US012675155B2

(12) United States Patent
Mori

(10) Patent No.: US 12,675,155 B2
(45) Date of Patent: Jul. 7, 2026

(54) METHOD AND SYSTEM

(71) Applicant: COVER Corp., Tokyo (JP)

(72) Inventor: Kohei Mori, Tokyo (JP)

(73) Assignee: COVER Corp., Tokyo (JP)

( * ) Notice: Subject to any disclaimer, the term of this patent is extended or adjusted under 35 U.S.C. 154(b) by 120 days.

(21) Appl. No.: 18/918,050

(22) Filed: Oct. 17, 2024

(65) Prior Publication Data

US 2025/0130630 A1     Apr. 24, 2025

(30) Foreign Application Priority Data

Oct. 18, 2023   (JP) ................................. 2023-179859
Oct. 18, 2023   (JP) ................................. 2023-179860
Oct. 18, 2023   (JP) ................................. 2023-179861
Oct. 18, 2023   (JP) ................................. 2023-179862

(51) Int. Cl.
  *G06F 3/01*      (2006.01)
  *G06T 11/00*     (2026.01)
  *G06V 20/20*     (2022.01)
  *H04L 65/1089*   (2022.01)

(52) U.S. Cl.
  CPC .............. *G06F 3/011* (2013.01); *G06T 11/00*
      (2013.01); *G06V 20/20* (2022.01); *H04L*
                          *65/1089* (2013.01)

(58) Field of Classification Search
  None
  See application file for complete search history.

(56) References Cited

U.S. PATENT DOCUMENTS

| | | | | |
|---|---|---|---|---|
| 5,956,028 | A * | 9/1999 | Matsui ..................... | H04N 7/15 |
| | | | | 348/E7.083 |
| 6,119,147 | A | 9/2000 | Toomey et al. | |
| 6,401,122 | B1 | 6/2002 | Matsui et al. | |
| 10,521,520 | B2 * | 12/2019 | Kaplan ................... | A63F 13/50 |
| 11,210,863 | B1 * | 12/2021 | Yan ......................... | G06T 19/20 |
| 2011/0153734 | A1 | 6/2011 | Kawakami et al. | |
| 2013/0172079 | A1 | 7/2013 | Ivanov et al. | |

(Continued)

FOREIGN PATENT DOCUMENTS

| | | |
|---|---|---|
| CN | 113645472 A | 11/2021 |
| JP | H10-40197 A | 2/1998 |

(Continued)

OTHER PUBLICATIONS

Japanese Notice of Reasons for Refusal dated Oct. 29, 2024 for Japanese application No. 2023-179862.

(Continued)

*Primary Examiner* — Parul H Gupta
(74) *Attorney, Agent, or Firm* — Yokoi & Co., U.S.A.; Toshiyuki Yokoi

(57) ABSTRACT

When first object information for displaying the first type of object is identifiable, a process is performed of displaying the predetermined space regardless of whether second object information for displaying the second type of object is identifiable, and displaying the predetermined space so that: when the second object information is identifiable, the second type of object is displayed in a display mode in accordance with the second object information; and when the second object information is not identifiable, an alternative object corresponding to the second type of object is displayed.

8 Claims, 44 Drawing Sheets

(56) References Cited

U.S. PATENT DOCUMENTS

| | | | |
|---|---|---|---|
| 2013/0204919 A1 | 8/2013 | Kitazato | |
| 2015/0130845 A1* | 5/2015 | Otero | G06T 15/30 |
| | | | 715/781 |
| 2018/0190025 A1* | 7/2018 | Paul | G06T 19/006 |
| 2019/0104235 A1 | 4/2019 | Bhaswar | |
| 2019/0156402 A1* | 5/2019 | Greenberger | G06Q 30/0643 |
| 2020/0404344 A1 | 12/2020 | Bathory | |
| 2022/0095008 A1 | 3/2022 | Otsuka et al. | |
| 2022/0152515 A1 | 5/2022 | Kanaya | |
| 2025/0166306 A1* | 5/2025 | Mori | G06F 9/455 |
| 2025/0272934 A1* | 8/2025 | Besecker | G06T 19/20 |
| 2025/0272935 A1* | 8/2025 | Besecker | G06T 19/20 |

FOREIGN PATENT DOCUMENTS

| | | |
|---|---|---|
| JP | 2000-50226 A | 2/2000 |
| JP | 2002-279449 A | 9/2002 |
| JP | 2003-103047 A | 4/2003 |
| JP | 2010-134800 A | 6/2010 |
| JP | 2011-092240 A | 5/2011 |
| JP | 2011-234301 A | 11/2011 |
| JP | 2012-120098 A | 6/2012 |
| JP | 2013-228850 A | 11/2013 |
| JP | 2017-055790 A | 3/2017 |
| JP | 2017-187995 A | 10/2017 |
| JP | 2020-98992 A | 6/2020 |
| JP | 2020-108074 A | 7/2020 |
| JP | 2020-167526 A | 10/2020 |
| JP | 2021-132393 A | 9/2021 |
| JP | 2021-153901 A | 10/2021 |
| JP | 2022-71783 A | 5/2022 |
| JP | 2022-80950 A | 5/2022 |
| JP | 2022-122110 A | 8/2022 |
| JP | 2023-27186 A | 3/2023 |
| JP | 2023-101506 A | 7/2023 |
| JP | 2023-119526 A | 8/2023 |
| WO | 2020/138107 A | 7/2020 |
| WO | 2022/040061 A | 2/2022 |
| WO | 2022/137522 A | 6/2022 |
| WO | 2022/137523 A | 6/2022 |

OTHER PUBLICATIONS

Japanese Notice of Reasons for Refusal dated Nov. 12, 2024 for Japanese application No. 2023-179859.
Japanese Notice of Reasons for Refusal dated Nov. 12, 2024 for Japanese application No. 2023-179861.
Japanese notice of reason for refusal dated Oct. 8, 2024.

* cited by examiner

FIG. 7

EVENT DATA

| EVENT ID | EVENT NAME | TS DATA | PERFORMER | MUSIC LIST | PARTICIPANT GROUP A | PARTICIPANT GROUP B | ··· |
|---|---|---|---|---|---|---|---|
| IV~1 | xxxx.xx ANNIVERSARY LIVE | tslstxx~1 | TID~0001 | mslstxx01 | 1.malist | 1.mblist** | ··· |
| IV~**2 | *** DEBUT LIVE | tslst***~1 | TID~0077 | mslst***02 | 2.malist | 2.mblist | ··· |
| ⋮ | ⋮ | ⋮ | ⋮ | ⋮ | ⋮ | ⋮ | ⋮ |

*TS DATA (TIME SCHEDULE DATA)

FIG. 8

PERFORMER USER DATA

| PERFORMER USER ID | ACCOUNT | NAME | AUTHENTICATIO N INFORMATION | AVATAR DATA | OWNED ITEMS | ... |
|---|---|---|---|---|---|---|
| TID–0001 | xxxx.xx@··· | xxxx.xx | s.sdatxxxxx | AID–xxxx–01 | xxxx.mylst** | ··· |
| TID–0002 | *.az@··· | * | s.sdat* | AID–*–01 | *f.mylst | ··· |
| ⋮ | ⋮ | ⋮ | ⋮ | ⋮ | ⋮ | ⋮ |

FIG. 9

VIEWER USER DATA

| VIEWER USER ID | ACCOUNT | AUTHENTICATION INFORMATION | AVATAR DATA | POINT BALANCE | PURCHASED ITEMS | NAME | ··· |
|---|---|---|---|---|---|---|---|
| MID–00001 | **1xyz@··· | s.sdat····· | MID–xxxx–01 | nnn | bitmlst.··· | ···· | ··· |
| MID–00002 | xx.bbb@··· | s.sdat····· | MID–***–01 | ppp | bitmlst.··· | ···· | ··· |
| ⋮ | ⋮ | ⋮ | ⋮ | ⋮ | ⋮ | ⋮ | ⋮ |

PERFORMER USER

VIRTUAL LIVE VENUE

IMAGES ON PC AS VIEWER TERMINAL
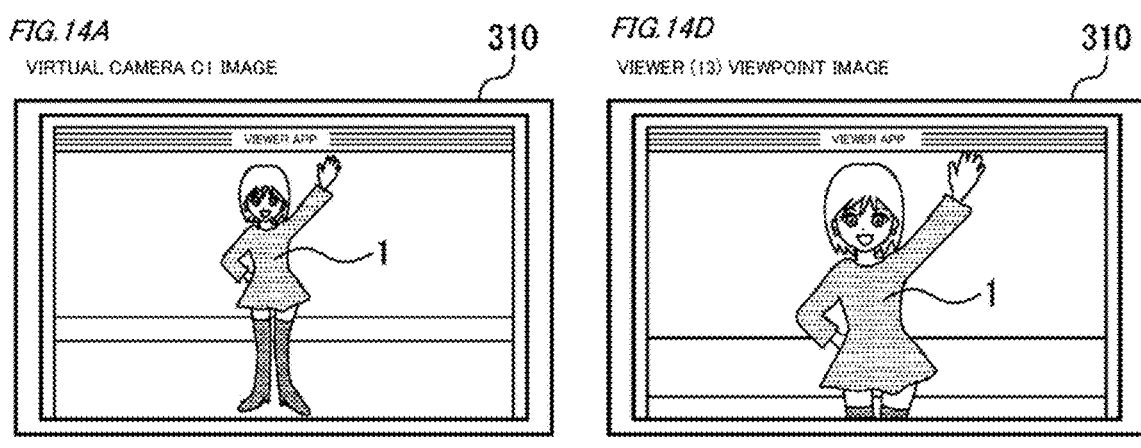
FIG.14A    310
VIRTUAL CAMERA C1 IMAGE
FIG.14D    310
VIEWER (13) VIEWPOINT IMAGE
FIG.14B    310
VIRTUAL CAMERA C4 IMAGE
FIG.14E    310
VIEWER (28) VIEWPOINT IMAGE
FIG.14C    310
VIRTUAL CAMERA C3 IMAGE
FIG.14F    310
VIEWER (32) VIEWPOINT IMAGE

IMAGES ON SMARTPHONE AS VIEWER TERMINAL

VIRTUAL CAMERA C1 IMAGE

VIEWER (13) VIEWPOINT IMAGE

VIRTUAL CAMERA C2 VIEWPOINT
(PERFORMER'S VIEWPOINT)

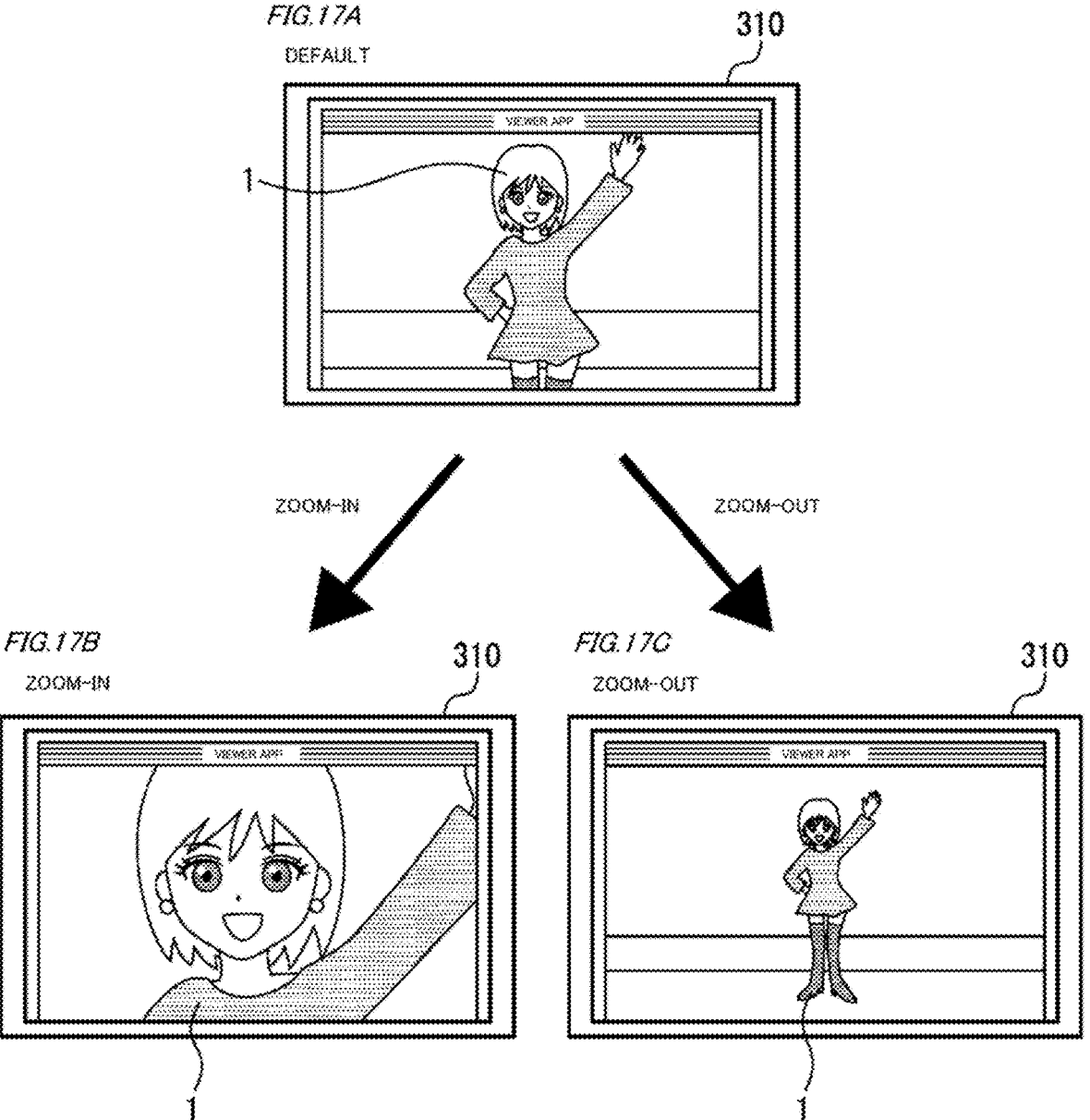

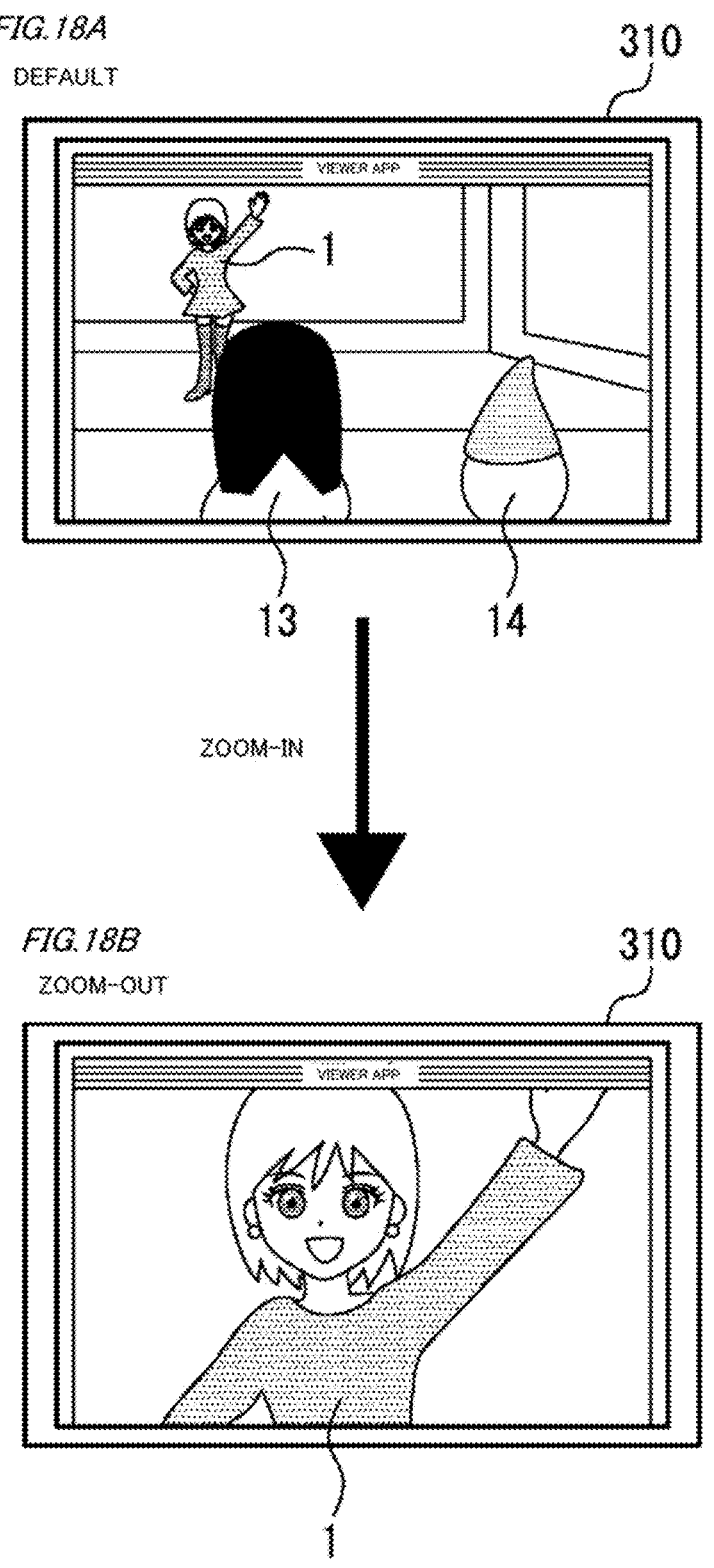

MOTION TRACKED

NOT MOTION TRACKED

FLYING PERFORMANCE PERIOD
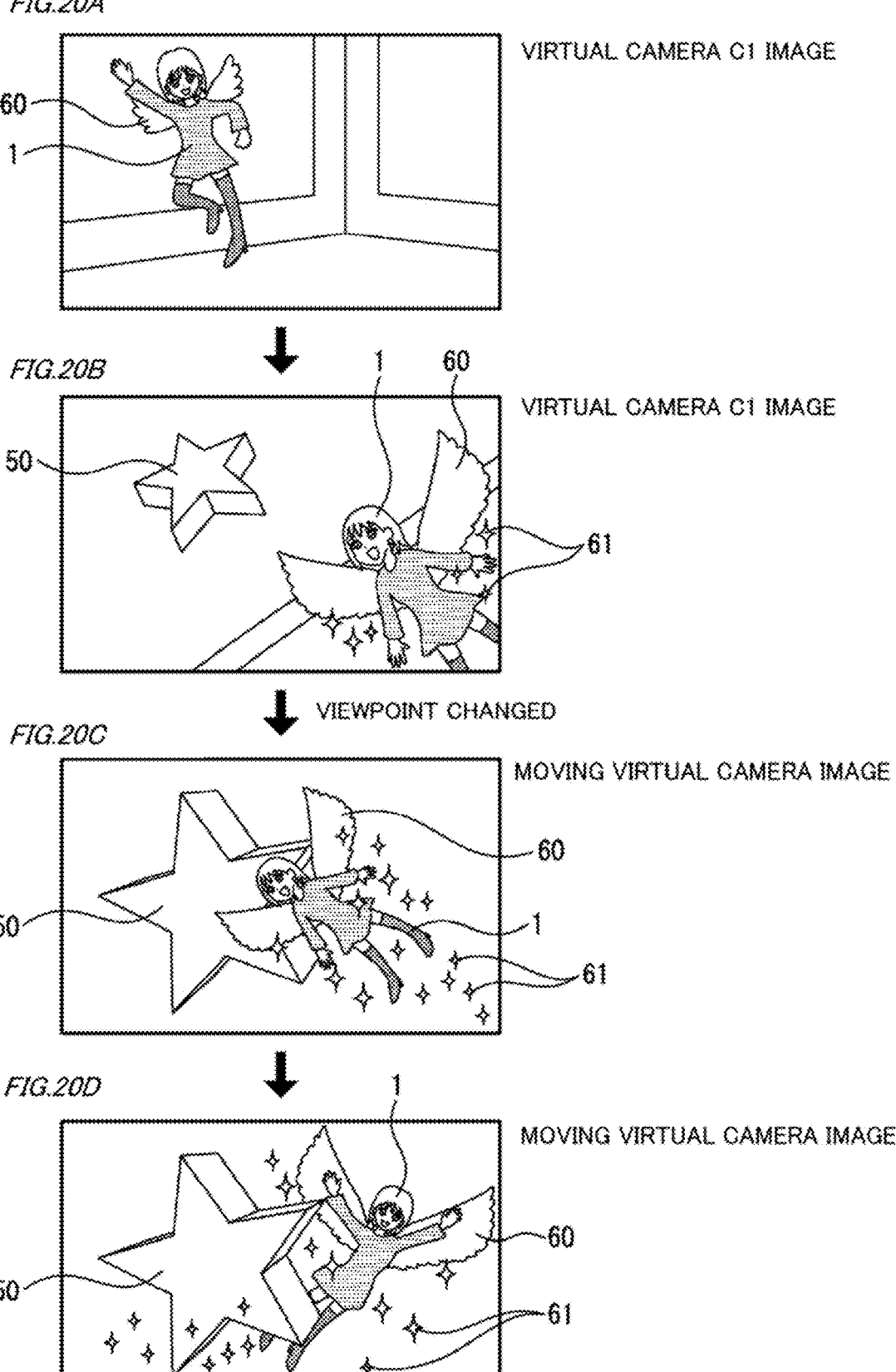
FIG.20A     VIRTUAL CAMERA C1 IMAGE
FIG.20B     VIRTUAL CAMERA C1 IMAGE
VIEWPOINT CHANGED
FIG.20C     MOVING VIRTUAL CAMERA IMAGE
FIG.20D     MOVING VIRTUAL CAMERA IMAGE

UNTIL SPECIFIC PERIOD BEFORE SCHEDULED DATE

FROM SPECIFIC PERIOD BEFORE

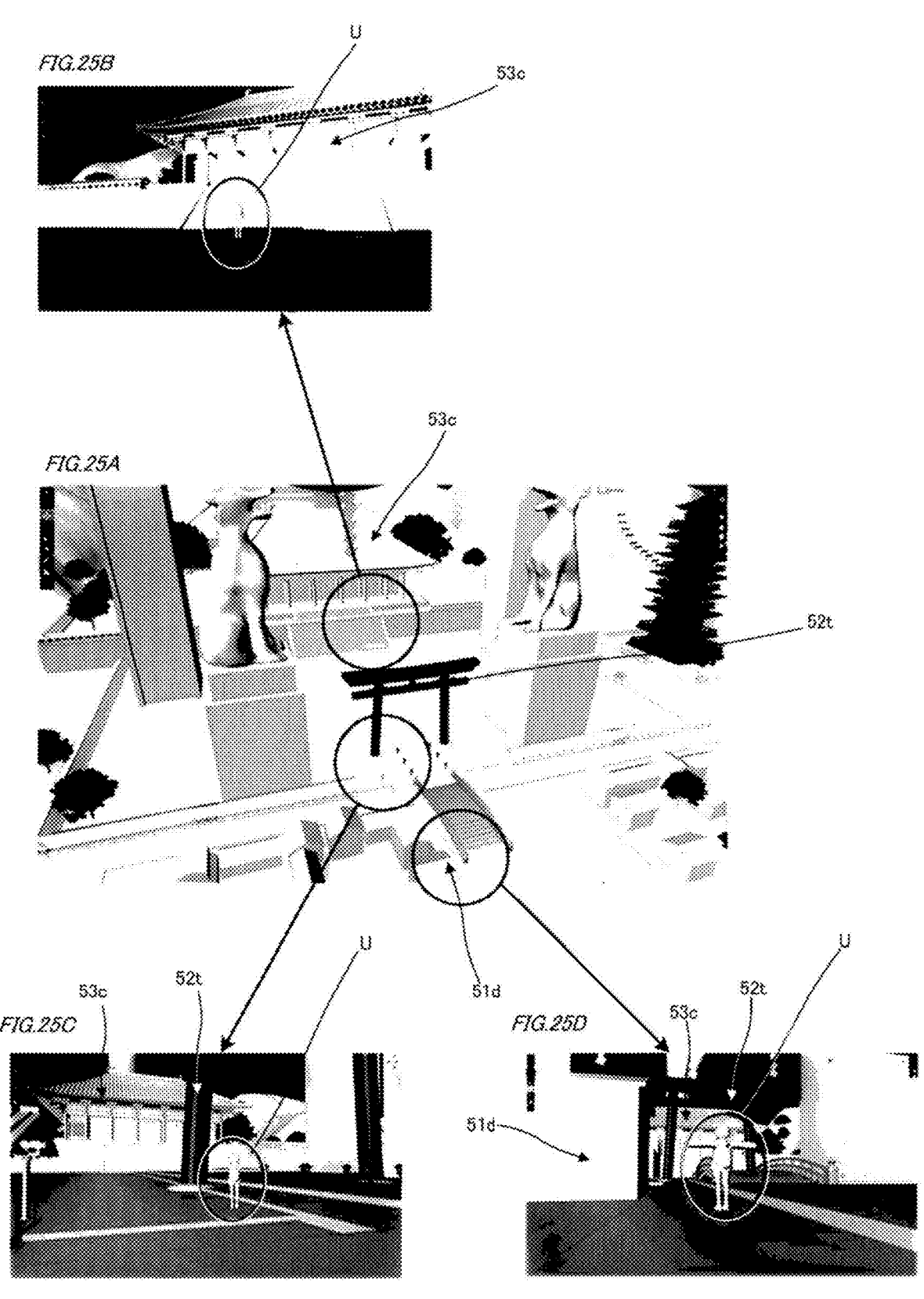

FS PURCHASE SCREEN

DISPLAYED SCREEN AFTER FS PURCHASE

FIG.27A

TABLE FOR ATTRIBUTES

| MOTIF (ATTRIBUTE) | MOTIF COLOR | PRICE (COIN) | |
|---|---|---|---|
| PLAIN | PLAIN | SMALL | 500 COIN |
| CHERRY BLOSSOM | PINK/WHITE | LARGE | 2500 COIN |
| | | SMALL | 500 COIN |
| DEMON | RED/BLACK | LARGE | 2500 COIN |
| | | SMALL | 500 COIN |
| WHITE FOX | WHITE/LIGHT BLUE | LARGE | 2500 COIN |
| | | SMALL | 500 COIN |
| BLACK FOX | BLACK/RED | LARGE | 2500 COIN |
| | | SMALL | 500 COIN |
| GORGEOUS | GOLD | LARGE | 5000 COIN |

FIG.27B

TABLE FOR SIZES

| SIZE | FONT TYPES | FONT COLORS | UPPER LIMIT FOR LETTERS | PLACEMENT AREA |
|---|---|---|---|---|
| LARGE | FONT A | BLACK | 1 LETTER + 1 LETTER | MAIN STREET (WEST) |
| | | | | MAIN STREET (EAST) |
| | FONT B | RED | | BIG SHRINE GATE |
| SMALL | FONT A | BLACK | 10 LETTER | SHRINE GROUNDS (WEST) |
| | | | | SHRINE GROUNDS (EAST) |
| | FONT B | RED | | FRONT OF WORSHIP HALL (WEST) |
| | | | | FRONT OF WORSHIP HALL (EAST) |

FIG.27C

USER RELATED INFORMATION(RELATED TO PURCHASED FS)

| USER ID | FS ID | PURCHASED FS | LETTERS | USER DESIGNATED AREA | POSITION | PURCHASED DATE AND TIME |
|---|---|---|---|---|---|---|
| 1 | a3 | CHERRY BLOSSOM, SMALL | AWESOME | A | A1 | 2023/6/3 1:00 |
| | b3 | GORGEOUS | GREAT | B | B7 | 2023/6/3 16:30 |
| | c3 | GORGEOUS | CONGRATS! | B | B4 | 2023/6/5 15:00 |
| 2 | d3 | WHITE FOX, SMALL | LETTERS D3 | C | C5 | 2023/6/1 0:15 |
| 3 | e3 | CHERRY BLOSSOM, SMALL | LETTERS E3 | A | A1 | 2023/6/1 20:30 |
| | f3 | BLACK FOX, LARGE | LETTERS F3 | D | D2 | 2023/6/6 21:03 |
| 4 | g3 | DEMON, LARGE | LETTERS G3 | D | D6 | 2023/6/2 9:21 |
| ... | ... | ... | ... | ... | ... | ... |

EXHIBITION AREA A FOR USER 1

INITIAL POSITION (MIDNIGHT)

NEWLY PURCHASE FS1

SWITCHING CONDITION MET (3AM)

SWITCHING CONDITION MET (4AM)

EXHIBITION AREA A FOR USER 2

INITIAL POSITION (MIDNIGHT)

WHEN USER 1 NEWLY PURCHASES FS1

SWITCHING CONDITION MET (2AM)

SWITCHING CONDITION MET (4AM)

*FIG.31A*

DEFAULT FS PLACEMENT INFORMATION FOR EXHIBITION AREA A (SMALL FS PLACEABLE AREA)

| LOCATIONS | FS ID | LETTERS |
|-----------|-------|---------|
| A1 | a1 | LETTERS A |
| A2 | b1 | LETTERS B |
| A3 | c1 | LETTERS C |
| A4 | d1 | LETTERS D |
| ... | ... | ... |

*FIG.31B*

DEFAULT FS PLACEMENT INFORMATION FOR EXHIBITION AREA B (LARGE FS PLACEABLE AREA)

| LOCATIONS | FS ID | LETTERS |
|-----------|-------|---------|
| B1 | a2 | LETTERS A2 |
| B2 | b2 | LETTERS B2 |
| B3 | c2 | LETTERS C2 |
| B4 | d2 | LETTERS D2 |
| ... | ... | ... |

EXHIBITION AREA A (INCLUDING FS OF SPECIAL USER), FOR USER 2

INITIAL POSITION (MIDNIGHT)

NEWLY PURCHASE FS1

SWITCHING CONDITION MET (2AM)

SWITCHING CONDITION MET (4AM)

FIG.36A

DEFAULT EVENT FS INFORMATION

| MOTIF (ATTRIBUTE) | | FS ID | LETTERS |
|---|---|---|---|
| CHERRY BLOSSOM | LARGE | a4 | LETTERS A4 |
| | SMALL | b4 | LETTERS B4 |
| DEMON | LARGE | c4 | LETTERS C4 |
| | SMALL | d4 | LETTERS D4 |
| WHITE FOX | LARGE | e4 | LETTERS E4 |
| | SMALL | f4 | LETTERS F4 |
| BLACK FOX | LARGE | g4 | LETTERS G4 |
| | SMALL | h4 | LETTERS H4 |
| GORGEOUS | LARGE | i4 | LETTERS I4 |

FIG.36B

EVENT FS INFORMATION ON USER 1 TERMINAL

| MOTIF (ATTRIBUTE) | | FS ID | LETTERS |
|---|---|---|---|
| CHERRY BLOSSOM | LARGE | a4 | LETTERS A4 |
| | SMALL | a3 | AWESOME |
| DEMON | LARGE | c4 | LETTERS C4 |
| | SMALL | d4 | LETTERS D4 |
| WHITE FOX | LARGE | e4 | LETTERS E4 |
| | SMALL | f4 | LETTERS F4 |
| BLACK FOX | LARGE | g4 | LETTERS G4 |
| | SMALL | h4 | LETTERS H4 |
| GORGEOUS | LARGE | c3 | CONGRATS ! |

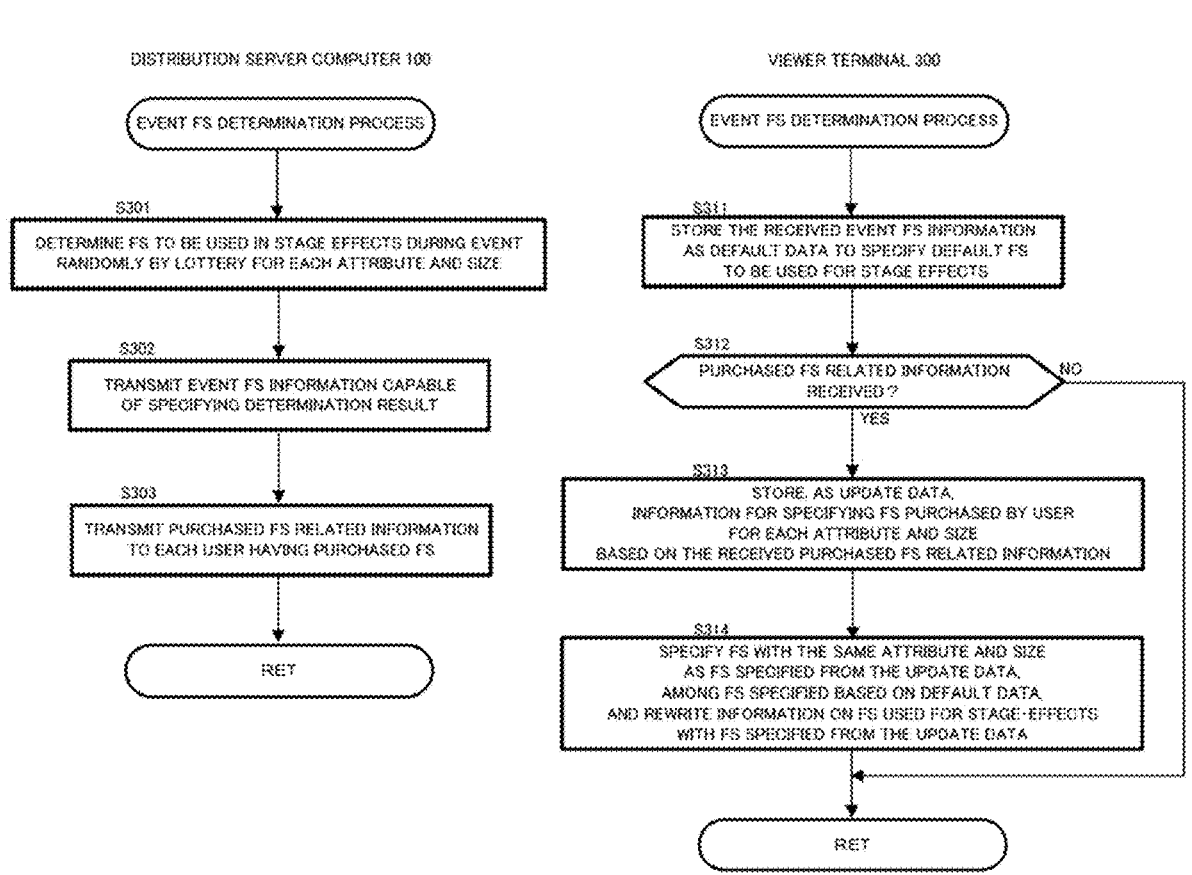

FIG.37A

*DISTRIBUTION SERVER COMPUTER 100*

EVENT FS DETERMINATION PROCESS

S301
DETERMINE FS TO BE USED IN STAGE EFFECTS DURING EVENT RANDOMLY BY LOTTERY FOR EACH ATTRIBUTE AND SIZE

S302
TRANSMIT EVENT FS INFORMATION CAPABLE OF SPECIFYING DETERMINATION RESULT

S303
TRANSMIT PURCHASED FS RELATED INFORMATION TO EACH USER HAVING PURCHASED FS

RET

FIG.37B

*VIEWER TERMINAL 300*

EVENT FS DETERMINATION PROCESS

S311
STORE THE RECEIVED EVENT FS INFORMATION AS DEFAULT DATA TO SPECIFY DEFAULT FS TO BE USED FOR STAGE EFFECTS

S312
PURCHASED FS RELATED INFORMATION RECEIVED ? — NO

YES

S313
STORE, AS UPDATE DATA, INFORMATION FOR SPECIFYING FS PURCHASED BY USER FOR EACH ATTRIBUTE AND SIZE BASED ON THE RECEIVED PURCHASED FS RELATED INFORMATION

S314
SPECIFY FS WITH THE SAME ATTRIBUTE AND SIZE AS FS SPECIFIED FROM THE UPDATE DATA, AMONG FS SPECIFIED BASED ON DEFAULT DATA, AND REWRITE INFORMATION ON FS USED FOR STAGE-EFFECTS WITH FS SPECIFIED FROM THE UPDATE DATA

RET

FIG. 38

| NUMBER OF ENTERING TIMES | ITEMS | STAGE EFFECTS |
|---|---|---|
| 1 | LIMITED CRACKER A | NORMAL |
| 2 | LIMITED CRACKER B | NORMAL |
| 3 | LIMITED CRACKER C | NORMAL |
| 4 | LIMITED FIREWORKS | SPECIAL ROOM A |
| 5 | LIMITED GLOW STICK | SPECIAL ROOM B |
| 6 | LIMITED STAMP | SPECIAL ROOM S |
| 7 | LIMITED ITEM SET | SECRET COSTUM |

EXAMPLE FS FOR CONTENT RE-PROVISION (CONTENT TAKEN OVER)

EXAMPLE FS FOR CONTENT RE-PROVISION (CONTENT NOT TAKEN OVER)

MULTIPLE ROOMS EACH MAKING UP VIRTUAL SPACE

EXAMPLE OF SPECIAL PROCESSING FOR ROOM ENTRY

METHOD AND SYSTEM

BACKGROUND

1. Technical Field

The present invention relates to methods and systems.

2. Description of the Background

A system is known, which provides a virtual space to users via a network and enables them to interact with other users in the virtual space (see Patent Literature 1, for example).

In such a known system, a server distributes desired data in response to a request from a user terminal, and the user terminal generates and displays a virtual space on the basis of the data.

CITATION LIST

Patent Literature

Patent Literature 1: JP 2011-092240

BRIEF SUMMARY

When many users flock to the server, for example, conventional systems may fail to deliver desired data to the user terminals, from which the accesses originate, because the load on the server increases. As a result, the user terminals may not be able to display the virtual space. When a live event is to be held in the virtual space at a predetermined date and time, the number of logins increases around that time, which may make it impossible for users to even log in.

In views of the above, the present invention provides a method and a system that enable a user to enter a virtual space and display the virtual space even when many users flock to the server for access.

(1) A computer control method according to one aspect of the present invention controls a computer (e.g., distribution server computer 100 and viewer terminal 300) that is configured to provide a virtual space to a user, and the method includes:

a step of performing a process (e.g., a virtual space update data distribution process, a viewer's viewpoint image output process) to display an image in the virtual space, the virtual space including a predetermined space (e.g., space ER5), in which a plurality of types of objects including: a first type of object (e.g., objects that are essential to generate a virtual space, and include the buildings and virtual stage G that is a stage object); and a second type of object (e.g., objects that liven up the atmosphere in the virtual space, and include flower stands FS) are displayable, the step of performing a process to display an image in the virtual space including:

when first object information for displaying the first type of object is identifiable, performing a process (e.g., see step S215 to step S245 in FIG. 33, and (Flower stand switching process 2) in Modified Examples) of displaying the predetermined space, regardless of whether second object information for displaying the second type of object is identifiable, and displaying the predetermined space so that: when the second object information is identifiable, the second type of object is displayed in a display mode in accordance with the second object information (e.g., if all the flower stand placement information has been read out at step S225 in FIG. 33, transmitting it to a user at step S205); and when the second object information is not identifiable, an alternative object corresponding to the second type of object is displayed.

This configuration allows the user, if the first object information is identified regardless of whether the second object information is identifiable or not, to display the virtual space, and also allows the user to, if the second object information is not identifiable, to display an alternative object. This allows the user to enter the virtual space and display the virtual space even when the second object information is not identifiable because the server is overloaded due to a concentration of access, for example.

(2) In the above (1), the computer is a user terminal (e.g., a viewer terminal 300) that displays a virtual space provided, and the step of performing a process to display an image in the virtual space includes: displaying an alternative object (e.g., see (Flower stand switching process 2) in Modified Examples) when the first object information is identifiable and when the second type of object is not identifiable after a predetermined time has elapsed since the timing when the second object information is to be received after a request for object information.

This configuration allows the user, if the second type of object is not identifiable even after a predetermined time has elapsed since the timing when the user terminal requests for object information, to display the virtual space, in which an alternative object is placed.

(3) In the above (1), the computer is a distribution device (e.g., a distribution server computer 100) that distributes information for providing the virtual space to a user terminal, and when the distribution device receives a request for object information from the user terminal, and identifies object information including the second object information for distributing, the step of performing a process to display an image in the virtual space distributes (e.g., step S245 to step S205 in FIG. 33) alternative object information for displaying the alternative object when the second object information is not identifiable (e.g., when flower stand placement information is not identifiable after a predetermined time at step S225 to step S235 in FIG. 33).

This configuration allows the user, if the distribution device, which receives a request for object information from the user terminal, fails to identify second object information, to display the virtual space on the user terminal because the distribution device distributes alternative object information for displaying an alternative object.

(4) In the above (1), the predetermined space is a space for providing event content (e.g., live event in spatial area ER5 in FIGS. 24A and 24B) in the predetermined space on a scheduled date.

Even if the virtual space is for providing event content on a scheduled date, and many users flock to the distribution device such as a server on that scheduled date, this configuration allows a user to display the virtual space when the first object information is identified, regardless of whether or not the second object information is identifiable.

(5) In the above (1), the second type of object is an object whose display mode is changeable (e.g., flower stands FS in FIGS. 29A, 29B, 29C, and 29D and FIGS. 30A, 30B, 30C and 30D), and the second object information being not identifiable includes display mode information (e.g., flower stand placement information updated at step S203 in FIG. 32 and at step S213 in FIG. 33) corresponding to a current display mode of the second type of object being not identifiable, and the step of performing a process to display an image in the virtual space including: displaying the predetermined space so that: when the display mode information is identifiable, the second type of object is displayed in a display mode in accordance with the display mode information (e.g., if all the flower stand placement information has been read out at step S225, transmitting it to a user at step S205); and when the display mode information is not identifiable, the second type of object that is the alternative object is displayed in a predetermined display mode (e.g., identifying the alternative flower stand at step S225 to step S245 in FIG. 33 and transmitting it to a user at step S205).

This configuration allows the user to display a second type of object in a predetermined display mode even when the display mode information of the second type of object is not identifiable. This allows the user to enter the virtual space and display the virtual space on the user terminal even when the display mode information corresponding to the current display mode of the second type of object is not identifiable because many users flock to the distribution device such as a server.

(6) In the above (1), the second type of object is an object whose display mode is changeable in accordance with a user's action in the virtual space (e.g., flower stand FS that can be exhibited in the exhibition area by the user through the purchase process in FIG. 28).

This configuration allows the user to display a second type of object whose display mode is changeable in accordance with the user's action. This makes it possible to attract the user's attention to how the display mode of the second type of object displayed in the virtual space changes in accordance with the user's action.

(7) In the above (6), the user's action includes user's operation of placing the second type of object in the predetermined space and the user's operation of generating a display mode of the second type of object when placing the object (e.g., the user is allowed to generate the display mode at step S104 in FIG. 28 by inputting text in the flower stand FS that can be exhibited in the exhibition area through the purchase process in FIG. 28).

This configuration allows the user to feel a sense of interest in operating how to change the placement position and display mode of the second type of object.

(8) A system (virtual space content distribution system) according to one aspect of the present invention includes a computer (e.g., distribution server computer 100 and viewer terminal 300) that is configured to provide a virtual space to a user, the system including the computer including a processor and a memory, the processor being configured to perform a process (e.g., a virtual space update data distribution process, a viewer's viewpoint image output process) to display an image in the virtual space, the virtual space including a predetermined space (e.g., space ER5), in which a plurality of types of objects including: a first type of object (e.g., objects that are essential to generate a virtual space, and include the buildings and virtual stage G that is a stage object); and a second type of object (e.g., objects that liven up the virtual space, and include flower stands FS) are displayable,

when first object information for displaying the first type of object is identifiable, perform a process (e.g., see step S215 to step S245 in FIG. 33, and (Flower stand switching process 2) in Modified Examples) of displaying the predetermined space, regardless of whether second object information for displaying the second type of object is identifiable, and display the predetermined space so that: when the second object information is identifiable, the second type of object is displayed in a display mode in accordance with the second object information (e.g., if all the flower stand placement information has been read out at step S225 in FIG. 33, transmitting it to a user at step S205); and when the second object information is not identifiable, an alternative object corresponding to the second type of object is displayed (e.g., see step S245 in FIG. 33 to identify an alternative flower stand, and (Flower stand switching process 2) in Modified Examples).

This configuration allows the user, if the first object information is identified regardless of whether the second object information is identifiable or not, to display the virtual space, and also allows the user to, if the second object information is not identifiable, to display an alternative object. This allows the user to enter the virtual space and display the virtual space even when the second object information is not identifiable because the server is overloaded due to a concentration of access, for example.

BRIEF DESCRIPTION OF DRAWINGS

FIG. 7 shows an example configuration of event data in the virtual space content distribution system according to one embodiment of the present invention.

FIG. 8 shows an example configuration of performer user data in the virtual space content distribution system according to one embodiment of the present invention.

FIG. 9 shows an example configuration of viewer user data in the virtual space content distribution system according to one embodiment of the present invention.

FIGS. 14A, 14B, 14C, 14D, 14E and 14F show an example display on a viewer terminal that makes up the virtual space content distribution system according to one embodiment of the present invention.

FIGS. 17A, 17B, and 17C show an example display by zoom operation on a viewer terminal that makes up the virtual space content distribution system according to one embodiment of the present invention.

FIGS. 18A and 18B show an example display by zoom operation on a viewer terminal that makes up the virtual space content distribution system according to one embodiment of the present invention.

FIGS. 20A, 20B, 20C, and 20D show an example display during a flying performance period on a viewer terminal that makes up the virtual space content distribution system according to one embodiment of the present invention.

FIG. 22 shows a virtual live venue in a modified example.

FIGS. 25A, 25B, 25C and 25D show an example display mode in a predetermined type of virtual space according to one embodiment of the present invention.

FIGS. 27A, 27B, and 27C show an example table of object types used in the purchase process of objects displayed in the virtual space and user related information according to one embodiment of the present invention.

FIGS. 31A and 31B are tables showing an example of the relationship between objects displayed in a predetermined type of virtual space and the predetermined areas according to one embodiment of the present invention.

FIGS. 36A and 36B show an example table about objects displayed in the event content provided in a predetermined type of virtual space according to one embodiment of the present invention.

FIGS. 37A and 37B is a flowchart showing an example of the determination process of objects to be displayed in the event content provided in a predetermined type of virtual space according to one embodiment of the present invention.

FIG. 38 shows an example table used for the process related to the event content provided in a predetermined type of virtual space according to one embodiment of the present invention.

DETAILED DESCRIPTION

Figure 1:
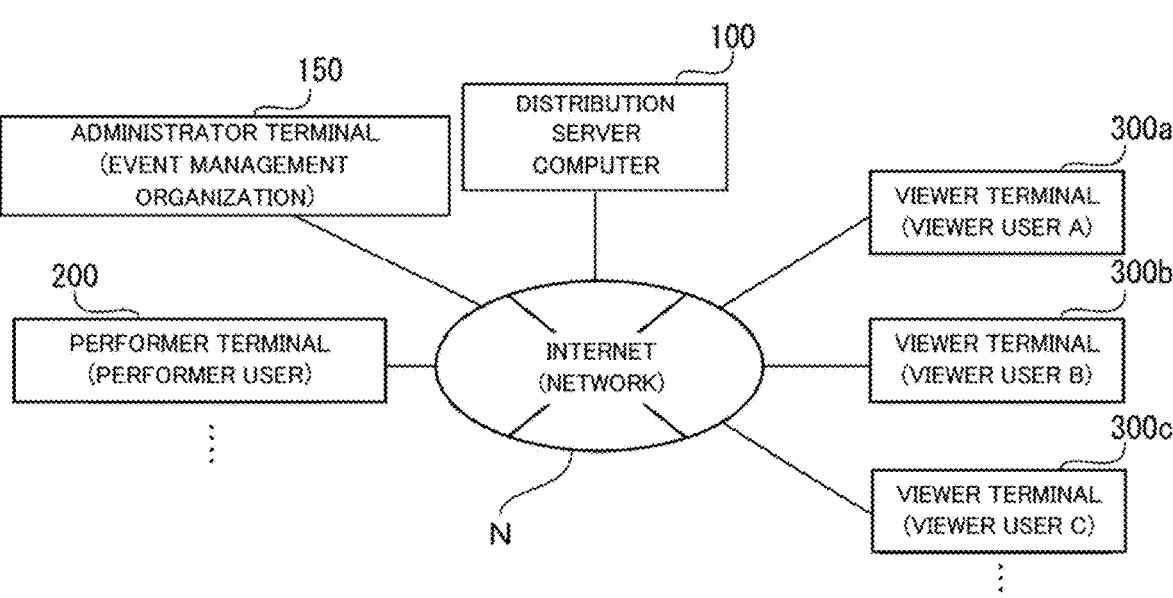
FIG. 1 is a block diagram of an example of the system configuration of a virtual space content distribution system according to one embodiment of the present invention.

Referring to the drawings, the following describes embodiments of the present invention that are a virtual space content distribution system configured to distribute various types of content in a virtual space, by way of examples. In the drawings, like numbers indicate like components to avoid redundant explanations. A distribution program executed in the virtual space content distribution system according to the present invention may be a program running in the entire system made up of a server computer and terminals, which will be described later and constitute the virtual space content distribution system. The program may be one that runs in only a part of the devices making up the virtual space content distribution system, just running in a server computer or each of the terminals, for example.

Example 1

FIG. 1 is a block diagram showing an example system configuration of a virtual space content distribution system in one embodiment of the present invention. This system shown in FIG. 1 distributes a virtual-space content that is a live event in a virtual space performed by a performer avatar 1 corresponding to a performer user. The live event includes live performance, games, social events, and movie watching parties in the virtual space.

As shown in FIG. 1, the virtual space content distribution system of the present embodiment mainly includes: a distribution server computer 100 capable of executing various processes related to the virtual space and various processes related to the provision and distribution of the virtual space; an administrator terminal 150 used by an event administrator K of an event management organization that manages and administers a live event in the virtual space to manage the distribution of the live event in the virtual space; a performer terminal 200 used by a performer user; and a viewer terminal 300 that a viewer user is allowed to use to enter and participate in the virtual space (e.g., by logging into the virtual space) and view the event content in the virtual space. The distribution server computer 100, the administrator terminal 150, the performer terminal 200, and the viewer terminal 300 are connected to each other for data communication via the internet network N, an open computer network.

The following describes an example of the present embodiment where the administrator terminal 150 and the performer terminal 200 are connected to the distribution server computer 100 via the internet network N, and the present invention is not limited to this. For instance, assume the case where an event management organization provides a studio to performer users, and the distribution server computer 100 is installed in this studio. In this case, the administrator terminal 150 and performer terminal 200 may be connected locally to this distribution server computer 100 for data communication, or they may be connected for communication via a local area network LAN within the studio facility.

As shown in FIG. 1, there are multiple viewer users such as viewer user A, viewer user B, and viewer user C, and the viewer terminals 300 may include a viewer terminal 300*a*, a viewer terminal 300*b*, a viewer terminal 300*c* . . . that the viewer user A, the viewer user B, the viewer user C . . . can use, respectively. Note that there is typically a plurality of viewer users, but they may be one user or four or more. The number of viewer users may be determined as appropriate depending on the type of event content provided in the virtual space. Hereinafter, these viewer user A, viewer user B, viewer user C . . . may be collectively called a viewer user, and the viewer terminal 300*a*, viewer terminal 300*b*, viewer terminal 300*c* . . . may be collectively called a viewer terminal 300.

The following describes an example of the present embodiment for a single performer user, and the present invention is not limited to this example. The event content provided in the virtual space may be a joint event in which multiple performer users who are working independently participate for performance, or a group event in which a group of multiple performer users who are working together participates. In this way, when multiple performers perform the live event, the performer terminal 200*a*, performer terminal 200*b*, performer terminal 200*c* . . . may be provided for each performer user, or when a group of multiple performers performs the event, they may share a single performer terminal 200. Note that a performer user (also referred to as a talent user) serves as a speaker, host/ facilitator, lead role, and others in the event content. Then, event content is facilitated by an avatar that acts as a facilitator, such as a performer avatar that corresponds to the actions of a performer user, and a management avatar that corresponds to the operations of the event manager (also called a management user).

FIG. 1 shows the distribution server computer 100 that is a single unit, and the present invention is not limited to this. This distribution server computer 100 may be configured with a plurality of server computers including a first server computer that mainly performs virtual space processing and a second server computer that mainly performs distribution processing. It may be configured with a cloud server, for example, and the number of server computers may be changed as appropriate depending on the scale of the live event, the number of viewer users participating in the event, and other factors.

Similarly, FIG. 1 shows the administrator terminal 150 that is a single unit, and the present invention is not limited to this. This administrator terminal 150 may include a plurality of terminals depending on the number of performer users and viewer users who participate in the event content such as a live performance, and the other factors.

<Distribution Server Computer>

Figure 2:
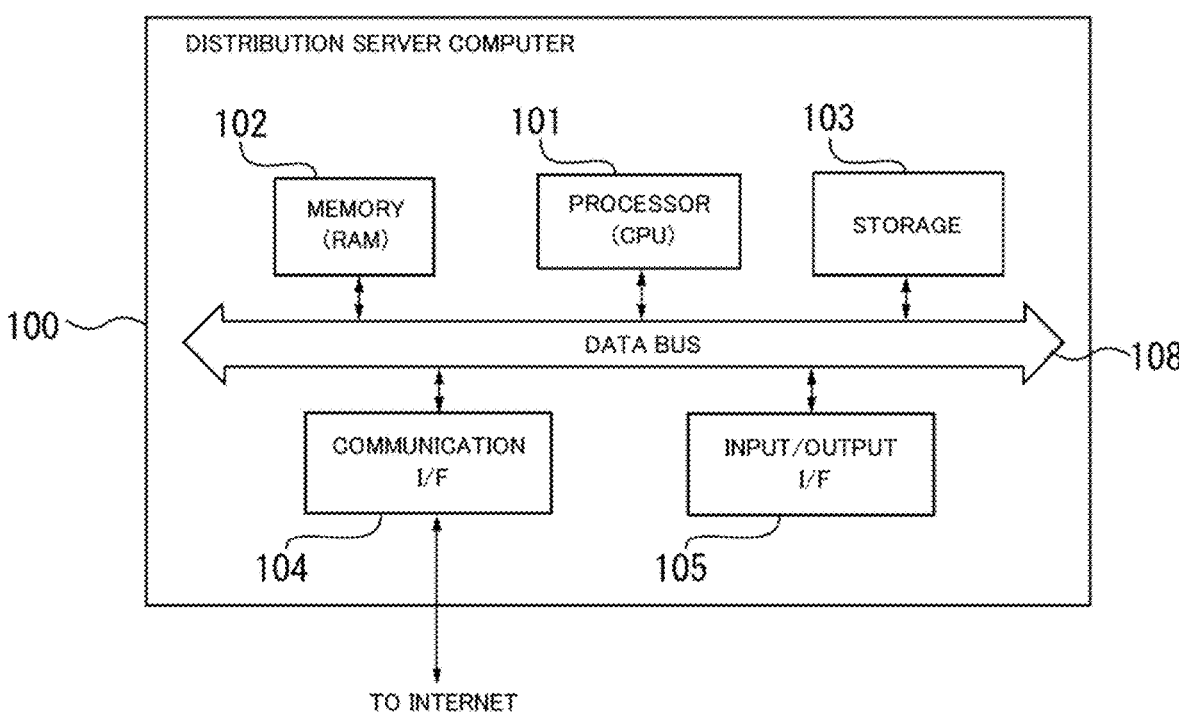
FIG. 2 shows an example configuration of a distribution server computer in the virtual space content distribution system according to one embodiment of the present invention.

FIG. 2 shows the configuration of the distribution server computer 100 used in the present embodiment. The distribution server computer 100 used in this embodiment is a typical server computer with relatively high processing power, installed in a studio operated by an event management organization, as described above. As shown in FIG. 2, the distribution server computer 100 includes a processor (CPU) 101, a memory (RAM) 102, a storage 103 such as a hard disk, a communication interface (I/F) 104 that enables bidirectional communications using TCP/IP protocols via the internet, an open computer network, and an input/output interface (I/F) 105 that enables connection with an input device such as a keyboard. These components are connected to a data bus 108.

This embodiment includes the input/output interface (I/F) 105 to enable local operation. Another embodiment may not include the input/output interface (I/F) 105 if remote operation is possible via the communication interface (I/F) 104.

Figure 3:
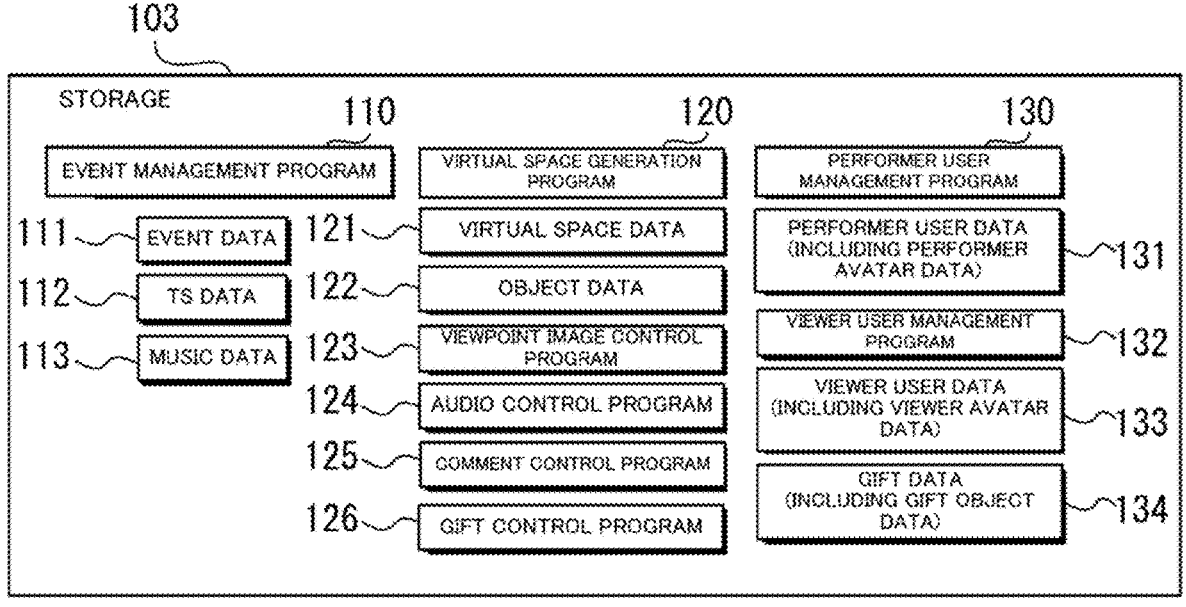
FIG. 3 shows various data stored in the storage of the distribution server computer according to one embodiment of the present invention.

The storage 103 of the distribution server computer 100 stores various data and programs, as shown in FIG. 3, in addition to an operation system (server OS) that provides server functions (not shown). Specifically, the storage 103 mainly stores: an event management program 110 that provides an event management function to manage various live events; a virtual space generation program 120 that provides a virtual space of an event venue; a performer user management program 130 that provides a performer user management function to manage a performer user; and a viewer user management program 132 that provides a viewer user management function to manage a viewer user.

The event management program 110 manages a live event held at the event venue in cooperation with the administrator terminal 150. The event management program 110 stored in the storage 103 is configured to manage the progress of the live event, using event data 111 (see FIG. 7), time schedule data (TS data) 112, music data 113, and other data also stored in the storage 103.

FIG. 7 shows an example of the event data 111 used in this embodiment. The event data 111 stores information associated with the event ID assigned uniquely to a live event, the information including the event name, the file name of the time schedule (TS) data, a performer ID uniquely assigned to a performer user who is a performer, the file name of a music list, the file name of a participating viewer list in which information on special viewer users is registered (the special viewer users are permitted to participate virtually in the third area of the virtual audience area described below), and the file name of a participating viewer list in which information on viewer users is registered (the participating users have reserved virtual participation in the fourth area of the virtual audience area described below). The event data also includes information that specifies the date and time when the live event is held, so that the event content will be distributed at the date and time. The event data also includes information that specifies the date and time of opening the virtual space for content. For the content, the virtual space where the live event will be held is opened before the scheduled date of the event, so that a user is allowed to enter the virtual space.

The time schedule data (TS data) 112 describes the progression order and the list of program (e.g., music) for the virtual space live event to be held in chronological order. The virtual space live event will be managed to proceed in accordance with the time schedule described in this time schedule data (TS data) 112. These time schedule data (TS data) 112, event data 111, and other data may be changed, updated, or added by the event administrator K operating the administrator terminal 150.

The music data 113 is data on a performance part (or karaoke) of each song, with which the performer user sings. The music data 113, which is reproduced by the audio control program 124 described later, is transmitted to the performer terminal 200 and viewer terminal 300 in accordance with the time schedule data (TS data) 112 by the event management program 110 (see FIG. 11).

The virtual space generation program 120 provides an event venue that is a virtual space. The virtual space generation program 120 has the function of providing an event venue in which a performer avatar and a viewer avatar are virtually participating, using various data stored in the storage 103, including virtual space data 121 describing the structure of the event venue, object data 122 to place various objects in the event venue (the objects including star decorations 43 on the stage and star objects 50 to 52 in the sky) within the virtual space, and performer avatar data included in performer user data 131 and viewer avatar data included in viewer user data 133 described later.

Figure 13:
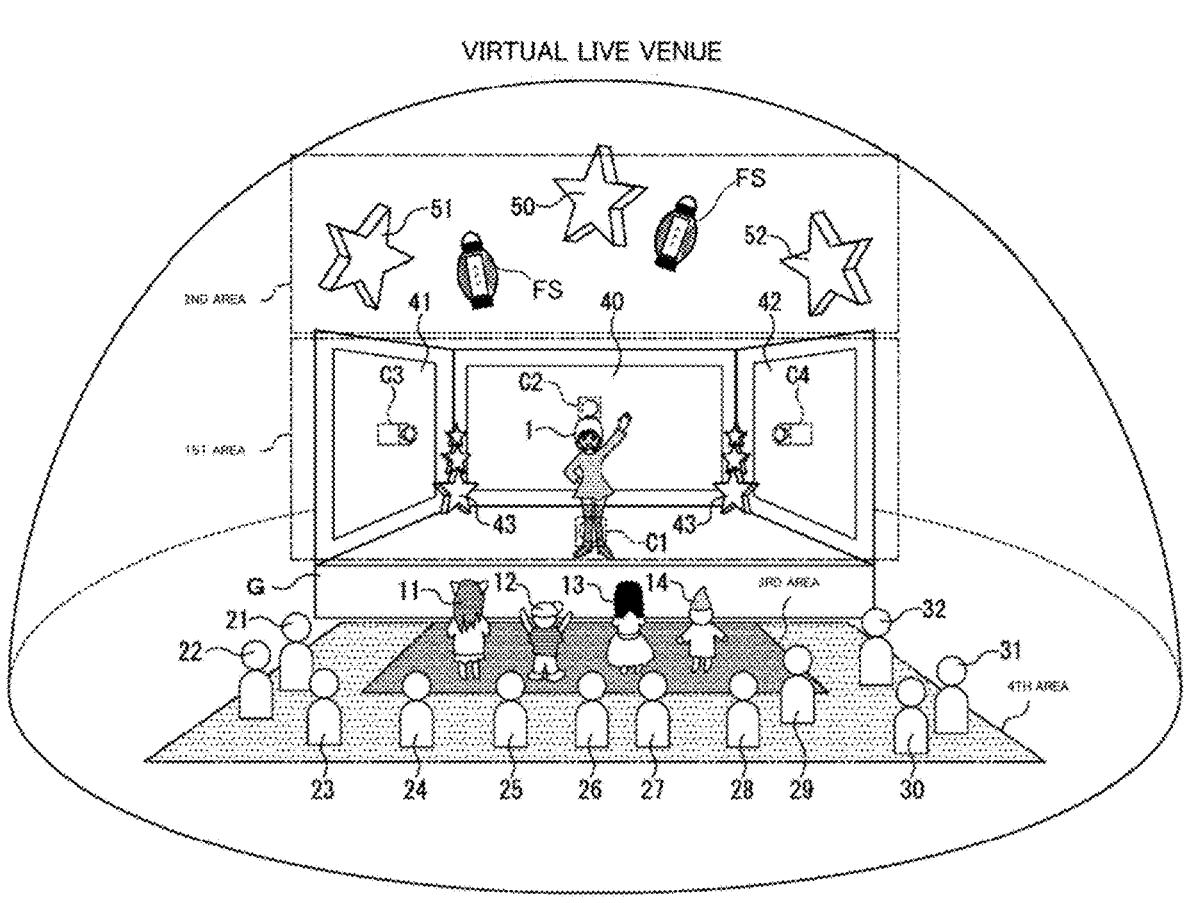
FIG. 13 shows a virtual live venue that is a virtual space used in the virtual space content distribution system according to one embodiment of the present invention.

The viewpoint image control program 123 provides a function of generating viewpoint images from virtual cameras C1 to C4 and from an aerial moving virtual camera (not shown). These virtual cameras are virtually set at the event venue as shown in FIG. 13, for example. The viewpoint image control program 123 also provides a function of displaying, on the performer terminal 200, images from the viewpoints of viewer avatars 11 to 14 who are participating virtually in the third area of the event venue and of viewer avatars 21 to 32 who are virtually participating in the fourth area of the event venue, in cooperation with the viewer terminals 300. The virtual camera C2 is set to obtain an image from the viewpoint of the performer avatar 1 who is on the stage of the event venue, and the viewpoint image from this virtual camera C2 is projected onto a screen S in the studio by the projector 211 (described below) that is connected to the performer terminal 200.

The audio control program 124 controls the audio (including music) distributed at a live event in the virtual space. Specifically, the audio control program 124 provides a reproduction function of the music data 113 and a function of combining the sound that the performer user issues with the reproduced music and distributing it to the administrator terminal 150 and the viewer terminal 300.

The comment control program 125 provides a function of, cooperating with a viewer comment control program (described below) stored in the viewer terminal 300, displaying various comments, which are entered by each viewer user with their viewer terminal 300 during the live event in the virtual space, on the performer terminal 200 and viewer terminal 300 in chronological order.

The gift control program 126 controls a gift that a viewer user gives to the performer user, in cooperation with a program for viewer (described later) stored in the viewer terminal 300. Specifically, the gift control program 126 provides a function of allowing a viewer user to purchase a gift (e.g., purchase an object) based on the information on the unit purchase price set for various gifts stored in the gift data 134, a processing function of allowing a viewer user to give the gift purchased using the object data of the gift included in the gift data 134 to the performer user (including the processing for stage effects to give the gift), and a processing function of changing the owner of the gift that has been given from the viewer user to the performer user.

The performer user management program 130 provides a management function and an authentication function for information relating to the performer user, based on the performer user data 131 shown in FIG. 8, which is stored in the storage 103 together with the performer user management program 130.

FIG. 8 shows an example of the performer user data 131 used in this embodiment. The performer user data 131 stores various information, such as the account (e-mail address), name, and authentication information of the performer user, the file name of the avatar data of the avatar used in the virtual space, and the file name of the item list in which the items owned by the performer user are registered, and these pieces of information are in association with the performer user ID that is uniquely assigned to a performer user. Although not shown in FIG. 8, the performer user data 131 may also store information on the virtual value such as points owned by each performer user.

Checking of the performer user ID, account, and authentication information allows the authentication of each performer user, and checking of the item list allows specification of the items (gifts), which the performer user have received from viewers to own.

The viewer user management program 132 provides a management function and an authentication function for information relating to a viewer user, based on the viewer user data 133 shown in FIG. 9, which is stored in the storage 103 together with the viewer user management program 132.

FIG. 9 shows an example of the viewer user data 133 used in this embodiment. The viewer user data 133 stores various information, such as the account (e-mail address) and authentication information of a viewer user, the file name of the avatar data of the avatar used in the virtual space, point balance that is the points owned that can be used in the virtual space, the file name of the item list in which items (gifts) purchased using points are registered, and personal information such as name, date of birth, and telephone number. These pieces of information are in association with the viewer user ID that is uniquely assigned to a viewer user. Although not shown in FIG. 9, the nickname (comment name) displayed together with a comment is also registered in the viewer user data 133, and this nickname (comment name) is displayed together with the comment. The viewer user is allowed to increase their points by purchasing them from a specified management company, for example.

<Performer Terminal>

Figure 4:
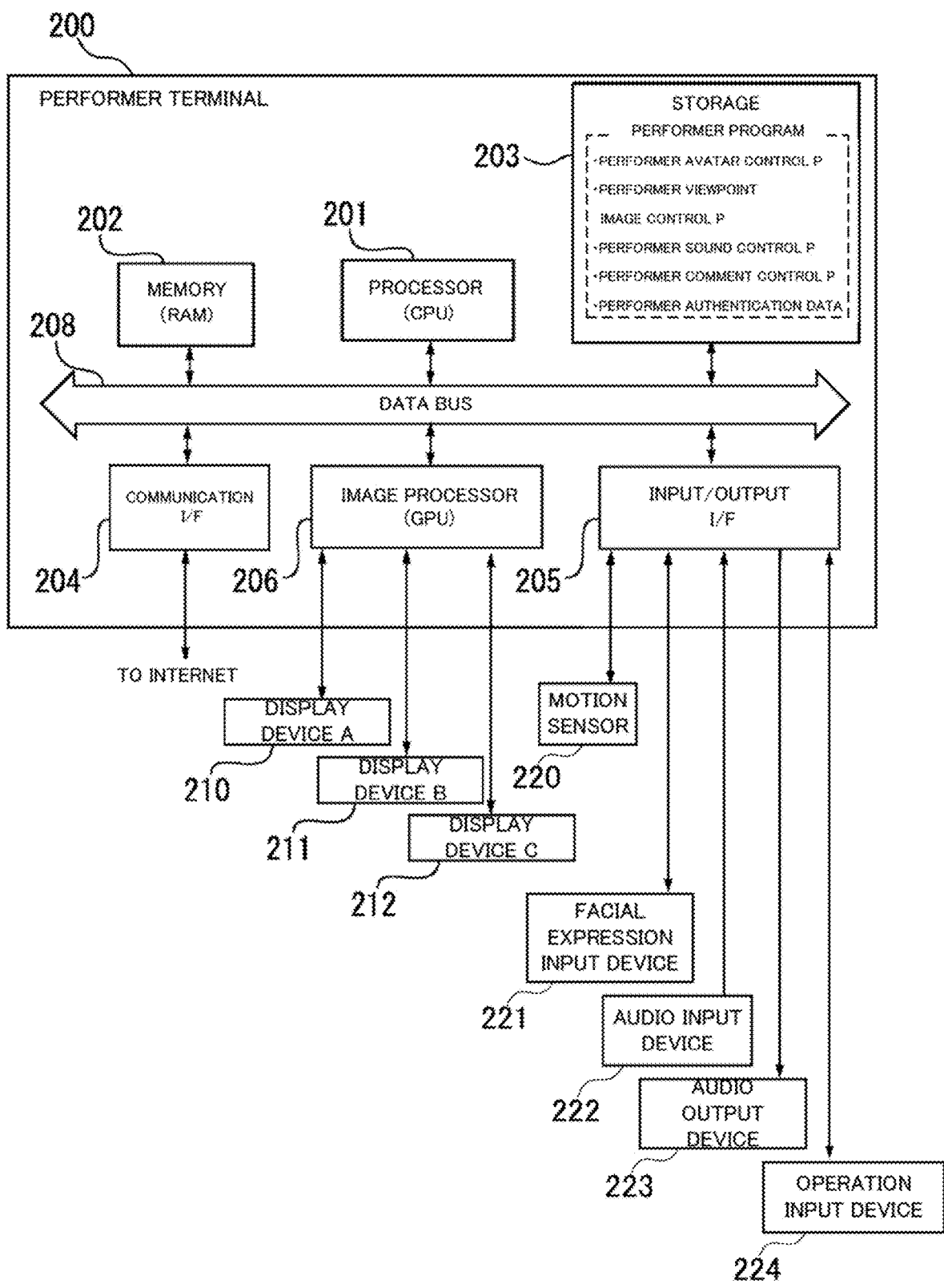
FIG. 4 shows an example configuration of a performer terminal in the virtual space content distribution system according to one embodiment of the present invention.
Figure 11:
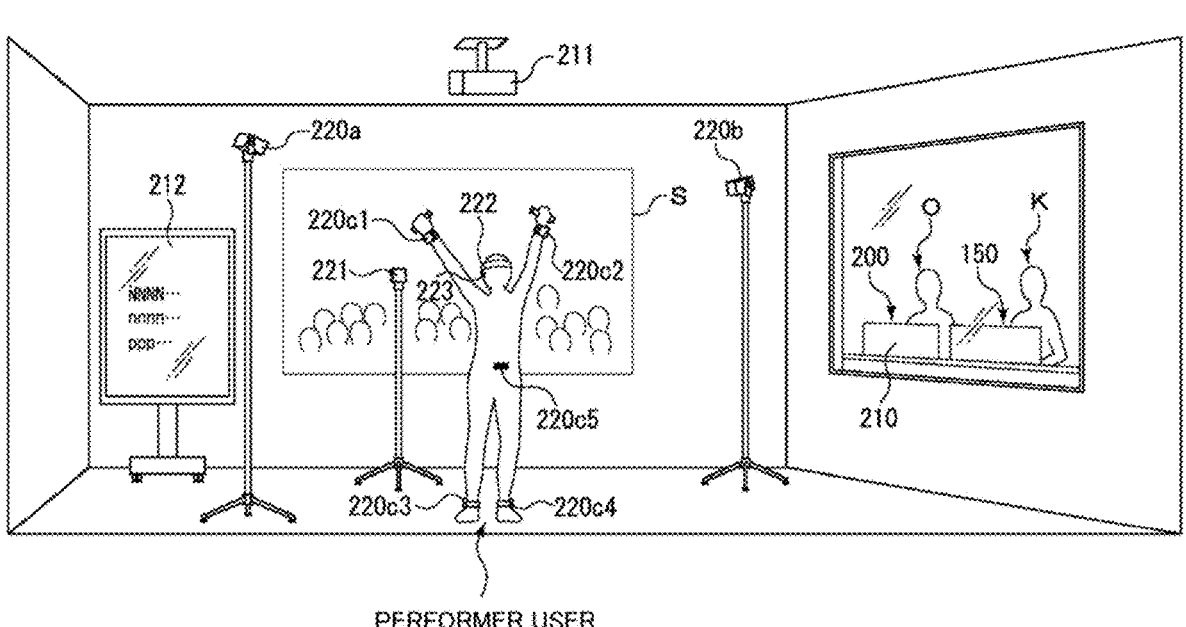
FIG. 11 is a schematic diagram showing the studio equipment used by a performer user in the virtual space content distribution system according to one embodiment of the present invention.

FIG. 4 shows an example configuration of the performer terminal 200 in the virtual space content distribution system in the present embodiment. As shown in FIG. 11, the performer terminal 200 in this embodiment is located in a control room adjacent to the studio where the performer user performs their acting motions, and includes a typical computer with relatively high processing power. As shown in FIG. 4, the performer terminal 200 includes a processor (CPU) 201, a memory (RAM) 202, a storage 203 such as a hard disk, a communication interface (I/F) 204 enabling bidirectional communications using the TCP/IP protocol via the internet, an open computer network, an image processor 206 including a graphics processing unit (GPU) to which display devices A210 to C212 are connected, and an input/output interface (I/F) 205 to which various input/output devices are connected, and these components are connected to a data bus 208.

The input/output interface (I/F) 205 is connected to input devices, and the input devices include: a motion sensor 220 including multiple wearable sensors 220C1 to 220C5 (see FIG. 11) worn by the performer user on the left and right limbs and waist; a facial expression input device 221 made up of an imaging camera to input the performer's facial expressions; an audio input device 222 made up of a sound-collecting microphone worn by the performer user on the head; and an operation input device 224 such as a keyboard or a touch panel that is operable by an assistant operator O who assists the performer user. These input devices may include a controller that can be grasped by the performer user to perform various operations so that the performer is able to perform various operations without the help of an assistant operator O.

In this embodiment, the performer user performs actions (music actions) with the music. This embodiment is therefore configured so that an assistant operator O assists with operations during the performance. It is also possible to have multiple assistant operators O, or to set the operation content in a sequence program, for example, in advance with the performer terminal 200, thereby eliminating the need for an assistant operator O.

The input/output interface (I/F) 205 is connected to an audio output device 223 that is an output device, and the audio output device 223 includes a sophisticated earphone (in-ear monitor) worn by the performer user and a speaker located in the control room. This outputs the sound of the played music transmitted from the distribution server computer 100 to the performer user via the sophisticated earphone (in-ear monitor), and also outputs the music sound along with the performer's sound from the speaker. This therefore allows the assistant operator O and others to check the status of the music, including the sound issued by the performer user, in the control room.

In this embodiment, the sophisticated earphone (in-ear monitor) is used to avoid the inconvenience caused by the played music sound being input from the sound collection microphone worn by the performer user. The present invention is not limited to this, and the music sound may be output from a speaker in the studio, for example, as long as the inconvenience caused by the input of the music sound can be avoided.

This embodiment describes an example of the sound collecting microphone that is worn by the performer user. This sound collecting microphone may be mounted to the floor, wall, or ceiling of the studio.

The following describes the motion sensor 220 used in the performer terminal 200 of this embodiment. Any type of motion sensor may be used for the motion sensor 220 as long as it enables appropriate detection (measurement) of the body movements (actions) of the performer user. This embodiment uses a plurality of wearable sensors 220C1 to 220C5, which are worn by the performer user on the body, to detect the actions of the performer more accurately and in a shorter cycle. The motion sensor 220 may be of a type that does not require the performer to wear any equipment. An example includes a LiDAR, which uses laser light.

This embodiment is configured to reduce the burden on the performer user when they act, particularly the head actions, caused by wearing sensors when they perform actions. To this end, this embodiment describes an example where the head actions of the performer user are detected by image recognition using an image captured by an imaging camera making up the facial expression input device 221, as described below, and the actions of the performer user other than the head are detected by the five wearing sensors 220C1 to 220C5. For instance, the performer user may wear a wearable sensor also on the head, for example. For the detection of more detailed actions, they may wear more (seven or more) wearable sensors.

As shown in FIG. 11, the wearable sensors 220C1 to 220C5 detect their own positions and directions in cooperation with base stations 220a and 220b installed in the studio room separated from the adjacent control room by a glass window.

In one example, these base station 220a and base station 220b may include a multi-axis laser emitter. The base station 220a emits a flashing light for synchronization and then scans a laser beam around a vertical axis, for example. The base station 220b scans a laser beam around a horizontal axis, for example.

Each of the wearable sensors 220C1 to 220C5 may include a plurality of optical sensors that detect the incidence of flashing light and laser beams from the base station 220a and the base station 220b.

Each of the wearable sensors 220C1 to 220C5 is capable of detecting its own position and direction based on the time difference between the incidence timing of the flashing light and the incidence timing of the laser beams, the light reception time at each optical sensor, the incidence angle of the laser beam detected by each optical sensor, and other information as necessary. For instance, the ViveTracker and a base station provided by HTC CORPORATION may be used.

These base station 220a and base station 220b emit flashing light and scan laser beams at regular intervals, meaning that the detection information by each wearable sensor 220C1 to 220C5 is updated at each such interval. Then, detection information indicating the position and direction of each motion sensor, which is calculated by each of these wearable sensors 220C1 to 220C5, is input to the performer terminal 200 via short-range wireless communication. The detection information is then transmitted, together with the facial motion information, to the distribution server computer 100 as performer avatar information (see FIG. 10).

Although this embodiment describes an example including two base stations, the base station 220a and base station 220b, the invention is not limited to this. It may include three or more of these base stations.

The motion sensor 220 may be configured such that each of the motion sensors worn by the performer user is equipped with a number of infrared LEDs or visible light LEDs, and the light from these LEDs is detected with an infrared camera installed on the floor or wall of the studio, thereby detecting the position and direction of each of the motion sensors.

To reduce the burden on the performer user, the motion sensor 220 may include a motion sensor with a more lightweight reflective marker, instead of the wearable sensors 220C1 to 220C5. In other words, reflective markers attached to various parts of the performer user's body with adhesive tape or other means may be photographed to generate shooting data, and this shooting data may be image-processed to detect the position and direction of the reflective markers, thereby detecting the performer user's actions. In this case, a camera operator may be in the studio to photograph the performer user, and the camera operator may photograph the performer user from a direction suitable for detection, allowing the performer user's actions to be detected well.

The motion sensor 220 may be a suit with a built-in inertial sensor, such as a suit with a built-in inertial sensor for the MVN motion capture system marketed by Xsens-.com, and the sensor signal output from this inertial sensor may be analyzed to detect the actions of the performer user.

Figure 10:
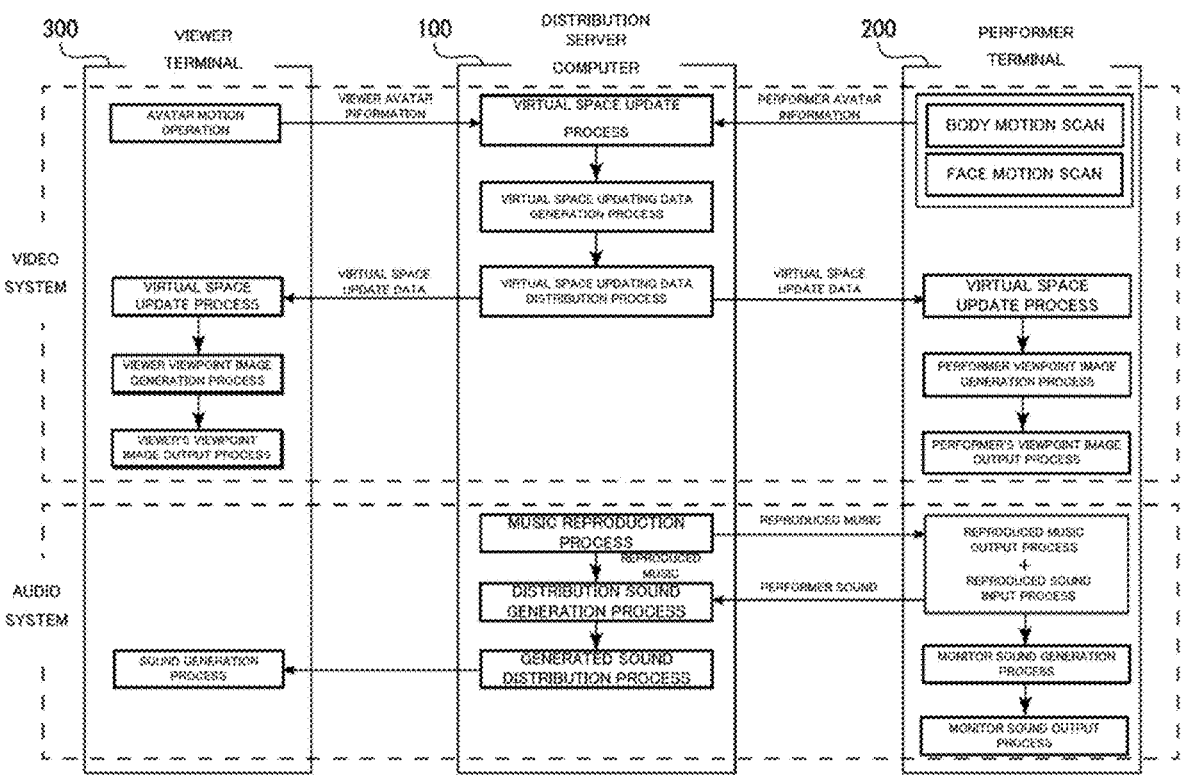
FIG. 10 explains data exchanged between the terminals and the server computer that make up the virtual space content distribution system according to one embodiment of the present invention.

Any type of device may be used for the facial expression input device 221 as long as it enables appropriate detection of the head (including the face) motions of the performer user. Specifically, the facial expression input device 221 in this embodiment includes an imaging camera (digital camera) positioned so that it can continuously capture images of the head including the face of the performer user. The images of the head movements and facial movements (expressions) of the performer user captured by this imaging camera are detected by image recognition, and the face motion information, which is the detected head movements and facial movements (expressions), is transmitted to the distribution server computer 100 as the performer avatar information together with the body motion information as shown in FIG. 10.

The facial expression input device 221 is not limited to the imaging camera (digital camera) used in this embodiment. For instance, the facial expression input device 221 may be a 3D camera capable of detecting the depth of a person's face, or a mobile terminal such as a smartphone equipped with a LiDER device may be used, for example. In this case, the performer user may wear such a mobile terminal.

As described above, the performer terminal 200 of this embodiment has three display devices A210 to C212. The display device A210 is an LCD monitor, for example, installed in the control room as shown in FIG. 11. The display device B211 is a projector that projects images onto a screen S installed in the studio. The display device C212 is a large vertical display installed adjacent to the screen S in the studio.

The display device A210, which is placed in the control room of the studio, displays images from each viewpoint of the virtual cameras C1 to C4, viewpoint images from an aerial moving virtual camera during the flying performance period described below, the content of comments, and a message input window, into which the assistant operator O inputs any message they wish to convey to the performer user.

Figure 16:
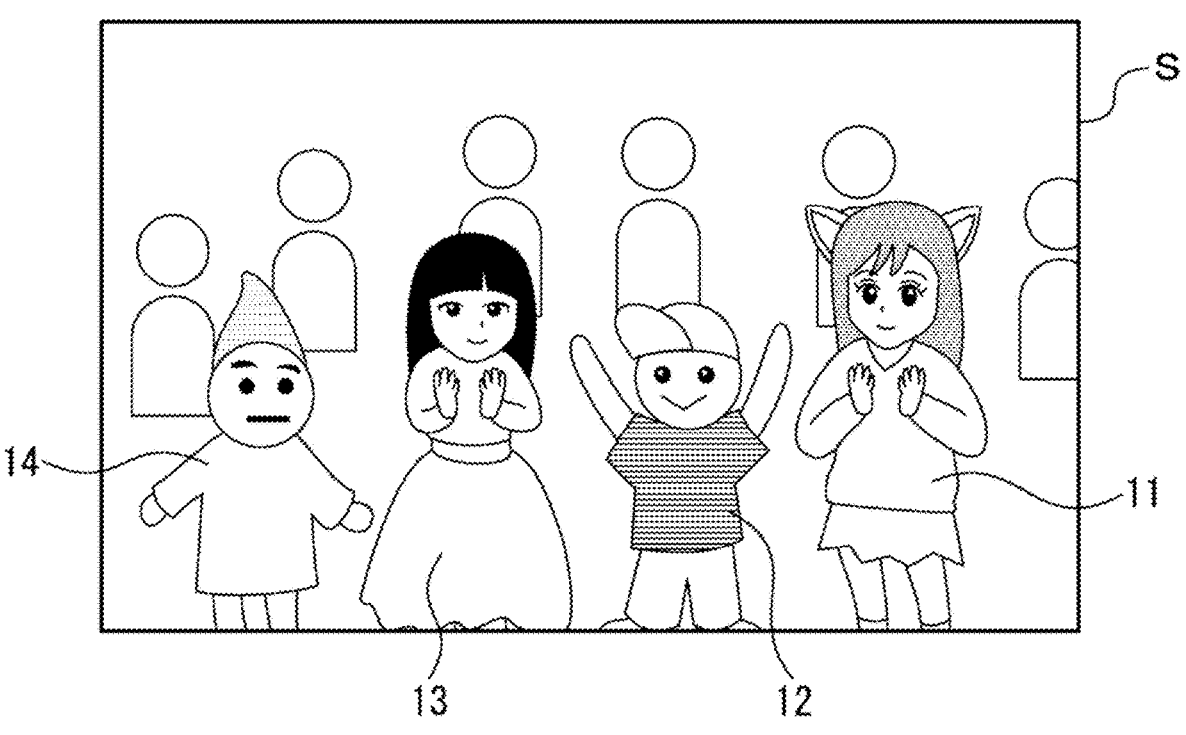
FIG. 16 shows an example display on a performer terminal that makes up the virtual space content distribution system according to one embodiment of the present invention.

On the screen S, an image is projected from the projector that is the display device B211 installed in the studio. The screen S displays an image from the viewpoint of the virtual camera C2 (see FIG. 13) that is the performer's viewpoint. For instance, the screen S displays an image, as shown in FIG. 16, including avatars of viewers who are virtually participating in the live performance in the third and fourth areas. This allows the performer user to check the status of the viewer users who are virtually participating in the virtual space live performance through the image.

The display unit C212 placed in the studio displays the comments of the viewer users and the comments and messages entered by the assistant operator O. This allows the performer user to check the comments of the viewer users and messages from the assistant operator O also during the performance.

The storage 203 stores a performer program, in addition to the operation system (OS) that makes the computer that is the performer terminal 200 work. The performer program is executed by the processor (CPU) 201 and other components to provide various functions in corporation with the distribution server computer 100. The functions include a function of allowing the performer user to control the movement of the performer avatar 1 in the virtual space live performance, which is the virtual space content.

As shown in FIG. 4, the performer program includes a performer avatar control program, a performer viewpoint image control program, a performer sound control program, a performer comment control program, and performer authentication data.

The performer avatar control program mainly provides the function of scanning the body motion of the performer user using the motion sensor 220 and scanning the facial motion (facial expressions) of the performer user using the facial expression input device 221, thus generating performer avatar information to make the performer avatar move, and the function of transmitting it to the distribution server computer 100.

The performer viewpoint image control program provides a function of generating and outputting an image from the viewpoint of the virtual camera C2, which is the performer's viewpoint, based on the virtual space update data distributed from the distribution server computer 100.

The performer sound control program provides a function of outputting the playback sound of music based on the playback music data distributed from the distribution server computer 100 via the audio output device 223, converting the sound input from the audio input device 222 into data and transmitting it to the distribution server computer 100 as performer audio data, and generating and outputting monitor audio made up of the playback sound of the music and the performer's sound.

The performer comment control program provides a function of displaying each comment by a viewer user, the comment being distributed from the distribution server computer 100.

The performer authentication data is to authenticate the identity of the performer user in a communication connection with the distribution server computer 100.

The performer avatar control program includes: a motion parameter generation program that is capable of generating parameter information on the position and rotation angle of the bones that make up the rig data (this may be called "skeleton data") indicating the skeleton of the performer avatar included in the performer avatar data; and an image recognition processing program that recognizes the position of the performer user's head and facial expressions from images captured by the imaging camera.

This embodiment describes an example of the performer terminal 200 that is a computer installed in the studio operated by an event management organization and used jointly by multiple performer users to hold a live event, where each performer user is allowed to use the performer terminal 200 by inputting data for performer authentication.

The present invention is not limited to this. For instance, a performer user may appear in a virtual space live performance from their home, and the performer terminal 200 may be a personal computer installed in the performer user's home and used only by the performer user. In this case, storage of the data for performer authentication is not necessarily required.

In this way, a performer user and others use the performer terminal 200 that constitutes the virtual space content distribution system of this embodiment, whereby the performer user moves the performer avatar 1 placed on the virtual stage G at the event venue in conjunction with their movements, reflects their own facial expressions on the facial expressions of the performer avatar 1, and also distributes their own voice as the voice of the performer avatar 1 to viewers via the distribution server computer 100.

<Viewer Terminal>

Figure 5:
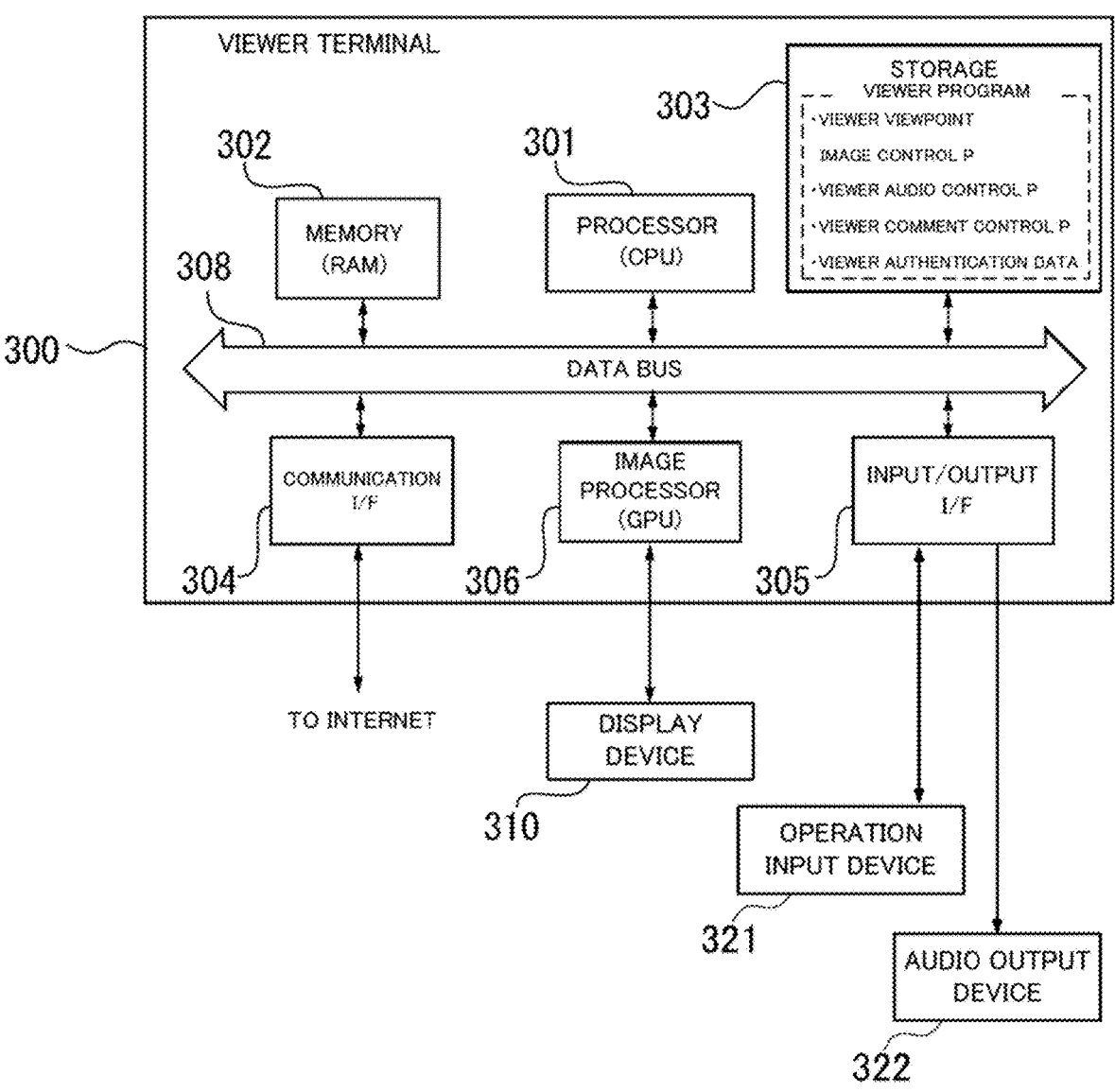
FIG. 5 shows an example configuration of a viewer terminal in the virtual space content distribution system according to one embodiment of the present invention.

FIG. 5 shows an example configuration of the viewer terminal 300 in the virtual space content distribution system in the present embodiment. The viewer terminal 300 in this embodiment is a smartphone P carried by a viewer user or a typical stationary computer (PC) installed in the viewer user's home or other locations. As shown in FIG. 5, the viewer terminal 300 includes a processor (CPU) 301, a memory (RAM) 302, a storage 303 such as a hard disk or a nonvolatile memory, a communication interface (I/F) 304 enabling bidirectional communications using the TCP/IP protocol via the internet, an open computer network, an image processor 306 including a graphics processing unit (GPU) to which a display device 310 is connected, and an input/output interface (I/F) 305 to which various input/output devices are connected, and these devices are connected to a data bus 308.

The display device 310 may be any device, which is capable of displaying the viewpoint images that are generated in accordance with the viewpoint image control program for viewer included in the viewer program stored in the storage 303, as described later, and are generated based on the virtual space data of the event venue, which is a virtual space updated by the virtual space update data (see FIG. 10) distributed from the distribution server computer 100, and displaying the flying viewpoint image distributed from the distribution server computer 100 during the flying performed period described later. When the viewer terminal 300 is a smartphone P, the display of the smartphone P corresponds to the display device 310. When the viewer terminal 300 is a typical computer (PC), the stationary display that makes up the computer (PC) corresponds to the display device 310. The display is not limited to those that display flat images (2D images), which may also be capable of displaying stereoscopic images (3D images) by displaying right-eye and left-eye images, as in a head-mounted display (HMD) that is wearable by the viewer, for example.

The input/output interface (I/F) 305 is connected to an input device that is an operation input device 321 made up of one or more devices that enable the viewer to perform various operations, and to an audio output device 322 such as an earphone, or speaker that is capable of outputting live audio, for example, distributed from the distribution server computer 100.

Needless to say, the audio output device 322 may not be a stand-alone device, but may be integrated with the display device 310 as in the head mounted display (HMD) described above.

The operation input device 321 may be any device that enables the viewer to perform various operations such as movement operations including moving the viewer avatar, zoom operations, operations related to comments, operations related to gifts, and other operations. For instance, it may include at least one of a transparent touch panel formed on the display surface of a smart phone, a keyboard constituting a computer, and a game controller.

In this embodiment, as shown in FIG. 13, for example, the virtual audience area for viewers at the event venue is sectioned into a third area near the virtual stage G in which only viewer users who are specially authorized by the performer user are allowed to virtually participate, and a fourth area around the third area in which ordinary viewer users virtually participate, as described later. As described above, a viewer user virtually participating in the fourth area may have an operation input device 321 such as a touch panel, keyboard, or game controller, and a viewer user virtually participating in the third area may have an operation input device 321 such as an MVN motion capture suit equipped with a built-in inertial sensor as described above, and thus the viewer user in the third area is able to precisely control their viewer avatar through their own movements, just like the performer user.

Note that the viewer users who are permitted to virtually participate in the third area are not allowed change the facial expressions of the viewer avatars, but the present invention is not limited to this. The facial expressions of these viewer avatars may be changed by the viewer users using the camera function of a smartphone or a camera connected to a computer to have the viewer user's facial expression recognized, so that the viewer users are allowed to change the facial expression, where a level of the change may be different from the level of change made by the performer user.

These various input/output devices connected to the input/output interface (I/F) 305 may be built-in or external, and in the case of external devices, they may be connected in either a wired or wireless manner.

The storage 303 stores a program for viewer in the form of viewer apps, in addition to the operation system (OS) that makes the smartphone or computer that is the viewer terminal 300 work. The program for viewer is executed by the processor (CPU) 301 and other components to provide various functions in corporation with the distribution server computer 100, the functions including a live performance viewing function related to the viewer users in the virtual space live performance that is virtual space content.

As shown in FIG. 5, the program for viewer includes: a viewpoint image control program for viewer that provides a function of generating each viewpoint image of the virtual space live performance to be displayed on the display device 310; an audio control program for viewer that provides a function of outputting, from the audio output device 322, live sound based on the live sound (data) in the virtual space live performance distributed from the distribution server computer 100; a comment control program for viewer that displays comments based on comment data distributed from the distribution server computer 100 and provides a function related to comments, such as transmitting comments input by viewers to the distribution server computer 100; and viewer authentication data to authenticate the identity of a viewer user in a communication connection with the distribution server computer 100.

Figure 22:
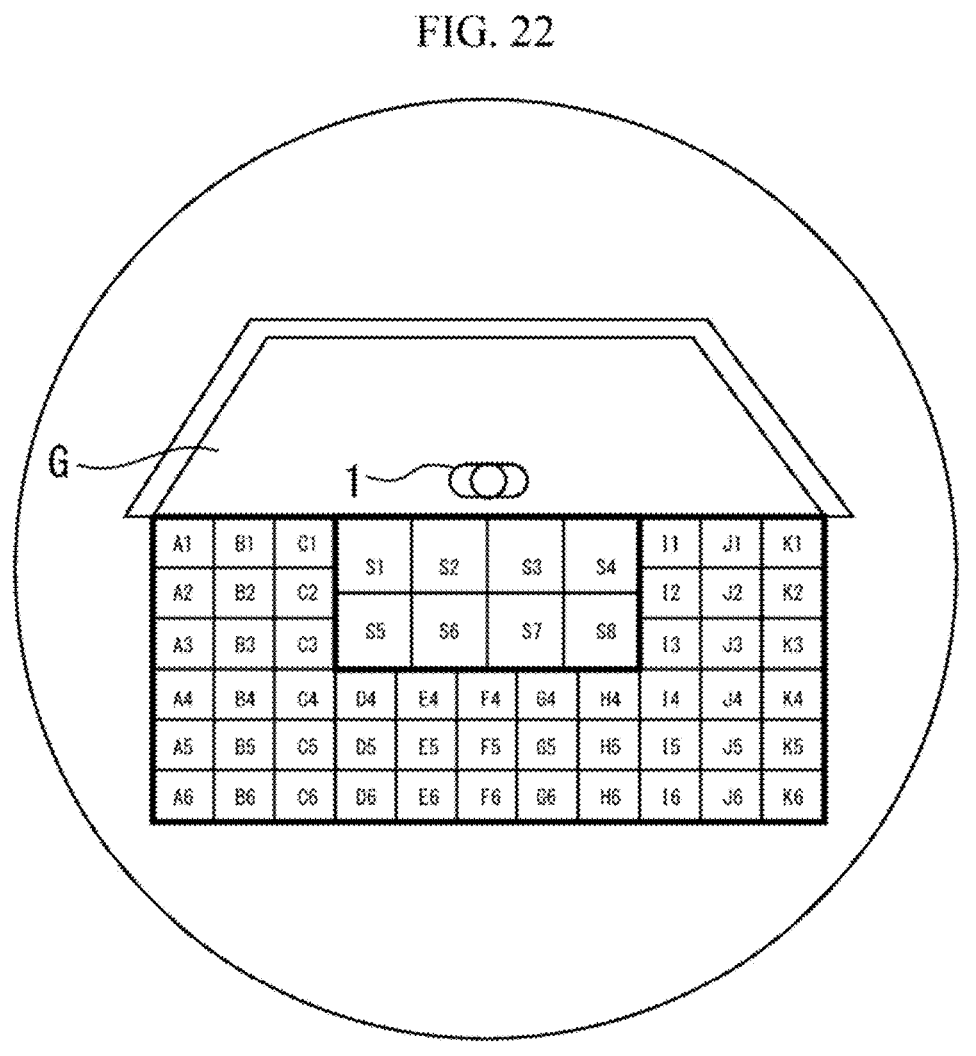
Figure 23:
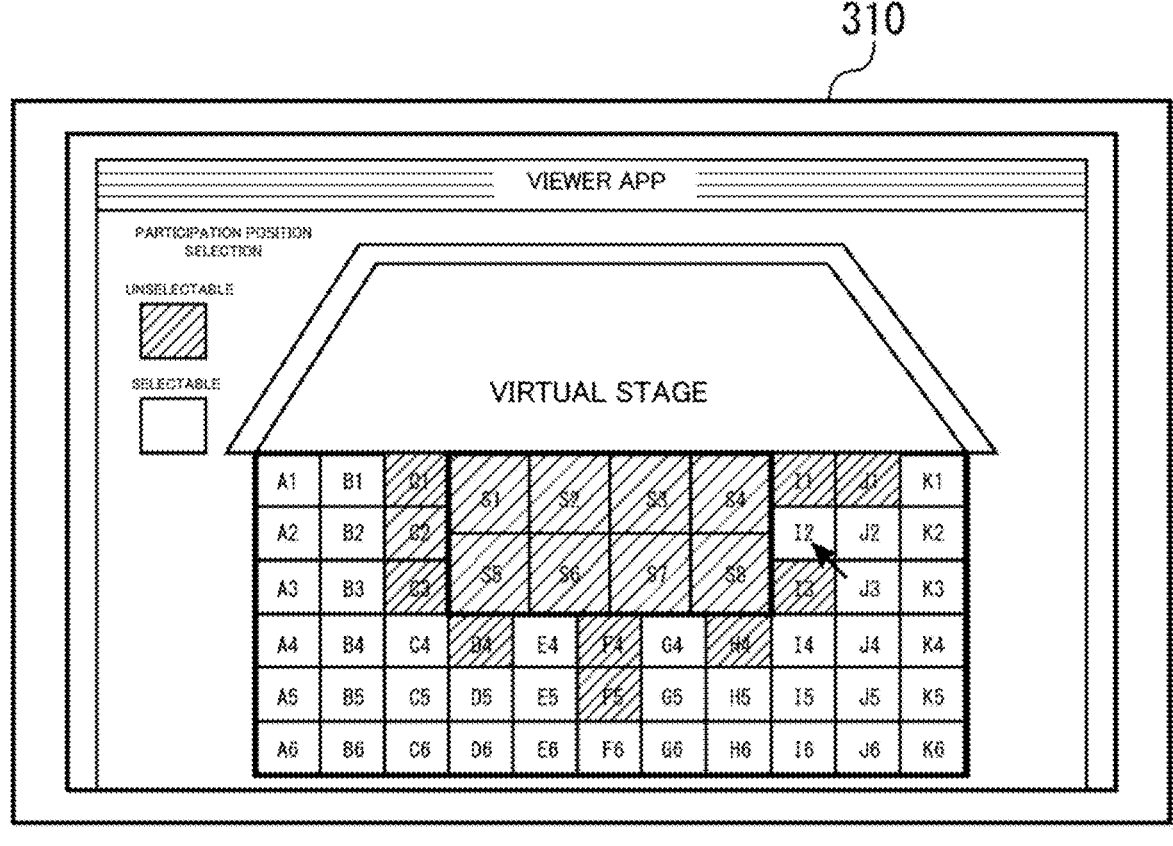
FIG. 23 shows a participation position selection screen for a virtual live venue in a modified example.

Although not shown in FIG. 5, the program for viewer may include other programs, in addition to the above programs, such as a gift control program that controls gifts and object placement in the virtual space, a program to purchase tickets for virtual participation by viewer avatars in the live event, and an area designation program that enables reservation of an area (position) for virtual participation by viewer avatars at the event venue before the start of the live event, as shown in FIG. 22 and FIG. 23. The program for viewer may include still other programs.

In this embodiment, the comments entered by the viewers are short messages in text format, but are not limited to these short messages in text format. For instance, the comments may be messages in a still image format, messages in a video format, or electronic messages in any other format. The comments are displayed on the display device 310 so as to be superimposed on each viewpoint image.

In this way, a viewer user uses the viewer terminal 300 that makes up the virtual space content distribution system of this embodiment. This moves and operates the viewer avatar that is virtually participating in the event venue, and changes the viewpoint of the viewer avatar, thus changing the viewpoint image displayed on the display device 310. This also changes the zoom state (viewpoint state), allowing the viewer user to operate the viewer avatar and cheer on the performer avatar 1.

It should be noted that a viewer avatar virtually participating in the third area is only allowed to move within the third area and not allowed to move to the fourth area. A viewer avatar virtually participating in the fourth area is only allowed to move within the fourth area and not allowed to move to the third area. The present invention is not limited to this, and it may be configured so that a viewer avatar virtually participating in the third area is allowed to move to the fourth area. Note that, naturally, the viewer avatar is not allowed to move onto the virtual stage G. Thus, the visibility of the performer avatar 1 is not obstructed by the viewer avatar moving onto the virtual stage G.

The viewpoint images are displayed on these display devices 310 and the live sound is output. This allows a viewer user to enjoy the virtual space live performance with the feeling as if they were actually present at the event venue.

Although detailed explanations are omitted, the comment function provided by the comment control program for viewer allows a viewer to enjoy the virtual space live performance while checking comments entered by themselves and other viewer users, and the gift function provided by the gift control program allows a viewer to liven up the virtual space live performance by giving items they own to the performer avatar 1.

<Administrator Terminal>

Figure 6:
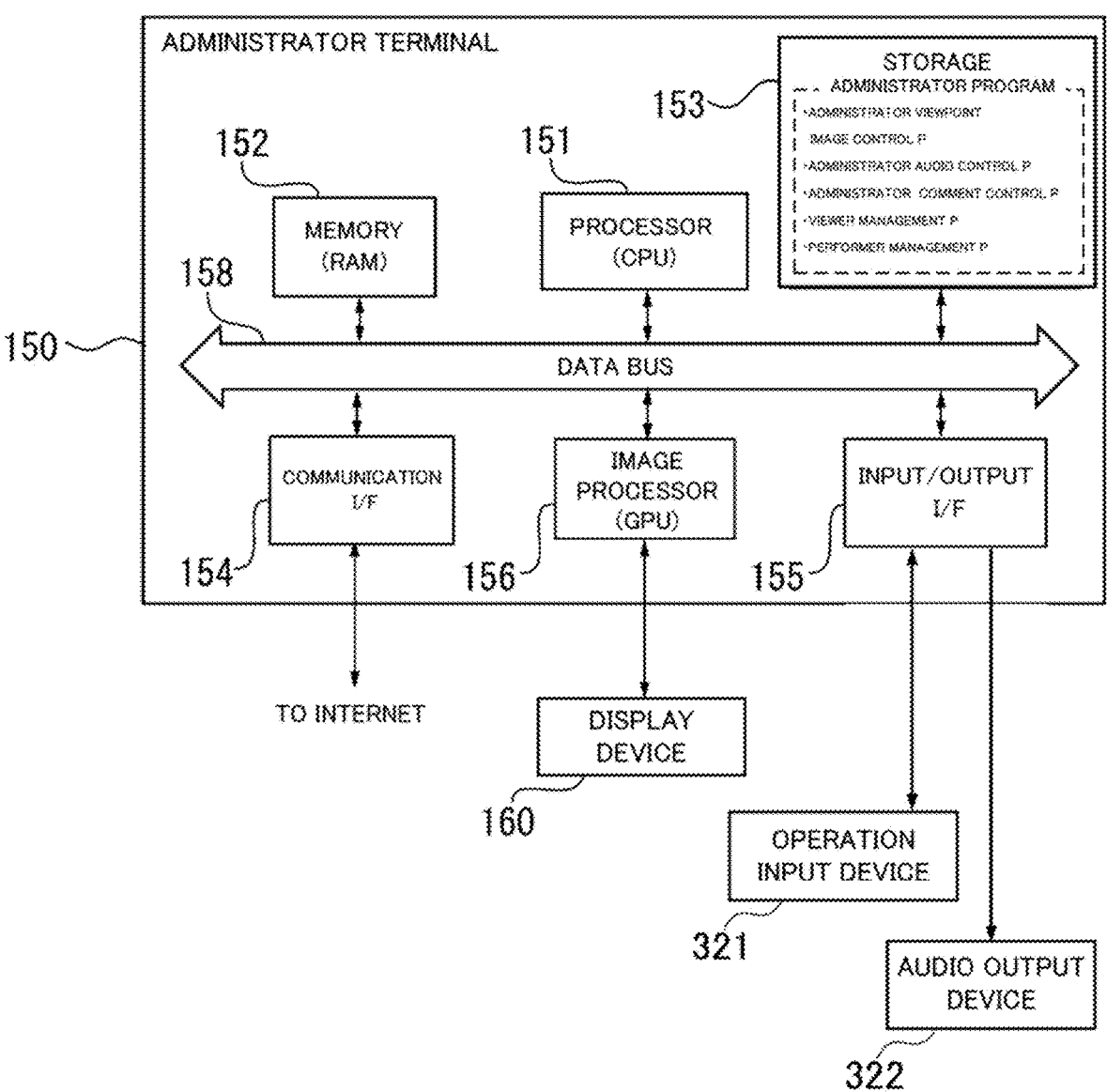
FIG. 6 shows an example configuration of an administrator terminal in the virtual space content distribution system according to one embodiment of the present invention.

FIG. 6 shows an example configuration of the administrator terminal 150 in the virtual space content distribution system in the present embodiment. The administrator terminal 150 in this embodiment uses, together with the performer terminal 200, a typical computer placed in the control room adjacent to the studio. As shown in FIG. 6, the administrator terminal 150 includes a processor (CPU) 151, a memory (RAM) 152, a storage 153 such as a hard disk, a communication interface (I/F) 154 enabling bidirectional communications using the TCP/IP protocol via the internet, an open computer network, an image processor 156 including a graphics processing unit (GPU) to which a display device 160 is connected, and an input/output interface (I/F) 155 to which various input/output devices are connected, and these devices are connected to a data bus 158.

The display device 150 may be any device, which is capable of individually displaying the viewpoint images of the virtual cameras C1 to C4 and the aerial moving virtual camera during the flying performance period described later. These viewpoint images are generated in accordance with the administrator viewpoint image control program included in the program for administrator stored in the storage 153, as described later, and are generated based on the virtual space data of the event venue, which is a virtual space updated by the virtual space update data (see FIG. 10) distributed from the distribution server computer 100. The display device 150 also is capable of displaying comments based on the comment data distributed from distribution server computer 100, and is configured with one or more stationary displays.

The input/output interface (I/F) 155 is connected to an input device that is an operation input device 161 made up of one or more devices that enable the administrator K to perform various operations, and to an audio output device 162 such as an earphone, headphone, or speaker that is capable of outputting live audio, for example, distributed from the distribution server computer 100.

The operation input device 161 may be any device that allows the administrator K to execute various operations such as inputting and settings related to the virtual space live event. For instance, it may include at least one of a keyboard making up a computer, a transparent touch panel formed on the surface of a display, and a viewpoint switching controller.

The various input/output devices connected to the input/output interface (I/F) 155 may be connected in either a wired or wireless manner.

The storage 153 stores a program for administrator, in addition to the operation system (OS) that makes the computer that is the administrator terminal 150 work. The program for administrator is executed by the processor (CPU) 151 and other components to provide various functions in corporation with the distribution server computer 100, the functions including a distribution management function related to the distribution of a virtual space live performance that is virtual space content.

As shown in FIG. 6, the program for administrator includes a viewpoint image control program for administrator, an audio control program for administrator, a comment control program for administrator, a viewer management program, and a performer management program.

The viewpoint image control program for administrator provides a function of generating viewpoint images from each virtual camera to be displayed on the display unit 160, as well as a function of changing and switching the viewpoints.

The audio control program for administrator provides a function of outputting live audio from the audio output device 162 based on the audio data of the virtual space live performance distributed from the distribution server computer 100.

The comment control program for administrator displays comments based on comment data distributed from the distribution server computer 100 and provides a function related to comments, such as selecting comments and viewers, so as not to distribute the comments and viewers that are prohibited for distribution.

The viewer management program manages viewer users who participate virtually in a virtual space live performance, and the performer management program manages performer users who participate virtually in a virtual space live performance.

Although not shown in FIG. 6, the program for administrator may include an authentication program to authenticate personal identification of the operator, that is, the administrator, and a schedule program to edit the time schedule and the music order of the virtual space live performance. The program may also include other programs.

In this way, the administrator K operates the administrator terminal 150 that makes up the virtual space content distribution system of this embodiment, whereby they are allowed to configure various settings for executing the live event, such as settings related to the program, order of songs, and stage effects, as well as the time schedule and the trajectory of the aerial moving virtual camera during the flying performance period, so that the virtual space live performance is managed based on these settings.

<Overall Image of Virtual Space>

Figure 12:
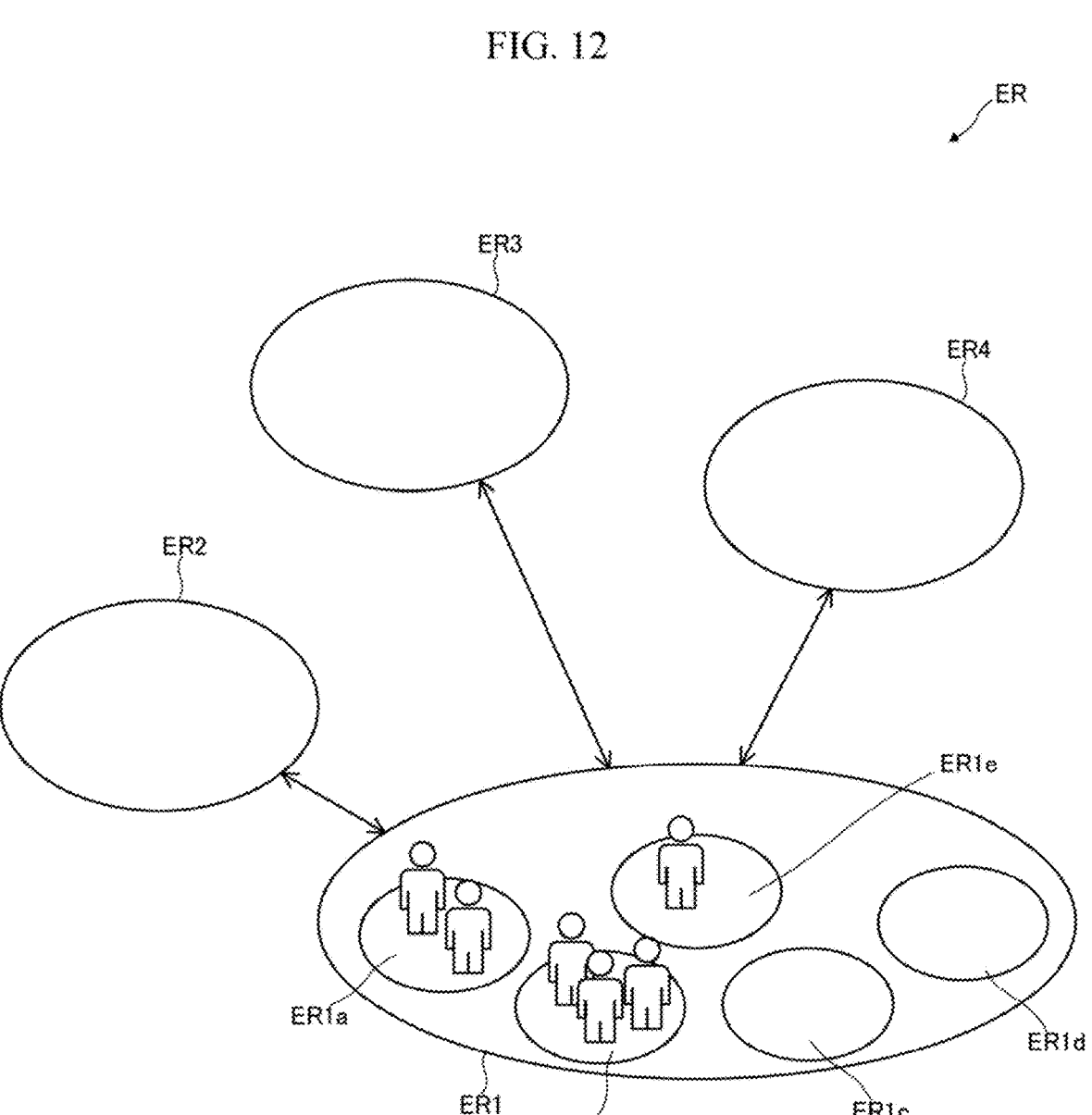
FIG. 12 shows an overall image of a virtual space according to one embodiment of the present invention.

The following describes an example of content that is a live event held by a performer in a virtual live venue. FIG. 12 shows an overall image of the virtual space provided by the system of this embodiment. The virtual space ER in this embodiment includes a plurality of types of spatial areas ER (spatial area ER1, spatial area ER2, . . . ). In each spatial area ER, content of different genres and types may be provided. These different types of spatial areas ER include an entrance that functions as a lobby when a user logs into the virtual space ER, and areas corresponding to various types of content, such as live performance venues, game content, and exhibition halls. When a user logs into the virtual space ER, they may select an area of various types from the title screen that is displayed during the logging-in. An event venue, which will be described later with reference to FIG. 13, FIGS. 24A and 24B, and FIGS. 25A, 25B, 25C and 25D, is constructed in the entirety of a predetermined spatial area ER, or in a part of the predetermined spatial area ER.

Each spatial area ER has multiple rooms where the same content is provided. Each room has a fixed maximum number of people that can be admitted to the room, e.g., 200 people. These rooms are managed by a real-time synchronization server, for example. Users in the same room are able to see each other's user avatars and communicate with each other. For instance, they are able to play games together and have conversations through chat. For instance, let that the spatial area ER1 is a space simulating a city. Then, in rooms ER1*a*, ER1*b*, . . . corresponding to the spatial area ER1, a space simulating the same city will be provided to the users. Note that when a user enters a spatial area ER, only the avatars of the users who are associated with the same room will be displayed. For instance, user avatar 1 of the user associated with room ER1*a* is not displayed on the user screen of the user associated with room ER1*b*. However, exceptionally, user avatars of special users (e.g., of talent or celebrities) may be displayed also in other rooms, not only in the room they are actually in (this may be called mirroring).

Once a user logs into the virtual space, they may be required to enter a spatial area ER first defined as an area (e.g., entrance) that provides special content, and only after that, they may move from one spatial area to another spatial area. Alternatively, they may be allowed to move back and forth between spatial areas ER without entering the defined spatial area. For instance, a user may not be allowed to move from spatial area ER2 to spatial area ER3 without passing through spatial area ER1, or they may be allowed to move directly between spatial area ER2 and spatial area ER3 without passing through spatial area ER1. When moving between spatial areas ER, a switching effect may be performed. For instance, when moving to another spatial area ER, the display screen may be switched to a darkened screen (e.g., displaying a black screen with a message such as "Loading . . . "). For user access to each spatial area ER, the user may be required to first enter the entrance area after logging in, or the user may be able to select and enter the spatial area ER of their choice without passing through the entrance area, or the user may transition to a spatial area ER that is randomly determined by lottery. For each room, the user may choose a room of their choice to enter, or they may enter a room randomly determined by lottery.

<Virtual Live Venue>

FIG. 13 shows a virtual live venue, which is the virtual space used in this embodiment. The virtual live venue shown in FIG. 13 is configured in a predetermined spatial area ER among the spatial areas ER shown in FIG. 12. As shown in FIG. 13, the virtual live venue is similar to a live venue in real space, and is a virtual space having a virtual stage G where a performer user appears as their performer avatar 1, and a virtual audience area where viewer users who are audience participate virtually as viewer avatars.

As shown in FIG. 13, the virtual stage G has a trapezoidal floor surface with a relatively large area, and the performer avatar 1 is movable on the virtual stage G in the same way as in a live venue in real space. As shown in FIG. 13, the virtual live venue has a virtual stage wall on the opposite side of the virtual stage G from the virtual audience seats, and the virtual stage wall is divided into three parts: the center, the right, and the left. These three parts of the virtual stage wall have the front surfaces, on which virtual displays 40, 41, and 42 are provided, and these virtual displays 40, 41, 42 virtually display images and videos for stage effects.

As shown in FIG. 13, virtual star objects 43 related to the performer user are placed between the virtual displays 40, 41, 42, and large aerial virtual star objects 50 to 52 are placed in a second area, which is an area on the virtual stage G above a first area surrounded by the virtual stage walls. The aerial virtual objects 50 to 52 are movable within the second area.

The venue has a virtual audience area in front of the virtual stage G, where viewer users are able to virtually participate in the virtual live venue as viewer avatars. As shown in FIG. 13, this virtual audience area is divided into a third area and a fourth area. The third area is a special area close to the center of the virtual stage G where the performer avatar 1 appears, and the fourth area is formed to surround the third area and is at a greater distance from the center of the virtual stage G than the third area.

In this third area, special viewer users within a predetermined upper limit in number are allowed to participate virtually. In this embodiment, as shown in FIG. 13, viewer avatars 11 to 14 are placed, corresponding to four viewer users who meet the predetermined virtual participation achievements and are allowed by the performer user to participate virtually.

In the fourth area, viewer avatars 21 to 32 are placed, corresponding to general viewer users who have reserved virtual participation prior to the start of the virtual space live. In FIG. 13, viewer avatars 21 to 32 are the same avatars as viewer avatars 11 to 14, although they are simplified for convenience.

Viewer avatar 11 to 14 placed in the third area are movable within the third area, in response to the operation by the viewer users with their viewer terminals. Viewer avatar 21 to 32 placed in the fourth area also are movable within the fourth area, in response to the operation by the viewer users with their viewer terminals.

As shown in FIG. 13, four virtual cameras C1 to C4 are virtually placed (set) in the virtual live venue. Virtual camera C1 is virtually positioned in front of the performer avatar 1 so as to face the performer avatar 1, and the viewpoint image captured by virtual camera C1 is a viewpoint image viewed from a position near the front of the performer avatar 1, as shown in FIG. 14A.

Virtual camera C2 is virtually positioned (set) above the head of the performer avatar 1, and the viewpoint image captured by virtual camera C2 is a performer viewpoint image of the virtual audience area viewed from the performer avatar 1, as shown in FIG. 16

Virtual camera C3 is virtually positioned on the virtual display 41 diagonally behind the performer avatar 1, and the viewpoint image captured by virtual camera C3 is a viewpoint image of the virtual audience area viewed from diagonally behind the performer avatar 1, as shown in FIG. 14C.

Virtual camera C4 is virtually positioned on the virtual display 42 diagonally behind the performer avatar 1, and the viewpoint image captured by virtual camera C4 is a viewpoint image of the virtual audience area viewed from diagonally behind the performer avatar 1, as shown in FIG. 14B.

In this embodiment, an aerial moving virtual camera (not shown) is virtually placed, in addition to these virtual cameras C1 to C4 that are fixedly placed (set). The aerial moving virtual camera is set to be movable in the air within the space of the virtual live venue, which is a virtual space. The aerial trajectory and the viewpoint directions (angles) at each position on the aerial trajectory of this aerial moving virtual camera are preset by the administrator terminal 150, and during the flying performance period described below, the performer avatar 1 virtually flies to follow the aerial trajectory of the aerial moving virtual camera, thereby generating a viewpoint image in which the virtually flying performer avatar 1 is captured by the aerial moving virtual camera.

As shown in FIG. 13, this embodiment shows an example of the four virtual cameras C1 to C4 that are virtually placed as fixedly placed (set) virtual cameras, and the present invention is not limited to this. The number of these fixedly placed virtual cameras may be five or more. Conversely, no fixedly placed virtual cameras are placed, and only the viewpoint images viewed from the viewpoints corresponding to the avatars virtually participating in the virtual live venue may be displayed on the performer terminal 200 and the viewer terminals 300.

This embodiment illustrates an example of one aerial moving virtual camera, and the present invention is not limited to this. In another embodiment, there may be a plurality of aerial moving virtual cameras, or conversely, no aerial moving virtual cameras are placed virtually.

<Studio>

FIG. 11 shows a studio used in this embodiment. As mentioned above, the studio is adjacent to a control room separated by a glass window. In the studio, a performer user performs various actions corresponding to singing, while an assistant operator O assists with the operation of the performer terminal 200 installed in the control room. The base stations 220a and 220b are mounted on the stands around the performer user wearing the wearing sensors 220C1 to 220C5, and the imaging camera that makes up the facial expression input device 221 is mounted on the stand substantially in front of the performer user.

A screen S is provided on the wall facing the performer user in the studio, and the viewpoint image of virtual camera C2 is projected onto the screen S from the projector (display device B211) on the ceiling of the studio. Thus, as shown in FIG. 16, the viewpoint image from the performer avatar 1 viewing the virtual audience area is displayed on the screen S. With this configuration, the performer user is allowed to proceed with the live performance while constantly checking the status of the virtual avatars (viewer's reactions to the live performance) who virtually participate in the virtual audience area.

A large vertical display as the display device C212 is placed lateral of the screen S. This large display displays the viewer's comments and messages that the auxiliary operator O wants to convey to the performer user. The display device C212 may be configured to display information (performer support information) such as the lyrics of the music sung by the performer and the words to be delivered during the live performance.

<Operation of Virtual Space Content Distribution System>

FIG. 10 explains the operation of the virtual space content distribution system of this embodiment, and specifically explains the flow of distributing video and audio of a virtual live performance.

Firstly the following describes a video system. As described above, the distribution server computer 100 is capable of providing a virtual space of a virtual live venue based on the virtual space generation program 120 and avatar data of performer users and viewer users. The virtual space data describing the state of the virtual space is updated by the performer avatar information transmitted from the performer terminal 200 and the viewer avatar information transmitted from the viewer terminal 300, so that the movements of the performer user are reflected on the performer avatar 1, and the movements (operation) of the viewer user are reflected on the viewer avatar.

Although not shown in FIG. 10, in response to a connection for communication of the performer terminal 200 and the viewer terminal 300 with the distribution server computer 100 to let the performer and viewer virtually participate in the virtually space live performance, these terminals receive the virtual space data of the virtual live venue that is distributed from the distribution server computer 100 in advance, and store the data. The virtual space data stored in advance in this way is sequentially updated by the virtual space update data sequentially distributed from the distribution server computer 100, as described below. This allows the performer and the viewer to confirm the latest state of the virtual live venue with the performer terminal 200 and the viewer terminal 300.

Specifically, the movements and facial expressions of the performer user in the studio described above are scanned at predetermined time intervals by the body motion scanning and face motion scanning functions of the performer avatar control program as described above. This generates performer avatar information, which is then transmitted to the distribution server computer 100.

A viewer user who is allowed to participate in the third area uses a motion sensor, similar to the performer. Such a viewer user therefore is scanned at predetermined time intervals by the body motion scanning and face motion scanning functions. This generates viewer avatar information, which is then transmitted to the distribution server computer 100.

A viewer user who is allowed to virtually participate in the fourth area uses the touch panel, keyboard, or controller of the viewer terminal 300. When such a viewer user performs various operations such as moving, changing the viewpoint direction, changing the viewpoint situation (zoom), raising a hand, clapping hands, and jumping, this may cause the viewer avatar to perform the corresponding action. Then, viewer avatar information is generated based on an operation related to the movement of the viewer avatar among these operations, and is transmitted to the distribution server computer 100.

Based on the performer avatar information transmitted from the performer terminal 200 and the viewer avatar information transmitted from the viewer terminal 300, the distribution server computer 100 executes virtual space updating process to update the virtual space data, so as to reflect the motions of the performer terminal and the motions (operations) of the viewer user on their corresponding avatars participating virtually in the virtual live venue.

The distribution server computer 100 then executes virtual space updating data generation process to generate virtual space updating data based on the virtual space data before the update and the virtual space data after the update, and then distributes the generated virtual space updating data to the performer terminal 200 and the viewer terminal 300.

Receiving the virtual space updating data, the performer terminal 200 and viewer terminal 300 update the virtual space data stored beforehand based on the distributed virtual space updating data, as shown in FIG. 10. The performer terminal 200 and viewer terminal 300 also execute performer viewpoint image generation process and viewer viewpoint image generation process, respectively, using the updated virtual space data. This generates a performer's viewpoint image and viewer's viewpoint image based on the updated virtual space data, and the performer terminal 200 and viewer terminal 300 display the generated performer's viewpoint image and viewer's viewpoint image, respectively (viewer's viewpoint image output process).

In this way, this embodiment is configured so that a viewpoint image of each viewer user virtually participating in the virtual live venue using a viewer avatar is generated and displayed with the viewer terminal 300 of the viewer user. This avoids the situation where the distribution server computer 100 generates viewer's avatar viewpoint images of the viewer users and thus the processing load on the distribution server computer 100 becomes extremely large, which may prevent many viewer users from participating in the virtual space live performance, and also avoids the situation where the increased processing load makes it difficult to distribute the images.

In this embodiment, the viewer avatar 13 of a viewer user is virtually participating in the third area close to the performer avatar 1 on the virtual stage G, and the viewer user has the viewer terminal 300 with the display device 310. As shown in FIG. 14D, the display device 310 generates and displays a viewpoint image in which the performer avatar 1 is displayed large, and the viewpoint image is a substantially frontal view of the performer avatar 1 that is viewed from the viewer avatar 13 close to the performer avatar 1. The viewer avatar 28 of a viewer user is virtually participating in the fourth area away from the performer avatar 1 on the virtual stage G (e.g., behind the viewer avatar 13), and the viewer user has the viewer terminal 300 with the display device 310. As shown in FIG. 14E, the display device 310 generates and displays a viewpoint image in which the performer avatar 1 is relatively displayed small, and the viewpoint image is a substantially frontal view of the performer avatar 1 that is viewed from the viewer avatar 28 away from the performer avatar 1 with the viewer avatars 13 and 14 virtually participating in the third area in between.

The viewer avatar 32 of a viewer user is virtually participating near the edge position of the virtual stage G in the fourth area that has a U-shape viewed from the above, and the viewer user has the viewer terminal 300 with the display device 310. As shown in FIG. 14F, the display device 310 displays a viewpoint image in which the performer avatar 1 is relatively displayed small, and the viewpoint image is viewed from the viewer avatar 32 obliquely in front of the performer avatar 1 with the viewer avatar 14 virtually participating in the third area in between.

Figure 15A:
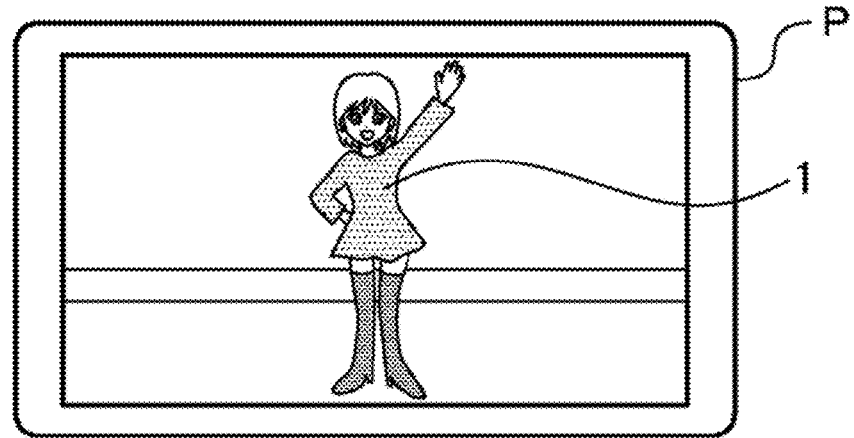
FIGS. 15A and 15B show an example display on a viewer terminal that makes up the virtual space content distribution system according to one embodiment of the present invention.
Figure 15B:
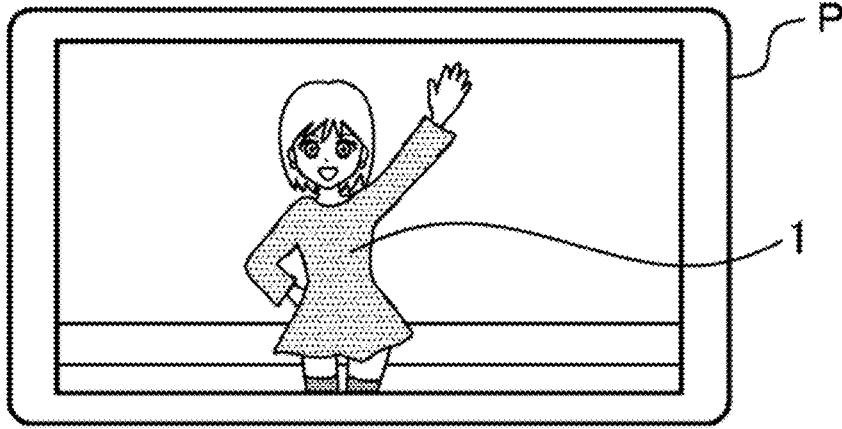

Note that all of the display examples in FIGS. 14A, 14B, 14C, 14D, and 14E show the case where the viewer terminal 300 is a stationary computer (PC) and the display device 310 is a stationary display. For instance, the viewer terminal 300 may be a smartphone P or a tablet. In this case, the viewpoint image of virtual camera C1 is displayed as shown in FIG. 15A. When the viewer terminal 300 is for the viewer avatar 13, the image is displayed as shown in FIG. 15B.

Next, the following describes the audio system. The distribution server computer 100 reproduces music data 113 by the audio control program 124 in accordance with the time schedule data (TS data) 112, and transmits the music data 113 as the reproduced music (data) to the performer terminal 200 (music reproduction process).

Receiving the reproduced music (data) from the distribution server computer 100, the performer terminal 200 outputs the data to the performer user via the sophisticated earphone (in-ear monitor) worn by the performer user (reproduced music output process). When the performer user sings along with the output reproduced music, the performer terminal 200 converts the performer sound input from the sound collection microphone (voice input device 222) into data, and transmits the performer's sound (the data) to the distribution server computer 100.

The distribution server computer 100 generates distribution sound (data) from the performer sound (data) received from the performer terminal 200 and the reproduced music reproduced in the music reproduction process described above (distribution sound generation process), and distributes the generated distribution sound (data) to the viewer terminal 300 (generated sound distribution process).

The viewer terminal 300 receives the distribution sound (data) distributed from the distribution server computer 100 and outputs it from the audio output device 322 such as an earphone or speaker. This allows the viewer to listen to the live sound as if the performer avatar 1 were singing in the virtual live venue.

The performer terminal 200 transmits the performer sound (data) to the distribution server computer 100 as described above, and also executes monitor sound generation process and monitor sound output process, as shown in FIG. 10. This allows the loudspeaker placed in the control room to output the music sound and the performer sound of the reproduced music, and thus allows the assistant operator O and others to check the status of singing by the performer user, for example, in the control room.

<Viewer's Viewpoint Image Control Process>

Figure 21:
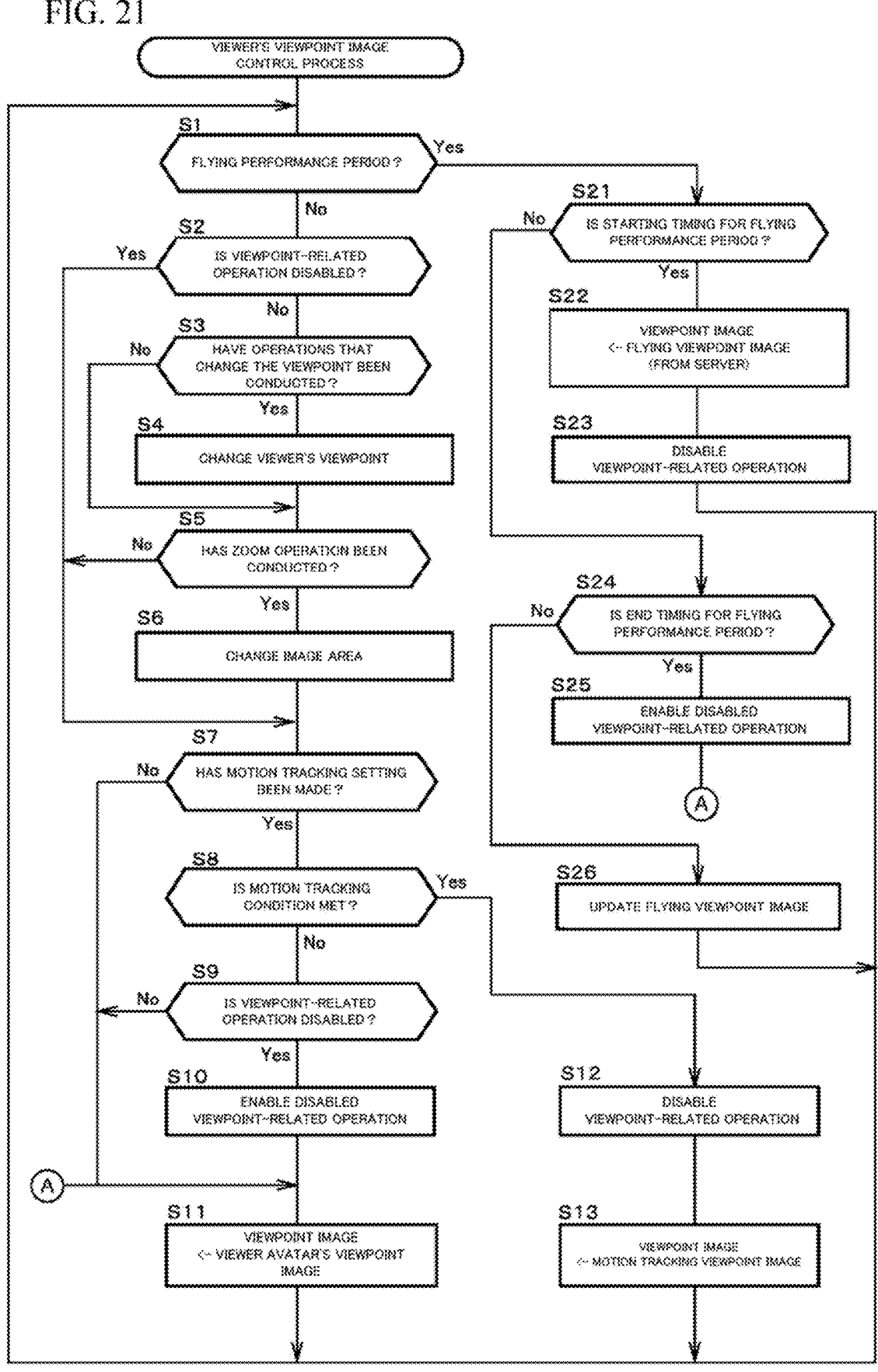
FIG. 21 is a flowchart showing an example of a viewer's viewpoint image control process executed by a viewer terminal that makes up the virtual space content distribution system according to one embodiment of the present invention.

Referring next to FIG. 21, the following describes viewer's viewpoint image control process that is executed with the viewer terminal 300 in accordance with the viewpoint image control program for viewer included in the program for viewer.

This viewer's viewpoint image control process starts with a determination whether or not the performer avatar 1 is in a flying performance period, in which the performer avatar 1 is virtually flying, as shown in FIGS. 20A, 20B, 20C, and 20D (step S1). Whether or not the flying performance period is in progress may be specified using the stage-effects status data from the distribution server computer 100, where the stage-effects status data indicates that the flying performance period is in progress. When it is the time for flying performance period in accordance with the time schedule data, the distribution server computer 100 transmits, to the viewer terminal 300, the stage-effects status data indicating that the flying performance period is in progress.

If the flying performance period is in progress (Y in step S1), the process proceeds to step S21. If the flying performance period is not in progress (N in step S1), the process determines whether viewpoint-related operations including viewpoint movement operations (including changing the viewpoint by avatar movement operations and motion operations) and zoom operations are disabled (step S2).

If the viewpoint-related operation is disabled (Y in step S2), the process proceeds to step S7. If the viewpoint-related operation is not disabled (N in step S2), the process determines whether operations that change the viewpoint, such as avatar movement or motion operations are conducted (step S3). If such an operation is conducted (Y in step S3), the viewer's viewpoint is changed according to the operation. If such an operation is not conducted (N in step S3), the process proceeds to step S5 to determine whether or not a zoom operation is conducted (step S5).

If a zoom operation is conducted (Y in step S5), the image area displayed on the display device 310 is changed to an image area according to the operation. If no zoom operation is conducted (N in step S5), the process determines whether or not a motion tracking setting has been made (step S7).

For this motion tracking setting, the viewer user is allowed to set as they like with the viewer terminal 300 before the start of a live performance or during a live performance, for example, depending on the type of device they use for operation and their level of proficiency in operation. Specifically, a user may not be accustomed to the operation with the operation input device 321 such as a touch panel, keyboard, or game controller, or may not be accustomed to the change of viewpoint by the avatar's movement operation or motion operation. In this case, this motion tracking setting may be made to deal with a failure of the viewer user in changing the viewpoint in response to the movement and motion of the performer avatar 1. For instance, if the virtual participation position of their viewer avatar is far from the performer avatar 1, and thus the performer avatar is expanded in display by zooming-in, an even small motion of the performer avatar 1 may cause improper displaying of the performer avatar 1.

If no motion tracking setting is made (N in step S7), the process proceeds to step S11. If the a motion tracking setting has been made (Y in step S7), the process further determines whether the motion tracking condition is met (step S8).

In this embodiment, the motion tracking condition is that the performer avatar 1 almost certainly fails to be displayed favorably on the display device 310. Specifically, if the head (or face) of the performer avatar 1 is within a predetermined range around the display area of the display device 310, it is highly likely that the movement or motion of the performer avatar 1 will cause the head (face) to move outside the display area, causing the head (face) to no longer be displayed favorably. It is therefore determined that the motion tracking condition is met in this case.

In this way, the present embodiment is configured to determine that the motion tracking condition is met before the head (face) of the performer avatar 1 disappears from the display area. This makes it possible to significantly reduce the disappearance of the head (face) of the performer avatar 1 from the display area. The present invention is not limited to this, and this motion tracking condition may be that the head (face) has moved outside the display area, or other conditions may be used as the motion tracking condition. In other words, any condition may be used as the movement tracking condition as long as it can prevent the performer avatar 1 from being no longer favorably displayed in the display area.

If the motion tracking condition is met (Y in step S8), the process disables viewpoint-related operations (step S12). After this step, the viewpoint is automatically changed to a motion tracking viewpoint, and a viewpoint image viewed from this motion-tracking viewpoint will be displayed on the display area of the display device 310 (step S13).

If the motion tracking condition is not met (N in step S8), the process further determines whether the viewpoint-related operations are disabled (step S9). If the viewpoint-related operations are disabled (Y in step S9), the process enables the disabled viewpoint-related operations (step S10) and then proceeds to step S11. If the viewpoint-related operations are not disabled (N in step S9), the process proceeds to step S11 without going through step S10.

In step 11, the motion tracking setting is not set or the motion tracking condition is not met. Then, the process continuously displays the viewpoint image of the viewer avatar in the display area of display device 310 (step S11).

As described above, if it is the time for the flying performance period, in which the performer avatar 1 is virtually flying in the live performance, the process determines Y at step S1 and proceeds to S21, where the process determines whether it is the start timing of the flying performance period (step S21).

If it is the start timing of the flying performance period (Y in step S21), the process displays a flying viewpoint image distributed from the distribution server computer 100 (step S22) in place of the viewer avatar's viewpoint image or motion-tracking viewpoint image that was displayed in the display area of the display device 310 before the start of the flying performance period, and then disables viewpoint-related operations (step S23). Then, the process returns to step S1.

In this embodiment, the same flying viewpoint image is displayed on the viewer terminals 300 of all viewer users during the flying production period. This flying viewpoint image is generated by the distribution server computer 100 and not by each viewer terminal 300 that generates a viewer avatar's viewpoint image that is different between the viewer users, and is distributed to the viewer terminals 300. Thus, the viewer terminals 300 with low processing power are able to favorably display the flying viewpoint image, which has a large rendering load for the viewpoint image because it involves the aerial movement of viewpoint. The present invention is not limited to this, and each viewer terminal 300 may generate this flying viewpoint image, similarly to the viewer avatar's viewpoint image.

If it is not the start time for the flying performance period (N in step S21), the process further determines whether it is the end timing of the flying performance period (step S24).

Whether it is the end timing of the flying performance period may be specified based on data indicating the end included in the data of the flying viewpoint image transmitted from the distribution server computer 100, or it may be specified by the stage-effects status data mentioned above, which is different from the flying viewpoint image.

If it is not the end timing for the flying performance period (N in step S24), i.e., it is in the flying performance period, the process proceeds to step S26 to update the flying viewpoint image, and then returns to step S1. If it is the end timing of the flying performance period (Y in step S24), the process enables the viewpoint-related operations (step S25). Then, the process proceeds to step S11, where it displays the viewpoint image of the viewer avatar instead of the flying viewpoint image that was displayed on the display area of the display unit 310 during the flying production period. After this, the process returns to step S1.

In this way, the viewer terminal 300 of this embodiment executes the viewer's viewpoint image control process shown in FIG. 21 to display the viewpoint image on the viewer terminal 300. Referring now to FIG. 17A to FIGS. 20A, 20B, 20C, and 20D, the following describes the viewpoint images.

FIGS. 17A, 17B, and 17C show the display content of the display device 310 when a zoom operation is performed with the viewer terminal 300 of this embodiment. In the default state where no zoom operation is performed, the viewpoint image of the image area centered on the upper body of the performer avatar 1 is displayed, as shown in FIG. 17A. In this default state, the viewer user performs a zoom-in operation of the viewer terminal 300: for a smartphone P, they touch the "+" on the display (not shown), and for a computer (PC), operate the "+" key on the keyboard. Then, the viewer terminal 300 displays a viewpoint image of the image area centered on the head (face) of the performer avatar 1, as shown in FIG. 17B, for example.

The viewer user performs a zoom-out operation of the viewer terminal 300: for a smartphone P, they touch the "−" on the display (not shown), and for a computer (PC), operate the "−" key on the keyboard. Then, the viewer terminal 300 displays a viewpoint image of the image area including the entire body of the performer avatar 1, as shown in FIG. 17C, for example.

For easy understanding of the zoom function, FIGS. 17A, 17B, and 17C describe the function using the viewpoint image of virtual camera C1 instead of the viewpoint of the viewer avatar. As shown in FIGS. 18A and 18B, zooming in and out may be performed for the viewpoint of the viewer avatar as well.

Although not described in detail in the viewer's viewpoint image control process of FIG. 21, when a live performance starts and the performer avatar 1 appears on the virtual stage G for the first time, the viewpoint of the viewer avatar may not be directed toward the performer avatar 1. In this case, it is likely that the performer avatar 1 will not be displayed on the viewer terminal 300 for a long period of time. In this way, the period during which the performer avatar 1 first appears is designated as an appearance period, and during this period, the viewpoint image displayed on the viewer terminal 300 is automatically switched to the viewpoint image of virtual camera C1, for example, instead of the viewpoint image of the viewer avatar, and each viewer user may be allowed to perform zooming-in and other operations to the viewpoint image of virtual camera C1.

FIGS. 18A and 18B show an example of a viewpoint image of a viewer avatar; the viewpoint image of the viewer avatar 28 participating virtually in the fourth region. As shown in FIGS. 18A and 18B, the viewpoint image of viewer avatar 28 includes the heads of viewer avatar 13 and viewer avatar 14, who are participating virtually in the third region, and the image will be of the performer avatar 1 viewed with the heads of these viewer avatars 13 and 14 in between.

In this case, the viewer user of viewer avatar 28 may perform a zoom-in operation to change the image area so that the upper body of performer avatar 1 is displayed on the center, as shown in FIG. 18B, whereby they are allowed to enjoy the live performance without having the viewer avatar 13 and viewer avatar 14 displayed.

Figures 19A, 19B, 19C, 19D, 19E, 19F:
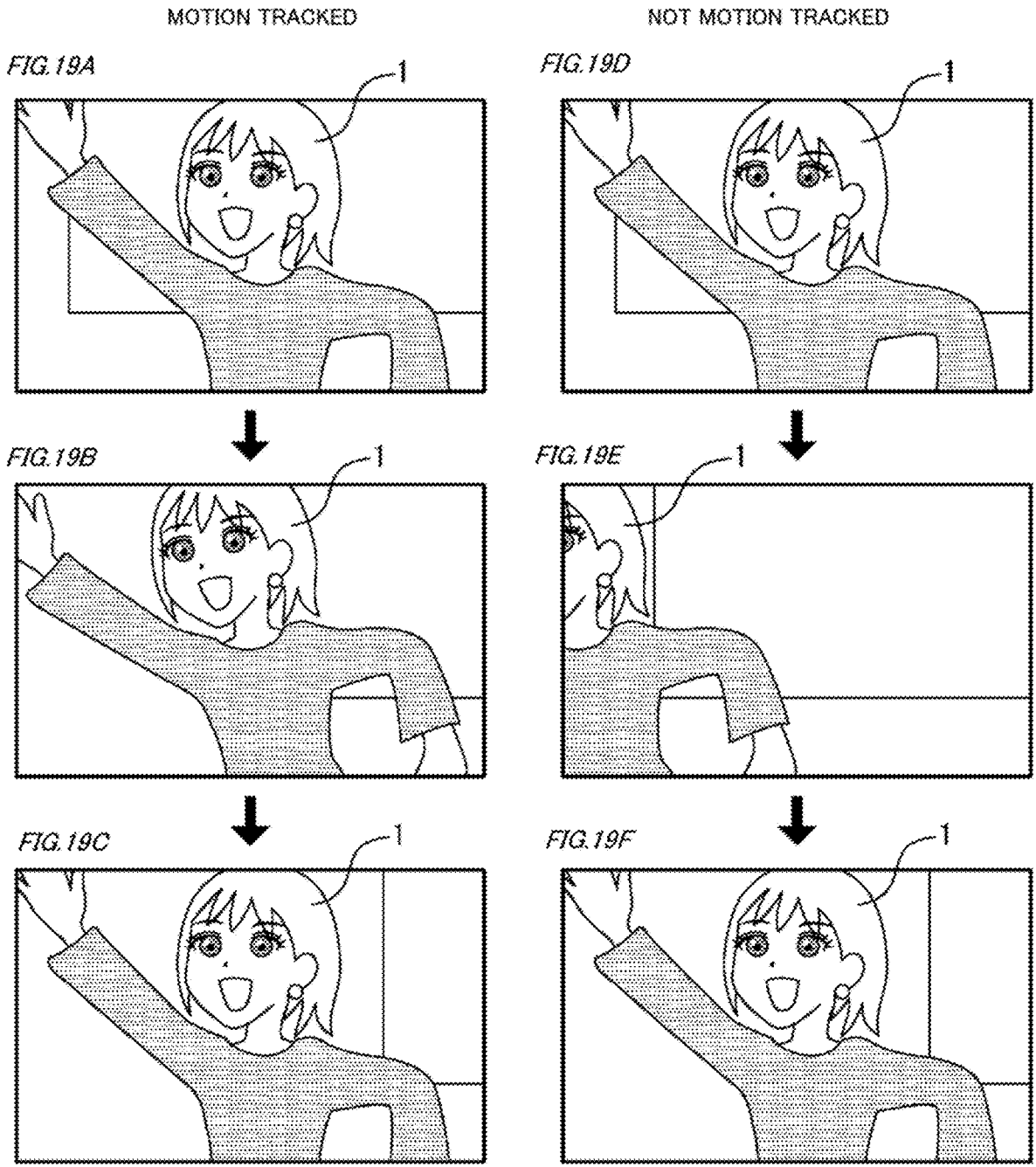
FIGS. 19A, 19B, 19C, 19D 19E, and 19F show an example display on a viewer terminal that makes up the virtual space content distribution system according to one embodiment of the present invention.

In the zoomed-in state shown in FIG. 18B, the live performance progresses and the performer avatar 1 may move or make large movements. In this case, if the viewer user is not able to successfully change the viewpoint of the viewer avatar 28 in accordance with the movements of the performer avatar 1, the performer avatar 1 may not be displayed well as shown in FIG. 19D to FIG. 19F. This makes it difficult for the viewer user to concentrate on the live performance because they have to pay attention to the viewpoint operation, and may prevent the viewer user from enjoying the live performance well.

This embodiment is configured so that, when the viewer user sets the motion tracking setting as described above and the head of the performer avatar 1 enters within a specified area surrounding the display area, the motion tracking condition is met. Then, the viewpoint is automatically changed to the motion tracking viewpoint, as shown in FIG. 19A to 19C, and the viewpoint image of the motion tracking viewpoint will be displayed. This means that the viewer user no longer needs to pay attention to operating the viewpoint, and is able to concentrate on the live performance and enjoy it favorably.

Then, as the live performance progresses and the flying performance period begins, as shown in FIGS. 20A, 20B, 20C, and 20D, the viewpoint image of each viewer avatar is automatically changed to a flying viewpoint image viewed from the aerial moving virtual camera, without any operation by the viewer user.

Specifically, before the performer avatar 1 starts the virtual flight, an image of the performer avatar 1 is displayed in which a wing object becomes large on the performer avatar 1's back. Then, as the performer avatar 1 looks up at a virtual aerial star object 50 virtually placed in the second area of the virtual live venue, the viewpoint of the viewer avatar also moves in a similar manner. At this time, a light effect 61 appears around the performer avatar 1.

Thereafter, when the performer avatar 1 shifts to virtual flight, the viewpoint image displayed on the display device 310 automatically switches from the viewpoint image of the viewer avatar in FIG. 20B to a flying viewpoint image viewed from the aerial moving virtual camera as shown in FIG. 20C.

During the flying performance period, the aerial moving virtual camera moves in the air within the second area based on the predetermined aerial trajectory, as described above, and the flying viewpoint images viewed from this aerial moving virtual camera are displayed on the display device 310 as shown in FIG. 20D.

The specific configuration is not limited to the above-described embodiment, and the present invention includes modifications and additions that do not depart from the gist of the present invention.

For example, the above embodiment describes an example of the viewer avatar that is movable freely within the third or fourth area in which they are virtually participating. This may result in problems such as errors in the virtual space data due to different viewer avatars in the fourth area colliding virtually with each other or overlapping in the same virtual position.

To solve such problems, the embodiment may be modified as in an example of FIG. 22 and FIG. 23, for example. Specifically, the third and fourth areas are each sectioned into small areas as shown in FIG. 22, and which of these sectioned areas will be used to participate in the virtual live performance is accepted from the viewer user in advance, before the live performance begins, as shown in FIG. 23. When the viewer user participates virtually with the viewer avatar, the user is allowed to participate only in the pre-selected area and move only within the selected area, thereby preventing errors in the virtual space data due to virtual collisions between viewer avatars or overlapping at the same virtual position.

When each viewer user is allowed to select the virtual participation position of the viewer avatar in advance as described above, the viewpoint image of virtual flying that is a special action may be the viewpoint image corresponding to the position (area) selected by each viewer user, depending on the position selected by the viewer user: for example, for viewer users who select A1 to C6 areas on the right of the virtual stage G in the fourth area, the viewpoint image during the flying performance period will be generated and displayed from the front right of the flying performer avatar 1, for viewer users who select D4 to H6 areas on the center of the virtual stage G in the fourth area, the viewpoint image during the flying performance period will be generated and displayed from the front center of the flying performer avatar 1, and for viewer users who select I1 to K6 areas on the left of the virtual stage G in the fourth area, the viewpoint image during the flying performance period will be generated and displayed from the front left of the flying performer avatar 1.

The above embodiment describes an example of the viewer terminal 300 generating a viewpoint image from the viewer avatar, and the present invention is not limited to this. For instance, for a live event with the small number of virtual participants, the distribution server computer 100 may generate and distribute the viewpoint image from the viewer avatar. The viewer user may be allowed to select whether to generate the viewpoint image with their viewer terminal 300 or with the distribution server computer 100, depending on the processing capacity of the terminal owned by the user and the data communication environment. The distribution server computer 100 may determine the processing capacity of the viewer terminal 300 connected for communication, and based on the determined processing capacity, the distribution server computer 100 may determine whether to generate the viewpoint image with the viewer terminal 300 or with the distribution server computer 100.

The above embodiment describes an example of the distribution server computer 100 that is installed in a studio operated by an event management organization that hosts the virtual space live event, and the present invention is not limited to this. The distribution server computer 100 may be a server computer owned by a company that leases the server computer in a data center, or may be a server computer provided by a cloud service, as described above. The server computer may be installed in any form, as long as it has the functions of the distribution server computer 100.

The above embodiment describes an example of a single performer user singing and performing alone, and the present invention is not limited to this. The performer user may include a group of performer users, and when a group of performer users holds a virtual live event, they may share a single performer terminal 200, or each of the members of the group may have a performer terminal 200 provided. When the performer user includes a group of multiple members, at least one of the distribution server computer 100 and the viewer terminal 300 may execute a process of designating a viewpoint tracking target member, allowing the viewer user to select the member in the group whose viewpoint is to be tracked.

In the above embodiment, the singer who sings and the actor who performs actions may be separate persons. In this case, different performer terminals are prepared for the singer and the actor, and the singer may sing in a location other than the studio where the actor performs the actions.

The above embodiment describes an example where the internet network is used as an example of a computer communication network connecting the distribution server computer 100, the administrator terminal 150, the performer terminal 200, and the viewer terminal 300, and the present invention is not limited to this. This communication network may be configured with a local area network that enables data communications only within a specific area, or may include a local area network and local data communications as part of the network.

The above embodiment describes an example where the performer user sings or performs singing actions (performance actions) in real time during the distribution of the virtual space live performance, so that the performer user is allowed to proceed with the live performance while checking the reactions of the viewer users who are virtually participating in the virtual space live performance. The present invention is not limited to this. Singing and singing actions (performance actions) by the performer user do not have to be performed in real time, but rather the singing and singing actions (performance actions) may be performed in advance, and the singing sound and singing actions (performance actions) may be recorded as performer avatar information in the distribution server computer 100. Then, the recorded singing sound and singing actions (performance actions) may be reproduced as the live performance progresses, thereby holding a virtual space live performance.

Instead of singing and singing actions (performance) by the performer user, singing and singing actions (performance actions) by a virtual performer created by computer graphics, for example, may be recorded in the distribution server computer as performer avatar information, and the recorded singing sound and singing actions (performance actions) may be reproduced as the live show progresses, thus holding a virtual space live performance.

In this way, singing or singing action (performance action) may be performed in advance to record the performer avatar information in the distribution server computer 100, and this performer avatar information may be reproduced to distribute a virtual space live performance. In this case, the virtual space content distribution system at the time of distribution will be configured with the distribution server computer 100, administrator terminal 150, and viewer terminal 300, and will not include the performer terminal 200, which is a performer user terminal that a performer user can use to make the performer avatar 1 act in the virtual space.

The above embodiment describes an example of the viewer terminal 300 that is a smartphone P or a computer (PC), and the present invention is not limited to this. This computer may be a portable laptop PC, or various types of information processing devices capable of outputting at least 2D images and audio, including tablet terminals, e-book readers, wearable computers, and game consoles.

The above embodiment describes an example of the performer user performing actions including singing in a studio, and the present invention is not limited to this. For instance, the performer user may perform in a virtual space live event from their home using the performer terminal 200 installed at home.

The above embodiment describes a virtual space live performance that is virtual space content, and the present invention is not limited to this. Such virtual space content may be any content that is beneficial to viewer users, such as a fan meeting where performer users gather with their fans, or such a talk session, and that is related to a virtual space in which performer avatar 1 and viewer avatars virtually participate.

The above embodiment describes an example, in which the general action (first action) is the action of the performer avatar 1 standing on the virtual stage G without moving, the special action (second action) is the action of the performer avatar 1 virtually flying, and the specific action (third action) is the action of the performer avatar 1 moving suddenly sideways. The present invention is not limited to this. The action may be in accordance with the content to be distributed: for instance, the general action (first action) may be an action (typical action) that is performed for the longest period of time by the performer avatar in the distributed content, the special action (second action) may be an action that is performed in a special period, which is the shortest period, or an action that is performed least frequently in the distributed content, and the specific action (third action) may be an action that is performed for a shorter period of time than the general action (first action) but for a longer period of time than the special action, or an operation that is executed less frequently than the general action (first action) but more frequently than the special action. The special action (second action) may include the specific action (third action).

The above embodiment describes an example having both the function of switching to the viewpoint corresponding to a special action (second action) and the function of tracking a specific action (third action), and the present invention is not limited to this. The virtual space content distribution system may have only one of these functions.

The above embodiment describes an example, in which the viewpoints of the four virtual cameras C1 to C4 as fixed (set) virtual cameras and the aerial moving virtual camera can be switched in advance by setting in the administrator terminal 150 or operating with the administrator terminal 150. The present invention is not limited to this. For instance, the administrator K may perform these viewpoint switching operations in real time with the administrator terminal 150 using a viewpoint switching controller, for example, that makes up the operation input device 161.

The above embodiment describes an example including the virtual cameras C1 to C4 that are fixed (set) in the virtual space as the virtual cameras. The present invention is not limited to this. For instance, in addition to or instead of these virtual cameras C1 to C4, a virtual moving camera that is movable may be placed within the virtual live venue, and the position and imaging direction of the virtual moving camera within the virtual space may be controlled by an administrator K or a camera crew via the operation with the administrator terminal 150 to produce the viewpoint image of the virtual moving camera.

The above embodiment describes an example, in which a viewpoint image of virtual camera C2 is displayed on the screen S to detect the facial expression of the performer user and to reflect it in the facial expression of the performer avatar. The present invention is not limited to this. For example, a sophisticated head-mounted display with a sensor function may be used to detect the facial expressions of the performer user. In this case, the performer user may perform while wearing this sophisticated head-mounted display, thereby enhancing the performer user's sense of immersion in the virtual live performance. The facial expressions of the performer avatar do not need to reflect the performer user's facial expressions in detail. In this case, the performer user may wear a typical head-mounted display for the performance.

The above embodiment describes an example, in which the viewer user's viewpoint is changed in accordance with the movements of the performer avatar and tracks the movements, and the present invention is not limited to this. For instance, changing and tracking of this viewpoint may be performed in accordance with specific stage-effects such as smoke or fireworks (pillars of fire) devices, special lighting, or deformation of stage G, which are objects for stage-effects on the stage G.

<Event Content>

(Summary of Event Content)

Referring to FIG. 13 through FIG. 23, the above explains an example of content that is event content to perform a live event by a performer in a virtual live venue. The event content is distributed at a predetermined date and time (scheduled time on the scheduled date) in accordance with the event data. The spatial area ER in which the event content is scheduled to be provided may be provided (distribution started and opened) before the start of the event so that viewer users are allowed to enter and participate in the virtual space in which the event is held. In this case, the event data may include information to specify the date and time when the spatial area ER scheduled to provide event content is to be provided (distribution started and opened) before the scheduled date.

The following describes an example, in which a virtual space as a predetermined type of virtual space is opened before the start of the event content of a virtual live event as shown in FIG. 13. In the virtual space, a virtual live venue (event venue) as shown in FIG. 13 is constructed. This allows viewer users to enter in the virtual space to participate, thereby gradually increasing the viewer user's interest in the event before the event starts. For instance, the predetermined type of virtual space is any one of the virtual spaces in the spatial area ER of FIG. 12. The following describes one example of the predetermined type of virtual space, by way of spatial area ER5 shown in FIGS. 24A and 24B.

Figure 24A:
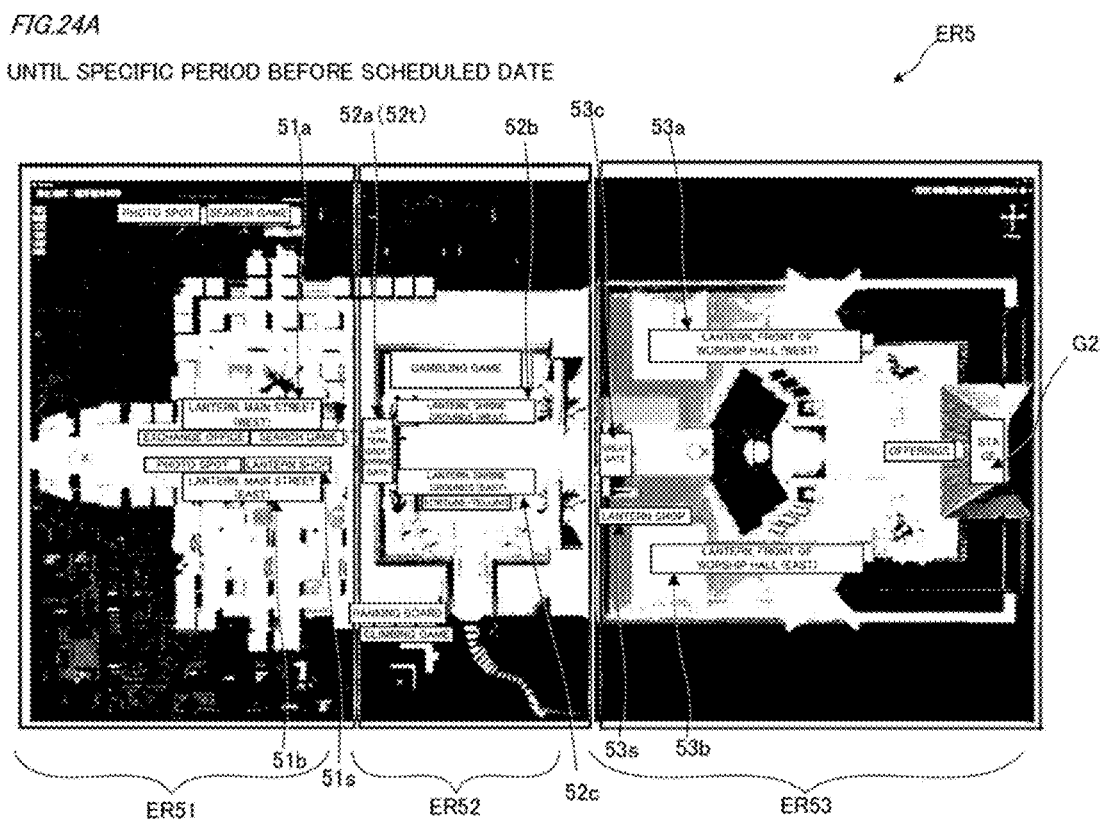
FIGS. 24A and 24B show an example of an overhead view of a predetermined type of virtual space according to one embodiment of the present invention.
Figure 24B:
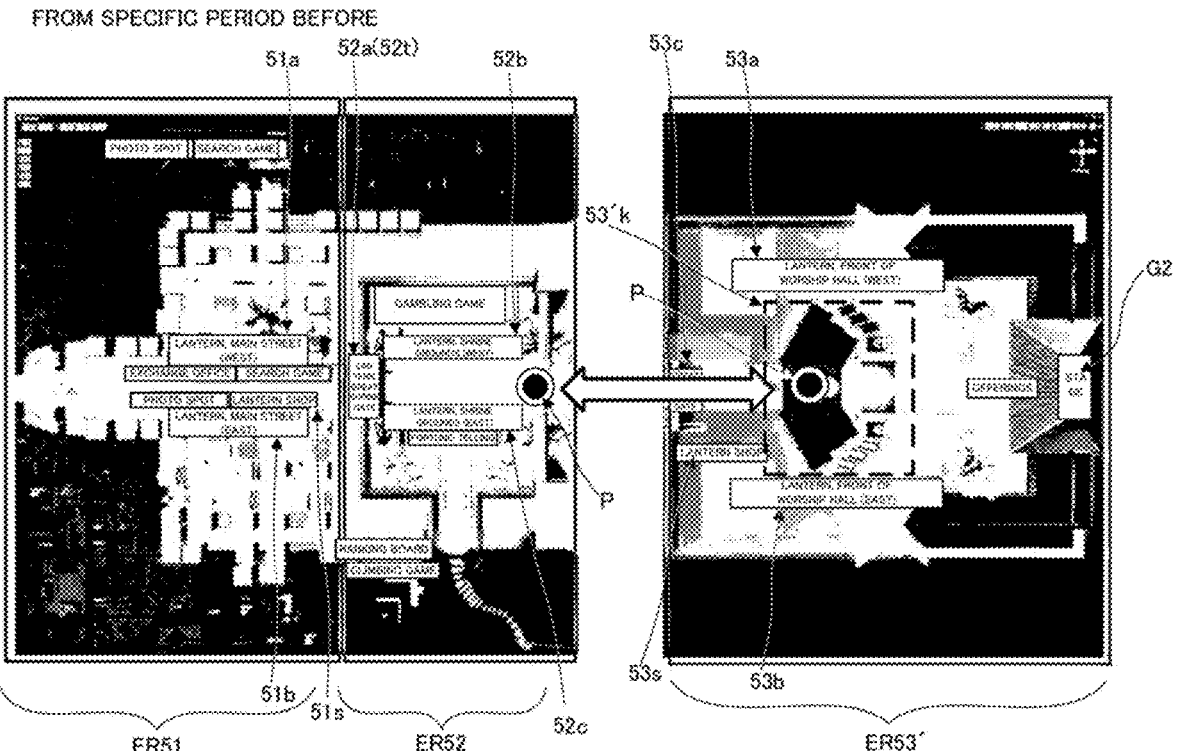

FIGS. 24A and 24B are overall overhead views of the event venue to be constructed in a spatial area ER5. In the spatial area ER5 in this embodiment, a virtual space is provided, in which objects such as buildings simulating a shrine and a town in front of the shrine are placed, for example. Note that the objects placed in the spatial area ER5 are not limited to buildings simulating a shrine, but may be objects according to various themes such as the sea, a lake, a mountain, and a school. The spatial area ER5 is made up of a plurality of sub-areas. As shown in FIG. 24A, the spatial area ER5 is made up of a sub-area ER51 corresponding to a town area, a sub-area ER52 corresponding to a shrine grounds area, and a sub-area ER53 corresponding to a worship hall area.

For instance, in the town area, multiple house objects like private houses are placed, and multiple exhibition areas are placed along the approach to the shrine grounds area to display (install) lantern objects purchased by viewers users. Lantern objects can be purchased, for example, in a lantern shop area in the town area. In the shrine grounds area, a large number of objects to be placed in the grounds of a shrine are placed, including the shrine gate (torii), gates, and ornaments. The shrine grounds area also has a game area where certain games can be played, a fortune-telling area for fortune-telling, and exhibition areas in multiple locations. For instance, in the worship hall area, a large number of objects corresponding to the worship hall of a shrine and a stage object that serves as a virtual live venue (event venue)

are placed. The worship hall area also has an offering area to make offerings, and exhibition areas in multiple locations.

The exhibition areas display lantern objects purchased by users, lantern objects associated with the operator (administrator) (including lantern objects that are initially set up), and lantern objects associated with special users. The special users include a performer user, a management user, a sponsor user who is supporting the event, and other celebrities, and include users who have been authenticated as special users by the management (administrator). Information on these sponsored user and other celebrities is stored in the event data 111.

As described below, the distribution server computer 100 determines beforehand the lantern objects displayed in the exhibition areas by a method such as random drawing, each time a switching condition is met. These lantern objects are default lantern objects to be displayed commonly to all of the users. The distribution server computer 100 transmits and places these lantern objects to the viewer terminal 300 of the user who has entered the spatial area ER5. The user brings their viewer avatar close to one of the exhibition areas, so that the lantern objects displayed in that exhibition area will be displayed on the viewer terminal 300.

Various processes related to such a spatial area ER5 (a predetermined type of virtual space) and various processes related to the provision and distribution of the spatial area ER5 are performed by the distribution server computer 100, and a viewer user enters and participates in the spatial area ER5 with the viewer terminal 300 and moves the viewer avatar, thereby causing images within the spatial area ER5 to be displayed on the viewer terminal 300. Hereinafter, viewer users and viewer avatars (also, performer avatars and others) will also be simply called users and user avatars (also, performer avatars and others).

FIGS. 25A, 25B, 25C and 25D are an example of an image of the spatial area ER5 displayed on the display unit 310 of the viewer terminal 300. FIG. 25A is an example of a display image when the sub-area ER52 (shrine grounds area) in FIGS. 24A and 24B is viewed obliquely from the inside of the sub-area ER51 (town area). FIG. 25B shows an example of a display image of a user avatar U operated by the user, viewed from behind the user avatar U. In the image, the user avatar is within the sub-region ER52 and is moving toward the boundary with the sub-region ER53. This drawing also shows a great gate object 53c, which corresponds to a great gate leading from the sub-area ER52 to the sub-area ER53. FIG. 25C shows an example of a display image of the user avatar U, viewed from behind the user avatar U. In the image, the user avatar is moving toward below a great shrine gate object 52t corresponding to the great shrine gate in the sub-area ER52 of FIGS. 24A and 24B. This drawing also shows the foot of the great shrine gate object 52t and the great gate object 53c. FIG. 25D shows an example of a display image of the user avatar U, viewed from behind the user avatar U. In the image, the user avatar is moving backward from the position shown in FIG. 25C. This drawing also shows the great shrine gate object 52a and a private-house object 51d corresponding to a private house. In this way, the user enters and participates in the spatial area ER5, whereby the user is allowed to move within the spatial area ER5 in response to the user's operations and view the objects and scenery within the spatial area ER5. The user is also allowed to purchase objects, make offerings, and participate in a live event held in the worship hall area on the scheduled date.

The image shown in FIG. 25A, which is an overhead view of the virtual space, may be displayed on the display unit 310 by user operation, and it may be an image corresponding to the line of sight of the user avatar U as shown in FIG. 25B to FIG. 25D. In response to user operations, the overhead view of the image of the user avatar U as in FIG. 25 B to FIG. 25D may display an image from the viewpoint of the user avatar U, without displaying the user avatar U operated by the user.

In this embodiment, a user is allowed to enter and participate (simply called enter) in the spatial area ER5 also during the period before the scheduled date, which is the period before the scheduled date when the event content is provided in the spatial area ER5. For instance, also during the period before the scheduled date, a user logs into the virtual space ER and enters and participates in the spatial area ER5. The virtual space generation program 120 then transmits data, to the viewer terminal 300, to display a generated image of the spatial area ER5 on the display device 310 of the viewer terminal 300. The period before the scheduled date refers to days before the scheduled date on which the event content is provided, and may be a specified period (e.g., one week) before the scheduled date, or may be all the days before the scheduled date. This embodiment assumes that a user is allowed to enter the spatial area ER5 from one week before the scheduled date.

Only users with the right (e.g., a ticket) to participate in the event content provided on the scheduled date are allowed to enter and participate in the spatial area ER5 during the period before the scheduled date and on the scheduled date. For instance, the right to participate is granted to the users by purchasing tickets to participate through billing, or by completing a given game or mission.

For instance, the spatial area ER5, which is a predetermined type of virtual space, includes a first virtual space having a plurality of sub-areas connected, where a viewer user is allowed to seamlessly move and enter from one sub-area to another of the multiple sub-areas, and a second virtual space including only a sub-area that has a common (same) display mode as another sub-area. The virtual space corresponding to the spatial area ER5 in this embodiment includes a first virtual space and a second virtual space. As shown in FIG. 24A, the first virtual space includes the sub-areas ER51 to ER53 connected, and in the first virtual space, a user is allowed to seamlessly move and enter between the sub-areas ER51 and ER52 and between sub-areas ER52 and ER53. As shown in FIG. 24B on the right, the second virtual space includes only a sub-area ER53' that has a common (same) display mode as the sub-area ER53.

For instance, until a specific period before the scheduled date of the event content (e.g., until the day before the scheduled date), the user is provided with the first virtual space shown in FIG. 24A, and when it's the specific period before the scheduled date of the event content and the open condition is met, the user is provided with the second virtual space shown in FIG. 24B in addition to the first virtual space. Then, a user is not allowed to move from some sub-areas (ER51, ER52) of the multiple sub-areas (ER51 to ER53) in the first virtual space to another area (ER53) (e.g., the gate of the great gate object 53c leading to the sub-area ER53 is closed). At the same time, a portal P is provided at a predetermined position in one of the sub-areas (a position in front of the great gate object 53c in the sub-area ER52). The user moves the user avatar U to this portal P, whereby the user becomes able to transition to the second virtual space including only the sub-area ER53' via the display of a predetermined screen (for example, a blackout screen), for example.

This embodiment provides the event content in the sub-area ER53' that has the same display mode as the sub-area ER53. This sub-area ER53' is an area where a user is not allowed to enter until the open condition is met, for example. In the sub-area ER53', a venue similar to the virtual live venue shown in FIG. 13 is constructed, with objects corresponding to a virtual stage for a live event and audience seats placed. During the live event, a performer avatar will act on the virtual stage, and the user will watch the event from the audience seats via the user avatar U.

Until the specific period before the scheduled date, the virtual live venue is gradually constructed in the sub-area ER53 of the first virtual space, such as gradually placing objects corresponding to audience seats for the live event and placing objects under construction for the virtual stage, and the user is allowed to check the status of the sub-area through the user avatar U. For instance, virtual space update data distribution process is performed every predetermined time (for example, every 24 hours) to update displayed objects. This informs the user that the event is approaching, and enhances the sense of realism and interest of the user.

If a user is staying within the sub-area ER53 when the open condition is met, they are moved out of the sub-area ER53. For instance, the user avatar U is forcibly moved to a predetermined position outside the sub-area ER53 (e.g., in front of the great gate object 53c in the sub-area ER52). After that, while the user is not able to enter the sub-area ER53, they may let the user avatar U enter the sub-area ER53' via the portal P described above.

The sub-area ER53 and sub-area ER53' have a common display mode, but they are different in that the space in which the user avatar U is movable is restricted. For instance, in the sub-area ER53, the user avatar U is able to freely move within the area, whereas in the sub-area ER53', the user avatar U is movable only within the audience area 53'k. This reduces the burden on the server to the minimum that is necessary for the processing to provide the event content. Different servers (rooms) may be used to perform the process of constructing and generating the sub-area ER53 and the sub-area ER53'. This allows a server (room) capable of handling heavy loads to perform the process of providing the event content. Note that users who are allowed to enter the sub-area ER53' may be limited to those who satisfy a predetermined condition to view the event content. (Changes in Display Mode in Virtual Space)

In this embodiment, the display mode in the spatial area ER5 may change according to an event that occurs in the spatial area ER5 during the period before the scheduled date. For instance, the event that occurs in the spatial area ER5 during the period before the scheduled date includes a user's action and an action of another user during the period before the scheduled date, as well as lotteries in the spatial area ER5 and changes to the settings of the virtual space performed by the manager. The user's action (or the action of another user) includes purchasing and placing a specific object (item, lantern object, and others), playing a game, such as completing a specific mission. The display mode in the spatial area ER5, which may change according to an event that occurs in the spatial area ER5 during the period before the scheduled date, includes a change in the display mode of a specific object (e.g., lantern objects, and exhibition areas in which lantern objects are placed) placed in the spatial area ER5, and a change in the display mode of stage effects during the provision of the event content.
(Change in Display Mode During the Period Before the Scheduled in Accordance with Specific Object Placement)

Referring to FIG. 26A to FIG. 32, the following describes an example of changing the display mode in the spatial area ER5 during the period before the scheduled date in accordance with an event in which a user purchases a lantern object to be placed it in the spatial area ER5 during the period before the scheduled date. For instance, the display mode in the spatial area ER5 during the period before the scheduled date may change in accordance with placing a lantern object purchased by a user in the exhibition area in the spatial area ER5, or changing a lantern object purchased by another user and placed in the exhibition area in the spatial area ER5 to a different lantern object when a switching condition is met. A lantern object can be a type of social tipping item (e.g., a flower stand) from users to the performer when providing event content, and this may be called a flower stand FS in the following.

Figure 26A:
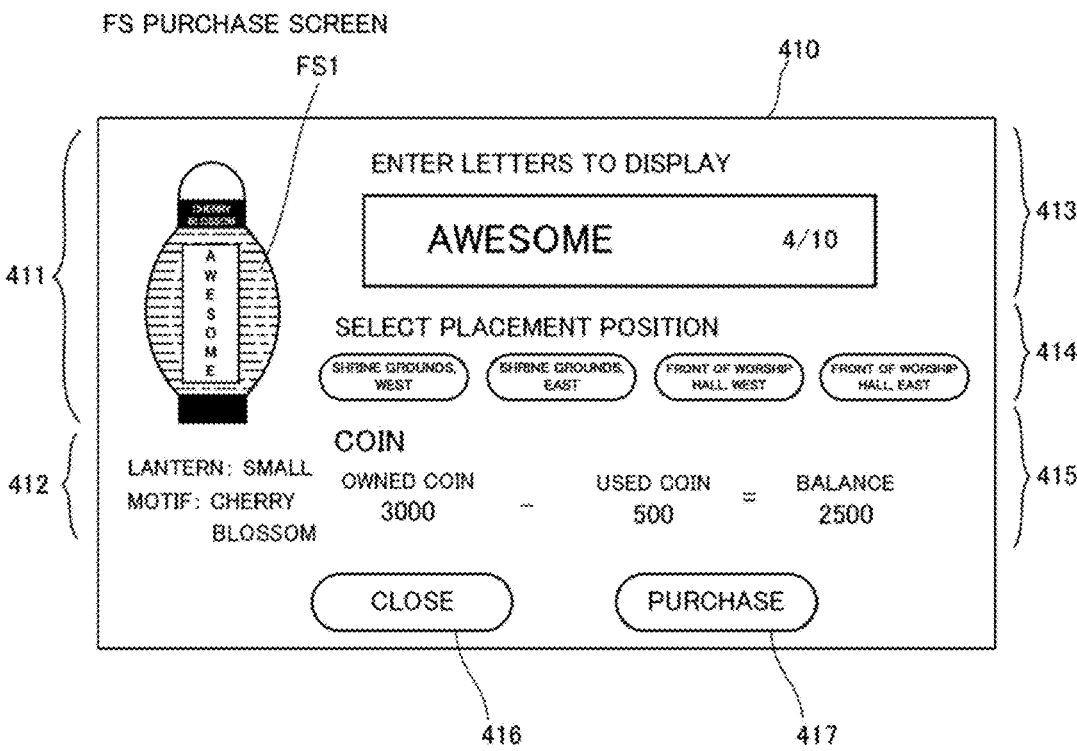
FIGS. 26A and 26B show an example display mode during a purchase process for an object displayed in a virtual space according to one embodiment of the present invention.

For instance, flower stands FS may be purchased at a lantern shop 51s located along the approach to the shrine within the sub-area ER51 shown in FIGS. 24A and 24B. A user moves the user avatar U to the lantern shop 51s or selects and operates the lantern shop 51s, whereby the image displayed on the viewer terminal 300 changes from a screen displaying the image in the sub-area ER51 to a screen to purchase a flower stand FS. FIG. 26A is an example of the screen that appears when purchasing flower stand FS.

There are several types of flower stands FS available for purchase, as shown in FIG. 27A and FIG. 27B. FIG. 27A shows a table for each attribute (motif) of the flower stand FS. The attributes (motifs) include "plain," "cherry blossom," "demon," "white fox," "black fox," and "gorgeous." Each attribute has a designated motif color, and the flower stand FS for each attribute has the corresponding color and a design related to the attribute. Of the attributes, "cherry blossom," "demon," "white fox," and "black fox" are the attributes and colors associated with the performer avatars that appear as facilitator characters during provision of the event content. In other words, the purchasable flower stands FS are prepared to match the image motifs and image colors defined for the performer avatars that appear when the event content is provided.

The flower stands FS are also available in multiple sizes. The flower stands FS have different sizes and prices depending on the attributes. For instance, for the attribute "plain," only the size "small" is available, and the price is set at 500 coins. For the attribute "cherry blossom", two sizes are available, "large" and "small", with the price for the "large" size set at 2,500 coins and the price for the "small" size at 500 coins. A user selects one of the motifs and sizes to purchase the desired flower stand FS. For instance, a user can enjoy purchasing a flower stand FS that matches the attribute/color, image motif, and image color associated with the performer avatar they are supporting (their favorite) among the performer avatars that appear during the provision of event content.

FIG. 27B shows a table for each size of the flower stands FS. A user may decorate the flower stand FS (generate the display mode of the flower stand FS), for example, by adding letters. The font type and font color are determined according to the size of the flower stand FS, and users can select them at the time of purchase. The maximum number of letters that can be displayed is defined for each size of flower stands FS. For instance, letters may be entered for size "large" in two columns, each with a limit of 15 letters. For size "small", the limit is 10 letters.

Flower stands FS have a defined area for each size that can be displayed (placed). When a user wishes to display a purchased flower stand FS within the spatial area ER5, they are able to select (designate) the exhibition area from the multiple exhibition areas provided within the spatial area ER5 in which the flower stand FS can be displayed, and place the flower stand FS there. For instance, they may select, for the size "large," any one of the exhibition areas: the main street (west) area 51$a$; the main street (east) area 51$b$; and the great shrine gate area 52$a$ (the area where the great shrine gate object 52$t$ is located). For the size "small," they may select any one of the exhibition areas: the shrine grounds (west) area 52$b$; the shrine grounds street (east) area 52$c$; the front of worship hall (west) area 53$a$, and the front of worship hall (east) area 53$b$.

FIG. 26A shows a purchase screen, which displays an image 411 of the flower stand FS selected by the user. Below the image 411 of the flower stand FS, the screen displays detailed information 412 of the selected flower stand FS. The detailed information 412 includes information on size and attribute (motif). A user is able to also add textual decorations to the flower stand FS they purchase, customizing it to their preferred design. In the letter input section 413, the user is able to input letters to be displayed on the flower stand FS. The input letters are reflected in the image 411 of the flower stand FS, so that the user is able to confirm the image when the flower stand is placed. Some taboo words are defined for the letters that cannot be displayed on flower stands FS. Examples of taboo words include violent language and language that violates public order and morals. If these taboo words are entered, the purchase icon 417 will be grayed out and the purchase operation will be disabled.

As shown in the example purchase screen of FIG. 26A, the user operates the placement position selection section 414 to select the exhibition area for the flower stand FS. The coin-related section 415 displays the number of coins the user possesses, the number of coins consumed that is the purchase price of the flower stand FS, and the number of coins remaining after the purchase. The user operates the purchase icon 417, thus confirming the purchase, and the billing process is carried out. If the purchase is to be cancelled, the user operates with the close icon 416.

Figure 26B:
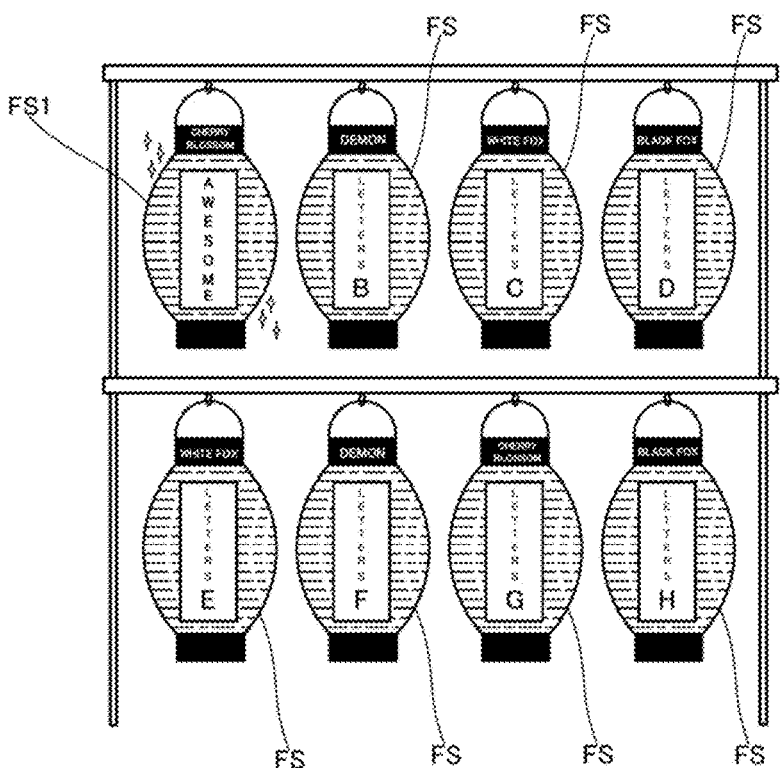

After purchasing the flower stand FS, the flower stand FS will be exhibited with special effect as shown in FIG. 26B. For instance, in FIG. 26A, a user purchases flower stand FS1 with the attribute "cherry blossom," the size "small," and the textual decoration "awesome". In this case, flower stand FS1 is displayed in the exhibition area where it is placed, and the flower stand FS1 is surrounded by light (displayed and highlighted in a specific manner different from other flower stands). When a user purchases a flower stand FS and designates an exhibition area with the viewer terminal 300, the distribution server computer 100 determines an exhibition position within the designated exhibition area by lottery, for example. The distribution server computer 100 stores information including the exhibition position of the flower stand FS, and transmits information to specify the exhibition position to the viewer terminal 300 of the user who made the designation. The viewer terminal 300 performs a process of replacing the flower stand displayed at the exhibition position designated from the received information with the flower stand purchased by the user and displaying it. This encourages the user, when entering and participating in the spatial area ER5, to move to the exhibition area of the flower stand FS placed by the user to see their own flower stand FS. This also adds interest, such as checking letters on other users' flower stands FS. As shown in FIG. 24A, the exhibition area is provided in all of the sub-areas ER51 to ER53 that make up the spatial area ER5. This encourages users who have entered and participated in spatial area ER5 to move to all of the sub-areas ER51 through ER53, allowing users to enjoy themselves over the entire spatial area ER5.

Figure 28:
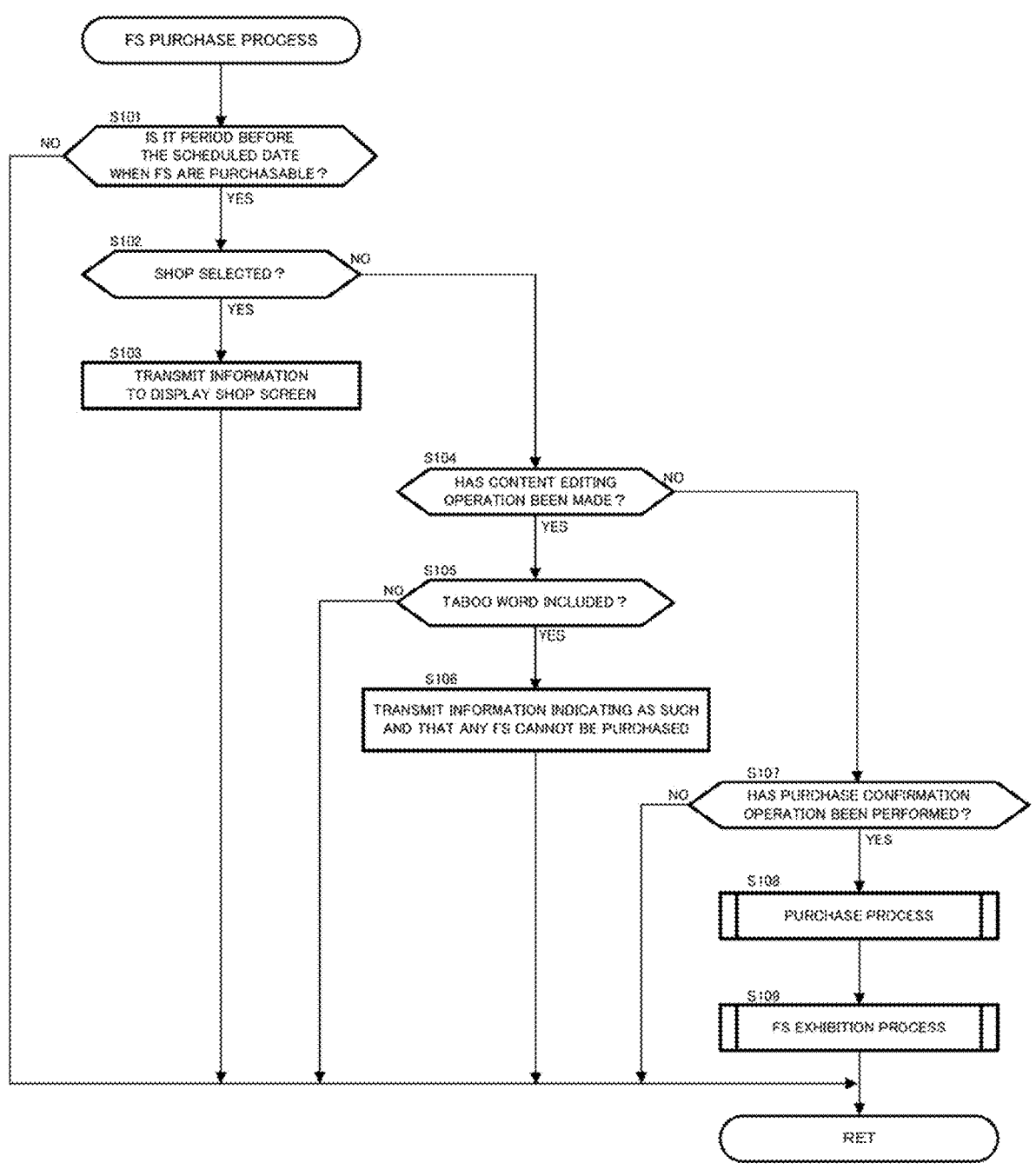
FIG. 28 is a flowchart showing an example of the purchase process of an object displayed in a virtual space according to one embodiment of the present invention.

Referring next to the flowchart of FIG. 28, the following describes the process of purchasing a flower stand FS executed by the distribution server computer 100.

In step S101, the process determines whether or not it is a period before the scheduled date when flower stands are purchasable. This purchasable period before the scheduled date may be a period that coincides with the period before the scheduled date, or may be a part of the period before the scheduled date. If it is not determined that it is the purchasable period before the scheduled date, the process ends because no flower stands can be purchased. For instance, on the day of the scheduled date, it is determined No in step S101, meaning that the user cannot purchase flower stands FS. This motivates users to enter the spatial area ER5 at least once before the date of the event to purchase a flower stand FS.

If it is determined in step S101 that it is the purchasable period before the scheduled date, the process determines in step S102 whether or not a shop selection operation has been performed. For instance, the shop selection operation is an operation to a flower stand shop within the spatial area ER5 (e.g., lantern shops 51$s$, 53$s$ in FIGS. 24A and 24B). The operation includes approaching a store clerk character or selecting a specified icon of the shop. Specifically, in step S102, the process determines whether or not the information to be transmitted when the store selection operation is performed with the viewer terminal 300 has been received.

If it is determined in step S102 that a shop selection operation has been performed, then the process transmits in step S103 the information, to the viewer terminal 300 with which the user operated to select the shop, to display a shop screen on the display device 310. For instance, the shop screen displays a product list to let a user select a flower stand FS to purchase, or a purchase screen for a flower stand FS, as shown in FIG. 26A. This allows the viewer terminal 300 to display the shop screen and let the user select a desired flower stand FS. After the information to display the shop screen is output in step S103, the process ends. In addition, the purchasing operation for the flower stands FS does not have to be performed within the spatial area ER5, but may be performed from a shop displayed in another space within the virtual space ER. The purchasing operation may be performed on a website other than the virtual space, which may be reflected on the virtual space (making it available for use and exhibiting).

If it is not determined in step S102 that a shop selection operation has been performed, then the process determines in step S104 whether or not a content editing operation has been performed. The content editing operation is a decoration operation such as inputting letters to a flower stand FS. Specifically, in step S104, the process determines whether or not information is received from the viewer terminal 300 to identify the letters input to the flower stand FS in response to the decoration operation on the screen shown in FIG. 26A after the flower stand FS to be purchased is selected with the viewer terminal 300. If it is determined that the content editing operation has been performed, then the process determines in step S105 whether or not a taboo word is included. If it is not determined that a taboo word is included, the process ends. If it is determined in step S105 that the letters contain a taboo word, then the process transmits in step S106 information indicating as such (that the letters contain a taboo word) and that any flower stand cannot be purchased to the viewer terminal 300 with which the user performed the content editing operation, and the process ends. This leads to a pop-up display on the viewer terminal 300 stating that "a taboo word is included", for example, or a process that prevents the user from selecting the purchase icon 417.

If it is not determined in step S104 that a content editing operation has been performed, then the process determines in step S107 whether or not a purchase confirmation operation has been performed. For instance, the purchase confirmation operation is an operation to the purchase icon 417 shown in FIG. 26A. Specifically, in step 107, the process determines whether or not the viewer terminal 300 has received information that is to be transmitted when an operation is performed on the purchase icon 417 with the viewer terminal 300 and that specifies the type of flower stand FS purchased, the letters entered, and the exhibition area selected. If it is not determined that the purchase confirmation operation has been performed, the process ends.

If it is determined in step S107 that the purchase confirmation operation has been performed, the process executes a purchase process (billing process) in step S108. After the purchase process is completed, the process executes a flower stand exhibition process in step S109, and the process ends. For instance, this process determines the exhibition position within the selected exhibition area by lottery, based on the information received when the purchase confirmation operation is performed, updates the user-related information (contained in the viewer user data 133) related to the flower stand FS, transmits information to specify the exhibition position to the viewer terminal 300 of the purchasing user, and generates the special effects shown in FIG. 26B on the viewer terminal 300 of the purchasing user. The exhibition positions in the exhibition area also are not limited to those determined by lottery. A user who purchases may be allowed to select the exhibition position so as to display in the position of their choice.

FIG. 27C is an example table that stores information about a flower stand FS purchased by a user, in the user-related information stored in the viewer user data 133. For instance, the table associates, with each user ID, information to specify the purchased flower stand FS and information on the exhibition position of the flower stand FS within the exhibition area specified by the user. In one example, the information includes a "FS ID" to individually specify the flower stand FS, "purchased FS" that is the information regarding the attribute and size of the purchased flower stand FS, "letters" that is information regarding the decoration made by the user (letters entered), "user designated area" that is information regarding the exhibition area designated by the user, "position" that is information regarding the exhibition position within the exhibition area, and "purchased date and time" that is the date and time when the user purchased the flower stand. In the flower stand exhibition process in step S109, information about the purchased flower stand FS associated with the purchasing user is newly stored. Information regarding the purchased flower stand FS is also transmitted to the viewer terminal 300 of the purchasing user, and the viewer terminal 300 performs an exhibition processing to display (exhibit) the purchased flower stand FS in place of the flower stand FS already displayed at the exhibition position. Note that when a flower stand FS is purchased, the process is not limited to exhibit the flower stand FS with special effect; instead or in addition, a notification may simply be made that the purchased flower stand FS has been exhibited in the selected exhibition area.

When any user purchases a flower stand FS, the viewer terminal 300 of this user will display the purchased flower stand FS at the exhibition position in place of the flower stand FS already exhibited there as stated above. The purchase, however, does not affect the flower stand FS in the exhibition area on the viewer terminal 300 of another user, and this viewer terminal 300 continuously exhibits the same flower stand FS as before the purchase. This means that different flower stands FS may be exhibited in the exhibition area between the user who has purchased a flower stand FS and another user.

Although in step S101, the process determines whether or not it is a purchasable period before the scheduled date when flower stands are purchasable, flower stands FS may be purchasable anytime, not just before the schedule date. For instance, flower stands FS are purchasable on the scheduled date on which the event content is provided or after the scheduled date, depending on the timing of the provision of event content related to the flower stands FS to be purchased. Note that if it is not in the purchasable period before the scheduled date in step S101, then the flower stand FS may not be used in the stage effects of the event content when it is provided.

Editing operations (e.g., inputting letter and editing content) of the display mode of the flower stand FS are not limited at the time of purchase, but instead or in addition thereto, editing may be performed after purchase. For instance, after a purchase operation of a flower stand FS, the flower stand FS may be stored in the user's item box, and the user may take it out of the item box and exhibit it or edit it at their preferred timing. The type and color of the font may be changed after purchase, not just at the time of purchase. It is not limited to letters, but it may also be possible to edit color and to add decorations as options to create a luxurious display mode.

The above describes the process of determining the exhibition position (e.g., the exhibition positions "A1", "A2" and others in the exhibition area A described later) in the exhibition area selected by the user, based on the information received in response to the purchase confirmation operation in step S107 of FIG. 28. The present invention is not limited to this, and for instance, the flower stand FS may be exhibited at a timing different from the timing of purchase of the flower stand FS, and the exhibition position may be determined at the timing of exhibition.

(Change in Display Mode During the Period Before the Scheduled Date in Response to the Fulfillment of Switching Condition)

Referring next to FIG. 29A through FIG. 32, the following describes transition of the lantern objects placed in the exhibition area (the display mode in the exhibition area). In this embodiment, lantern objects are exhibited and displayed in a plurality of exhibition areas within the area ER5 (e.g., the main street (west) area 51a, the main street (east) area 51b, and the great shrine gate area 52a). Each exhibition area has a set upper limit on the number of lantern objects that can be exhibited.

As described above, various flower stands FS are placed in these exhibition areas, including not only flower stands FS purchased by the user themselves (associated with the user) as described above with reference to FIG. 26A through FIG. 28, but also flower stands FS purchased by other users (associated with other users), flower stands FS associated with the management (administrator), and flower stands FS associated with special users.

Figures 29A, 29B, 29C, 29D:
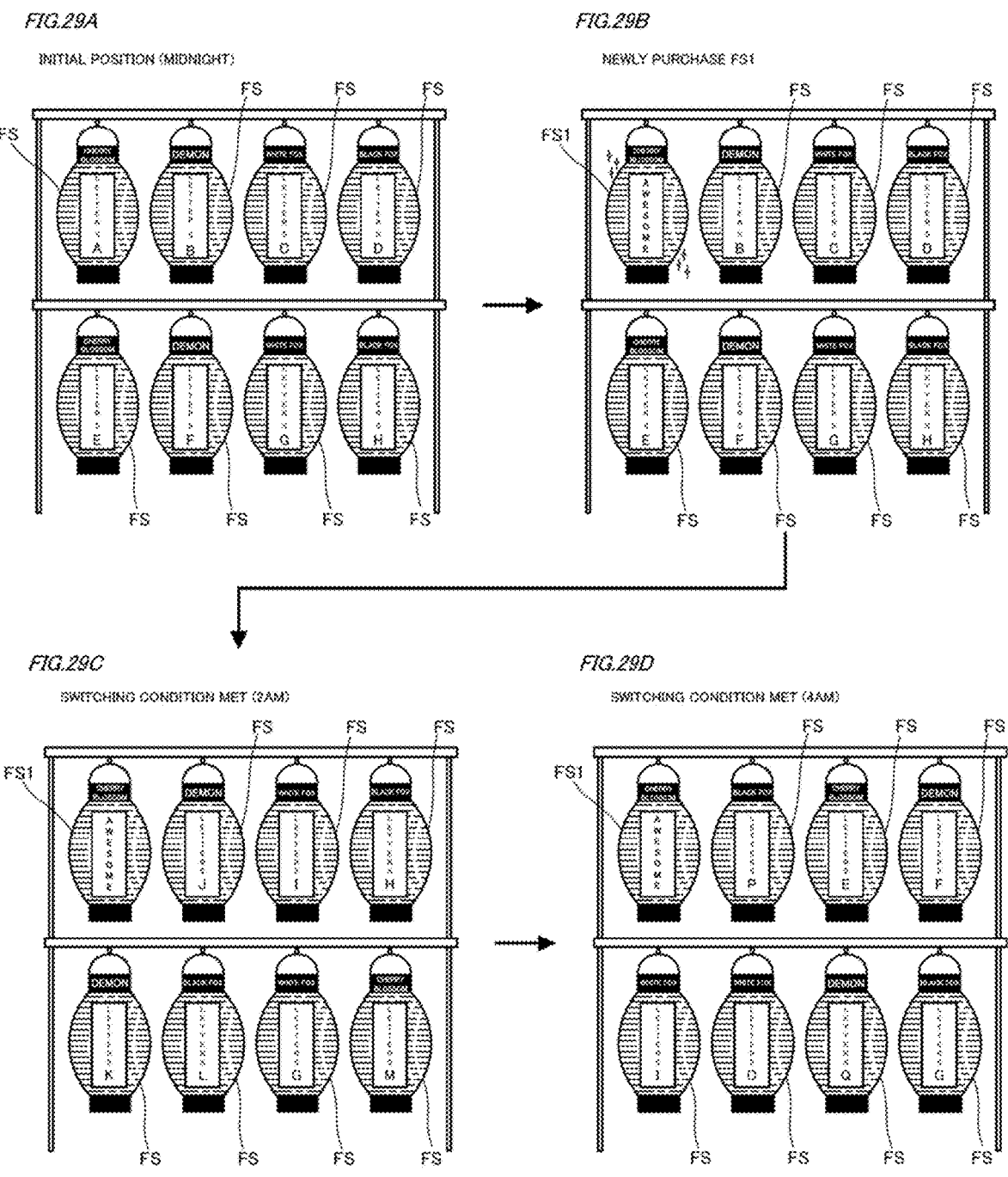
FIGS. 29A, 29B, 29C, and 29D show an example transition of the display mode of objects displayed in a predetermined type of virtual space according to one embodiment of the present invention.

In this embodiment, the exhibition area A corresponds to the shrine grounds (west) area 52b of the sub-area ER52 in FIGS. 24A and 24B. In this area, "small"-size flower stands FS shown in FIG. 27B can be exhibited among the flower stands FS that are lantern objects. FIG. 29A shows a part of the exhibition area A that corresponds to the shrine grounds (west) area 52*b*. As shown in FIG. 29A, a plurality of flower stands FS, which are lantern objects, are exhibited vertically and horizontally in this exhibition area A. FIG. 31A is a table included in the object data 122, and is an example of a data table relating to the information that specifies the flower stands FS to be exhibited within the exhibition area A and their exhibition positions. The table in FIG. 31A associates, with each exhibition position (A1, A2, A3 . . . ) in the exhibition area A, information to specify the flower stands FS, including flower stand IDs and textual information to be displayed. The exhibit position A1 corresponds to the upper left end of FIG. 29A, for example, and is associated with the flower stand FS with the flower stand ID "a1", the attribute "cherry blossom" and "letter A" displayed. The exhibit position A2 corresponds to the position immediately right to the exhibition position A1 in the same row, and is associated with the flower stand FS with the flower stand ID "b1", the attribute "demon" and "letter B" displayed.

FIG. 31B is a table included in the object data 122, and is an example of a data table relating to the information that specifies the flower stands FS to be exhibited within the exhibition area B and their exhibition positions. The exhibition area B, in which the "large"-size flower stands FS shown in FIG. 27B can be exhibited, corresponds to the place of the sub-area ER52 where the great shrine gate object 52*t* is located (great shrine gate area 52*a*). Similarly to FIG. 31A, the table in FIG. 31B associates, with each exhibition position (B1, B2, B3 . . . ) in the exhibition area B, information to specify the flower stands FS, including flower stand IDs and textual information to be displayed. For instance, the position corresponding to the exhibit position B1 is associated with the flower stand FS with the flower stand ID "a2" and "letter A2" displayed. The position corresponding to the exhibit position B2 is associated with the flower stand FS with the flower stand ID "b2" and "letter B2" displayed.

As shown in FIG. 31A and FIG. 31B, the information on the flower stands FS is associated with each exhibition area, and this information is switched to information on another flower stand FS determined by random lottery, for example, each time a switching condition is met. The switching condition for information on flower stands FS in each exhibition area may include: the elapse of a predetermined time (e.g., every 30 minutes or every 2 hours); user's operation to enter and leave the virtual space (e.g., login and re-login); and user's operation to reload the display data (e.g., reload operation or after the viewpoint of user avatar U moves away from a predetermined exhibition area and then returns to that exhibition area). The probability of being selected for exhibition by random lottery is set uniformly for each flower stand FS. The present invention is not limited to this, and the probability may vary with the characteristics of each flower stand FS, as described below.

Each time a switching condition is met, the distribution server computer 100 determines the flower stands FS to be exhibited in each exhibition area, updates the table for each exhibition area stored in the object data 122 (see FIG. 31A and FIG. 31B, for example) (sets it as a default common to all users), and transmits the information that specifies the flower stands FS for each exhibition area to the viewer terminal 300 of the user who has entered the spatial area ER5. This allows the viewer terminal 300 to change the flower stands FS in each exhibition area (flower stands FS of other users, excluding the user's own flower stand FS) to other flower stands FS. The changing of flower stands FS will be done up to the maximum number that can be exhibited in each exhibition area. For instance, the maximum number of flower stands FS that can be exhibited in exhibition area A is 100. In this case, the information on the flower stands FS for exhibition area A stored in the object data 122 shown in FIG. 31A is updated so that 100 flower stands FS are selected by random drawing, for example, each time the switching condition is met, and the information is changed and updated to the data on the selected flower stands FS. For instance, when the exhibition area is opened, 10 flower stands FS may be initially placed in exhibition area A, which has the capacity of exhibiting 100 flower stands FS, and as users purchase and exhibit the flower stands FS, the number may gradually increase to 100. The time when the exhibition area is opened refers to when a user is allowed to purchase a flower stand FS and exhibit it in the exhibition area. In this case, the random lottery may be performed after the number of purchasing reaches the upper limit.

Figures 30A, 30B, 30C, 30D:
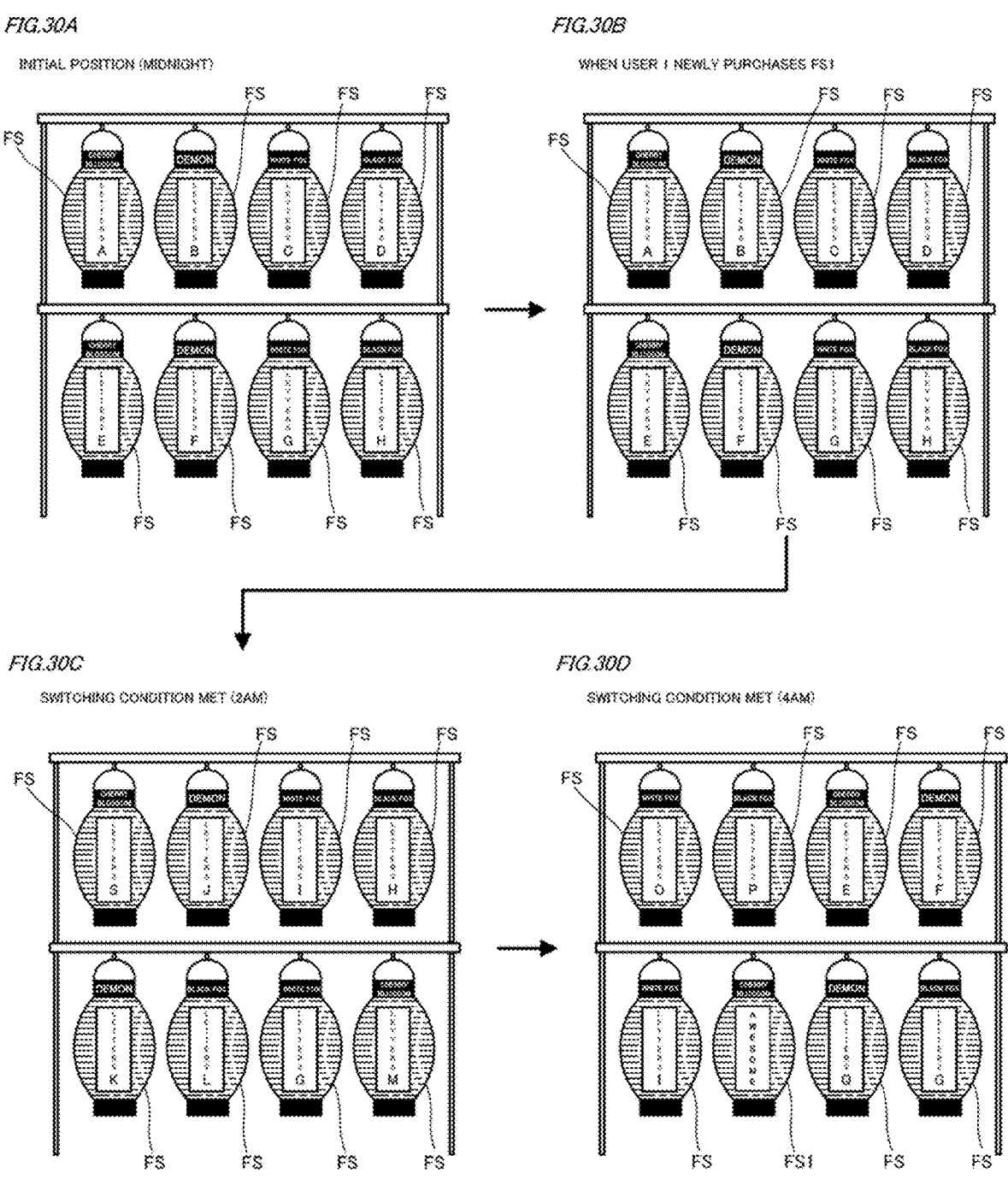
FIGS. 30A, 30B, 30C and 30D show another example transition of the display mode of objects displayed in a predetermined type of virtual space according to one embodiment of the present invention.

The information on the flower stands FS placed in the virtual space changes each time the switching condition is met. The flower stand FS that the user has purchased, however, may continue to be displayed in the exhibition area within the virtual space based on the information managed in FIG. 27C, as described above. For instance, FIGS. 29A, 29B, 29C, and 29D show an example of the transition of the display mode of flower stands FS in exhibition area A displayed on the display device 310 of user 1 when user 1 newly purchases a flower stand FS. FIGS. 30A, 30B, 30C and 30D show an example of the transition of the display mode of flower stands FS in exhibition area A (the same exhibition position as in FIGS. 29A, 29B, 29C, and 29D) displayed on the display device 310 of user 2 when user 1 newly purchases a flower stand FS. FIG. 29A and FIG. 30A are display examples of placing flower stands FS that have been determined as the default corresponding to the exhibition area A and that are specified from the flower-stand placement information of FIG. 31A. Note that at the timing of FIG. 29A and FIG. 30A, the flower stands FS purchased by users 1 and 2 are not exhibited in the exhibition area A for both users 1 and 2.

FIG. 29B and FIG. 30B are display examples at the timing when user 1 newly purchases a flower stand FS1. For instance, the flower stand FS1 purchased by user 1 has the flower stand ID "a3" shown in FIG. 27C with the attribute "cherry blossom" of size "small" and the input letters of "awesome". Assume also that user 1 selects "A" as the exhibition area at the time of purchase, and the location "A1" within the exhibition area is associated with the flower stand.

In response to the purchase of flower stand FS1 by user 1, the purchased flower stand information is distributed to user 1, and then user 1's viewer terminal 300 changes the flower stand FS placed in exhibition position A1 in exhibition area A to the flower stand FS1 that user 1 purchased and displays it. On the other hand, the display device 301 of user 2 still displays the same flower stand as in FIG. 30A, as shown in FIG. 30B.

FIG. 29C and FIG. 30C are display examples when a predetermined time has elapsed since the previous switching and the switching condition is met. As shown in FIG. 29C, the display device 301 of user 1 continuously displays flower stand FS1 purchased by user 1 to be exhibited in exhibition area A in the same position as in FIG. 29B. However, it displays flower stands FS in other positions that have changed to other flower stands FS determined by lottery in response to the fulfillment of the switching condition. These other flower stands FS are not associated with user 1, but are associated with other users. These other flower stands FS may include flower stands FS prepared by the management, which are not associated with any other users.

Meanwhile, as shown in FIG. 30C, the display device 310 of user 2 displays flower stands FS that have changed to other flower stands FS determined by lottery in response to the fulfillment of the switching condition. FIG. 30C differs from FIG. 29C for user 1 in that a flower stand FS different from flower stand FS1 associated with user 1 is displayed in exhibit position A1 of exhibit area A. In FIG. 30C, common flower stands FS based on the default data stored in the object data 122 are displayed at all exhibition positions in the exhibition area A, including the exhibition position A1.

FIG. 29D and FIG. 30D are display examples when a predetermined time has elapsed and the switching condition is met again, so that the flower stands FS have changed in exhibition area A. Assume that the object data 122 of exhibition area A, which is determined by lottery and stored at this switching timing, happens to contain the flower stand FS1 purchased by user 1 and the exhibition position of this flower stand FS1 is A6 (the second position from the left in the bottom row in FIG. 29D and FIG. 30D). In this case, the display for user 2 shows the flower stand FS1 of user 1 in A6 based on the default data, as shown in FIG. 30D.

Meanwhile, as shown in FIG. 29D, the display device 310 of user 1 continuously displays the flower stand FS1 at position A1 in accordance with FIG. 27C. In other words, even if the object data 122 for the same exhibition area includes the flower stand FS1 purchased by user 1, the viewer terminal 300 of user 1 changes the display mode so as to place the flower stand FS1 purchased by user 1 in the exhibition position in accordance with FIG. 27C, and not in the exhibition position in accordance with the default data. The viewer terminal 300 of user 1 further performs the process of changing the position of placing the flower stand FS, which was placed at the exhibition position (A1) in the default data included in the object data 122, to the exhibition position (A6) where the flower stand FS1 purchased by user 1 is placed in the default data. As a result, the flower stand FS associated with A1 in the default data (the flower stand FS with "letter O") is displayed at A6 of user 1, instead of the flower stand FS1. This prevents the same flower stand from being placed at multiple positions in a single exhibit area.

Alternatively, if the object data 122 for the same exhibition area includes the flower stand FS purchased by user 1, the viewer terminal 300 of the user 1 may perform only the changing process to place the flower stand FS purchased by user 1 in the exhibition position in accordance with FIG. 27C, and it may keep the flower stand FS purchased by user 1 in accordance with the object data 122. This case gives the user a special feeling because the flower stand FS of user 1 is displayed at multiple positions.

Referring to FIGS. 29A, 29B, 29C, and 29D, the above describes an example, in which the flower stand FS1 purchased by user 1 is displayed at fixed position A1 in the exhibition area A. The present invention is not limited to this, and the display position of the purchased flower stand FS may be changed each time the switching condition is met within the exhibition area A in which the user has placed the flower stand FS. For instance, at the timing of FIG. 29C, the flower stand FS1 purchased by user 1 is displayed at position A1, but at the next switching timing, it may be displayed at position A4, which corresponds to the upper right end of exhibition area A, and the default data (data of the flower stand FS associated with A1 in FIG. 31A) may be displayed at A1.

Figure 32:
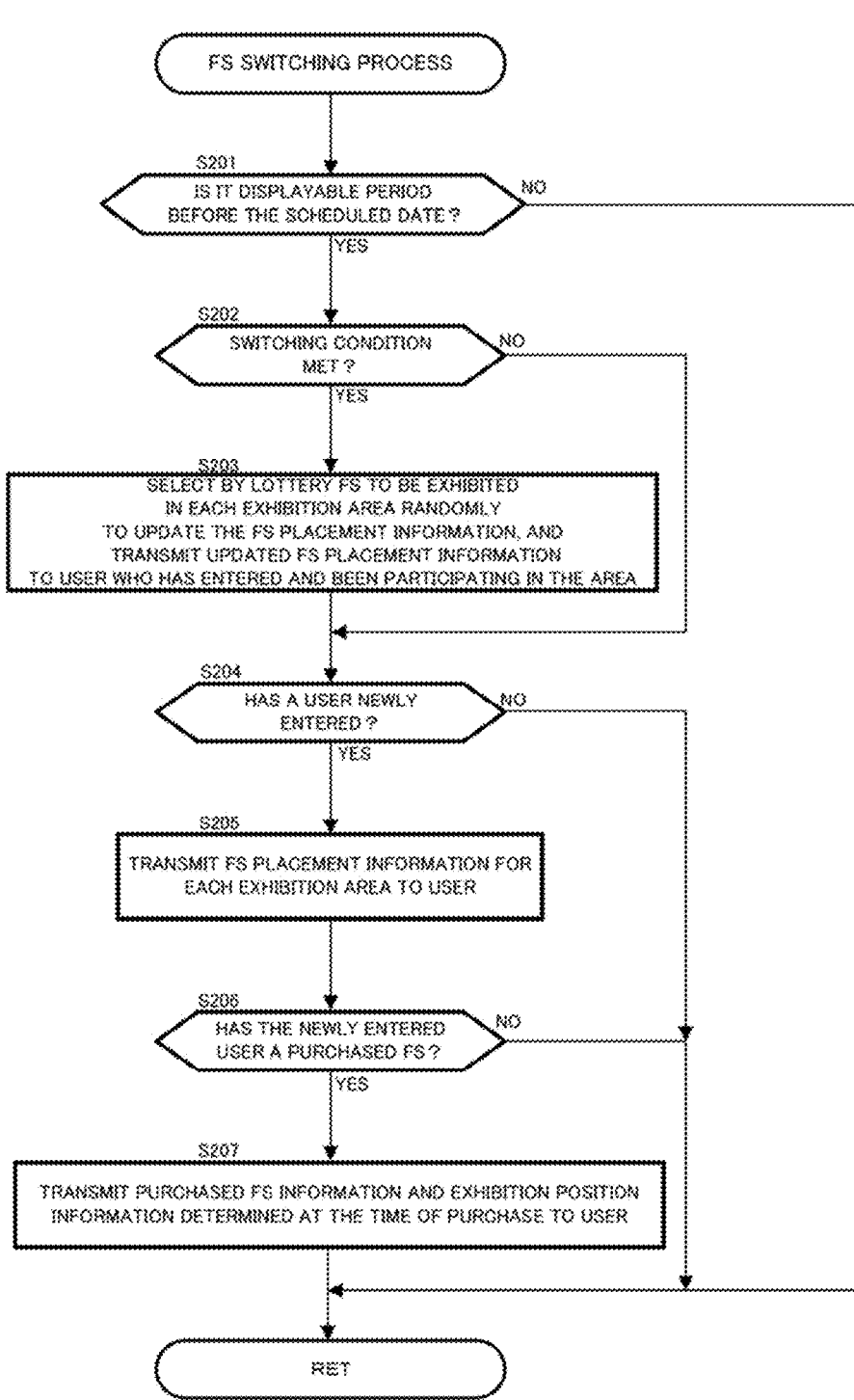
FIG. 32 is a flowchart showing an example of a switching process of objects displayed in a predetermined type of virtual space according to one embodiment of the present invention.

Referring next to FIG. 32, the following describes the switching process of the flower stands FS displayed in the exhibition area in the virtual space that is executed by the virtual space generation program 120.

In step S201, the process determines whether or not it is a displayable period before the scheduled date. The displayable period before the scheduled date may be a period that coincides with the period before the scheduled date, or may be a part of the period before the scheduled date. If it is not determined that it is the displayable period before the scheduled date, the process ends.

If it is determined in step S201 that it is a displayable period before the scheduled date, the process determines in step S202 whether or not a switching condition is met. An example of the switching condition in step S202 is when a predetermined time has elapsed (e.g., 30 minutes or 2 hours). If it is determined in step S202 that the switching condition is met, the process proceeds to step S203, where the process selects by lottery the flower stands to be exhibited in each exhibition area randomly from all the flower stands FS that are the target of the selection to update the flower stand placement information for each exhibition area that is the object data 122 (e.g., FIG. 31A and FIG. 31B). Then the process transmits the updated flower stand placement information (including information specifying a flower stand FS (the display mode of a flower stand to be displayed on the viewer terminal)) to the viewer terminal 300 of the user who has entered and been participating in the spatial area ER5. For exhibition area A, for example, the flower stand placement information for exhibition area A shown in FIG. 31A is updated to be the information of randomly selected flower stands FS, and the updated information is stored in the database that stores the object data 122. The updated flower stand placement information is then transmitted from the database that stores the object data 122 to the user's viewer terminal 300. This updates the information on the default flower stands FS for each exhibition area, and changes the flower stands of each exhibition area to be displayed on the viewer terminal 300 of the user who has entered and is participating in the spatial area ER5.

Note that the target of flower stands FS to be selected by lottery may be all the flower stands FS stored as object data 122 excluding inappropriate flower stands (e.g., a flower stand that is set not to be displayed by the manager because the flower stand has been reported), or the flower stands FS may be divided into predetermined groups and a flower stand FS may be selected by lottery from within a predetermined group. For instance, the flower stands may be divided into groups in accordance with the time of purchase, type of flower stands, and other factors.

If it is not determined in step S202 that the switching condition is met, the process determines in step S204 whether or not a user has newly entered the spatial area ER5.

If it is not determined in step S204 that a user has newly entered, the process ends. If it is determined in step S204 that a user has newly entered, the process transmits in step S205 the flower stand placement information for each exhibition area to the viewer terminal 300 of the user. This allows the user to receive information to specify the default flower stands FS, which is determined for each exhibit area. For instance, the process transmits the flower stand placement information in a predetermined range including the exhibition area A that is updated in step S203.

In step S206, the process determines whether or not the newly entered user has a purchased flower stand FS, based on the information related to the purchased flower stand shown in FIG. 27C. If it is determined that the user has a purchased flower stand FS, the process transmits in step S207, to the viewer terminal 300 of the user, purchased flower stand information to specify the purchased flower stand FS and the exhibition position information determined at the time of purchase. The purchased flower stand information is about purchased flower stand FS for each user, as illustrated in FIG. 27C. For instance, assume that user 1 has newly entered the spatial area and the flower stands FS to be displayed in the exhibition area A are at the timing having the display mode shown in FIG. 29C. Then, the process transmits in step S205 the default data for exhibition area A at the time of FIG. 29C. The process then transmits in step S207 the purchased flower stand information for user 1 shown in FIG. 27C (flower stand ID "a3") and the exhibition position information determined at the time of purchase ("A1", which is the placement information for "a3"). As a result, as shown in FIG. 29C, the viewer terminal 300 of user 1 displays flower stand FS1 with flower stand ID "a3" at the exhibition position A1 and the default flower stands FS at the other exhibition positions in the exhibition area A.

The above describes an example where the process determines in step S201 whether or not it is a displayable period before the scheduled date. The present invention is not limited to this, and the process may not make such a determination as to whether it is a displayable period before the scheduled date. For instance, the process may be applicable to a spatial area ER, in which a specific object can be placed regardless of the date on which the event content is provided (e.g., the date when a live performance is held).

The above describes an example where in step S203, the process updates the flower stand placement information when the switching condition is met, and transmits the updated flower stand placement information to the user who has entered and is participating in spatial area ER5. The present invention is not limited to this, and in step S203, the process executes only the process of updating the flower stand information when the switching condition is met, and does not execute the process of transmitting the updated flower stand information to the user who has entered and is participating in the spatial area ER5. That is, the process does not change the flower stands in response to the fulfillment of the switching condition at the viewer terminal 300 of the user who has already entered and is participating in the spatial area. In step S203, the process updates the flower stand placement information when the switching condition is met, and transmits the updated flower stand placement information to the user who has entered and is participating in spatial area ER5 and who meets certain requirements. For instance, the certain requirements may be that a longer period of time has elapsed since entering/participating than the time required for the fulfillment of the switching condition, or that user's individual settings allow switching in response to the fulfillment of the switching condition. Even if the updated flower stand placement information is not transmitted to a user in step S203, the latest flower stand placement information (updated in step S203) will be transmitted to the user when the user re-enters the spatial area, for example, through the process of step S205 or later.

The embodiment described referring to FIG. 29A through FIG. 32 describes an example, in which even when the switching condition is met, the flower stand FS purchased by the user themselves continues to be displayed, while the flower stands FS associated with other users are changed in display. Also for the flower stands FS associated with other users, if the other user is a special user, the flower stand FS associated with the special user may be continuously displayed. As described above, the special user includes a performer user, a sponsor user who is supporting the event, and other celebrities, and includes users who have been authenticated as special users by the management (administrator).

Figure 33:
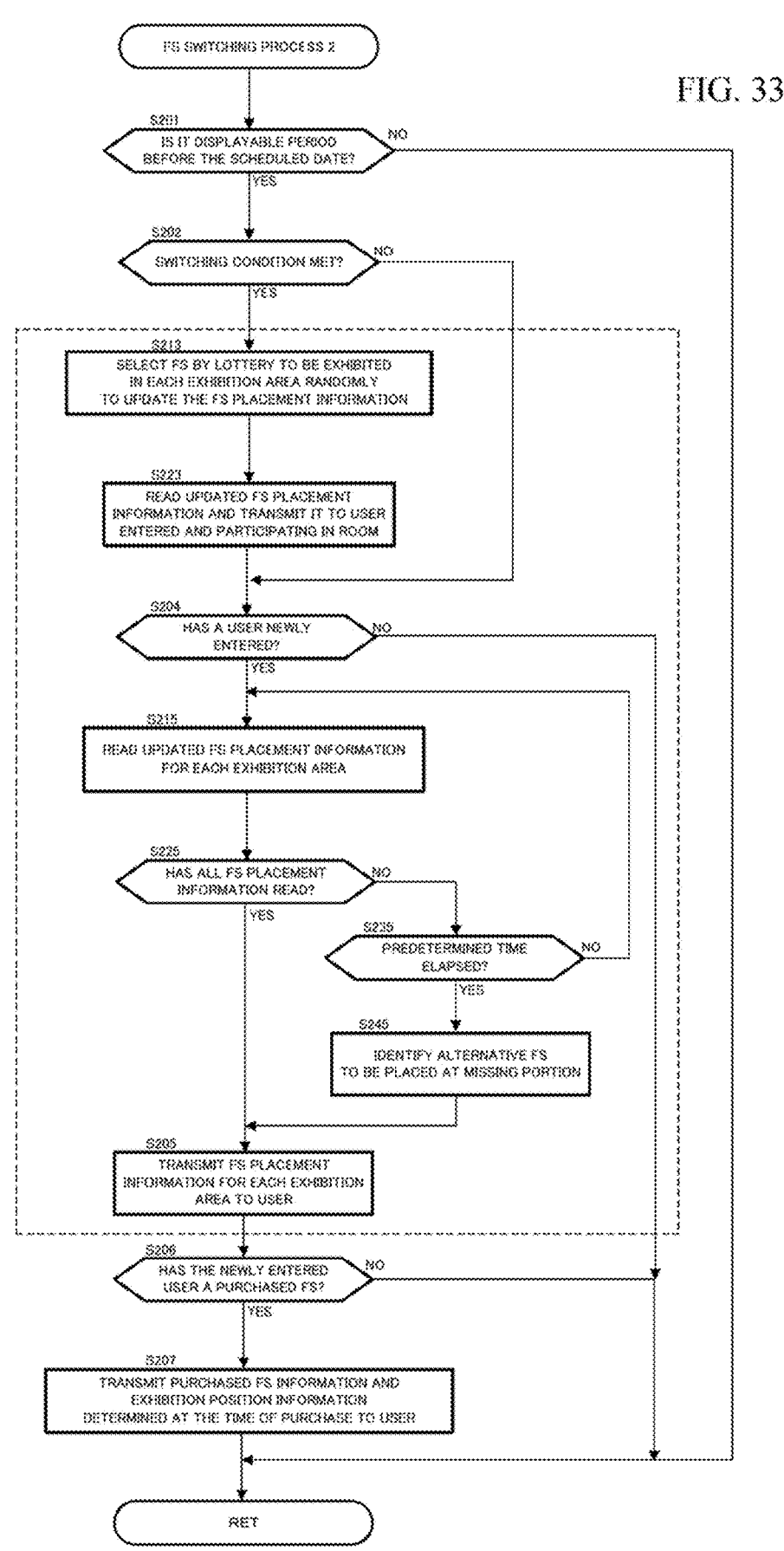
FIG. 33 is a flowchart showing an example of a switching process of objects displayed in a predetermined type of virtual space according to one embodiment of the present invention.

Referring next to FIG. 33, the following describes the switching process 2 of the flower stands FS displayed in the exhibition area in the virtual space that is executed by the virtual space generation program 120.

FIG. 33 shows an example of the above-mentioned flower stand switching process, in which processing is added if flower stand (FS) information cannot be read out in the desired state from the database that stores the flower stand (FS) information (when the flower stand (FS) information cannot be identified). In this embodiment, there are a large number of flower stands to be exhibited, and each flower stand may have a different display mode. In the flower stand switching process, information is read from a database (e.g., a database server) in which information on many flower stands FS is stored, and the information is transmitted (distributed) to each user who entered the space. For this reason, if many users try to enter the space at the same time, the load on the distribution server computer 100 increases because the computer performs the flower stand switching process for the many users. For instance, if the number of accesses to a database server that stores information on the flower stand FS increases, the database server may be overloaded and may fail to read out the flower stand placement information. If this happens, the server may fail to transmit (distribute) the information necessary to display the virtual space on the viewer terminal of each user who has entered or participated in the virtual space, from which they logged in. This could result in problems such as being unable to enter the room.

Note that, although the flower stands in the exhibition area are objects that liven up the atmosphere in the virtual space, they are not essential objects to generate the virtual space. Objects that are essential to generate a virtual space include: objects that may cause a user to feel uncomfortable if the objects are missing, such as buildings and stage objects shown in FIGS. 24A and 24B, depending on the content provided; and objects that form the basis of the virtual space. If the data of these essential objects cannot be read and transmitted (distributed), the virtual space itself cannot be generated and displayed. In other words, while the absence of these essential objects leads to a failure in forming the content to be provided in the virtual space, it is possible to generate and display the virtual space even if a flower stand in the exhibition area cannot be displayed accurately. That is, when data of an object (a first type of object) that is essential to generate a virtual space can be identified (read and transmitted/received), the virtual space can be generated and displayed, regardless of whether data of an object (a second type of object) such as a flower stand that is not essential to generate the virtual space has been identified. As explained in steps S202 to S205 of FIG. 32, the flower stands in the exhibition area are updated and displayed accurately every time the switching condition is met. In other words, if users are able to enter the virtual space, the flower stands in the exhibition area will be updated periodically. This means the inability to enter the virtual space due to a temporary failure of flower stands accurately displayed in the exhibition area would have a greater inconvenience and impact on both the users and the management than such a failure itself.

Thus, in the flower stand switching process 2 in this embodiment, steps S225 to S245 are performed following step S215. In FIG. 33, the process within the dotted-line frame has been mainly added to the process in FIG. 32 described above. Like numerals for steps refer to like processes as in FIG. 32 to simplify (omit) their descriptions. Steps S213 and S223 in FIG. 33 describe more specifically the process in step S203 in FIG. 32, and steps S215 to S245 in FIG. 33 describe more specifically the process up to transmitting the flower stand placement information to the user in step S205 of FIG. 32 and FIG. 33.

If it is determined in step S202 that the switching condition is met, the process proceeds to step S213, where the distribution server computer 100 selects by lottery the flower stands to be exhibited in each exhibition area randomly from all the flower stands FS that are the target of the selection to update the flower stand placement information for each exhibition area in the object data 122 (e.g., FIG. 31A and FIG. 31B), and stores the information. For exhibition area A, for example, the flower stand placement information for exhibition area A shown in FIG. 31A is updated to be the information of randomly selected flower stands FS, and the updated information is stored in the database that stores the object data 122.

In step S223, the process reads updated flower stand placement information (including information specifying flower stands FS, such as information specifying the display mode of flower stands to be displayed on the viewer terminal) from the database that stores the updated flower stand placement information, and transmits it to the viewer terminal 300 of the user who has entered and been participating in the spatial area ER5. This updates the information on the default flower stands FS for each exhibition area, and changes the flower stands of each exhibition area to be displayed on the viewer terminal 300 of the user who has entered and is participating in the spatial area ER5.

In step S204, the process determines whether or not a user has newly entered. If it is not determined that a user has newly entered, the process ends like FIG. 32. If it is determined in step S204 that a user has newly entered, the process reads updated flower stand placement information (including information specifying flower stands FS, such as information specifying the display mode of flower stands to be displayed on the viewer terminal) for each exhibition area in step S215. For instance, the distribution server computer 100 performs a process of reading the flower stand placement information, which is updated in step S213 and is transmitted to the user who has entered and participated in step S223, from the database in which the information on the updated flower stands FS to be placed is stored as object data 122.

Note that the extent of flower stand (FS) information that the distribution server computer 100 reads from the database storing flower stand (FS) information (including the placement information) as object data 122 in step S223 and step S215 may be: the flower stand (FS) placement information that is displayable in all exhibition areas of the virtual space that the user entered (such as within the spatial area ER5); or the flower stand placement information that is displayable in some exhibition areas of the virtual space that the user entered. The flower stand placement information that is displayable in some exhibition areas may be the flower stand placement information on an exhibition area within a section in which the user avatar U is located within the area of the virtual space the user has entered (e.g., an exhibition area within a section such as sub-area ER51 or sub-area ER52 in FIGS. 24A and 24B). Alternatively, it may be the flower stand placement information within a range that is displayable on the user screen as the user avatar U moves (e.g., the exhibition area within a predetermined 360-degree distance from the position of the user avatar U).

In step S225, the process makes a determination as to whether or not all the flower stand placement information has been read out. The state of having read out all the flower stand placement information includes a state in which information specifying the flower stands (FS) to be read from the database is returned accurately from the database. If it is determined in step S225 that all the flower stand placement information has been read out, the process transmits in step S205 the flower stand placement information for each exhibition area read out to the viewer terminal 300 of the user.

In contrast, if it is not determined in step S225 that all the flower stand placement information has been read out, the process makes a determination in step S235 whether a predetermined time (e.g., 100 ms) has elapsed since the start of reading in step S215. If it is not determined in step S235 that the predetermined time has elapsed, the process shifts again to step S215 to continue reading out the unread flower stand placement information (flower stands to be placed in the missing portion). This determination as to whether a predetermined time has elapsed may be made by determining whether a predetermined time has elapsed since the AP server started processing to read out information on the flower stands (FS) from the database server to wait for a response from the database server. Alternatively, the database server may determine whether or not a predetermined time has elapsed since it started the process of identifying the flower stand (FS) information to be returned as the flower stand placement information, and return the information (e.g., information that could not be identified) to the AP server after the predetermined time has elapsed.

If it is determined in step S235 that the predetermined time has elapsed, then the process identifies in step S245 a predetermined alternative flower stand to be placed in the missing portion that was not read. When the flower stand to be placed in the missing portion is identified in step S245, the process shifts to step S205 to transmit the flower stand placement information for each exhibition area to the viewer terminal 300 of the user. The alternative flower stand is information that requires a lighter processing load for the distribution server computer 100 to identify than reading out the flower stand placement information updated in step S213. For instance, this may be a flower stand FS that is displayed in a simple flower stand (FS) format (such as in a solid color) in a memory area different from the database from which the flower stand FS is read in steps S223, S215 in the storage 103 of the distribution server computer 100 (or it may be the past updated flower stand placement information temporarily stored as a cache), or a flower stand FS that is not updated (not exhibited) when the switching condition is met, such as a flower stand FS that is previously determined by the manager. The alternative flower stand is not limited to them, and may be a predetermined flower stand FS among the flower stands FS that can be updated (exhibited) when the switching condition is met, or may be a flower stand FS included in the flower stand placement information that has already been read. In step S235, if the desired flower stand placement information cannot be read (identified) due to a load on the database, for example, information for displaying the alternative flower stand FS, which requires less processing load to identify, in place of the data that could not be read, is distributed to the viewer terminal 300.

Only a portion of the information on the flower stand FS that was read in step S215 may have been read correctly. In this case, in steps S245 and S205, the process performs a process to compensate for the missing portion excluding the portion that was read. For instance, while the process tries to read information on exhibition areas A and B, only information on exhibition area A has been read out. In this case, a process is performed to supplement information on exhibition area B. Only part of the flower stand (FS) information may be read in step S225. Also in this case, the process may replace the entire information with alternative flower stand (FS) information in step S245.

This allows the viewer terminal 300 to receive the information on flower stand FS that replaces the default flower stand (FS) information that could not be read due to database overload. This avoids a problem such as a user not being able to enter the room due to the inability to receive information to display the virtual space. In other words, the priority order for displaying the objects that can be displayed is defined. Then, if the objects with high priority that are essential to form the content provided by the virtual space are received, the process displays the virtual space regardless of whether the objects that are not essential and have low priority are successfully received or not. Along with this process, when data of an object that is not essential and has a low priority can be identified, the object is displayed in a display mode based on the data. If the data cannot be identified, an alternative object corresponding to the object is displayed.

FIGS. 34A, 34B, 34C, and 34D are an example of the display on the display screen 310 of user 1 in FIGS. 29A, 29B, 29C, and 29D, where the flower stand FST associated with a special user is further placed in the exhibition area A. The flower stand FST is a flower stand FS associated with a talent user associated with the attribute "black fox", and is a special flower stand FST prepared or purchased by the special user, for example. At the timing of FIG. 34A, the flower stand FST of the special user is displayed by default in the upper right end position A4 within the exhibition area A. In this way, the flower stand FST prepared or purchased by a special user is displayed in the exhibition area, and even if the switching condition is met, the flower stand placement information of this flower stand FST will not be changed to another flower stand.

Figures 34A, 34B, 34C, 34D:
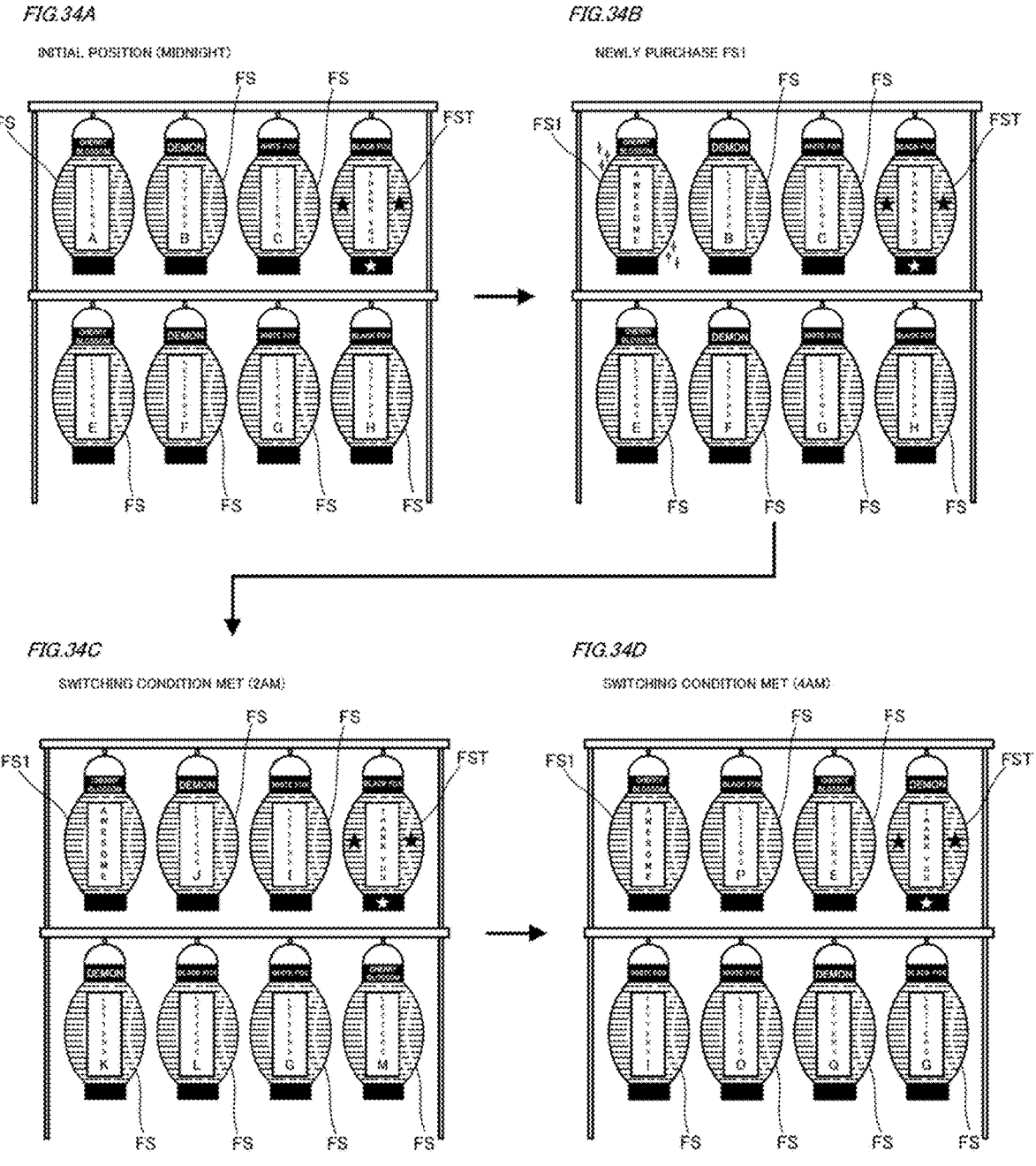
FIGS. 34A, 34B, 34C, and 34D show another example transition of the display mode of objects displayed in a predetermined type of virtual space according to one embodiment of the present invention.

Next, in FIG. 34B, when user 1 purchases flower stand FS1, the flower stand FS1 purchased by user 1 is displayed at exhibition position A1 in exhibition area A. When the user purchases the flower stand FS, the user selects the exhibition area and the exhibition position is determined in that exhibition area as described above. In this case, however, the exhibition position of exhibiting the special user's flower stand is excluded from the exhibition positions that are a target of the determination, as described above. This prevents the exhibition position of the flower stand purchased by the user from being determined to the display position of the special user's flower stand.

Subsequently, even after the switching timing when the switching condition is met in FIG. 34C, the special user's flower stand FST continues to be displayed at the exhibition position A4 in addition to the flower stand FS1 purchased by the user 1 themselves. Similarly, at the next switching timing shown in FIG. 34D, the flower stands FS1 and FST continue to be displayed.

Within the spatial area ER5, there may be an exhibition area (special exhibition area) where all the flower stands FS displayed are those of special users, or there may be a single area where the special users' flower stands FS are displayed individually in the form of statues or as photo spots. The flower stands to be exhibited in these special exhibition area or single area may be changed to a flower stand FS associated with another special user in response to the fulfillment of the switching condition.

In this embodiment, a user is able to purchase and own multiple flower stands FS (specific objects). This means that, the more flower stands FS a user has purchased, the higher the probability that their flower stands will be determined as the default flower stands FS when the switching condition is met, and the higher the possibility that they will be displayed in the spatial area ER5 of the viewer terminal 300 of another user. For instance, user 1 in FIG. 27C has three flower stands FS, whereas user 2 has one flower stand FS. Therefore, if the lottery is performed with a uniform probability, the probability that any of the flower stands of user 1 will be selected as the default flower stands FS is three times higher than the probability that the flower stand FS of user 2 will be selected. This motivates users to purchase more flower stands FS to appeal to other users.

On the other hand, a certain user may own a huge number of flower stands FS (e.g., 10,000). Also in this case, if the more a user owns flower stands, the more likely their flower stands are selected as the default flower stands FS, as described above, then it is extremely likely that the user who owns a large number of flower stands will have their flower stands FS selected as the default flower stands FS and displayed. As a result, the display mode of flower stands FS exhibited in the exhibition area of other users will become less appealing because the display mode does not change well, and that the flower stands will be misused, so that other users will feel uncomfortable. To avoid these problems, this embodiment is configured so that, for a user whose number of flower stands FS purchased and owned reaches a specified number (e.g., 100), regardless of whether the user has more than the specified number, the number of flower stand FS that they have purchased and owned is considered to be the specified number. Then, the default flower stands FS are determined so that the proportion (probability) is the same as that of another user who has purchased and owned the specified number of flower stands FS. For instance, assume that the predetermined number is 100. Then, a user who purchases and owns 100 or more flower stands FS (whether they may actually own 1,000 or 10,000 flower stands FS) will have the same proportion to have the default flower stands FS determined as that of another user who purchases and owns 100 flower stands FS. This prevents a particular user's flower stands FS from being displayed too much in the exhibition area on other users' display devices 300.

(Changes in Display Mode During the Provision of Event Content)

This embodiment is configured so that, during the provision of the event content on the scheduled date, the flower stand FS purchased by the user during the period before the scheduled date is displayed in the virtual space. An image (display mode) in the sub-area ER53' during the liver performance that is the event content changes according to the event that occurred within the spatial area ER5 during the period before the scheduled date. For instance, the event that occurs within spatial area ER5 during the period before scheduled date includes a user's purchasing a flower stand FS to be exhibited and placed in an exhibition area in the spatial area ER5. Referring to FIG. 35A through FIG. 37B, the following describes a change in display mode in the virtual space during the provision of event content.

Figures 35A, 35B:
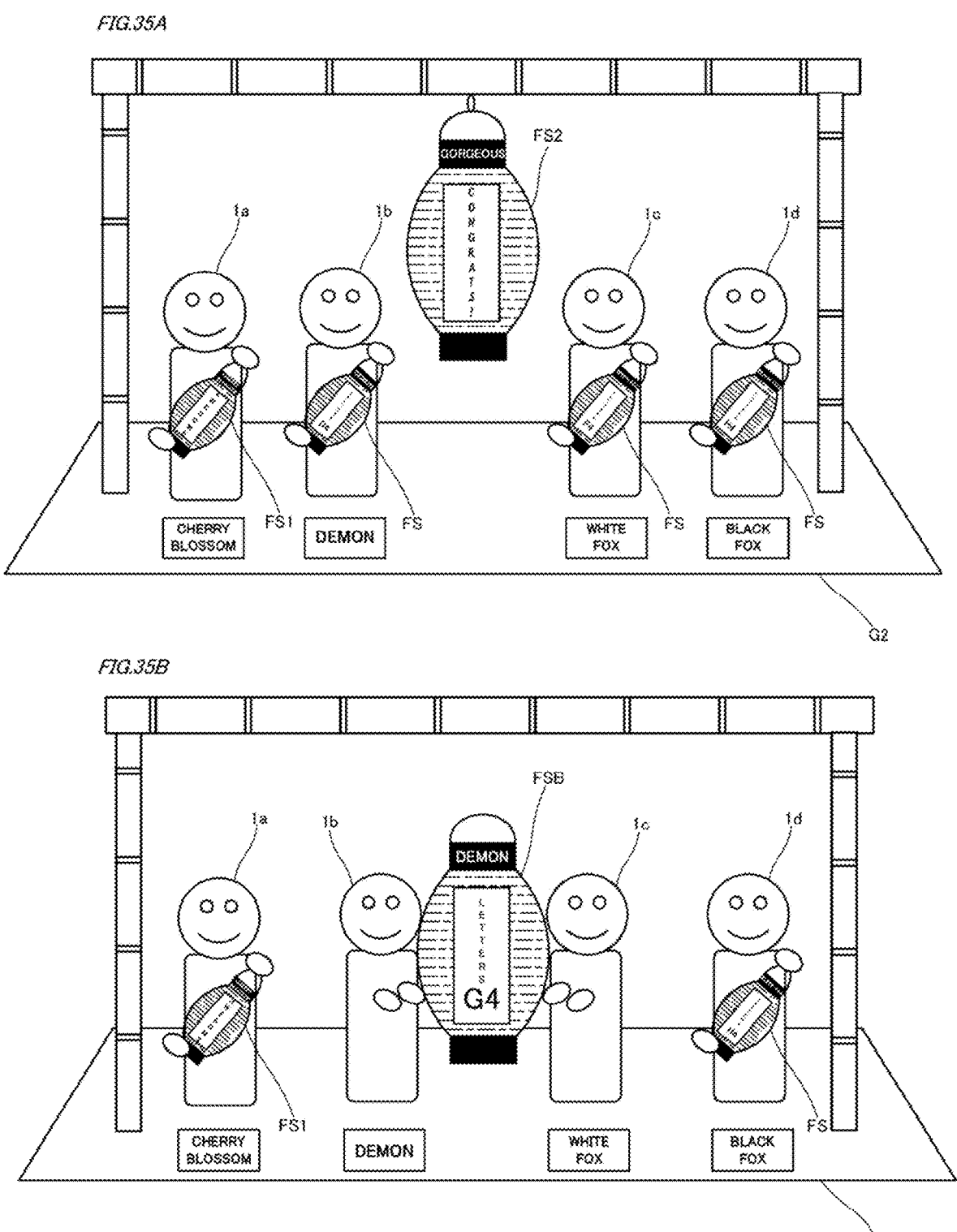
FIGS. 35A and 35B show an example of event content provided in a predetermined type of virtual space according to one embodiment of the present invention.

FIGS. 35A and 35B show an example of a scene of stage effects in the event content (e.g., live performance in which the same types of stage effects as those in FIGS. 13 to 24 are executed) provided in the worship hall of the sub-area ER53' in FIGS. 24A and 24B that functions as the virtual stage G. The virtual stage G in FIGS. 35A and 35B will be referred to as a virtual stage G2 in the following description. Performer avatars 1a to 1d are appearing on virtual stage G2. The performer avatars 1a to 1d are associated with the attributes "cherry blossom," "demon," "white fox," and "black fox," respectively. These attributes correspond to the attributes associated with the flower stands FS shown in FIG. 27A.

During the provision of event content, as shown in FIGS. 35A and 35B, the stage effects are given, in which the performer avatars 1a to 1d hold the flower stands FS in their hands to show them to the audience. In this embodiment, if a viewer user has purchased a flower stand FS during the period before the scheduled date, the performer avatars 1a to 1d are shown holding the flower stand FS purchased by that user. FIGS. 36A and 36B are an example of a data table that specifies the flower stands FS used in the stage effects of the event content of FIGS. 35A and 35B. FIG. 36A shows default event flower-stand information common to all users, which is managed by the distribution server computer 100 (e.g., gift data 134). The flower stands FS displayed on the display device 310 for each user while the event content is being provided is specified based on the event flower-stand information in FIG. 36A and the purchased flower stand related information for each user in FIG. 27C.

In this embodiment, a total of nine flower stands FS is used to give the event content the stage effects: flower stands FS of sizes "large" and "small" for each of the attributes "cherry blossom," "demon," "white fox," and "black fox," as well as a flower stand FS of the attribute "gorgeous." Between the end of the period before the scheduled date and the start of the event content, the default flower stands FS in FIG. 36A are determined by randomly selecting a flower stand FS for each attribute and size from among the flower stands FS purchased by any user during the period before the scheduled date. As shown in FIG. 36A, information that specifies a default flower stand FS to be used for the stage effects is associated with each attribute and size of the flower stand FS. For instance, a flower stand FS with the attribute "cherry blossom" of size "large" is associated with the flower stand FS with the flower stand ID "a4" whose displayed letter is "character A4". Not all types of flower stands FS that can be purchased before the scheduled date illustrated in FIG. 27A are used in the stage effects of event content, but some of them may be used. For instance, the attribute "plain" is not used for the stage effects of event content in this embodiment.

The distribution server computer 100 transmits the event flower stand information of FIG. 36A and purchased flower-stand related information for each user of FIG. 27C to the viewer terminal 300 of the participating users at the start of the event content (at login) or at a specified timing during the content provision.

Based on the user's purchased flower stand related information, the viewer terminal 300 of each user specifies a flower stand having the same attribute and size as those of their purchased flower stand from among the flower stands specified from the received event flower stand information. The viewer terminal 300 then changes the specified flower stand to the flower stand specified from the user's purchased flower stand related information, and updates the event flower stand data to the event flower stand data shown in FIG. 36B. In this embodiment, if a user has purchased and owns a plurality of flower stands FS with the same attribute and size, the last (most recently) purchased flower stand FS is set as the event flower stand information (associated with the table). As shown in FIG. 27C, user 1 owns one flower stand FS with the flower stand ID "a3", attribute "cherry blossom" and size "small". This means that, although the default information in FIG. 36A shows that the flower stand FS with the attribute "cherry blossom" and size "small" is associated with the flower stand ID "b4", this flower stand is associated with "a3" in the event flower stand information for user 1, as shown in FIG. 36B. As shown in FIG. 27C, user 1 owns two flower stands FS with the attribute "gorgeous", flower stand IDs "b3" and "c3". User 1 purchased "c3" later than "b3", so that "c3" is associated with the attribute "gorgeous" in FIG. 36B. As a result, default event flower stand information is maintained for a user who has not purchased a flower stand during the period before the scheduled date, whereas the event flower stand information is updated for a user who has purchased a flower stand during the period before the scheduled date, from the default information to the one in which the flower stand with the same attribute and size as those in the purchased flower stand is replaced with the purchased flower stand.

The viewer terminal 300 of each user gives stage effects to the user during the provision of event content as illustrated in FIGS. 35A and 35B, in accordance with the set event flower stand information. FIGS. 35A and 35B are an example of a display mode displayed on the display device 310 of user 1, and is displayed in accordance with the event flower stand information stored as in FIG. 36B. FIG. 35A shows an example in which the performer avatars 1a to 1d have a flower stand FS of size "small" corresponding to each of their attributes. The flower stand FS1 that the performer avatar 1a holds displays flower stand FS1 with flower stand ID "a3" purchased by user 1. FIG. 35A shows flower stand FS with the attribute "gorgeous" displayed on the center, on which flower stand FS2 with flower stand ID "c3" that was last purchased by user 1 is displayed. In FIG. 35B, performer avatar 1b and performer avatar 1c have flower stand FS of size "large" with attribute "demon". User 1 has not purchased flower stand FS of size "large" with attribute "demon". Thus, the flower stand FS with flower stand ID "g4", which is defined by default in FIG. 36A, is displayed. The display mode of the virtual live venue is not limited to the set illustrated in FIGS. 35A and 35B, and various objects may be displayed.

The stage effects illustrated in FIGS. 35A and 35B are implemented by transmitting stage-effects information from the distribution server computer 100, the stage-effects information including information that controls the display actions of the performer avatars 1a to 1d and information that specifies the attributes and size of a flower stand to be held in the hands of each of the performer avatars 1a to 1d or to be exhibited at a predetermined position in the virtual space (hanging from the ceiling). The viewer terminal 300 of each user controls the display mode in the virtual space including the performer avatars 1a to 1d based on the stage-effects information, and places the flower stands that match the information for specifying the attributes and size of the flower stand from among the flower stands FS specified from the event flower stand information (see FIG. 36B) updated in each viewer terminal 300. This implements the stage effects illustrated in FIGS. 35A and 35B.

Referring next to FIG. 37A, the following describes event flower stand determination process executed by the distribution server computer 100. In step S301, the process determines a flower stand to be used in the stage effects during the provision of the event content randomly by lottery for each of the attributes and sizes of the flower stand described above. In step S302, the process transmits the event display flower stand information (see FIG. 36A) capable of specifying the result of the determination to the viewer terminal 300. For instance, as shown in FIG. 36A, event flower stand information, which is stored in association with information specifying the flower stands FS determined by lottery for each attribute and size, is transmitted to the viewer terminal 300 of the user who is going to participate or is currently participating in the event content.

In step S303, the process specifies users with purchased flower stands, based on the purchased flower stand related information for each user shown in FIG. 27C, and transmits the purchased flower stand related information for each identified user to the viewer terminal 300 of the user. After that, the event flower stand determination process ends.

Referring next to FIG. 37B, the following describes event flower stand specifying process executed by the viewer terminal 300.

In step S311, the process stores the event flower stand information (see FIG. 36A) transmitted from the distribution server computer 100 in step S302 in FIG. 37A as default data to specify default flower stands FS to be used for the stage effects. In step S312, the process determines whether or not the purchased flower stand related information (the user information in FIG. 27C transmitted from the distribution server computer 100 in step S303 in FIG. 37A) has been received. If it is not determined in step S312 that the purchased flower stand related information has been received, the event flower stand determination process ends.

If it is determined in step S312 that purchased flower stand related information has been received, the process proceeds to step S313, in which the process stores, as update data, information for specifying the flower stand FS purchased by the user for each attribute and size based on the received purchased flower stand related information. In this step, if a plurality of flower stands are specified as having the same attribute and size, the last (most recently) purchased flower stand is specified and stored based on their purchase date and time.

For a flower stand with the same attribute and size as the flower stand specified from the update data among the flower stands specified based on the default data, the process in step S314 rewrites information on the flower stands used for stage effects with the flower stand specified from the update data.

As described above, the process associates a performer avatar with the flower stand purchased by the user who has the purchased flower stand FS in the flower stands displayed during the event and displays it to the user. This embodiment is configured so that, if there are multiple purchased flower stands with the same attributes and size, the most recently purchased flower stand FS will be displayed. This enables the display of a more elaborately prepared flower stand FS by the scheduled date for the event content to be provided. Note that, instead of using the most recently purchased flower stand FS, the process may determine the flower stand by lottery from the flower stands with the same attribute and size, and use it for stage effects.

In the above-described event flower stand determination process in FIG. 37A, the information is determined and stored in advance before the event content is provided, and the present invention is not limited to this. The process may be executed during the provision of event content, for example, at predetermined time intervals (e.g., every 10 minutes) to update the event flower stand information. Alternatively, if the singing part and the MC part are repeated during the provision of event content, the event flower stand information for each part may be updated before the next part begins. During the provision of the event content, the display mode of the stage effects may be changed in accordance with the event flower stand information updated during the provision of the event content.

Note that the flower stands FS that are a target of lottery and are determined as the event flower stand information illustrated in FIG. 36A may exclude a flower stand FS associated with a special user. This allows the flower stands FS to be selected by lottery from those associated with fan users (general users) for the performer avatar, for example, and increases the consistency in the stage effects for the event content between the displayed flower stands FS and messages to the fans such as "Thank you for your support with the flower stand!"

(Processing Related to Event Content)

That is the descriptions on the example in which the display mode in spatial area ER5 is changeable in accordance with an event that occurs in the spatial area ER5 during the period before the scheduled date to provide the event content. Instead of or in addition to this, this embodiment may be configured so that the process related to the event content is performed in accordance with the degree of user's displaying an image in the spatial area ER5 on the display device 310 of the viewer terminal 300 during the period before the scheduled date to provide the event content. This may be performed by entering or participating in the spatial area ER5 during the period before the scheduled date.

The process related to the event content includes the process of changing the display mode of the stage effects while the event content is being provided, and the process of giving the user an object that the user can use while the event content is being provided. For instance, the degree of user's displaying is the number of times the user enters the spatial area ER5 during the period before the scheduled date. The number of entering times into spatial area ER5 may be the number of days so that multiple entries on the same day are counted as one entry, or it may be the number of times when the user has entered the area for a specified period of time (e.g., 10 minutes) or longer. The degree of user's displaying is not limited to this, and it may also be the period of time spent in the spatial area ER5 during the period before the scheduled date, or the degree (e.g., the number of times displayed, the displayed period of time) of displaying a specific area within the spatial area ER5. The specific area may include an exhibition area or a money-offering area, or any other area that is determined in advance in the spatial area ER5.

The following describes an example in which the "degree" of displaying images in spatial area ER5 is "the number of times a user has entered spatial area ER5 where the event content can be held on a scheduled date (hereinafter simply referred to as the number of entering times)," and "process related to event content" is "process to change the content of the stage effects during the provision of event content" and "process to give an object that can be used by the user during the provision of event content".

The distribution server computer 100 (e.g., the event data 111 and the gift data 134) counts and stores the number of times each user entered the area during the period before the scheduled date. FIG. 38 is an example of a data table to specify the "items" to be given according to the number of entering times, and the "stage-effects content" to be changed during the provision of event content according to the number of entering times.

"Items" that are given (made available) according to the number of entering times are objects that the user can use while the event content is being provided. For instance, it may be a limited item that can only be used in the event content (e.g., a live performance) held after the period before the scheduled date ends, or it may be an item that can be used not only in the event content held after the period before the scheduled date ends, but also in content other than the event content. If the item can be used in content other than the event content held after the end of the period before the scheduled date period, the item may be subject to certain restrictions in terms of performance, such as the functionality and efficacy (e.g., certain functions may not be available, effectiveness may be reduced). Alternatively, instead of or in addition to this, the item may be a limited item related to the image theme of the event content to be held after the end of the period before the scheduled date, for example.

As shown in FIG. 38, "items" can be used during the provision of event content to liven up the event, for example. For instance, if the number of entering times is once during the period before the scheduled date, the user will be given limited cracker A that can be used in the event content; if it is twice, they will be given limited cracker B; if it is three times, they will be given limited cracker C. If the number of entering times is four times, the user will be given limited edition fireworks, if it is five times, they will be given a limited edition glow stick, if it is six times, they will be given a limited edition stamp, and if it is seven times, they will be given a limited edition item set. The stamp can be used in chats and when exchanging messages within the virtual space. The item set is a collection of multiple items. Note that the items shown in FIG. 38 are not limited to these items and may be any items that can be used while the event content is being provided and that will liven up the event. They may be social tipping items, for example. The items given to a user may be not only the item corresponding to the actual number of entering times the user has entered the space, but also items corresponding to the number of times that is less than the actual number of entering times the user has entered the space (e.g., a user who has actually entered the space three times may be given the limited cracker B, which corresponds to the two entry times, or the limited cracker A, which corresponds to the one entry time, in addition to the limited cracker C, which corresponds to the actual number of entering times).

As shown in FIG. 38, the "stage effects" will be normal one if the number of entering times during the period before the scheduled date is between 1 and 3 times, for example, meaning that the stage effects do not change. If the number of entering times is four or more times, the stage effects may change; for four times, the user will be given a special room A, for five times, special room B, and for six times, special room S. A special room given means that the user can obtain the right to participate in the event content in a virtual live venue with animation (display mode) that is different from the normal one. For instance, the sub-area ER53' may be prepared, where only target users can access, who have obtained the right to participate in the live event in a special room, and the event content may be provided in the special room. Alternatively, the target users may receive a replaced image of a live venue set that is distributed during the provision of the event content.

If the number of entering times is seven, the user will be given the performance in secret costume. The secret costume is a costume (costume object) of the performer avatar that is displayed corresponding to the performer avatar when the event content is provided. The target users, who have obtained the right to be given the performance in the secret costume, will receive a replaced data that is different in costume data of the performer avatar from the data distributed to normal users.

Figure 39:
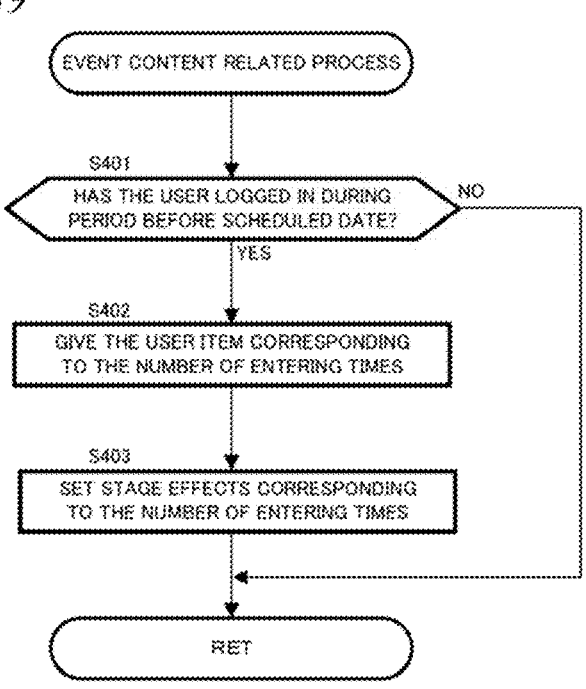
FIG. 39 is a flowchart showing an example of the process related to event content provided in a predetermined type of virtual space according to one embodiment of the present invention.

Referring to FIG. 39, the following describes an example of the event content-related process executed by the distribution server computer 100 in accordance with the number of entering times shown in FIG. 38. For instance, the event content-related process is executed for each user who is scheduled to participate in the event content (e.g., in the ascending order of user ID), from the end of the period before the scheduled date to the start of the event content.

In step S401, the process determines whether or not the user's number of entering times during the period before the scheduled date is one or more. If it is not determined that the user's number of entering times during the period before the scheduled date is one or more, the process ends. For a user who is determined in step S401 not to have the number of entering times during the period before the scheduled time that is one or more, the process distributes event content in accordance with the data stored as default in the event data 111.

If it is determined in step S401 that the user's number of entering times during the period before the scheduled date is one or more, the process proceeds to step S402, where the process gives the user an item corresponding to the number of entering times. This allows an item given to an item box owned by the user in the virtual space ER to be displayed, for example. The item may be put in the box in advance before the start time of the event content being provided, and it may be grayed out and unavailable until the start time of the provision, and it may be available in the virtual live venue that is open from the start time of the content provided.

In step S403, the process sets the stage-effects content corresponding to the user's number of entering times, and the process ends. For instance, if the user's number of entering times is four, limited edition fireworks will be displayed in the item box, and the process stores information to configure the design of the virtual live venue as special room A in association with the target user.

(Period Before Scheduled Date and Re-Provision of Content on Live Event)

Figure 40A:
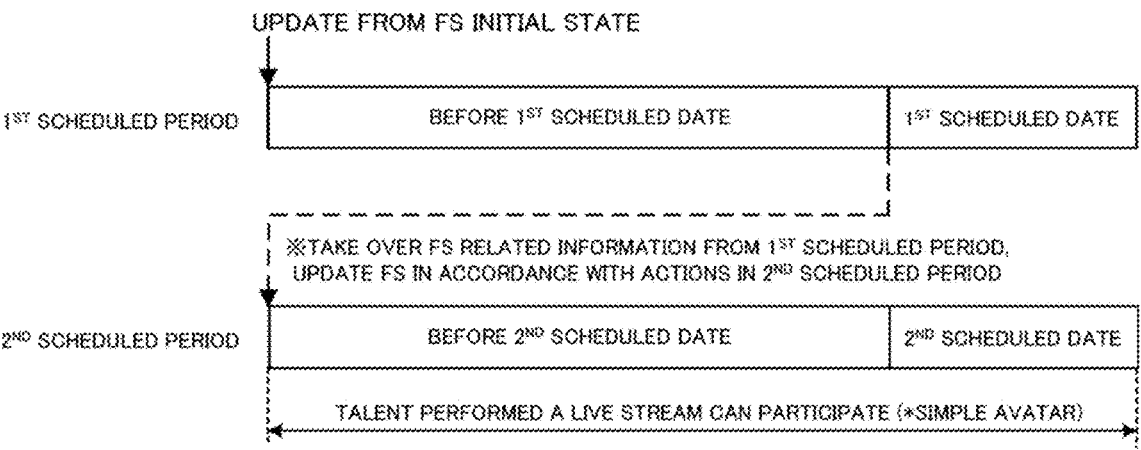
FIG. 40A and FIG. 40B describe a period before scheduled date and the re-provision of event content according to one embodiment of the present invention.
Figure 40B:
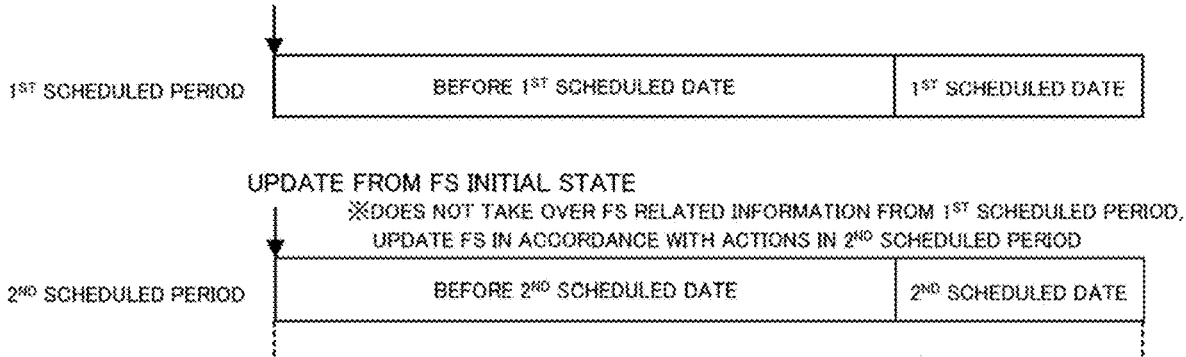

Referring to FIG. 24A through FIG. 39, the above describes an example of event content provided in the period before scheduled date and on the scheduled date. The content provided to users by the distribution server computer 100 may be re-provided (replayed). FIG. 13 through FIG. 39 describe a live event, which is an example of content, by a performer at a virtual live venue on a scheduled date as an example of event content. FIGS. 40A and 40B collectively refer to the live event provided on the scheduled date and the content (e.g., areas that can be used for a limited time in connection with the live event to be held, and such activities) provided in the period before the scheduled date prior to the live event as event content. The content provided in the period before scheduled date includes content related to the live event, and includes the spatial area ER5 that is open in the period before scheduled date prior to the live event, described in FIG. 24A through FIG. 39. In the following description, the spatial area ER5 that is open in the period before the scheduled date and the live event provided in the spatial area ER5 on the scheduled date will be collectively referred to as event content. Note that the content in the period before scheduled date may include activities (e.g., game content) that are available to users and objects that can be displayed in the spatial area ER5 that is open in the period before scheduled date.

FIGS. 40A and 40B describe a period before scheduled date and the re-provision of event content. For instance, as shown in FIG. 40A, two scheduled periods are provided, including a first scheduled period and a second scheduled period, each of which include the scheduled date when the live event content is provided and the period before the scheduled date. The content for the period before the scheduled date is provided before the first scheduled date in the first scheduled period, and the content for the live event is provided on the first scheduled date. The second scheduled period is for re-provision of the event content provided in the first scheduled period, and it may start after a predetermined period (e.g., two months) has elapsed since the end of the first scheduled period. Although the provision of the event content ends with the first scheduled period, the distribution server computer 100 stores and holds the information (re-provision data) to take over and re-provide the content data at the end of the first scheduled period. The stored re-provision data is re-provided to users in the second scheduled period. The re-provision data includes: information for generating a virtual space (e.g., FIGS. 24A and 24B and FIGS. 25A, 25B, 25C and 25D); information corresponding to user actions (e.g., user-related information (related to purchased flower stands) in FIGS. 27A, 27B, and 27C, and flower stand placement information for each exhibition area shown in FIGS. 31A and 31B); performer information such as animation data including motion data of a performer avatar in a live event and audio data (e.g., performer avatar information and performer audio distributed in FIG. 10); information on event flower stands used by a performer for stage effects of the live event as shown in FIG. 35A through FIG. 37B; and data on games played in the first scheduled period (e.g., previously saved data, ranking data, and user level). The spatial area ER5 may be open for several days after the first scheduled date to provide a period after the first scheduled date, and the content data at the end of the first scheduled period, including the period after the first scheduled date, may be taken over.

The flower stands FS in the virtual space at the start of the first scheduled period start to be exhibited in their initial state (e.g., initially placed with the flower stands FS in the initial setting) and are updated according to user actions (e.g., purchase operations) in the period before the first scheduled date as described above. At the start of the second scheduled period illustrated in FIG. 40A (e.g., when spatial area ER5 is reopened), information based on the user's actions during the first scheduled period is taken over and reflected in the virtual space, so that the flower stands FS for each exhibition area are placed in accordance with the flower stand placement information at the end of the first period before scheduled date. As a result, when a user who has purchased a flower stand FS in the first scheduled period enters the space in the second scheduled period, they will see the flower stand FS purchased by themselves placed in the same position and in the same display mode as it was placed in the first scheduled period. Although the flower stand placement information is described as the flower stand placement information at the end of the first period before scheduled date, it may be flower stand placement information at the end of the first scheduled date or at the end of the first scheduled period including a period after the first scheduled date.

In the period before the second scheduled date of the second scheduled period, similar to the period before the first scheduled date, the display mode in the virtual space may be changed in accordance with the user actions, and the display mode may be made different for each user. Also, the processes shown in FIG. 32 through FIG. 39 may be executed. Thus, when a user who entered the space during the period before the second scheduled date purchases a flower stand FS, the flower stand will be displayed in the virtual space on the user's viewer terminal 300 in the predetermined area that the user designated at the time of purchase and in the display mode such as with the text as the user edited, as shown in FIGS. 29A, 29B, 29C, and 29D and FIGS. 30A, 30B, 30C and 30D. This purchased flower stand FS may not be reflected in the virtual space of another user, meaning that the flower stands FS exhibited will be different for each user. Each time the switching condition is met, the flower stands FS other than the flower stand FS purchased and placed by the user can be changed and updated among the exhibited flower stands. This purchase includes both the purchases during the first scheduled period and purchases during the second scheduled period. In addition, data from games played during the first scheduled period is taken over to display rankings, for example, and data such as games cleared by each user is also taken over, so that the user is allowed to start the game from the continuation of the first scheduled period.

The re-provision data does not include location and movement information (information for displaying other users' avatars U) of the user avatars U that entered the space during the first scheduled period. This means that, in the second scheduled period, the user avatar U of the user who is actually entering the space in that second scheduled period will be displayed. The present invention is not limited to this, and the re-provision data taken over for replay may include location and movement information of the user avatar U of the user who entered during the first scheduled period, and depending on the number of users who have entered the spatial area ER5 during the second scheduled period (e.g., when it is less than a predetermined number), a virtual avatar may be displayed based on the location and movement information of the user avatar U that is taken over.

Similar to the first scheduled date, a live event is performed by a performer on the second scheduled date in the second scheduled period, and a user who enters spatial area ER5 is allowed to view the event from a viewpoint corresponding to the operation from that user. During the live event on the second scheduled date, the latest flower stand (last purchased flower stand) for each user can be displayed in connection with the performer avatar, similar to the examples in FIGS. 35 to 37. The default flower stand placement information in FIG. 36A may be the same as the flower stands FS in the first scheduled period, but may be different from the default in the first scheduled period, on the basis of the information of the flower stand FS purchased by the user in the second scheduled period.

FIG. 40A shows an example in which the flower stand related information in the first scheduled period is taken over to the second scheduled period, and the present invention is not limited to this. As shown in FIG. 40B, the flower stand related information in the first scheduled period may not be taken over to the second scheduled period. FIG. 40B shows the case, in which the flower stands FS in the virtual space at the start of the second scheduled period will be displayed in its initial state, similar to the start of the first scheduled period, and then they will be updated in accordance with the user's action during the period before the second scheduled date. The initial state of the flower stands (the flower stands exhibited and their display mode) at the start of the second scheduled period may be the same as the initial state of the flower stands at the start of the first scheduled period, or may be partially different, or may be completely different (e.g., the display mode of the flower stands FS in a predetermined initial position may be changed to a design for the second scheduled period).

Similar to the first scheduled date, a live event is performed by a performer on the second scheduled date in the second scheduled period, and a user who enters spatial area ER5 is allowed to view the live event from a viewpoint corresponding to the operation from that user, and the default flower stand information in FIG. 36A may be different from the default in the first scheduled period, on the basis of the information of the flower stand FS purchased by the user in the second scheduled period.

The data of a live event that is re-provided is identical to the motion data provided the last time in the motion and sound of the performer's performer avatar, but the display mode other than the performer avatar's motion is not limited to the same as that provided the last time, and may be different between that provided the last time and the re-provision. For instance, the costume of the performer avatar during the live event on the first scheduled date may be different from the costume of the performer avatar during the live event on the second scheduled date.

(Special Sound/Viewpoint Switching Processing)

Next, the following describes a performer when the event content is re-provided. In the period before the first scheduled date of the first scheduled period, a performer at the live event on the first scheduled date (e.g., a talent who has performed a live stream) is typically not able to enter (does not enter) the space. Whereas, during the second scheduled period, the performer at the live event on the second scheduled date (i.e., the same live event as the first scheduled date) is able to enter the spatial area ER5 as a participant, both during the period before the second scheduled date and on the second scheduled date. The performer avatar who entered the area as a participant in the second scheduled period is displayed in a different display mode from the mode in which the performer avatar is displayed in the live event on the first scheduled date. For instance, the performer avatar who is leading the live event as a performer is displayed as a three-dimensional human-shaped model that differs from another performer (e.g., performer avatar 1 in FIG. 13), whereas the performer avatar who has entered the area as a participant during the second scheduled period is displayed as the same user avatar as other general users. However, the performer's name is displayed for the user avatar that is the same as other general users (e.g., the user's name and an official mark that, together with the user's name, identifies the user as a performer), so that other users understand that this is the performer's avatar. User avatars of general users may not be a human-shaped avatar, but may be an avatar that is simply displayed. For instance, while a three-dimensional human-shaped model requires a large amount of drawing information to be displayed in a virtual space, a simply displayed avatar can be a three-dimensional model that can be displayed with a small amount of drawing information, such as a simple shape made up of a circle, square, triangle, and others (such as a triangular pyramid or a plain animal shape).

When a performer is taking part as a participant in the live event on the second scheduled date, the performer avatar (an avatar that moves and is displayed based on motion data and audio data that are stored in advance as re-provision data) as the performer leading the live event and a user avatar of the performer as a participant may be displayed. This allows other users participating in the live event to view (display) both avatars at the same time in a single virtual space, increasing the users' interest. For instance, the users can enjoy watching an avatar as the performer leading the live event while listening to the voice of the performer as a participant talking about their feelings during the live event. To facilitate such enjoyment, this embodiment performs the processing to switch the sound output from the viewer terminal 300 and the viewpoint displayed on the viewer terminal 300.

In principle, only the user avatars of users who are in the same area are displayed on the viewer terminal 300. Therefore, even if the performer has entered the virtual space as a participant, the performer's avatar as the participant will not be displayed on the viewer terminal 300 of a user other than the user who has entered the same area as the performer. In this embodiment, however, when a special user enters a room as a participant, a user avatar of the special user's account is allowed to have the appearance and voice of the user avatar reflected also in other rooms (e.g., duplicated rooms providing the same content) by mirroring. This allows the avatar of the performer as a participant to be displayed in the virtual space displayed on the viewer terminal 300 of a user who has not entered the same room as the performer.

Figure 41:
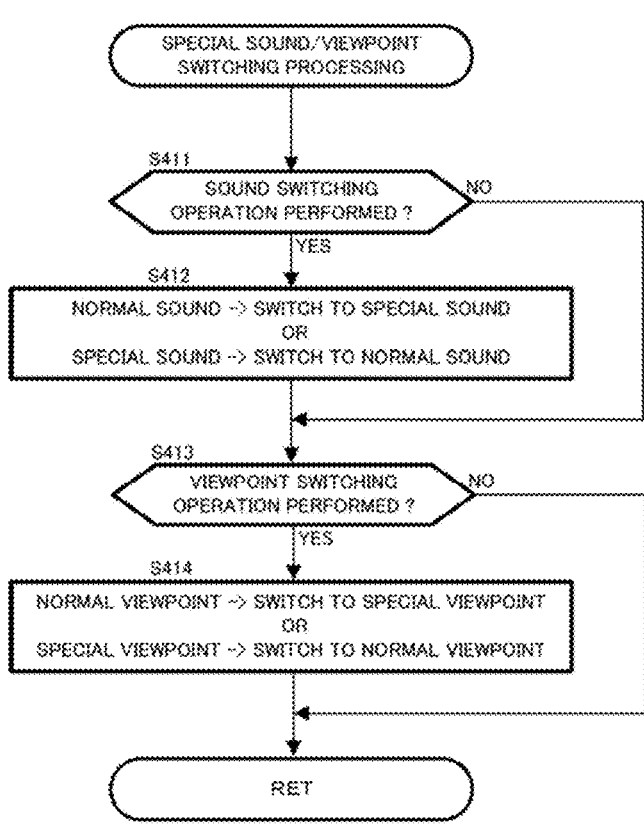
FIG. 41 is a flowchart showing an example of the special switching process according to the present invention.

FIG. 41 is a flowchart showing an example of a special sound/viewpoint switching process that switches sound and viewpoint. This special sound/viewpoint switching process is executed by each viewer terminal 300. The viewer terminal 300 displays an icon that lets a user select settings for the virtual space along with an image within the virtual space, and executes the special sound/viewpoint switching process when it receives an operation on the icon to switch sound or viewpoint.

In step S411, the process makes a determination whether or not a sound switching operation has been performed. If it is not determined that sound switching operation is being performed, the process proceeds to step S413. If it is determined in step S411 that sound switching operation is being performed, the process proceeds to step S412, and if the current sound setting is normal sound, the setting is switched to a special sound that enables the voice of a special user to be output, whereas if the current sound setting is special sound, the setting is switched to a normal sound. The special sound is setting that extracts only the voice of a special user from the sounds output from within the virtual space and outputs it through the viewer terminal 300. For instance, special users are accounts of talent, celebrities, and others, including a performer. Extracting only the voice may be to extract the voice of a special user so as to make it easier to hear. This allows the user to easily switch to the voice of a performer as a participant. The normal sound is sound corresponding to the position where the user avatar of a user is located in the virtual space, and is sound that is generated within a predetermined radius from that position. For instance, when the user is located near the event stage, the sound of the performer who is leading the live event will be output at a louder volume than the other sound, and when the user is located far from the event stage, the sound of other users near the user avatar of the user will be output at a louder volume than the audio of the performer who is leading the live event. When multiple performers are present as participants, it may be possible to select which performer's sound is to be used. For instance, a user may be able to select one particular favorite performer, or may be able to select multiple performers.

In response to an operation to switch to special sound, the output of normal sound may not be stopped, and the user may be allowed to hear the voice of a special user, in addition to the normal sound. For instance, in addition to sound emitted from user avatars located in the vicinity of the user avatar operated by the user, sound may be output from a user avatar of a special user, even if their user avatar is located at a distance where the sound would not normally be heard.

The sound on stage is output from audio data distributed to the viewer terminal 300 by the generated sound distribution process (FIG. 10). Therefore, the sound may be output through the viewer terminal 300 when either normal sound or special sound is selected; during live content distribution, normal sound cannot be selected (sounds such as voice chat from other users cannot be heard), but special sound may be able to be output as secondary sound. The special sound may be selected only by a user who meets predetermined conditions (e.g., paying bills or clearing the game) to be output to the user. This may allow the sound of the performer avatar as a participant to be output as a secondary voice (narration) while watching the live performance (main voice) during the live content distribution.

The present invention is not limited to switching between sounds, and may change the volume of sound. For instance, when the current sound setting is normal sound, the normal sound may be output at a louder volume than the special sound, and when the current sound setting is special sound, the special sound may be output at a louder volume than the normal sound.

Next, in step S413, the process makes a determination whether or not a viewpoint switching operation has been performed. If it is not determined that viewpoint switching operation is being performed, the special sound/viewpoint switching process ends. If it is determined in step S413 that viewpoint switching operation is being performed, the process proceeds to step S414, and if the current viewpoint setting is normal viewpoint, the setting is switched to a special viewpoint that focuses on a user avatar of a special user (e.g., avatar of the performer who enters the virtual space as a participant). If the current viewpoint setting is a special viewpoint, a process for switching to a normal viewpoint is performed. This allows the user to easily switch the viewpoint so as to focus on the avatar of the performer as participant.

The normal viewpoint corresponds to the direction in which the user avatar U of the user is facing in the virtual space, and an image in the virtual space that is viewable from the viewpoint will be displayed. For instance, if the user avatar is facing the event stage, an image including the avatar of the performer who is leading the live event will be displayed, and if the user avatar is facing the opposite side of the event stage, an image in the virtual space on the opposite side of the event stage will be displayed.

The special viewpoint is an image captured by a virtual camera placed in the virtual space, capturing the user avatar of a special user from an angle that may be different from the normal viewpoint. For instance, an image may be taken from a virtual camera that is fixedly placed in advance. In this case, an image showing a user avatar of a special user may be captured from the virtual camera, and may be distributed to the viewer terminal 300. Such a pre-fixed positioned virtual camera may be selected by the manager's operation, or the virtual camera may be selected based on the special user location information. Alternatively, the special viewpoint setting may be configured to distribute, to the viewer terminal 300, an image showing the avatar of the performer as a participant, which is being captured by a virtual camera operated by the operator. For instance, the viewpoint may be a bird's-eye view from diagonally above of the avatar of the performer that is being shot by a drone in a virtual space using an administrator account. When multiple performers are present as participants, it may be possible to select which performer's avatar is to be used. For instance, a user may be able to select one particular favorite performer, or may be able to select multiple performers.

In this special sound/viewpoint switching process, the switching operation to special sound and special viewpoint may be only for a user who meets predetermined conditions, such as paying bills. Only users who meet the predetermined conditions may be able to operate either the special voice or the special viewpoint.

(Special Processing for Room Entry)

The virtual space in this embodiment is provided using a plurality of rooms in order to provide the same content to a plurality of users at the same time. This allows content such as spatial area ER5, in which a virtual live venue is built to provide event content for the period before scheduled date and on the scheduled date as described above with reference to FIGS. 40A and 40B, to be provided using these rooms, thereby allowing simultaneous distribution to many users. Note that, for these rooms, one room is defined for one server, but multiple rooms may be defined for one server.

Figure 42A:
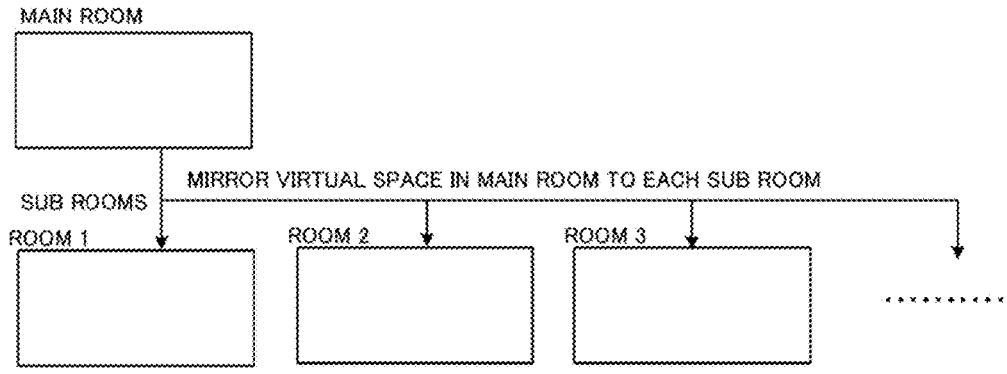
FIG. 42A and FIG. 42B is a flowchart showing an example of special processing for room entry according to the present invention.

FIG. 42A describes the multiple rooms that make up the spatial area ER where predetermined content is provided. For instance, the spatial area ER in which the predetermined content is provided may include rooms corresponding to sub-areas ER51 through ER53 of the spatial area ER5 which builds a virtual live venue, or a room corresponding to sub-area ER53' in FIGS. 24A and 24B in which a live event is to be provided on the scheduled date with the same mode as sub-area ER53. The multiple rooms include a main room in which a virtual space is constructed and a performer enters (is associated with) during the live event, and multiple other rooms (room 1, room 2, room 3, and others) in which the virtual space within the main room (including the performer's avatar) is mirrored. A user who wishes to enter the virtual live venue is assigned to a room designated by the user from among multiple rooms, or is randomly assigned (associated) by a load balancing system to a room if no room is designated, thus the user is able to view images of the same virtual live venue. The timing of the assignment to a room may be at the time of entry by logging into the virtual space, for example. Alternatively, after logging-in, a screen may be displayed, which allows the user to select the content (e.g., area) they wish to enter, and when the user selects the area they wish to enter rather than specifying a room ID, they may be randomly assigned to one of the rooms because they do not specify a room.

Note that user actions (e.g., voice, actions, comments) within the virtual space can be shared with users in the same room, but cannot be shared with users in other rooms. However, to liven up the atmosphere of a live event in a virtual space, some users may be desirably allowed to enter the same room: this includes the situation where multiple talents or celebrities wish to enter the same room or the situation where a user wishes to enter the same room as another user in a friend relationship because the other user has already entered there.

Note that, in consideration of the server's processing capacity, load concentration, and other factors, a maximum number (e.g., 200 people) is set in advance for the number of users who can enter each room. For this reason, if users are allocated to rooms by strictly using the upper limit number, it may not be possible to allow the users to enter the same room under the situations described above, and the user's request cannot be met. Meanwhile, the upper limit is typically set to a value that takes into account the processing capacity of the server so that distribution is not affected (such as an inability to distribute) even when the load on the server increases.

Figure 42B:
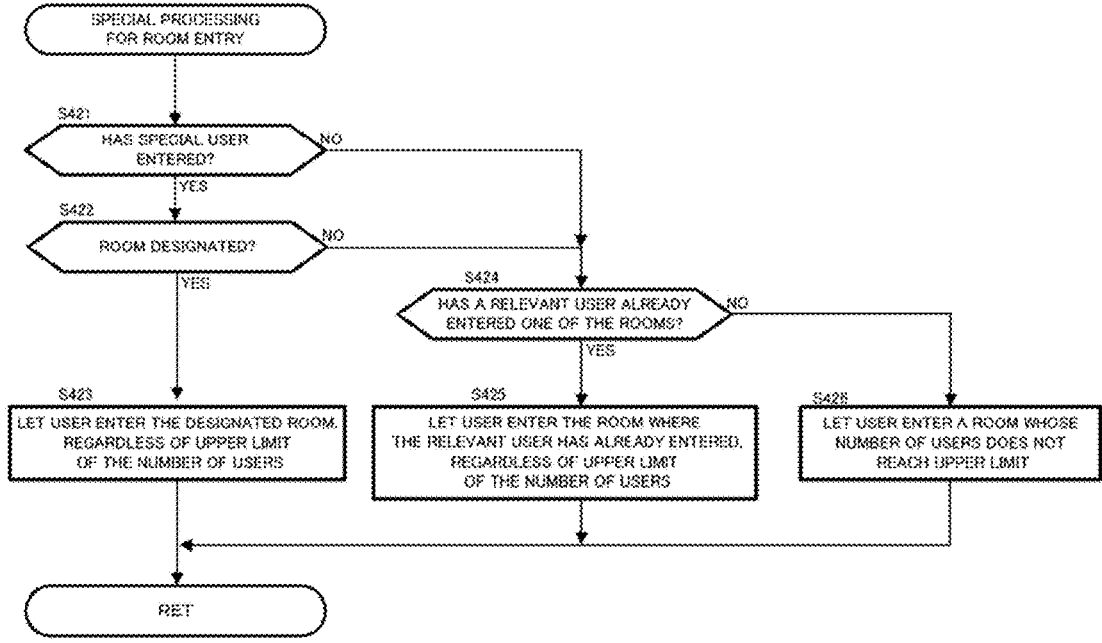

Thus, this embodiment is configured so that, if predetermined conditions are met, special processing is performed, which allows users to enter the same room even if their entry would lead to exceeding of the upper limit. FIG. 42B is a flowchart showing an example of special processing for room entry. The distribution server computer 100 executes this special processing for room entry. In response to a request from a user to enter a room in which predetermined content is provided, the distribution server computer 100 executes this special processing for room entry. The room in which the predetermined content is provided includes a room that constitutes the spatial area ER to build a virtual live venue. The request to enter a room may be made at the time of logging in to the virtual space, or may be made when a screen to let the user select the content (e.g., area) to enter is displayed on a title screen after logging in, and the user selects the content. The user may designate a room ID at the timing of logging into the virtual space or when they select content. Examples of the predetermined conditions include, but are not limited to, when a special user enters a virtual space by designating a room, or when a user who is relevant to the user trying to enter a room has been within one of the rooms.

Special users include accounts of a performer who appears as a performer in the live event (e.g., performer user ID and account in FIG. 8), talents, and celebrities. Some talents and celebrities may be also performers. For instance, a special user may be a user account that has been predetermined by the manager as a special user, or may be a user who has an attribute number assigned so that they can be identified as a talent or celebrity, together with a user ID for viewer user data to be stored in storage 103, or an account. Furthermore, special users in this special processing for room entry may include a manager who manages the virtual space and relevant people to the talent (e.g., their manager). The manager of the virtual space includes an account of a user who has authority to operate a virtual camera. This enables them to capture images in the room where the talent has entered with the virtual camera, and display the images on other users' screens or transmit the image data to other computers. The other computers to transmit the video data include an external server for live distribution.

Users being relevant to each other include the case where the users have a mutual follow-up relationship in the virtual space provided by the distribution server computer 100 and having a follow function such as being friends, or the case where their degree of intimacy is above a predetermined value. The degree of intimacy is calculated on the basis of the action history in the virtual space, for example. For instance, the degree of intimacy may increase with the frequency of chats, the number of cooperative games played, or the number of times when they have been located within a predetermined area based on the location information. Also among special users, the special users whose degree of intimacy is above a predetermined value, and the special users who need to be in the same room for the progress of the content (e.g., special users who are scheduled to appear in the same live event) are set as the relevant users by the manager.

In step S421, the process determines whether a special user has entered the room or not. If it is determined in step S421 that a special user has entered the room, the process determines in step S422 whether or not a room has been designated. For instance, when a room ID is input to a terminal with an account of a talent who is a special user, then a request to enter the room is transmitted to the distribution server computer 100 together with a request to designate the room ID. If it is determined in step S422 that a designation has been made, then the process performs in step S423 the processing of associating the user with the designated room and allowing the user to enter the room, regardless of the number of users currently in the designated room and the upper limit of the number of users. The distribution server computer 100 determines whether the user is a special user on the basis of the ID of the user who has requested to enter the room, and if a room ID is designated, the distribution server computer 100 allows the user to enter the room with the designated room ID. For instance, the distribution server computer 100 performs the processing of associating the user ID of the special user who has entered the room with the designated room ID.

The room ID that allows the entry regardless of the maximum number of users may be predetermined by the manager. In other words, when a room ID other than the predetermined room ID, which allows the entry regardless of the upper limit, is designated, the process may prevent the entry to the room if the number of users entering the designated room has already reached the upper limit. At this time, the special user who entered the room in step S421 may be allowed to enter a room in which another special user who is relevant to the special user has already entered.

If it is not determined that a special user has entered a room, or if a special user has entered a room but no room has been designated, the process then determines in step S424 whether or not a user that is relevant to the user trying to enter the room has already entered one of the rooms. Users being relevant to each other include the case where their friendship or degree of intimacy is above a predetermined value. If it is determined in step S424 that a user that is relevant to has already entered one of the rooms, the process performs in step S425 the processing of associating the user with the room where the relevant user has already entered, regardless of the number of users in the room and the maximum number of users in the room. If the relevant users are distributed among multiple rooms, the user may be allowed to enter the room in which the largest number of relevant users are present. Alternatively, among the rooms in which relevant users are present, a room with a lower degree of congestion may be given priority for entry.

If it is determined in step S424 that no users that are relevant to are in any one of the rooms, the process performs in step S426 the processing of associating the user with one of the rooms whose number of users does not reach the maximum number. For instance, the assigning process may be performed by a typical load balancing process.

(Component Resetting of Performer's Human-Shaped Avatar)

Figure 43:
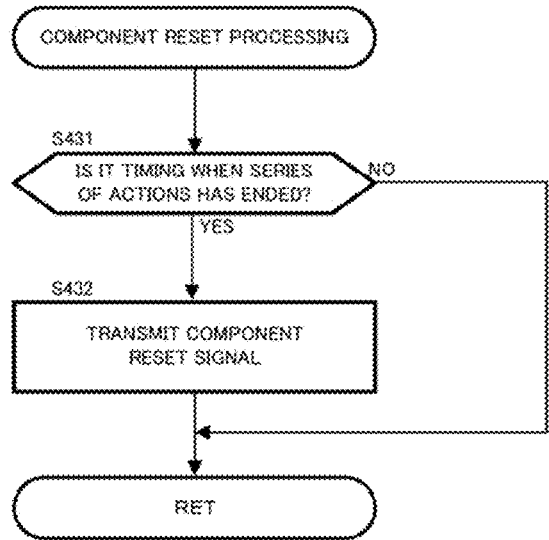
FIG. 43 is a flowchart showing an example of the component reset processing according to one embodiment of the present invention.

Referring next to FIG. 43, the following describes processing of resetting abnormal display of an object that swings in conjunction with a character object at a predetermined timing. As shown in FIG. 13 and FIGS. 20A, 20B, 20C, and 20D, for example, the performer's human-shaped avatar wears a costume object corresponding to the costume worn by a human-shaped character object (a three-dimensional model with bones (skeleton)), the costume object being associated with the character object. Components (functional parameters) are associated with the objects displayed in the virtual space, thereby allowing various objects to be displayed and operate in the virtual space. These character object and costume object have various components (such as various parameters including collider and rigid body) previously set therein for use in physical calculations (calculation processes for collision detection, gravity, movement, and others). The object data with various components associated is included in the virtual space update data in FIG. 10 and is distributed to the viewer terminal 300. The viewer terminal 300 performs the processing to display a character object in motion on the basis of the performer's motion data (performer avatar information included in the virtual space update data in FIG. 10) distributed by the distribution server computer 100. The costume object is displayed with a swinging motion, and is displayed in motion through physical calculations that are in conjunction with the motion of the character object. The objects that are displayed with a swinging motion include fabric such as clothes, hair, and others. The physical calculations performed in conjunction with the motion of the character object include calculation processing based on a component that calculates swaying objects such as fabric that functions in conjunction with a skin mesh associated with the character object. In this way, the viewer terminal 300 performs the processing to perform physical calculations and to display the movement of the costume object in the same way as in the real space in response to the movement of the character object. The movement of the costume object includes swinging, bouncing, bending, and others.

This calculating process of displaying a character object and a costume object in motion is performed by the viewer terminal 300, on the basis of the virtual space update data that is streamed at predetermined intervals from the distribution server computer 100. Once the motion display processing based on the previously received virtual space update data ends, the motion display processing is executed based on the next received data.

Even if the data distributed is the same, differences can occur among users due to the processing power of their viewer terminals 300 or the communication environment (e.g., lower frame rates). In particular, when the viewer terminal 300 has low processing power or the communication speed is below a certain level, calculations based on physical calculations take a long time (drawing speed is slow). Therefore, when the character's motion speed and motion range are large, an abnormal display mode of the costume object is likely to be calculated and displayed. For instance, a large discrepancy may occur between the final motion position of a character object based on previously received streaming data and the starting motion position of the next received streaming data. As a result, objects such as skirts, which are calculated to follow the character object and should naturally sway smoothly, do not move smoothly, but instead move in an extremely large swinging motion. In one example, if a performer moves vigorously, the movement of the colliders of various objects may cause the hem of a skirt object to be calculated as inserting into the top of the skirt or into the character object's legs. This may cause the hem of the skirt to be displayed as if it is rolled up. In another example, the tip of a wing object may be calculated to enter into the middle of the wing, and the wing may be displayed in a bent state so that it cannot flap. To avoid the continued display of such an abnormal display mode, the distribution server computer 100 in the present embodiment performs a component reset processing to reset the display state of an object to neutral.

FIG. 43 is a flowchart showing an example of the component reset processing. The distribution server computer 100 executes this component reset processing. When distributing virtual space update data including data to let a human-shaped avatar move, the distribution server computer 100 executes this component reset processing every time a predetermined time (e.g., 2 ms) elapses. The following describes an example of the component reset processing that is executed during provision (during distribution) of the live event as described above.

In step S431, the process determines whether or not a series of actions by the performer avatar has ended. The timing at which a series of actions ends is the timing at which the performer avatar's action that can continue comes to an end, and the performer avatar's motion speed and range decrease and the motion settles down. For instance, in the case of content in which a performer sings while dancing, the timing includes the timing when one song is finished, the timing between songs before the start of the next song, and the timing at which the second song begins. In the case of content in which a performer performs an attraction, the timing includes the timing when one attraction ends, the timing until the start of the next second attraction, and the timing at which the second attraction begins. In this embodiment, any one of these timings is used as the timing when a series of actions ends. The distribution server computer 100 determines whether the motion speed or motion range is below a predetermined amount. Whether or not the motion speed or range is below a predetermined amount may be determined when the acceleration becomes less than a predetermined value (or this state continues for a predetermined number of seconds).

If it is not determined in step S431 that the timing is when the series of actions by the performer avatar has ended, the component reset processing ends. If it is determined in step S431 that the timing is when the series of actions by the performer avatar has ended, the process distributes a component reset signal to the viewer terminal 300 in step S432, and ends the component reset processing. The component reset signal causes the viewer terminal 300 to perform physical calculations for an object (e.g., a costume object) displayed corresponding to a character object from a predetermined initial state. In other words, this signal causes a calculation, which would normally be performed following the calculation based on previously received streaming data, to be performed from an initial state without being based on the result of the previous calculation. This means that even if the display state of the costume object is abnormal, the display state is reset to neutral and then the physics calculation is performed.

In this way, the viewer terminal 300 performs the processing of performing physical calculations and displaying the movement of the costume object in the same way as in the real space in response to the movement of the character object. To this end, the viewer terminal 300 calculates the current acceleration, taking into account the acceleration of each part of the costume object at the previous calculation timing. When receiving a component reset signal, however, the viewer terminal 300 performs a process of calculating the current acceleration from a predetermined initial state (e.g., zero acceleration) without taking into account the acceleration of each part at the previous calculation timing. This allows the costume object to be returned to the mode calculated from its initial state (neutral state) even if an abnormal state has been calculated and displayed as the mode of the costume object during a series of actions. For instance, it can eliminate the state such as the hem of a skirt that is rolled up or wings that are bent and cannot flap. Such a state leads to a calculation that is an impossible mode of the costume object, which may cause the costume object of the character to move and display in an abnormal mode. If the character's motion speed and range are large, the possibility of such an abnormal mode may increase. Even in such a case, the present embodiment eliminates the abnormal mode.

The component reset signal may be a command to start physical calculations from the initial parameters of the costume object, and may be a command to reset the components of the costume object to the same parameters as those in their initial position. For instance, the initial parameters of a costume object are parameters when the character object is wearing the costume in its initial posture, and are in a neutral display state without acceleration being applied. For instance, the components of the costume object are parameters such as acceleration and gravity. For instance, the initial position refers to when the character object is in the initial posture.

<Example of Specific Configuration and Effects>

(1-1) As described with reference to FIG. 1 through FIG. 25D, the above-mentioned embodiment is configured so that the distribution server computer 100 follows a stored program (e.g., a program stored in a non-transitory computer-readable storage medium) and a method of controlling a computer with the program (hereinafter they may be simply referred to as a program) to perform the process of generating a virtual space ER and transmitting information that displays an image in the virtual space ER in response to a user operation, and the viewer terminal 300 follows a stored program to perform the process of displaying an image in response to a user operation in accordance with the information from the distribution server computer 100. As described with reference to FIG. 26A through FIG. 28, the distribution server computer 100 follows a stored program to perform the process of placing and updating objects such as flower stands FS that are purchased in response to a purchase operation by the user within the virtual space ER, and the viewer terminal 300 follows a stored program to perform the process of placing and displaying the objects that are placed and updated by the distribution server computer 100 and purchased in response to a purchase operation by the user within the virtual space ER. As described with reference to FIG. 13 through FIG. 23 and FIGS. 35A and 35B, the distribution server computer 100 follows a stored program to perform the process of constructing a space in the spatial area ER5 within the virtual space ER to provide the event content on the scheduled date, and the viewer terminal 300 follows a stored program to provide the event content on the scheduled date in the spatial area ER5 constructed by the distribution server computer 100.

The present embodiment is configured so that, also during the period before the scheduled date of the event, the distribution server computer 100 and the viewer terminal 300 each follow a stored program to perform the process of enabling the entrance into the spatial area ER5 and displaying an image in the spatial area ER5 in response to a user's operation and perform the process of enabling placement and display of the object purchased in response to a purchase operation in the spatial area ER5. As shown in FIGS. 26A and 26B, FIGS. 29A, 29B, 29C, and 29D, FIGS. 30A, 30B, 30C and 30D, FIGS. 34A, 34B, 34C, and 34D and FIGS. 35A and 35B, the distribution server computer 100 and the viewer terminal 300 each follow a stored program to perform the process of changing the display mode in the spatial area ER5, in response to the placement and display of the object such as a flower stand FS in the spatial area ER5 during the period before the scheduled date. This shares and provides a user with the spatial area ER5 in which event content is to be provided and events that can change the display mode in the spatial area ER5 during the period before the scheduled date, thereby gradually increasing the interest in the event content before the event content is provided.

(1-2) The distribution server computer 100 and the viewer terminal 300 each follow a stored program to perform the process of changing the display mode of each exhibition area in the spatial area ER5 from the timing of purchase until the end of the period before the scheduled date, as shown in FIGS. 26A and 26B, FIG. 28, and FIGS. 29A, 29B, 29C, and 29D, in accordance with the user's purchase of the flower stand FS in the period before the scheduled date as shown in FIG. 27C. This allows users to focus on whether a flower stand FS will be purchased by users during the period before the scheduled date, what attributes the purchased flower stand FS will have, how it will be decorated, and where it will be displayed, and how the display mode of each exhibition area within the spatial area ER5 will change accordingly.

(1-3) The display mode of each exhibition area within spatial area ER5, which may change during the period before the scheduled date, may be different from the user to another user. This may change with whether the user has purchased and placed a flower stand FS during the period before the scheduled date, as described while comparing FIGS. 29A, 29B, 29C, and 29D and FIGS. 30A, 30B, 30C and 30D, for example. This enables customization of the display mode of each exhibition area in the spatial area ER5 for each user during the period before the scheduled date, thus giving each user a special feeling.

(1-4) As shown in FIGS. 35A and 35B, the distribution server computer 100 and the viewer terminal 300 each follow a stored program to perform the process of changing the display mode for stage effects of the live event to be performed in the spatial area ER5 during the provision of the event content, in response to the user's purchase and placement of a flower stand FS during the period before the scheduled date. This allows users to focus on whether a flower stand FS will be purchased by users during the period before the scheduled date, what attributes the purchased flower stand FS will have, how it will be decorated, and how the display mode for stage effects of the live event performed in the spatial area ER5 during the provision of the event content will change accordingly.

(1-5) The stage effects for the live event performed in spatial area ER5, which may change during the provision of the event content, may be different from the user to another user. This may change with whether the user has purchased and placed a flower stand FS during the period before the scheduled date, as described with reference to FIG. 27C, FIGS. 35A and 35B and FIGS. 36A and 36B, for example. This allows each user to customize the display mode of the stage effects for the live event performed in the spatial area ER5 during the provision of the event content, thus giving each user a special feeling.

(1-6) An event that changes the display mode in the spatial area ER5 may be an action in response to a user's purchase operation of a flower stand FS. The action displays and places the purchased flower stand FS in an exhibition area within the spatial area ER5, thus reflecting the purchased flower stand FS there. For instance, this is an example of the action in step S107 of FIG. 28 in which a user purchases a flower stand FS and the action in step S109 where the flower stand FS is placed in a predetermined exhibition area A of the spatial area ER5. This generates an event that changes the display mode within the spatial area ER5 in response to the user's own operation, thereby encouraging the user to operate and improving the user's awareness of participation.

(1-7) One example of the event that changes the display mode within spatial area ER5 is the purchase operation of a flower stand FS, which is an action in response to an operation from another user (e.g., user 1 who is another user for user 2 in FIGS. 29A, 29B, 29C, and 29D and FIGS. 30A, 30B, 30C and 30D), and is the action reflected by the display and placement of the flower stand FS in the exhibition area within spatial area ER5. This shows an example of the action that is the purchasing by another user 1. That is, as shown in an example in FIG. 30D, the display device 310 of user 2 displays the flower stand FS1 that would not be displayed unless another user 1 purchased it, and this flower stand FS1, which is a result of the purchase action of another user 1, can be determined randomly by lottery as one of the default flower stands FS to be displayed, and can be displayed in a specified exhibition area A. In this way, another user's operation and action also can be an event that changes the display mode in the spatial area ER5. This adds interest to the change in display mode, and thus enhances the interest of the user.

(1-8) An example of the event that changes the display mode in the spatial area ER5 is the fulfillment of a switching condition. The distribution server computer 100 and the viewer terminal 300 each follow a stored program to perform the process of keeping the exhibition of a flower stand FS related to a special user in the spatial area ER5 even if an event occurs that changes the display mode in the spatial area ER5. For instance, the exhibition position of a flower stand FS purchased by a user is determined by lottery from the positions other than the exhibition position of the special user's flower stand FS. Even if the switching condition is met, the exhibition and display of the flower stand FST associated with the special user continues, as shown in FIGS. 34A, 34B, 34C, and 34D. This allows the display mode related to the special user to continue without change, thereby maintaining and improving the convenience and priority of the special user. This also makes it possible to use an object such as a flower stand of a special user for advertising and PR activities. Thus, the management will be able to more easily solicit investments from sponsors who could be an example of special users.

(1-9) As shown in FIGS. 24A and 24B, spatial area ER5 has the sub-area ER53' that is a second virtual space used to provide event content on the scheduled date and the sub-area ER53 that is a part of a first virtual space and has a common (same or similar) display mode with the sub-area ER53'. The distribution server computer 100 and the viewer terminal 300 each follow a stored program and do not display a portal P to restrict the entry into the sub-area ER53', while permitting the entry into the sub-area ER53 during the period before the scheduled date (e.g., until the day before the scheduled date of the event) and the display of an image of the sub-region ER53 in response to an operation from the user. On the day before the scheduled event date and after the open condition is met, the distribution server computer 100 and the viewer terminal 300 close the great gate object 53*c* leading to the sub-area ER53 to restrict the entry into the sub-area ER53, while displaying the portal P to permit the entry into the sub-area ER53' of the second virtual space to allow an image of the sub-area ER53' to be displayed in response to the user's operation. This allows the area used to be switched depending on whether the open condition is met; before the open condition is met, this configuration provides a virtual space that is an area suitable for the user's action before the provision of the event content, and after the open condition is met, it provides a virtual space that is an area suitable to provide the event content.

(1-10) As shown in FIGS. 24A and 24B, the spatial area ER5 has the sub-areas ER51 and ER52, which are part of the first virtual space, and the user avatar can be seamlessly moved between the sub-area ER51, the sub-area ER52, and the sub-area ER53 in FIG. 24A in the first virtual space (the user avatar is movable between the sub-areas from one sub-area to another in response to the user operation). In contrast, the sub-area ER53' as the second virtual space is formed separately from the sub-areas ER51 and ER52 as part of the first virtual space, and as shown in FIG. 24B, the user avatar is movable between the first virtual space and the second virtual space through the portals P of the sub-area ER53' and sub-area ER52 via a blackout display. This improves the convenience of traffic between the sub-areas ER51, ER52, and ER53 of FIG. 24A, which are in the first virtual space, before the open condition is met. After the open condition is met, the display is darkened before the avatar moves to the sub-area ER53' in the second virtual space, thus giving the user a special feeling or a feeling of tension, and increasing the user's interest.

(1-11) The open condition may be met on the day before the scheduled date of the event content to be provided. This forms a period before the open condition is met, a period after the open condition is met but before the event content is provided, and a period during which the event content is being provided, thereby enhancing the user's interest more gradually.

(1-12) The changeable display mode in spatial area ER5 includes a flower stand FS exhibited in an exhibition area in spatial area ER5, and an event that changes the display mode in spatial area ER5 includes an event in which a user purchases a flower stand FS in the period before the scheduled date to be placed the flower stand FS associated with the user in the selected exhibition area within the spatial area ER5. This makes the user purchase a flower stand FS so that the flower stand FS is placed in their selected exhibition area, thus changing the display mode of the exhibition area during the period before the scheduled date, thereby increasing the user's interest.

(1-13) An event that changes the display mode in the spatial area ER5 includes an event that generates the display mode (decoration such as letters) of the flower stand FS in response to a user operation when placing the flower stand FS. This allows each user to change the display mode of the flower stand FS to be placed in their own original way, thus increasing the user's interest.

(1-14) The changeable display mode within the spatial area ER5 includes a flower stand FS held by a performer avatar that is displayed within the spatial area ER5 while event content is being provided and that is able to act and facilitate the event content, as shown in FIGS. 35A and 35B. This allows the flower stand FS, which can be displayed corresponding to the performer avatar, to change in accordance with the event that occurs during the period before the scheduled date, thus increasing the user's interest due to the event.

(1-15) As shown in FIG. 39, the distribution server computer 100 and the viewer terminal 300 each follow a stored program to perform the process of changing the display mode in the spatial area ER5, in accordance with the number of entering times into the spatial area ER5, which is an example of the degree of displaying an image in the spatial area ER5 in the period before the scheduled date. This allows the display mode within the spatial area ER5 to change with the number of entering times into the spatial area ER5 during the period before the scheduled date, thereby increasing user's motivation and encouraging the user to enter the spatial area ER5 during the period before the scheduled date.

(1-16) The distribution server computer 100 and the viewer terminal 300 each follow a stored program to perform the process of providing the event content to a user on the scheduled date, if the user meets a predetermined condition, such as by purchasing a ticket to participate in the event content, and to allow the user who meets the predetermined condition to enter the spatial area ER5 during the period before the scheduled date and to view a displayed image within the spatial area ER5. This improves user's motivation and encourages user to meet the predetermined condition.

(2-1) The present embodiment is configured so that, also during the period before the scheduled date of the event, the distribution server computer 100 and the viewer terminal 300 each follow a stored program (e.g., a program stored in a non-transitory computer-readable storage medium) to perform the process of enabling the entrance into the spatial area ER5 and displaying an image in the spatial area ER5 in response to a user's operation. As shown in FIG. 38 and FIG. 39, the distribution server computer 100 and the viewer terminal 300 each follow a stored program to perform the process related to the event content in accordance with the number of entering times that is an example of the degree of entering the spatial area ER5 of the virtual space ER where the event content is provided on the scheduled date and displaying an image in the spatial area ER5. The number of entering times does not include the number of entering spatial areas ER other than the spatial area ER5 after logging into the virtual space ER. This allows the spatial area ER5 in which the event content is provided to be shared and provided to users during the period before the scheduled date, and processing related to the event content is performed in accordance with the number of entering times into the spatial area ER5 during the period before the scheduled date. This increases the user's motivation to enter the spatial area ER5 rather than other spatial areas within the virtual space ER to display images within the spatial area ER5, thereby gradually increasing the user's interest in the event content before the event content is provided.

(2-2) The process related to the event content includes, as shown with the stage effects in FIG. 38, the process of changing the display mode within the spatial area ER5 while the event content is being provided in accordance with the number of entering times during the period before the scheduled date. This increases user's motivation to enter the spatial area ER5 during the period before the scheduled date, and also draws the user's attention to how to change the display mode in the spatial area ER5.

(2-3) The process related to event content changes the display mode in the spatial area ER5 during the provision of event content according to the number of entering times; as shown with the stage effects of FIG. 38, the process sets a different stage-effects content in accordance with the number of entering times. This means that the display mode may be different from one user to another according to their number of entering times. This enables customization of the display mode in the spatial area ER5 for each user during the provision of the event content, thus giving the user a special feeling.

(2-4) The changeable display mode in the spatial area ER5 during the provision of event content includes a secret costume of a performance avatar, which is a displayed costume for the performer avatar that is displayed and acts in the spatial area ER5 during the provision of event content, the performer avatar being able to facilitate the event content. That is, the costume of the performer avatar may change during the provision of the event content, in accordance with the number of entering times into the spatial area ER5 during the period before the scheduled date. This enhances the user's motivation to enter the spatial area ER5 during the period before the scheduled date, thereby increasing user's interest.

(2-5) The process related to event content includes, as shown in step S402 in FIG. 39, the process of giving a user one of the items in accordance with their number of entering times. These items are one example of an object that the user can use during the provision of the event content. This enhances the user's motivation to enter the spatial area ER5 during the period before the scheduled date, and draws the user's attention to the items to be given.

(2-6) These items given to a user through the process related to event content can be different from one user to another because different items are set according to their number of entering times as shown with the items of FIG. 38. This allows the users to use different items during the provision of the event content, thereby enhancing the user's interest in the event content.

(3-1) In this embodiment, the distribution server computer 100 and the viewer terminal 300 each follow a stored program (e.g., a program stored in a non-transitory computer-readable storage medium) to perform the process of placing the flower stand FS that has been associated with the user who purchased it in the exhibition area within the spatial area ER5, and the process of changing, of the flower stands FS shown in FIG. 29A, those associated with other users (e.g., other than user 1) and placed in the exhibition area within spatial area ER5 to other flower stands FS in step S203 of FIG. 32 when a switching condition is met, while continuously displaying the flower stand FS associated with the user themselves (e.g., user 1) even if the switching condition is met, as described with reference to FIG. 27C. This allows the flower stands FS to be appropriately reflected within the spatial area ER5 even if there are a large number of flower stands FS to be exhibited and the number of exhibition positions available in the exhibition area is limited. This also allows the flower stands FS associated with other users to be exhibited and displayed relatively evenly within the spatial area ER5, and changes the display mode of these flower stands in the exhibition area within the spatial area ER5, thus increasing the user's interest, while enhancing the user's satisfaction because they can check the flower stands FS associated with themselves.

(3-2) The switching condition may be met when a predetermined time has elapsed, or when a user logs in or enters or leaves the spatial area ER5. This changes a flower stand FS associated with another user to a different flower stand FS without requiring user's previous knowledge (e.g., about the switching method). Thus, this increases the interest of all users in the flower stands FS that can be exhibited and displayed in the exhibition area within the spatial area ER5.

(3-3) As shown in FIGS. 27A, 27B, and 27C, multiple types of flower stands with different attributes and sizes are provided, and each of the flower stands FS has a defined exhibition area in the spatial area ER5 where it can be placed and exhibited, depending on the type. This allows the appropriate type of flower stand FS to be placed in the exhibition area so as to fit the design, taste, and world view of the spatial area ER5. This also creates a sense of unity in the types of flower stands FS placed in each exhibition area.

(3-4) Flower stands FS can be exhibited and displayed up to the maximum number defined for each exhibition area within the spatial area ER5. The distribution server computer 100 and the viewer terminal 300 each follow a stored program to keep the number of flower stands FS exhibited within the possible upper limit of exhibition, while changing the flower stands FS associated with other users in the display when the switching condition is met, as shown in FIG. 29C and FIG. 29D. This allows the flower stands FS associated with other users to be evenly exhibited in the exhibition area within the upper limit number, and changes the display mode of the exhibition area and the spatial area ER5, thus increasing the user's interest.

(3-5) As shown in FIGS. 24A and 24B, the spatial area ER5 has multiple exhibition areas, in each of which flower stands FS can be placed for exhibition. The distribution server computer 100 and the viewer terminal 300 each follow a stored program to perform the process of placing and exhibiting the user's flower stand FS in the exhibition area designated in response to the user's operation from these exhibition areas, as shown in FIGS. 26A and 26B. This allows the user to place and exhibit their own flower stand FS in the exhibition area to suit their liking, thereby increasing the user's interest.

(3-6) The distribution server computer 100 and the viewer terminal 300 each follow a stored program to perform the process of changing the display mode of the flower stands FS exhibited by decorating them with letters, for example, in response to the user's operation, and exhibiting and displaying them, as shown in FIGS. 26A and 26B. This allows each user to change the display mode of the flower stand FS exhibited in their own original display mode, thus increasing the user's interest.

(3-7) The distribution server computer 100 and the viewer terminal 300 each follow a stored program to exhibit and display flower stands FS while giving a higher percentage of being selected as default flower stands to the users who have purchased more flower stands FS than those who have purchased fewer (e.g., 11 rather than 10, 40 rather than 30). However, for users who have reached a predetermined number of purchased flower stands, regardless of their purchased number more than the predetermined number, the same percentage (e.g., the same percentage as users who have purchased a predetermined number of flower stands) will be used for determination of the default flower stands FS by lottery, and their flower stands will be exhibited and displayed. This encourages a user to purchase an appropriate number of flower stands FS (less than the predetermined number), and also prevents the flower stands FS of a user who has purchased them more than the predetermined number from excessively occupying the default flower stands FS.

(4-1) The virtual space in this embodiment includes a space ER5, in which multiple types of objects may be displayed, including: first type of objects such as a building and a virtual stage G or a stage object, which are objects essential for generating the virtual space; and second type of objects such as a flower stand FS, which is an example of an object that livens up the atmosphere of the virtual space and is not essential for forming the content. The distribution server computer 100 and the viewer terminal 300 each follow a stored program (e.g., a program stored in a non-transitory computer-readable storage medium) to: if information for displaying an essential object is identified, perform a process of displaying a predetermined space in steps S215 to S245 of FIG. 33, regardless of whether information for displaying a non-essential flower stand FS whose display mode changes can be identified or not; if it is determined in step S225 of FIG. 33 that all the flower stand placement information has been read out, transmit the latest flower stand placement information to the user in step S205; and if predetermined time has elapsed before all the flower stand placement information is read out in step S235 of FIG. 33, to identify an alternative flower stand and transmit it to the user in step S245. This configuration allows the user, if the information of the essential object is identified regardless of whether the flower stand placement information is identified or not, to display the space ER5, and also allows the user to, if the flower stand placement information is not identified, to display an alternative object. This allows the user to enter the virtual space and display the virtual space even when some objects cannot be identified because the server is overloaded due to a concentration of access, for example.

(4-2) When displaying a space for providing a live event, for example, on a scheduled date in the spatial area ER5 of FIGS. 24A and 24B, this configuration allows the viewer terminal 300 to display the spatial area ER5 even if the flower stand placement information has not been identified. The spatial area ER5 is a virtual space for providing the event content on the scheduled date, so that access to a distribution device such as a server may be concentrated on the scheduled date. This embodiment allows the viewer terminal to display the virtual space when essential object information is identified, regardless of whether or not the flower stand placement information has been identified.

(4-3) As illustrated in FIGS. 29A, 29B, 29C, and 29D and FIGS. 30A, 30B, 30C and 30D, a flower stand FS is an object whose display mode changes depending on the user's actions such as purchase. Even if the flower stand placement information corresponding to the current display mode updated in step S203 of FIG. 32 or step S213 of FIG. 33 has not been identified, an alternative flower stand may be identified in steps S225 to S245 of FIG. 33, and information identifying the flower stand FS may be transmitted to the user in step S205. This allows the user, if there is a concentration of access to a distribution device such as a server for the latest updated flower stands FS, to enter the spatial area ER5 and display an image in the spatial area ER5.

(4-4) If an object cannot be read in FIG. 33, this object is replaced with an alternative object. The object is a flower stand FS that the user can exhibit in the exhibition area after purchasing it in FIG. 28 or inputting letters in step S104. Such an object therefore have many variations in the display mode, so that the information for identifying the flower stand FS can easily become heavy, which may cause a failure in reading the flower stand placement information. To prevent such a failure, the present embodiment replaces the object with an alternative object having a lighter processing load in step S245 in FIG. 33, for example.

(5-1) In this embodiment, the objects placed in the virtual space include a character object such as a performer avatar that moves based on motion data, and a costume object such as a skirt that is placed to correspond to the character object. The distribution server computer 100 and the viewer terminal 300 each follow a stored program (e.g., a program stored in a non-transitory computer-readable storage medium) to perform the processing of displaying a costume object in motion in the mode corresponding to the motion of a character object that moves on the basis of the motion data, through a viewer viewpoint image generation process based on virtual space update data and a viewer's viewpoint image output process. At the timing when a series of actions in step S431 of FIG. 43 ends, or between songs, for example, this embodiment performs the process of transmitting a component reset signal in step S432 of FIG. 43 to reset the display state of the costume object to neutral. In this way, this embodiment performs the process of resetting the display state of the costume object to neutral at a specific timing when the amount of movement of the performer avatar becomes less than a predetermined amount. This enables the resetting at a timing that does not cause the viewer to feel extremely uncomfortable.

(5-2) In this embodiment, resetting the display state of a costume object to neutral includes performing physical calculations associated with the costume object (e.g., calculations such as collision detection and acceleration) from a predetermined initial state. This may include the calculations from an initial state rather than based on the results of a previous calculation. This enables physical calculations associated with linked objects from a predetermined initial state at a timing that does not cause the viewer to feel extremely uncomfortable.

(5-3) In this embodiment, the process of resetting the display state of the costume object to neutral in step S432 in FIG. 43 is executed when a series of actions in step S431 ends. For instance, in a live event in which performer avatar 1 as in FIG. 13 is appearing, this can be executed at any time of: the end of the first song, which is the first part sung by the performer avatar; the start of the second song, which is the second part; and between the end of the first song and the start of the second song. With this configuration, the timing at which the component reset processing is performed is between the first and second parts during the live event, and is a timing at which the amount of movement of the character object, the performer avatar, may be less than a predetermined amount. Therefore, even if resetting occurs, viewers do not feel extremely uncomfortable.

(6-1) In this embodiment, the distribution server computer 100 and the viewer terminal 300 each follow a stored program (e.g., a program stored in a non-transitory computer-readable storage medium) to, as described referring to FIGS. 40A and 40B, provide event content (including a live event provided on the scheduled date and content provided in the period before scheduled date when the live event is held) in spatial area ER5 during the first scheduled period, and enable re-provision of event content in the spatial area ER5 also during the second scheduled period after the first scheduled period has elapsed. As described in FIG. 40A, the display mode of the flower stand FS and others in the spatial area ER5 at the start of the second scheduled period will be taken over from the flower stand-related information in the first scheduled period so that the display mode will be a display mode according to the flower stand placement information for the first scheduled period (e.g., at the end of the scheduled period, at the end of the scheduled date, at the end of the period before the scheduled date), and the display mode of the flower stand FS exhibited in the spatial area ER5 and of the flower stand FS used in the stage effects of the live event in FIGS. 35A and 35B are changeable depending on user purchases during the second scheduled period. This increases the interest of users, who participated in the first scheduled period, to the event content in the second scheduled period. This allows users to change the display mode of flower stands FS within spatial area ER5 in the second scheduled period and share it among the users, which increases the users' interest in the event content in the second scheduled period, regardless of whether the user was a participant in the first scheduled period or not.

(6-2) In this embodiment, event content may be re-provided as described in FIGS. 40A and 40B: as described in FIG. 40B, the display mode of the flower stands FS and others within spatial area ER5 at the start of the second scheduled period is set to a predetermined display mode, such as an initial state, without taking over the flower stand placement information from the first scheduled period, and the display mode of the flower stands FS exhibited within spatial area ER5 and the flower stands FS used in the stage effects of the live event in FIGS. 35A and 35B are changeable depending on user purchases during the second schedule period. In this way, the display mode within a predetermined type of virtual space at the start of the second scheduled period may be set to a predetermined display mode. This allows a user, who participated in the first scheduled period, to participate in the event content in the second scheduled period with a fresh feeling, thereby increasing their interest in the event content.

(6-3) In this embodiment, a performer (e.g., performer avatars 1a to 1d in FIGS. 35A and 35B) who is leading the live event on the first and second scheduled dates is allowed to participate, as a participant avatar, in the event content during the second scheduled period described with reference to FIGS. 40A and 40B. The performer also is allowed to participate in the live event on the second scheduled date, and during the live event, the performer avatar on the virtual live stage as in FIGS. 35A and 35B and an avatar of the performer participating as a participant can be displayed in the virtual space. This provides a live event with an atmosphere and concept different from those of the first scheduled period, thereby increasing the interest in the live event.

(6-4) The avatar of the performer displayed as a participant on the second scheduled date is displayed in the form of the same simple avatar as a general user, and is displayed in a different mode from the performer avatar in a live event. This distinguishes between the avatar object of the performer as a participant and the avatar object as the performer, thus preventing confusion for the user.

(6-5) As described in steps S411 to S412 of the special sound/viewpoint switching process in FIG. 41, if the performer in the live event is participating also as a participant in the live event during the second scheduled period, setting of this embodiment may be changed so as to listen to the special voice emitted from the performer as a participant in response to the operation with the viewer terminal 300. This allows the user to listen to the voice emitted from the performer as a participant according to the user's intention, thereby increasing the interest to the event content such as live content, as well as increasing the variation in the way the user enjoys the live event.

(6-6) As described in steps S413 to S414 of the special sound/viewpoint switching process in FIG. 41, if the performer in the live event is participating also as a participant in the live event during the second scheduled period, setting of this embodiment may be changed so as to display an image of the avatar object of the performer as a participant from a predetermined viewpoint in response to the operation with the viewer terminal 300. This allows the user to switch to an image of the avatar object of the performer as a participant from a predetermined viewpoint according to the user's intention, thereby increasing the interest to the event content such as live content, as well as increasing the variation in the way the user enjoys the live event.

(6-7) In this embodiment, when event content is re-provided as in FIGS. 40A and 40B, the display mode of the performer avatar on the virtual live stage at the live event is the same between during the first scheduled period and during the second scheduled period, which is based on the motion data and the virtual space update data including information for displaying a costume of the performer on the first scheduled date. Meanwhile, the flower stands FS illustrated in FIGS. 35A and 35B, for example, used for the stage effects of the live event are changeable to the latest one based on user purchases and other actions in the second scheduled period. This allows the quality of the live event in the second scheduled period to be the same as that of the live event in the first scheduled period, while objects such as the flower stands FS for stage effects are displayed in the display mode in the second scheduled period, thereby increasing the interest in the live event in the second scheduled period.

(7-1) In this embodiment, the distribution server computer 100 and the viewer terminal 300 each follow a stored program (e.g., a program stored in a non-transitory computer-readable storage medium) to, as described in steps S423, S425 and S426 of the room entry special processing in FIG. 42B, perform the processing of associating a user with any one of a plurality of virtual-space providing sections, in response to a request to enter a virtual space by a user's logging in, entering a room by selecting content, or specifying a room to enter. Each room has a predetermined upper limit on the number of users that can be associated with it, for example 200. If a user who has requested entry is a non-specific user who does not meet certain conditions, such as a general user or a user who is not relevant to other users, the non-specific user is not allowed to enter a room where the number of associated users has reached the upper limit, and is not associated with. Rather, in step S426, the processing makes this user enter another room where the number of associated users has not reached the upper limit. In contrast, if the entry request is from a special user who satisfies specific conditions, that is, from a special user such as a talent account or a manager account, or a user who is relevant to other users, the process admits, in steps S421 to S423 and steps S424 to S425 of FIG. 42B, to associate the special user with a predetermined room regardless of whether the number of associated users has reached the upper limit. As a result, when a request for entry is made by a specific user, the restriction on entry to the virtual space set by the upper limit number can be exceptionally lifted, allowing the specific user to be associated with a predetermined room, thereby improving the convenience for the specific user.

(7-2) In step S423 of FIG. 42B of this embodiment, a room that a user is allowed to enter regardless of the upper limit on the number of users have a room ID that has been determined in advance by the manager. A specific user is associated with a predetermined room designated by the manager, making it easier to change the settings of the room designated by the manager, thereby reducing the processing load on the distribution server computer 100.

(7-3) In this embodiment, if a room ID is designated as described in step S422 of FIG. 42B, the entry request includes information on the designated room ID. This allows the user to be associated with the room designated by them, which reduces the processing load for allocating the user to any room and further improves the user's convenience.

(7-4) In this embodiment, a special user and a user who is relevant to another user is allowed to enter a room that is already associated with another user who is appearing in the same live content or who is relevant to the user, such as having a friendship relationship or a relationship with a degree of intimacy equal to or greater than a predetermined value. This allows the user to be associated with a predetermined room taking into account the relationship between users, making it easier for users to act and communicate within the same virtual space provided by the same room, and making it easier to enhance the atmosphere in the virtual space.

(7-5) In this embodiment, a special user in the processing of steps S421 to S423 in FIG. 42B includes a performer appearing in the live event as in FIGS. 35A and 35B, and such a performer is allowed to enter a predetermined room regardless of the room upper limit. This improves the convenience for the performer.

(7-6) In this embodiment, a special user in the processing of steps S421 to S423 in FIG. 42B, who is allowed to enter a predetermined room regardless of the room upper limit, includes a user who has the authority to operate a virtual camera and has the authority to output images taken in the virtual space to be displayable on other computers. This improves the convenience for the user having the authority to output.

Modified Examples

The following is a list of modification examples of the embodiment (including modifications and additions) described above with reference to FIG. 1 through FIG. 43. (Period Before Scheduled Date and Re-Provision of Content on Event)

The above embodiment refers to FIGS. 40A and 40B to describe an example of re-provision of event content in the second scheduled period. FIG. 40A illustrates an example of taking over the flower-stand related information in the first scheduled period to the second scheduled period, and FIG. 40B illustrates an example of not taking over the flower-stand related information in the first scheduled period to the second scheduled period. The present invention is not limited to this, and the information taken over to the second scheduled period may be different depending on whether or not the user participated in the event content during the first scheduled period. For instance, this may depend on whether or not a user participated in a live event that is the event content in the first scheduled period, or entered a virtual space such as spatial area ER5 where the event content is provided during the first scheduled period. Then, the flower-stand related information of the first scheduled period may not be taken over for the user who participated or entered, and the second scheduled period may start from an initial state different from the start of the first scheduled period. For a user who did not participate or enter during the first scheduled period, the second scheduled period may start from the same initial state as the first scheduled period. In this case, for a user who has purchased a flower stand FS during the first scheduled period, the information on the flower stand FS that they purchased may be taken over. (Replay Data)

The above embodiment refers to FIGS. 40A and 40B to describe an example of re-provision (replay) of event content in the second scheduled period. Re-provision of event content is not limited to being provided within a predetermined scheduled period, and may be provided in response to a request from a user at any timing. For instance, the distribution server computer 100 may store data on the event content (event data 111) provided in this embodiment so that it can be provided later to the user. The distribution server computer 100 may perform the process of, even after the event content has been provided, providing the data again upon a request from a user (e.g., an operation to purchase replay data, and view the data second time). For instance, while the event content is provided on the scheduled date, the distribution server computer 100 stores, in the storage 103, information to display images in the sub-area ER53' containing performer information such as animation data including motion data of the performer avatar and audio data (e.g., performer avatar information and performer audio distributed in FIG. 10) and that are in response to user operations, event flower stand information illustrated in FIGS. 36A and 36B, and item and stage-effects content information that can be configured in FIG. 39, as the replay data for the event data, and transmits it to the viewer terminal 300 of the user who made a request.

The event flower stand information includes the default information of FIG. 36A determined by lottery for each event content, and information on the flower stand FS purchased by the user who requested re-provision based on the user-related information of FIG. 27C. The item and stage-effects content information includes information that specifies the items to be given and the stage-effects content to be set by the event content-related processing in FIG. 39, in accordance with the number of entering times during the period before the scheduled date for the user who requested provision again.

Receiving the replay data, the viewer terminal 300 replays the data of the event content provided on the scheduled date based on the replay data at any timing selected by the user. The event content is replayed to have the display mode in accordance with the event occurs during the period before the scheduled date. To this end, the viewer terminal 300 specifies a flower stand having the same attribute and size as those of the user's purchased flower stand from among the flower stands specified from the received event flower stand information. The viewer terminal 300 then changes the specified flower stand to the flower stand purchased by the user, and provides stage effects for the event content. In other words, the display mode of the flower stands FS that can be displayed based on the replay data may be different from one user to another depending on their flower stand FS purchased during the period before the scheduled date. This allows the event content to be provided in the display mode that corresponds to the event that occurs in the period before the scheduled date even after the provision of the event content on the scheduled date, thereby increasing user's convenience and interest. Specifically, if a user who was unable to participate in the event content on the scheduled date, they are allowed participate in the event content even after the scheduled date, and if the user purchased a flower stand FS during the period before the scheduled date, they are able to experience the stage effects in accordance with the flower stand FS.

Also for replay of event content, the process related to the event content may be performed in accordance with the number of entering times, which is one example of the degree of displaying an image in the spatial area ER5 during the period before the scheduled date. To this end, the stage-effects content is set to be specified from the item and stage-effects content information that is received as the stage-effects content of the event content, for example, and the item specified from the received item and stage-effects content information is given so that the user can use during the replay event. That is, the display mode of event content based on replay data may be made different from one user to another in accordance with their number of entering times during the period before the scheduled date. This allows the event content to be provided in the display mode that corresponds to the degree that is the number of entering times in the period before the scheduled date, even after the provision of the event content on the scheduled date, thereby increasing user's convenience and interest. Also, the process is performed, which allows the user to use the item in accordance with the user's number of entering times during the period before the scheduled date from among the items available in the event content based on the replay data. This increases the convenience and interest of the user. (Right to Enter Spatial Area ER5)

The above embodiment describes an example, in which only a user who has the right (e.g., a ticket) to participate in the event content to be provided on the scheduled date is permitted to enter and participate in the spatial area ER5 during the period before the scheduled date. The present invention is not limited to this. Even if a user does not have the right to participate in the event content to be provided on the scheduled date, they may be permitted to enter spatial area ER5 during the period before the scheduled date and be able to act freely within spatial area ER5, such as purchasing flower stands FS and viewing the exhibition area. Although the user is not allowed to participate in the event content itself unless they have the right to participate (e.g., entry into the sub-area ER53' is restricted), they are allowed to enter the spatial area ER5 during the period before the scheduled date, and walk around and experience the spatial area ER5, for example. This increases the user's interest in the event content and motivates the user to acquire the right to participate in the event content. There is no right to participate in the event content, and any user who is able to participate in the virtual space ER may be able to participate in the event content on the scheduled date and may also be able to enter the spatial area ER5 in the period before the scheduled date.

(Display Balance of Flower Stand Attributes in Exhibition Area)

The above embodiment describes an example, in which the flower stands FS to be changed when the switching condition is met in step S202 of FIG. 32 are determined randomly by lottery. The present invention is not limited to this, and the flower stands FS to be exhibited in the spatial area ER5 may be determined by lottery so that the number of attributes associated with the flower stand FS is approximately equal among the attributes. As mentioned above, the attributes "cherry blossom," "demon," "white fox," and "black fox" are the attributes and colors associated with the performer avatars that appear as facilitator characters during the provision of event content. Assume the example, in which there are 80,000 positions within the spatial area ER5 where flower stands with the attributes "cherry blossom," "demon," "white fox," and "black fox" can be displayed. In this case, the number of positions where each attribute can be displayed is calculated to be 20,000. This means that when the switching condition is met, the flower stands FS may be changed by lottery so that 20,000 flower stands are determined for each attribute. That is, a flower stand FS has one of the motifs (attributes) associated with it, as shown in FIGS. 27A, 27B, and 27C, and the distribution server computer 100 and the viewer terminal 300 each may follow a stored program to perform the process of determining by lottery the default flower stands FS so that the number of attributes associated with the exhibited flower stands FS is approximately equal among the attributes. Thus, the flower stands of the four attributes may be approximately evenly exhibited in the entire spatial area ER5. This allows the attributes of the flower stands exhibited in the spatial area ER5 to be displayed in a well-balanced manner, preventing an excessive emphasis on any one attribute. Also focusing on each exhibition area, the number of attributes associated with the flower stands FS exhibited in one exhibition area may be substantially equal among the attributes. In other words, the number of the flower stands of the four attributes may be substantially equal for each exhibit area.

Exhibition areas with a predetermined upper limit may be provided in number corresponding to the number of attributes, and an attribute may be associated with each exhibition area; for instance, in the first exhibition area, flower stands may be determined by lottery from only those with the attribute "cherry blossom", in the second exhibition area, they may be determined by lottery from only those with the attribute "demon", in the third exhibition area, they may be determined by lottery from only those with the attribute "white fox", and in the fourth exhibition area, they may be determined by lottery from only those with the attribute "black fox." This allows the flower stands FS associated with each attribute (especially the attribute of the performer avatar appearing during the provision of event content) to be displayed in a well-balanced manner in the spatial area ER5. In addition, the user will browse the exhibition area of flower stands related to the attributes of their favorite performer avatar, so that they are allowed to efficiently browse the flower stands related to the attributes of the favorite performer avatar. The above describes an example, in which the number of only certain attributes (attributes "cherry blossom", "demon", "white fox", and "black fox") is substantially equal. The present invention is not limited to this, and all the attributes, including plain and gorgeous, may be substantially equal in number. Note that the flower stands FS purchased and placed by a user may increase the number of attributes associated with the flower stands FS purchased by the user in the virtual space. In this case, taking into consideration the attributes of the flower stands FS purchased by the user, a lottery may be conducted for each user so that the display balance can be substantially uniform among the attributes within the range of the upper limit of the flower stands FS that can be exhibited in the exhibition area (or in the spatial area ER).

The ratios that are determined by lottery and displayed may be predetermined for each attribute. For instance, the ratio of displaying the attribute "plain" shown in FIG. 27A in the spatial area ER5 may be 5%, while the ratio for "gorgeous" may be 15%, and those for "cherry blossom", "demon", "white fox", and "black fox" may each be 20%

(Probability of being Determined as Default Flower Stands)

The above embodiment describes an example, in which when the switching condition is met, the probability of being determined randomly by lottery at step S203 of FIG. 32 as default flower stands F is uniform among the flower stands FS. The present invention is not limited to this, and the probability of being determined as the default flower stands FS may be varied with a parameter specific to a flower stand FS, or a flower stand FS may not be selected as the default flower stands FS when the switching condition is met (e.g., it may be excluded from the target of lottery). Referring to FIG. 39, the following describes an example of changing the probability for each flower stand FS that is determined as default flower stands FS. Each user may be allowed to perform a like action or a report action on the flower stand FS associated with another user displayed in the spatial area ER5. The like action is to express favorable impressions, for example, operating an icon such as "Like" (heart mark) to indicate favorable impressions of another user's flower stand FS. The report action is to express the opinion that something to be displayed in the spatial area ER5 is inappropriate. For instance, this reports offensive words (comments) displayed on another user's flower stand FS to the management.

Figure 44:
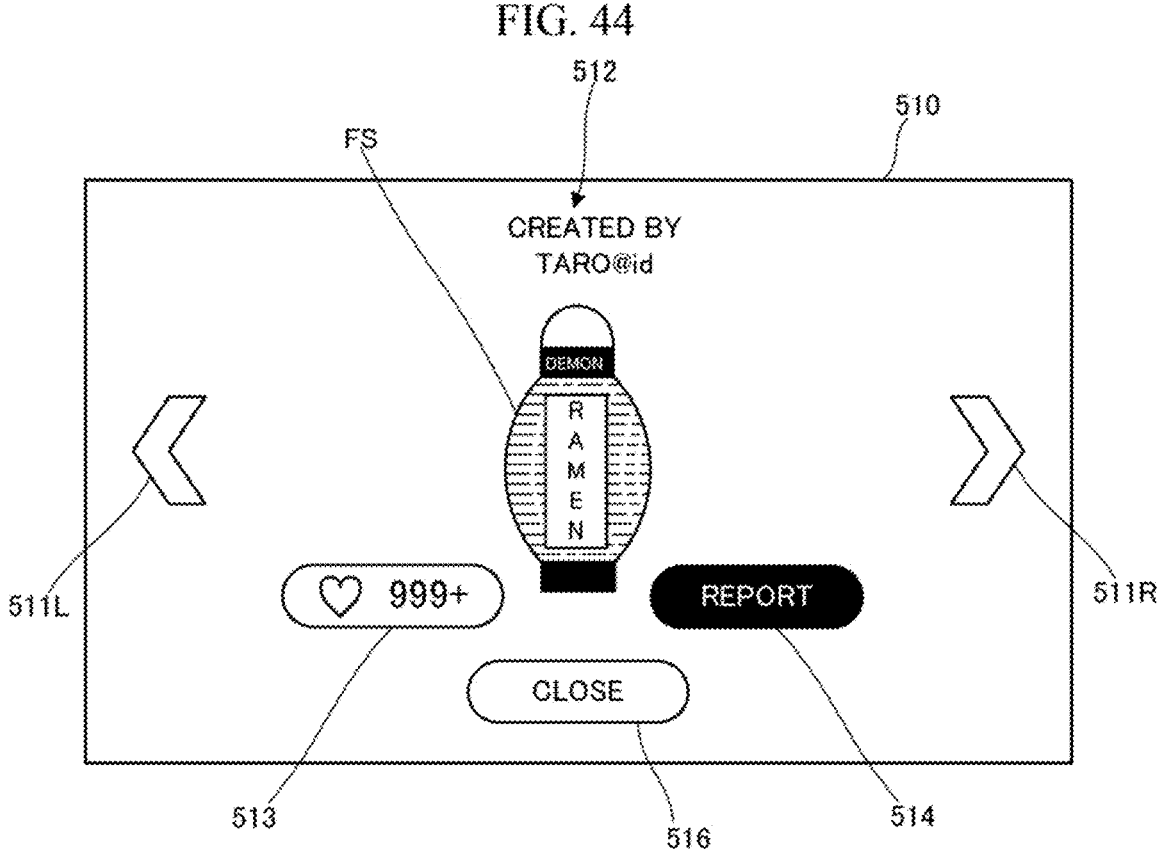
FIG. 44 shows an example screen with which a user performs an action on an object displayed in a predetermined type of virtual space according to one embodiment of the present invention.

FIG. 44 is an example of a close-up image 510 of a flower stand FS. The close-up image 510 is an image displayed on the display device 310, and is triggered by approaching or operating the flower stand FS exhibited in the exhibition area with the viewer terminal 300, for example. This image is displayed based on the information transmitted from the distribution server computer 100, and is capable of displaying the details of each flower stand FS. The close-up image 510 in FIG. 44 displays one of the flower stands FS placed within the exhibition area, and other flower stands FS within the exhibition area can be displayed by operating the left and right buttons 511 (511L, 511R). This close-up image 510 displays a like button 513 for a like action, a report button 514 for a report action, and a close button 516 to close the close-up image 510. The close-up image 510 also displays creator information 512 (user information) as the detailed information. This may motivate a user to take a like action, if the flower stand FS was purchased and created by a celebrity or friend's account. It may also motivate a user to take a like action toward a flower stand FS that has a funny or interesting message.

In response to the operation with the like button 513, the viewer terminal 300 transmits a like information to the distribution server computer 100, where the like information specifies the flower stand FS that is the target of the like action. Receiving the like information, the distribution server computer 100 updates and stores the number of likes (like history) of the flower stand FS as the target of the like action, among the flower stands FS stored in the object data 122. In response to the updating of the number of likes, the close-up image 510 adds one to the number of likes of the flower stand FS for updating and displays it.

The distribution server computer 100 may refer to the number of likes for each flower stand FS to determine the default flower stands FS to be exhibited by lottery when the switching condition is met, and may change the probability to choose the flower stands FS in accordance with the number of likes. For instance, if there are 1 million flower stands FS that are a target of the lottery, the probability of choice would normally be 1 in 1 million, but the probability of choice may be gradually increased with the number of likes. For instance, the probability may increase to 10/1 million if the number of likes is between 100 and 999, and to 100/1 million if the number of likes is between 1,000 and 2,999.

That is, the distribution server computer 100 and the viewer terminal 300 each follow a stored program to perform the process of receiving like information that specifies like actions from users to a flower stand FS, thus updating the like history for the flower stand FS and, based on the like history for each flower stand FS, adding the number of likes by 1 when displaying the flower stand FS, and making the flower stand FS to be more likely displayed as default flower stands. This provides the user with an interesting experience in that the display of the flower stand can be controlled based on the like history. This also provides the user with the fun of acquiring like actions, and also improves the user's interest because they can experience reactions from other users.

If there is any flower stand FS for which a restriction condition has been met, then the distribution server computer 100 may exclude this flower stand FS from the target of lottery in step S203 of FIG. 32. This restricts this flower stand FS from being chosen and exhibited as default flower stands FS (i.e., restricts the flower stand from being displayed to users other than the user having this flower stand FS). For instance, this restriction condition is met when the management checks the number of report actions and the text of the flower stand, and they determine that the flower stand should be non-displayed. When the user operates the report button 514, the viewer terminal 300 transmits report information to the distribution server computer 100 to identify the flower stand FS that is to be reported. Receiving this report information, the distribution server computer 100 updates and stores the number of reports (report history) of the flower stand FS that is to be reported among the flower stands FS stored in the object data 122. The restriction condition may be met when the management sets it to be non-displayed according to the updated number of reports, or the distribution server computer 100 may determine whether or not the number of reports has reached a predetermined number, and if it reaches the predetermined number, non-display setting may be made automatically and the condition may be met. This restricts any flower stand FS associated with another user for which the restriction condition is met from being determined as the default flower stand and displayed, thus preventing this flower stand FS from being exhibited in the exhibition area and providing a comfortable spatial area ER5 for users.

Even if there is any flower stand FS for which the restriction condition is met, the display device 310 of the user who purchased and has this flower stand FS may still display this flower stand continuously in the exhibition area within the spatial area ER5 (this may be called a "shadow-ban"). This prevents the user who purchased the flower stand FS from losing their interest, and also makes it difficult for the user to tell that the restriction condition is met for their flower stand FS. In addition to or instead of reporting, the viewer terminal 300 of the user who has reported about the flower stand may not display the flower stand even before the restriction condition is met. If there is any action of non-displaying, the distribution server computer 100 may accumulate the number of non-displaying, and when the number of non-displaying reaches a predetermined number, it may set not to display the flower stand for all users. If there is any action performed for non-displaying, the distribution server computer 100 and viewer terminal 300 each follow a stored program to determine by drawing another flower stand to be exhibited instead.

Note that the target of lottery in step S203 of FIG. 32 may include only the flower stands FS that have passed the screening to determine whether they contain taboo-word comments or inappropriate comments, and flower stands FS that are determined to contain such comments may be excluded from the target of lottery. For instance, the screening may be carried out by visual inspection by an administrator, and any flower stand FS that is determined to contain these comments may be flagged so that it is not eligible for the lottery; alternatively, the text may be extracted and the screening may be carried out automatically, and any flower stand FS that is determined inappropriate may be flagged as such. Not only in the lottery when the switching condition is met, but also in the lottery in step S301 of FIG. 37A, the probability of being determined as the default flower stands may vary with the parameter specific to the flower stand FS (e.g., the number of likes), or a flower stand FS for which the restriction condition is met may not be determined as default flower stands FS.

(Flower Stand Switching Process 2)

The above embodiment describes an example, in which the distribution server computer 100 executes the processes in steps S225 to S245 in FIG. 33. The present invention is not limited to this, and the viewer terminal 300 may execute these steps. For instance, after requesting information for displaying a flower stand FS to be placed in an exhibition area (e.g., information specifying the display mode) from the distribution server computer 100, the viewer terminal 300 may not receive the information for specifying the requested flower stand FS returned therefrom within a predetermined time. In this case, the viewer terminal 300 may perform the process of displaying a predetermined alternative flower stand FS in the virtual space placed in each exhibition area. Alternatively, the viewer terminal 300 may perform the process of displaying a predetermined alternative object that is different from the flower stand FS in the virtual space placed in each exhibition area. For instance, the viewer terminal 300 may receive, together with the virtual space update data, information for displaying an alternative object in advance from the distribution server computer 100. Alternatively, if information for specifying the updated flower stand FS is not returned from the distribution server computer 100, the viewer terminal 300 may request information for displaying an alternative object from the distribution server computer 100.

The above embodiment describes an example, in which if it is determined that a predetermined time has elapsed in step S235, the process specifies an alternative flower stand FS to be placed at the missing portion in step S245 and sends it to the viewer terminal 300 in step S205. The present invention is not limited to this. If the information on the flower stand FS cannot be received (specified) correctly after a predetermined period of time has elapsed since the flower stand (FS) information had been read from the database, the process may perform a random lottery to select a flower stand FS to replace the missing portion, and transmit the information to display the flower stand FS determined by the lottery to the viewer terminal 300. For instance, this may be applied if the processing burden on the distribution server computer 100 in some management methods of a database is lighter in conducting a random lottery by referring to a database that stores the object data 122 that is the target of the lottery and is refereed to update the flower stand placement information in step S213 (step S203 in FIG. 32), than reading out the flower stand placement information from a database that stores the updated flower stand placement information.

The above embodiment describes an example, in which an alternative flower stand is specified as an object to replace the flower stand FS read in step S215 of FIG. 33. The present invention is not limited to this, and the alternative object may be an object other than the one with a same mode of the flower stand FS, and may be an object that is not a flower stand FS. For instance, if the flower stand FS is a lantern object, a simple plain round three-dimensional model may be displayed in place of the lantern. Alternatively, this is not limited to the flower stand FS itself as shown in FIGS. 29A, 29B, 29C, and 29D, but a base object such as a framework for displaying the flower stand FS may also be replaced with a simple wooden object.

The present invention is not limited to the configuration of displaying an alternative object. If a predetermined time has elapsed in step S235, the process may transmit (distribute) information for displaying the spatial area ER to the viewer terminal 300, where the information is for displaying a virtual space including objects that must be displayed (e.g., a virtual stage G, which is a stage object), but not including any flower stands FS. For instance, the base object, such as a framework for displaying flower stands FS, may not be displayed. The virtual space in which no flower stands FS are displayed may continue: until the next switching condition (step S202 in FIG. 32 and FIG. 33) is met; until a predetermined time; or if the load on the distribution server computer 100 remains below a predetermined threshold value for a predetermined time. If the switching condition is met or the load falls below a threshold, an updated flower stand FS may be displayed in the virtual space that may be displayed on the viewer terminal 300.

The above embodiment describes an example, in which it is determined in step S235 that a predetermined time has elapsed since the reading of the flower stand placement information, the process identifies an alternative flower stand in step S245. The present invention is not limited to this. In step S235, if it is determined that a predetermined time has elapsed since the reading of the flower stand placement information, another determination may be added as to whether or not the essential objects have been read. If it is determined that the essential objects have been read, the process may transmit information for displaying the virtual space to the viewer terminal 300 even if information for displaying the flower stand FS has not been received correctly. In this case, an alternative object may be specified, or no alternative object may be displayed. If essential objects cannot be read (specified), the virtual space itself may not be displayed on the viewer terminal 300.

The above embodiment describes an example, in which the process of steps S225 through S245 in FIG. 33 is used to read the flower stand placement information. The information to read is not limited to the flower stand placement information, and the process may be used to read other types of information as long as a large amount of information is read out from a database. The above describes an example of this process used when a user enters a room. Instead of or in addition to this, the process similar to those of steps S225 through S245 may be performed following step S202 in FIG. 32, 33 when the switching condition is met. That is, if it is determined in step S202 that the switching condition is met, the flower stand to be exhibited in each exhibition area is randomly selected from among the flower stands FS that are the target of the lottery, and the flower stand placement information for each exhibition area in the object data 122 is updated (part of step S203, step S213). After this, it is determined whether the flower stand placement information (e.g., information specifying all the read flower stands FS that are displayable) has been updated correctly (corresponding to step S225). If correctly updated, the updated flower stand placement information is transmitted to the viewer terminal 300 of the user entering and participating in spatial area ER5 (part of step S203, step S223). In contrast, if it is not determined that all the flower stands have been updated, it is then determined whether or not a predetermined time has elapsed (corresponding to step S235), and if the predetermined time has not elapsed, the procedure shifts again to the step of determining whether or not the flower stand placement information has been updated correctly. If the predetermined time has elapsed, the flower stand placement information is updated to place a predetermined flower stand in the location that has not been updated (corresponding to step S245), and the updated flower stand placement information is transmitted to the viewer terminal 300 of the user entering and participating in spatial area ER5 (part of step S203, step S223). Note that the flower stand placement information is updated for all the users who have entered the room when the switching condition is met, and there is almost no possibility of a problem occurring such as an increase in the load on the distribution server computer 100 making it impossible to complete the process. However, the processing similar to steps S225 to S245 following step S202 makes it possible to deal with unforeseen circumstances.

(Event that Changes Display Mode in Virtual Space)

The above embodiment describes purchase and placement of a flower stand FS in response to user's operation that is an example of an event that changes the display mode in spatial area ER5 (the display mode of a flower stand FS in the exhibition area during the period before the scheduled date and of a flower stand FS that the performer avatar holds during the provision of event content). Specific objects used for an event that change the display mode in the virtual space are not limited to flower stand FS, and may be an object that imitates a light-emitting glow stick or a fan, or an object that can be placed (installed) within the spatial area ER5. Examples include an object that imitates flowers, a clock, a hedge, a fence, a signboard, or a notice-board within a shrine. The above describes an example of these specific object that is an object that the performer avatar can hold in their hand while the event content is being provided, and the specific object is not limited to this. They may be an object that a user avatar (viewer avatar) can use, or an object that can be placed (installed) within the spatial area (sub-area ER53') where the event content is provided.

Events that change the display mode within the virtual space are not limited to those that occurs due to the placement of specific objects. Instead of or in addition to this, various activities may be prepared within the spatial area ER5 and an event may occur depending on the result of activities played by the user during the period before the scheduled date. Such an activity may be playable for a limited period of time before the scheduled date (or until the event content is provided at the event time). Examples of the activity include a game, a mission, and a test of luck that are carried out within the spatial area ER5. For instance, they include the activities performed in the game area of FIGS. 24A and 24B, including a game that can be played in a short time, such as lottery games, search missions to find specified items, and tests of luck such as fortune telling and offerings. Depending on the results of the games, search missions, and tests of luck during the period before the scheduled date, certain right (benefit) may be associated with the user who experienced the activity, where the right (benefit) includes granting of the above-mentioned flower stand FS or the items shown in FIG. 38, or a change in the stage effects when the event content is provided. The items acquired as a result of the activity may be saved in an item box, for example. For instance, the right (benefit) is not limited to objects, and may include voice data of the performer avatar. Depending on the results of the games, search missions, and tests of luck during the period before the scheduled date, the display mode within the spatial area ER5 may be changed on the display terminal 300 of the user who experienced the activity. In this way, experiences of various activities may be prepared in the predetermined type of virtual space where the event content is provided in the period before the scheduled date. This generates an event in the virtual space in the period before the scheduled date and thus enhances the mood of users until the scheduled date when the event content is provided.

Events that change the display mode within the virtual space are not limited to those that occur in response to operations from the user. Instead or in addition, they may be the events that occur when the user is in the virtual space and the occurrence condition is met, regardless of operations from the user. For example, an event may occur when a user who has entered spatial area ER5 is given a specific object after a predetermined time has passed since entering and the user places the object within spatial area ER5, or the event may occur when a predetermined time has passed since entering, or an event may occur for a user who has entered spatial area ER5 and wins a random lottery, for example, at predetermined time intervals (it is not considered an event has occurred for users who do not win the lottery).

(Target of Display Mode Change During Period Before Scheduled Date in Accordance with Event that has Occurred)

The above embodiment describes an example in which the display mode of a flower stand FS placed in the exhibition area in the spatial area ER5 during the period before the scheduled date changes in accordance with an event that occurs during the period. The target of change is not limited to this, as long as they may be in the spatial area ER5. For instance, the target of change in accordance with an event occurs during the period before the scheduled date may be the type or number of objects such as buildings and ornaments placed within the spatial area ER5 during the period, the positions of buildings and ornaments placed within the spatial area ER5 during the period, or the number of areas in the spatial area ER5 during the period (e.g., a sub-area ER54 connected to the sub-area ER51 may be added, making it possible for the user to enter the sub-area ER54). Note that, in this case, only sub-areas ER51 and ER52 among the multiple sub-areas in spatial area ER5 may be subject to the change, and the display mode of sub-area ER53, which is associated with the area where event content is provided, may not be changed in accordance with an event. Also in this configuration, the display mode will change only on the viewer terminal 300 of the user who generated the event during the period before the scheduled date. This means that the display mode may be different from that for other users in accordance with the events that they generated during the period.

(Target of Display Mode Change During Provision of Event in Accordance with Event that has Occurred)

The above embodiment describes an example in which the display mode of the flower stand that the performer avatar holds in their hand, which is one of the stage effects during the provision of event content, changes in accordance with the event occurs during the period before the scheduled date. The target of change is not limited to this, as long as they may be in the spatial area ER5. For instance, the target of change in accordance with an event occurring during the period before the scheduled date may be a costume object of the performer avatar, as illustrated by the "secret costume" stage effect that is set at the seventh entry in FIG. 38. The target of change in accordance with an event that occurs during the period before the scheduled date may be display of the name of a user who purchased a flower stand FS during the period before the scheduled date in the ending credits at the end of the event content. In this case, the users may be displayed in order of the amount of purchases by them or the number of purchases made by them, and the size of the user name displayed in the ending credits may vary with the amount of purchases or the number of purchases (the larger the amount of purchases by them or the number of purchases, the larger the size of the user name displayed). The target of change in accordance with an event that occurs during the period before the scheduled date may be a stage effect of displaying a large number of flower stands FS in the virtual live venue. For instance, flower stands FS in large quantities, which will double in number all the flower stands FS purchased by users during the period before the scheduled date (for users who have not purchased, the default flower stands FS will be displayed), are made float like jet balloons. This makes the event content have a more exciting stage effect. Also in this configuration, the display mode will change only on the viewer terminal 300 of the user who generated the event during the period before the scheduled date. This means that the display mode may be different from that for other users in accordance with the events that they generated during the period.

(Degree of Displaying an Image in a Predetermined Type of Virtual Space During Period Before the Scheduled Date)

The above embodiment describes an example of the degree of performing the event content related process that is the number of entering times into the spatial area ER5 where the event content may be held on the scheduled date. The present invention is not limited to this, and the degree may be the time spent in the spatial area ER5, the ratio of the number of days spent in the spatial area ER5 to the number of days before the scheduled date, the ratio of the time spent in spatial area ER5 to the total time of the period before the scheduled date, the ratio of the number of entering times into the spatial area ER5 or the time spent there to the number of entering times into the virtual space ER or the time spent there during the period before the scheduled date, the length of time taken from the previous entry to the current entry during the period before the scheduled date.

(Event Content Related Process in Accordance with Degree of Displaying)

The above embodiment describes an example, as shown in the stage effects of FIG. 38, of the process to change the display mode in the spatial area ER5 according to the degree, and the stage effects such as images of a live venue set and costumes of performer avatars are changed. The target of the process of changing the display mode in the spatial area ER5 according to degree is not limited to this. For instance, the name of a user who entered the area during the period before the scheduled date may be displayed in the ending credits at the end of the event content. In this case, the users may be displayed in the descending order of the number of entering times, and the size of user name displayed in the ending credits may vary with their number of entering times (the larger the number of entering times, the larger the size of user name displayed). It may be a stage effect of displaying a large number of flower stands FS in the virtual live venue. For instance, flower stands FS in number corresponding to the number of entering times (for users who have purchased, the purchased flower stands FS, while for users who have not purchased, the default flower stands FS) are made float like jet balloons. In this way, the display mode of stage effects and jet balloons may be changed in a different manner from one user to another. This means that the display mode on the viewer terminal 300 may be different from one user to another in accordance with their degree. For another stage effect, a room with a different display mode may be associated with each number of entering times, and the type of room set may be different with the number of entering times (e.g., there are several different types of special rooms with different display modes, and event content is provided in a special room according to the number of entering times). For another stage effect, a costume of performer avatar in a different display mode may be associated with each number of entering times, so that a different type of costume (display mode) can be set for each number of entering times.

The above embodiment describes an example of a target of the process to change the display mode in the spatial area ER5 in accordance with the degree. In this example, an item that a user can use during the event content is given as an object in accordance with the degree, as shown with the items of FIG. 38. The target of an object given in accordance with the degree is not limited to this, and may be an object that imitates a light-emitting glow stick or a fan, or an object that can be installed within the spatial area ER5. Examples include an object that imitates flowers, a clock, a hedge, a fence, a signboard, or a notice-board within a shrine. The object may be the one that the performer avatar can hold in their hand while the event content is being provided, may be the one object that a user avatar or viewer avatar can use, or may be the one that can be installed within the spatial area (sub-area ER53') where the event content is provided.

(Display Mode Transition of Specific Object in Virtual Space)

In the above embodiment, the flower stand switching process illustrated in FIG. 29A through FIG. 32 is not limited to the process that is performed during the period related to the event content to be provided on the scheduled date. The process may be applied to the case where a specific object associated with a user or a specific object associated with another user is placeable in a virtual space, regardless of whether or not there is event content to be provided on the scheduled date. For instance, a virtual space may be provided, where creative content (e.g., art, derivative works, in-game works, links to original virtual spaces (e.g., where user-created buildings exist)) created by a user and creative content created by another user can be shared and displayed, and the flower stand switching process illustrated in FIG. 29A through FIG. 32 may be executed in such a virtual space. Thereby, the creative content created by another user may be displayed by switching when the switching condition is met. This allows users to view and experience the creative content created by various users without prior knowledge, thus increasing interest in the virtual space. Note that the objects placed in the exhibition area in response to the operation with the viewer terminal 300 of the user may include an object with pre-determined designs that the user is not allowed to edit (to edit the content). This allows the user to view their own specific object at any time even when the number of specific objects that can be placed and displayed in the virtual space is limited, thereby enhancing the user's satisfaction. Meanwhile, this allows the specific objects associated with other users to be displayed evenly in the virtual space, and changes the display mode of the virtual space to enhance the user's interest, and reflects a large number of specific objects appropriately.

(Area to Place Specific Objects)

The above embodiment describes an example in FIGS. 27A, 27B, and 27C, where flower stands FS, which are an example of the specific objects, have determined areas to be placed in accordance with their sizes. The flower stands FS have several types of attributes defined as well as sizes. Therefore, the areas of placing the flower stands FS may be determined differently for each attribute of the flower stands FS, instead of or in addition to the size of the flower stands FS. This further enhances the sense of unity for each area.

(Another Form of Data Transmitted to Viewer Terminals)

The above embodiment describes an example of transmitting the default flower stand information (step S205 in FIG. 32, step S302 in FIG. 37A) in the flower stand switching process of FIG. 32 and the event flower stand determination process of FIGS. 37A and 37B, and information for specifying the flower stand FS associated with each user based on the user-related information of FIG. 27C (step S207 of FIG. 32, step S303 of FIG. 37A) to the user, and rewriting the flower stand information used in the exhibition area and for the stage effects of the event content on the viewer terminal 300. The present invention is not limited to this, and the distribution server computer 100 may transmit, to each user, default flower stand information that is updated for each user based on FIG. 27C. That is, the distribution server computer 100 may generate and transmit different information for each user according to the user's flower stand FS, and the viewer terminal 300 may display the flower stand FS corresponding to the user based on the information.

(Items that can be Used During the Provision of Event Content)

As illustrated in FIG. 38, the above embodiment describes an example of the items (objects) that can be used during the provision of event content, including crackers, fireworks, glow sticks, and stamps. These items, whether used or not, may be displayed in the virtual space ER, for example, in a room of a house built by the user. Alternatively, these items may be displayed as a memento in an item box displayed in the virtual space ER even after it has been used. This allows users to keep the limited items and other items corresponding to the event content provided (held) as memories, increasing their attachment to the event content.

(Other Effects on Event Content from Events Occurred in the Period Before Scheduled Date)

The above embodiment describes a change in display mode of a specific object that is an example of the display mode that changes in the virtual space during the provision of event content in accordance with an event that occurs in the predetermined type of virtual space during the period before the scheduled date. The present invention is not limited to this. For instance, a user who purchased a flower stand FS during the period before the scheduled date and places it within the spatial area ER5 may be given a certain right (privilege) in accordance with the purchase amount or the number purchased (number of placement). For instance, the certain right (privilege) may be the right to extend the time of the event content provided (e.g., the right to participate in a talk after the event), the right to watch the event content live from a dedicated virtual camera that the user can operate, or the right to participate in a special area.

(Example of Scheduled Date)

The above embodiment describes an example of the event content that is distributed (provided) at the scheduled time on the scheduled date (predetermined date and time) according to the event data. For instance, the scheduled date may be the entire date on which a live event is scheduled to be held (e.g., from midnight to 23:59 on April 5th), or a period of several days (e.g., from 9:00 on May 1st to 21:00 on May 5th). The event content may be scheduled for a period of several days and may be comprehensive event content where multiple pieces of content (e.g., live events, talk shows) are provided (e.g., festival events over several days). In this case, the display mode in a predetermined type of virtual space that provides the multiple pieces of content may change in accordance with an event that occurs during the period before the scheduled date for each of the multiple pieces of content to be provided during the comprehensive event content.

(Period Before the Scheduled Date)

The above embodiment describes an example of the period before the scheduled date that is the period until the day before the scheduled date when the event content is provided. The period before the scheduled date is not limited to this as long as it is any period before the event content is provided. For instance, it may be two days or a predetermined number of days before the scheduled date, or it may be a timing during the scheduled date when the event content is provided, including one hour, 10 minutes or 1 minute before the scheduled time. For instance, the display mode in a predetermined type of virtual space may change in accordance with an event that occurs in the predetermined type of virtual space up to several hours before the event content is provided. For instance, a flower stand FS purchased by a user up to two hours before the start of a live event in the spatial area ER5 (e.g., 7 PM) can be displayed in the spatial area ER5, and the purchased flower stand FS may be used in the stage effects during the live event shown in FIGS. 35A and 35B.

(Portal P)

The above embodiment describes an example in which when it is a specific period of time before the scheduled date of the event content, and thus the open condition is met, the transition to the sub-area ER53' is allowed via portal P in FIG. 24B. For instance, this portal P may appear in front of the great gate object 53c in the sub-area ER52 when it is a specific period before the scheduled date (the day before the scheduled date during the period before the scheduled date) (when the open condition is met). Alternatively, the portal P may exist prior to the specific period (e.g., prior to the day before the scheduled date), but may not function as the portal P to allow the transition to another area until it is the timing at the specific period before the scheduled date (e.g., on the day before the scheduled date). When returning to the sub-area ER52 after transitioning to the sub-area ER53', the user avatar U may be able to transition to the sub-area ER52 via the portal P close to the sub-area ER53' in FIG. 24B, for example, so that the user avatar U is allowed to move back and forth between the first virtual space and the second virtual space.

The above embodiment describes an example in which a user who has been in sub-area ER53 is moved out of sub-area ER53 a specific period before the scheduled date (the day before the scheduled date) (e.g., user avatar U is forcibly moved out of sub-area ER53). The present invention is not limited to the case where all users are moved out of sub-area ER53 without exception a specific period of time before. It may control so that a user who is in a predetermined state is moved out of sub-area ER53 (an image of the virtual space other than sub-area ER53 is displayed) after the termination condition is met. For instance, a user whose flower stand FS is displayed in the exhibition area within sub-area ER53 (e.g., displaying the screen of FIG. 44) may be considered to be in the predetermined state, and when the display of screen such as FIG. 44 ends, the termination condition may be met and the user may be moved out of sub-region ER53.

(Open Condition and Specific Period)

The present embodiment describes an example in which the open condition is met when it is a specified period before the scheduled date when the event content is provided, and describes the day before the scheduled event date that is an example of the specified period. The specific period before the scheduled date when the open condition is met is not limited to this, and may be a period of two days or a specific number of days before the scheduled date. The specific period is not limited to a period related to the number of days or time. For instance, it may be a period after the timing when the number of users who have entered the spatial area ER5 reaches a specified number, or a period after the timing set by the management taking into consideration the situation.

(Second Virtual Space after Event Content Ends)

The above embodiment describes an example of the event content that is provided in sub-area ER53', which shares the same display mode as sub-area ER53. This sub-area ER53' may be set so that a user avatar U is not allowed to enter after the event content ends or after a predetermined time has elapsed since the end of the event content. For instance, if a live event is held in sub-area ER53' and 30 minutes have passed since the live event ended, a user avatar U still existing in area sub-ER53' may be forcibly transitioned (moved) out of sub-area ER53' (e.g., moved in front of the great gate object 53c in sub-area ER52 with a blackout effect). The sub-area ER53' may be managed by a server supporting heavy loads of the event content provided. In this case, this configuration prevents the server being used more than necessary, and enabling cost reduction. After a predetermined amount of time has elapsed (e.g., until 30 minutes or one hour has passed) since the end of the event content provision, the user avatar U may be moved. This provides time for the user to feel the lingering effects of the event.

Sub-area ER53 has been inaccessible since the specified period before the scheduled date when the event content is provided. This sub-area ER53 will be accessible again after the provision of event content ends. For instance, when sub-area ER53' becomes inaccessible (e.g., 30 minutes after the end of a live event), the portal P leading to sub-area ER53' disappears, making it impossible to move to sub-area ER53', and the virtual space (sub-areas ER51, ER52, ER53) before the specific period returns to the state in which seamless movement therebetween is possible (the gate of the great gate object 53c leading to sub-area ER53 is open). Even if a specific period has elapsed since the end of the event content, portal P may not be displayed in sub-area ER52 to a user who left sub-area ER53'. For instance, the gate of the great gate object 53c leading to sub-area ER53 may be opened to the user.

(Event Venue after Event Content Ends)

The above embodiment describes an example in which sub-area ER53 has a stage and others (e.g., virtual stages G, G2) displayed in the same manner as the virtual live venue of FIG. 13 and FIGS. 35A and 35B that is constructed in sub-area ER53', and reflects the virtual live venue that is gradually constructed during the period before the scheduled date. In addition to or instead of this, after the event content ends, the virtual live venue in sub-area ER53 may appear in a completed state in which the event content has been provided. For instance, it may be in an unfinished mode before the event content is provided, but after the event content ends, it may display the objects at the venue where the live event was held, such as in FIGS. 35A and 35B. This allows users to feel the lingering effects of the event content even after the event content has ended. The objects of the virtual live venue may not be displayed in sub-area ER53 during the period before the scheduled date, and data may be distributed to users every predetermined time to display the state of gradually increasing venue objects in sub-area ER53' between the specific period before the time of the event and the event starting time. That is, the venue objects are not placed (displayed) in sub-area ER53, and the venue objects are placed (displayed) only in sub-area ER53'.

(Example of Switching for Specific Objects in Exhibition Area)

The above embodiment describes, as illustrated in FIG. 29D and FIG. 30D, an example in which when the default flower stands FS for exhibition area A, which are determined by lottery and stored when the switching condition is met, happens to include the flower stand FS1 purchased by user 1 at position A6 in the exhibition area A, priority is given to the user related information in FIG. 27C and flower stand FS1 is continuously displayed at position A1 on user 1's display device 310 as shown in FIG. 29D, and the flower stand FS at position A6 is changed to the flower stand FS that was determined by default at position A1. The present invention is not limited to this, and if the default flower stands FS include flower stand FS1 purchased by user 1, the flower stands FS determined by default may be displayed (i.e., the flower stand FS1 purchased by user 1 is displayed at position A6 determined by default). Also, while continuing to display the flower stand FS1 at position A1, the flower stand FS1 may also be displayed at position A6 that has been determined as the default. This allows the user to view the flower stand FS at multiple positions that they have purchased, thereby improving the user's satisfaction.

The above embodiment describes, in step S203 of FIG. 32, an example of determining default flower stands FS for each exhibition area randomly by lottery from among all the flower stands FS that are a target of the lottery. In this case, the flower stands FS that are a target of the lottery include a flower stand FS that was determined as the default flower stand FS and was on display before the switching, and thus as shown in FIG. 29C, the flower stand FS with the letter G that was displayed before the switching may by chance be displayed also after the switching. In another embodiment, if the same flower stand FS happens to be chosen both before and after the switching, then lottery was conducted again for the flower stand FS in question so as not to display the same flower stand FS before and after the switching, and the table of the default flower stand information in the object data 122 of FIG. 31A and FIG. 31B may be updated. Alternatively, the flower stand FS that was determined and exhibited as the default flower stand FS before the switching may be excluded from the lottery target, and after the switching, all the flower stands FS may be changed to different ones from those before the switching.

The above embodiment describes an example, in which a determination is made in step S101 of FIG. 28 whether or not it is a purchasable period before the scheduled date at the time of purchase of a flower stand FS, and a determination is made in step S201 of FIG. 32 whether or not it is a displayable period before the scheduled date for the flower stand FS. These purchasable period and displayable period may or may not coincide with each other. For instance, the purchasable period may be set as from seven days to four days before the scheduled date, and the displayable period of the flower stand FS purchased during the purchasable period may be set as from three days to the day before the scheduled date.

(Display Mode of Avatar for Each Content)

The above embodiment describes an example, in which a performer avatar (e.g., human-shaped avatar in FIG. 13) who leads the live event is different from a general user avatar (e.g., having a simple shape such as a circle, square, and triangle, as exemplified in (special sound/viewpoint switching process) in FIG. 41), and an example, in which a performer's avatar is the same as a general user's avatar when they enter the virtual space as a participant like other general users. These display modes of avatars may differ depending on the content and area provided within the virtual space (e.g., the display mode of avatars for general users, performers as participants, and performers as facilitators may be set for each content and area). For instance, the avatar of a general user may be a simple avatar only in a specific area of the virtual space, and in other spaces, a general user also may be a human-shaped avatar, similar to a performer avatar during live event. The specific area includes a space in which a large amount of stage effects is required, such as in sub-area ER53' in FIGS. 24A and 24B where a live event is held, and the processing load is heavy. In a space where the processing load is heavy, general users other than the performer avatar appearing on the virtual stage G may be rendered as simple avatars. In the case of live content, attention is focused on the stage effects for live performance rather than on the display mode of general users' avatars. Therefore, avatars of general users may be simple avatars, whereby more computer resources can be used for the live performance, which allows the users to enjoy the performance.

In a virtual space (such as a room) or a private space where content with a low processing load, such as chat, is provided, a general user also may be displayed as a human-shaped avatar. This allows, when a fan meeting with a performer avatar is held, both the performer and the general users are displayed in human shape, which makes it easier for them to feel closer and become more comfortable with each other.

Even in an area (room) where a live event is provided and general users are displayed as simple avatars, the display of a general user there may be switched to a human-shaped avatar that is the same as the performer if a certain condition is met. The condition may be met when an authorized user or a manager performs an operation to allow the avatar to be displayed as a human-shaped avatar, or when a simple avatar of a user who has been given permission to be displayed as a human-shaped avatar or a user who has moved to a specified area may be switched to display as a human-shaped avatar. The authorized users include users with authority such as a room creator, and a performer. The use's movement to the specified area includes their movement from the virtual audience area (audience seat) to the virtual stage G, for example. This movement to the specified area may be allowed when permission is given by an authorized user or the manager.

(Special Processing for Room Entry)

In the above-described embodiment, an example is described referring to FIGS. 42A and 42B, in which when a user enters any room in the virtual space, the use is allowed to enter a room that is automatically specified in step S425 or step S426 if they do not designate any room. The present invention is not limited to this, and the user may enter any room by designating a room. For instance, after logging in to a virtual space, a selection screen for a room to enter may be displayed. In this case, the congestion status of each room according to the number of people the room accommodates (e.g., using words such as comfortable, crowded, and full) may be displayed, and each room may be displayed in a manner that allows the user to recognize a room in which a relevant user or a special user have entered. This allows the user to designate the room where the relevant user has entered, and even if the maximum number of users has been reached (i.e., the room is full), the user may be able to enter the room even if the maximum number of users has been exceeded, as long as the relevant user is in the room. A second maximum number of users may be defined when a user enters the same room with their relevant user. For instance, the original upper limit for the number of people is 200, and if relevant users are allowed to enter the room, the upper limit may be set to 220.

In addition, users in number already exceeding the upper limit may be in a room through the processing in steps S424 to S425. Then, even if it is determined in step S424 that another user whose relevant user is in this room, this user may not be allowed to enter the room, and may be associated with another room for entry. The other room may be a room in which their relevant user has entered, other than a room that has been subjected to the process in steps S424 and S425.

The above embodiment describes an example, in which, if it is determined in step S421 of FIG. 42B that a special user has entered the room, the process allows the special user to enter the designated room, if any room is designated in step S422, regardless of the room upper limit. The present invention is not limited to this. Even if it is determined in step S422 that no room has been designated, a special user, if they request an entry to a room, is allowed to enter the room predetermined by the manager, for example, regardless of the maximum number of people in the room.

Referring to FIG. 42B, the above embodiment describes an example, in which a user may be allowed in step S425 to enter a room where their relevant user has already entered, regardless of the maximum number of users in the room. If the relevant user has already entered the room in this way, and if multiple relevant users request to enter the same room within a predetermined period (e.g., within five or ten minutes after the first user enters the room), these relevant users may be allowed to enter the room regardless of the maximum number of users. In addition, if a plurality of special users such as talents designate the same room and request an entry within a predetermined period, they may be allowed to enter this room regardless of the upper limit on the number of users. This allows them to meet up intentionally at the same entry time and hold an event or activity in the same room.

(Component Resetting of Performer's Human-Shaped Avatar)

The above embodiment describes an example, in which the component resetting in FIG. 43 resets the component of a swinging object, such as a costume object, which is displayed in a motion corresponding to a character object. The present invention is not limited to this. Not only the components (parameters) that operate and display the costume object but also the components that operate and display the corresponding character object may also be reset.

Referring to FIG. 43, the above embodiment describes an example, in which the distribution server computer 100 determines whether or not a series of actions by the performer avatar has ended. The present invention is not limited to this, and the viewer terminal 300 may determine, based on a program for viewer, whether or not it is the timing when a series of actions by the performer avatar has ended (e.g., whether the amount of movement of the performer avatar has fallen below a predetermined amount, or whether the volume of sound generated in the virtual space including the sound from the performer avatar has fallen below a predetermined amount), and may perform the process of resetting the components.

The above embodiment describes an example, in which it is determined in step S431 of FIG. 43 whether or not it is the timing when a series of actions has ended, and then a component reset signal is transmitted in step S432. The present invention is not limited to this, and the virtual space update data distributed to a viewer terminal 300 may include a component reset signal in advance so as to match the timing between songs of the playback music.

The above embodiment describes an example, in which, in the component reset processing of FIG. 43, it is determined whether or not a series of actions has ended based on the motion of the performer avatar. The present invention is not limited to this, and the determination on the timing between songs may be made based on the state (e.g., volume and rhythm) of the waveform of sound delivered by the generated sound distribution process of FIG. 10. In this way, the timing may be such that the performer avatar does not perform any major movements (e.g., not singing or dancing).

[Addendum 1]

A system is known, which provides a virtual space to users via a network and enables them to interact with other users in the virtual space.

In such a known system, a server distributes data including motion data of a character to generate a virtual space, and a user terminal generates the virtual space and displays the character in motion in the virtual space. The user terminal also performs physical calculations so that a costume object of the character moves corresponding to the motion of the character (see JP 2003-103047, for example).

Physical calculations, however, depend on the performance and processing power of the user terminal. The reception environment for data distributed from the server depends on the communication speed of the communication environment that the user terminal uses. That is, even if the character's motion speed and range are large, a user terminal with high performance and processing power enables calculations at a speed such that the character motion and the costume object corresponding to the character's motion are in a desirable mode, allowing the costume object and other objects to be displayed in an appropriate manner corresponding to the character's motion in the virtual space. A user terminal with low performance and processing power, however, may cause an abnormal display mode of the costume object relative to the character due to the low physical calculation speed. If the motion speed and range of the character are large, such a case is likely to occur. Whether it is in an abnormal display mode depends on the user terminal. Thus, the server is not able to identify whether or not the costume object or other object moves in an abnormal manner. The server therefore is not able to output a signal to reset the abnormal mode at the appropriate time.

In views of the above, the present invention provides a method and a system that are capable of resetting an abnormal display mode of an object at an appropriate timing.

(1) A computer control method according to one aspect of the present invention controls a computer (e.g., distribution server computer 100 and viewer terminal 300) that is configured to provide a virtual space to a user, and objects placed in the virtual space include: a first object (e.g., character object) that is movable in the virtual space; and a second object (e.g., costume object such as a skirt) that is placed to correspond to the first object, the method including:

performing processing of displaying the first object in motion and displaying the second object in motion corresponding to the motion of the first object (e.g., viewer viewpoint image generation process based on virtual space update data, and viewer's viewpoint image output process); and performing processing (e.g., transmitting a component reset signal in step S432 of FIG. 43) of resetting a display state of the second object to neutral at a specific timing (e.g., a timing when a series of actions ends in step S431 of FIG. 43, and between songs) when the amount of motion of the first object may become less than a predetermined amount.

This configuration resets the display state of the second object to neutral at a specific timing when the amount of motion of the first object may become less than a predetermined amount. This enables resetting at the timing so that viewers do not feel extremely uncomfortable.

(2) In the above (1), the first object is an avatar object that moves corresponding to the motion of a performer (e.g., performer avatar 1 in FIG. 13), the second object is a costume object (e.g., a skirt or hair that is displayed in swaying motion) that moves in conjunction with the motion of the avatar object, and resetting the display state of the second object to neutral includes performing physical calculations associated with the costume object from a predetermined initial state (e.g., the calculations from an initial state rather than based on the results of a previous calculation).

This configuration enables physical calculations associated with linked objects from a predetermined initial state at a timing that does not cause the viewer to feel extremely uncomfortable.

(3) In the above (2), the virtual space is for holding a live event in which the avatar object is a main object (e.g., a space for holding a live event in which the performer avatar 1 appears as in FIG. 13), the live event includes a first part (e.g., a first song, and a first attraction) in which a first action is performed by the avatar object, and a second part (e.g., a second song, and a second attraction) in which a second action is performed by the avatar object following the first part, and the specific timing is any one of an end timing of the first part, a start timing of the second part, and a timing between the end of the first part and the start of the second part.

With this configuration, the specific timing is between the first and second parts during the live event, and is a timing at which the amount of movement of the avatar object may be less than a predetermined amount. Therefore, even if resetting occurs, viewers do not feel extremely uncomfortable.

(4) In the above (3), the first part is a part for singing a first song at the live event, and the second part is a part for singing a second song at the live event.

With this configuration, the specific timing is between the first and second songs during the live event, and is a timing when attention of the viewers to the avatar object is relatively low. Therefore, even if resetting occurs, the viewers do not feel extremely uncomfortable.

(5) In the above (1), the computer is a distribution device (e.g., a distribution server computer 100) that distributes information for providing the virtual space to a user terminal, and the processing of resetting includes transmitting reset instruction information to reset the display state of the second object to neutral on the user terminal (e.g., step S432 in FIG. 43) that is a process of resetting the display state of the second object to neutral.

According to this configuration, the distribution device voluntarily sends the reset instruction information at a timing that does not cause the viewer to feel excessive discomfort even if the resetting occurs, thereby resetting the display state of the second object on the user terminal.

(6) In the above (1), the computer is a user terminal (e.g., a viewer terminal 300) that displays a virtual space provided, and the method further includes a determination step of specifying an amount of motion of the first object and determining whether or not the amount of motion is less than the predetermined amount and thus it is a specific timing (see, for example, (Component resetting of performer's human-shaped avatar) in Modified Examples).

This configuration allows a determination with the user terminal on the specific timing that is the timing when the amount of motion of the first object may be less than a predetermined amount, and thus allows the user terminal to reset the display state of the second object voluntarily at a timing that does not cause the viewer to feel extremely uncomfortable even if the resetting occurs.

(7) A system according to one aspect of the present invention includes a computer (e.g., distribution server computer 100 and viewer terminal 300) that is config-
ured to provide a virtual space to a user, the system
including the computer including a processor and a memory, objects placed in the virtual space including: a first object
(e.g., character object) that is movable in the virtual
space; and a second object (e.g., costume object such as
a skirt) that is placed to correspond to the first object, the processor being configured to perform processing of:
displaying the first object in motion and displaying the
second object in motion corresponding to the motion of
the first object (e.g., viewer viewpoint image genera-
tion process based on virtual space update data, and
viewer's viewpoint image output process); and performing processing (e.g., transmitting a component
reset signal in step S432 of FIG. 43) of resetting a
display state of the second object to neutral at a specific
timing (e.g., a timing when a series of actions ends in
step S431 of FIG. 43, and between songs) when the
amount of motion of the first object may become less
than a predetermined amount.

This configuration resets the display state of the second
object to neutral at a specific timing when the amount of
motion of the first object may become less than a predeter-
mined amount. This enables resetting at the timing so that
viewers do not feel extremely uncomfortable.

[Addendum 2]

For instance, JP 2012-120098 A discloses a distribution
system that distributes content via a network, and allows a
performer to hold a live event such as a live performance in
a virtual space on the web, while allowing a viewer to
operate a viewer avatar (to move, give gifts, perform social
tipping, and perform other actions) so that the viewer is able
to participate in the live event.

The distribution system described in JP 2012-120098 A is
configured to allow performers and viewers to generate an
event while the live event is being held, thus livening up the
live event and raising the participant's awareness of the
participation. This enhances their interest in the live event.
However, once the live event has ended, this live event is not
resumed, and the space created by the performers, viewers
and others cannot be reused and is not utilized. Even if the
live event could simply be resumed, it may not be able to
enhance the interest of the performers, viewers, and others
who participated in the previous live event.

In view of the above, the present invention provides a
method and a system that are capable of re-providing a live
event while increasing the interest of users who participated
in the live event.

(1) A computer control method according to one aspect of
the present invention controls a computer (e.g., distri-
bution server computer 100 and viewer terminal 300)
that is configured to provide a virtual space to a user,
and the method includes:

a displaying step of displaying an image in a generated
virtual space, the image being in accordance with an
operation by the user (e.g., a virtual space update data
distribution process, a viewer's viewpoint image output
process);

a generating step of generating an event in the virtual
space (e.g., a process of placing an object purchased in
response to a purchase operation by a user in the virtual
space (a virtual space update data generation process),
a process of placing and updating the purchased object
in the virtual space based on the virtual space update
data (a virtual space update process)); and a providing step of providing event content in a prede-
termined type of virtual space (e.g., in spatial area ER5)
of the virtual space in a first scheduled period (e.g.,
virtual space update data distribution process using
event data 111, viewer's viewpoint image output pro-
cess), wherein during the first scheduled period, the generating step
enables generation of an event in the predetermined
type of virtual space, the displaying step displays an
image in the predetermined type of virtual space in
response to an operation by the user (e.g., the user is
allowed to enter the spatial area ER5 and view a
displayed image in spatial area ER5), and changes a
display mode in the predetermined type of virtual space
in accordance with an event generated in the predeter-
mined type of virtual space (e.g., placing a flower stand
FS purchased by the user in spatial area ER5 in steps
S107 to S109 of FIG. 28, choosing a flower stand FS by
lottery to be exhibited in spatial area ER5 in step S203
of FIG. 32, changing settings performed in response to
an operation by the manager, such as the display mode
of a flower stand FS used for stage effects of a live
event shown in FIGS. 34A, 34B, 34C, and 34D, the
display mode being changeable in response to user
purchasing in FIGS. 37A and 37B), the method includes a re-providing step of re-providing
event content in the predetermined type of virtual space
also in a second scheduled period after the first sched-
uled period has elapsed (e.g., the virtual space update
data distribution process using event data 111, viewer's
viewpoint image output process, see FIGS. 40A and
40B), and the displaying step sets so that the display mode in the
predetermined type of virtual space at the start of the
second scheduled period is a display mode in accor-
dance with the event generated in the first scheduled
period, and may change the display mode in the pre-
determined type of virtual space according to an event
generated in the predetermined type of virtual space
during the second scheduled period (e.g., see FIG.
40A).

This configuration allows users to share the display mode
in the predetermined type of virtual space in which event
content is to be provided, the display mode being changeable
in accordance with an event generated in the predetermined
type of virtual space in the first scheduled period, thereby
increasing the interest in the event content. This also enables
re-provision of event content also in the second scheduled
period, where the display mode in the predetermined type of
virtual space at the start of the second scheduled period may
be set to a display mode in accordance with the event
generated in the first scheduled period. This increases the
interest of a user, who participated in the first scheduled
period, to the event content in the second scheduled period.
This also changes the display mode in the predetermined
type of virtual space in accordance with the event generated
in the predetermined type of virtual space in the second
scheduled period, and allows users to share the display
mode. This increases the users' interest in the event content
in the second scheduled period, regardless of whether the
user participated in the first scheduled period or not.

(2) A computer control method according to one aspect of
the present invention controls a computer (e.g., distri-
bution server computer 100 and viewer terminal 300)
that is configured to provide a virtual space to a user,
and the method includes:

a displaying step of displaying an image in a generated virtual space, the image being in accordance with an operation by the user (e.g., a virtual space update data distribution process, a viewer's viewpoint image output process);

a generating step of generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and a providing step of providing event content in a predetermined type of virtual space (e.g., in spatial area ER5) of the virtual space on a first scheduled period (e.g., virtual space update data distribution process using event data 111, viewer's viewpoint image output process), wherein during the first scheduled period, the generating step enables generation of an event in the predetermined type of virtual space, the displaying step displays an image in the predetermined type of virtual space in response to an operation by the user (e.g., the user is allowed to enter the spatial area ER5 and view a displayed image in spatial area ER5), and changes a display mode in the predetermined type of virtual space in accordance with an event generated in the predetermined type of virtual space (e.g., placing a flower stand FS purchased by the user in spatial area ER5 in steps S107 to S109 of FIG. 28, choosing a flower stand FS by lottery to be exhibited in spatial area ER5 in step S203 of FIG. 32, changing settings performed in response to an operation by the manager, such as the display mode of a flower stand FS used for stage effects of a live event shown in FIGS. 34A, 34B, 34C, and 34D, the display mode being changeable in response to user purchasing in FIGS. 37A and 37B), the method includes a re-providing step of re-providing event content in the predetermined type of virtual space also in a second scheduled period after the first scheduled period has elapsed (e.g., the virtual space update data distribution process using event data 111, viewer's viewpoint image output process, see FIGS. 40A and 40B), and the displaying step sets so that the display mode in the predetermined type of virtual space at the start of the second scheduled period is a predetermined display mode regardless of an event generated in the first scheduled period, and may change the display mode in the predetermined type of virtual space according to the event generated in the predetermined type of virtual space during the second scheduled period (e.g., see FIG. 40B).

This configuration allows users to share the display mode in the predetermined type of virtual space in which event content is to be provided, the display mode being changeable in accordance with an event generated in the predetermined type of virtual space in the first scheduled period, thereby increasing the interest in the event content. This also enables re-provision of event content also in the second scheduled period, where the display mode in the predetermined type of virtual space at the start of the second scheduled period may be set to a predetermined display mode. This allows a user, who participated in the first scheduled period, to participate in the event content in the second scheduled period with a fresh feeling, thereby increasing their interest in the event content. This also changes the display mode in the predetermined type of virtual space in accordance with the event generated in the predetermined type of virtual space in the second scheduled period, and allows users to share the display mode. This increases the users' interest in the event content in the second scheduled period, regardless of whether the user participated in the first scheduled period or not.

(3) A computer control method according to one aspect of the present invention controls a computer (e.g., distribution server computer 100 and viewer terminal 300) that is configured to provide a virtual space to a user, and the method includes:

a displaying step of displaying an image in a generated virtual space, the image being in accordance with an operation by the user (e.g., a virtual space update data distribution process, a viewer's viewpoint image output process);

a generating step of generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and a providing step of providing event content in a predetermined type of virtual space (e.g., in spatial area ER5) of the virtual space on a first scheduled period (e.g., virtual space update data distribution process using event data 111, viewer's viewpoint image output process), wherein during the first scheduled period, the generating step enables generation of an event in the predetermined type of virtual space, the displaying step displays an image in the predetermined type of virtual space in response to an operation by the user (e.g., the user is allowed to enter the spatial area ER5 and view a displayed image in spatial area ER5), and changes a display mode in the predetermined type of virtual space in accordance with an event generated in the predetermined type of virtual space, the method includes a re-providing step of re-providing event content in the predetermined type of virtual space also in a second scheduled period after the first scheduled period has elapsed (e.g., the virtual space update data distribution process using event data 111, viewer's viewpoint image output process, see FIGS. 40A and 40B), and the displaying step sets so that the display mode in the predetermined type of virtual space at the start of the second scheduled period is a display mode that is different depending on whether or not the user participated in the event content during the first scheduled period, and may change the display mode in the predetermined type of virtual space according to the event generated in the predetermined type of virtual space during the second scheduled period (e.g., see (Period before scheduled date and re-provision of content on event) in Modified Examples).

This configuration allows users to share the display mode in the predetermined type of virtual space in which event content is to be provided, the display mode being changeable in accordance with an event generated in the predetermined type of virtual space, thereby increasing the interest in the event content. This also enables re-provision of event content also in the second scheduled period, where the display mode in the predetermined type of virtual space at the start of the second scheduled period may be a display mode that is different depending on whether or not the user participated in the event content during the first scheduled period. This gives a user a special and different feeling depending on whether or not they participated in the first scheduled period, and thus increases the interest in the event content in the second scheduled period. This also changes the display mode in the predetermined type of virtual space in accordance with the event generated in the predetermined type of virtual space in the second scheduled period, and allows users to share the display mode. This increases the users' interest in the event content in the second scheduled period, regardless of whether the user participated in the first scheduled period or not.

(4) In any of (1) to (3) above, the event content during the first scheduled period and the second scheduled period includes specific content that progresses with an avatar object that moves in accordance with a motion of a specific performer (e.g., a live event that progresses with performer avatars 1a to 1d in FIGS. 35A and 35B), a user including the specific performer is allowed to participate in the specific content during the second scheduled period, and when the specific performer participates in the specific content in the second scheduled period, the displaying step may display an avatar object of the participating specific performer as a participant in a predetermined type of virtual space in the specific content in the second scheduled period, apart from an avatar object of the specific performer in the first scheduled period (e.g., the performer avatar on the virtual live stage and the avatar of the performer participating as a participant are displayable).

This configuration displays an avatar object as a specific performer and an avatar object of the specific performer that is a participant who has participated separately from the avatar object as the performer within the predetermined type of virtual space in the specific content for the second scheduled period, making it possible to provide the specific content with a different atmosphere and style from the specific content in the first scheduled period, thereby increasing interest in the specific content.

(5) In the above (4), an avatar object of the specific performer as a participant that is displayable in a predetermined type of virtual space in the specific content during the second scheduled period has a display mode different from an avatar object of the specific performer (e.g., an avatar of the performer can be displayed as a general user, separately from the performer avatar on the virtual live stage).

This configuration distinguishes between the avatar object of the specific performer as a participant and the avatar object as the specific performer in the predetermined type of virtual space, thus preventing confusion for the user.

(6) In the above (4), the computer is a user terminal (e.g., a viewer terminal 300) that displays a virtual space provided, and the method includes, when the specific performer is participating in the specific content for the second scheduled period, a step of changing sound from the user terminal to sound emitted from the specific performer as a participant, in response to an operation with the user terminal (e.g., steps S411 to S412 for special sound/viewpoint switching process in FIG. 41).

This configuration allows a user to change the setting so as to listen to sound emitted from the specific performer as a participant as the user intends, thereby increasing the interest to the specific content, as well as increasing the variation in the way the user enjoys the content.

(7) In the above (4), the computer is a user terminal (e.g., a viewer terminal 300) that displays a virtual space provided, and the displaying step changes, when the specific performer is participating in the specific content during the second scheduled period, an image displayed in the predetermined type of virtual space in the specific content to an image of an avatar object of the specific performer as a participant viewed from a specified viewpoint in response to an operation with the user terminal (e.g., steps S413 to S414 of the special sound/viewpoint switching process in FIG. 41).

This configuration allows the user to switch to an image of the avatar object of the specific performer as a participant from a predetermined viewpoint according to the user's intention, thereby increasing the interest to the event content, as well as increasing the variation in the way the user enjoys the event content.

(8) In the above (1), the event content during the first scheduled period and the second scheduled period includes specific content that progresses with an avatar object that moves in accordance with a motion of a specific performer (e.g., a live event as in FIGS. 35A and 35B), of objects in the predetermined type of virtual space in the specific content during the second scheduled period, the displaying step displays the avatar object in a same display mode as the specific content during the first scheduled period (e.g., the performer avatar on the virtual live stage is in the same display mode as the first scheduled period), and the displaying step displays a predetermined object different from the avatar object in a display mode different from the specific content during the first scheduled period (e.g., a flower stand FS used for stage effects in the live event is displayed in accordance with the user's purchase information during the second scheduled period).

This configuration allows the quality of the specific content in the second scheduled period to be the same as that of the specific content in the first scheduled period, while the predetermined object is displayed in the display mode in the second scheduled period, thereby increasing the interest in the specific content in the second scheduled period.

(9) In any of the above (1) to (3), the display mode in the predetermined type of virtual space that is changeable in accordance with an event that occurs in the second scheduled period may be different from the display mode displayed for another user in accordance with an event that occurs in the second scheduled period (e.g., the user 1's purchased flower stand FS1 will be displayed at the predetermined position A1 in the predetermined exhibition area A in the spatial area ER5 on the viewer terminal 300 of user 1 as in FIG. 29B through FIG. 29D. Meanwhile, viewer terminal 300 of user 2 does not display the flower stand FS1 purchased by user 1 at the predetermined position A1 in the predetermined display area A, as shown in FIG. 30B and FIG. 30C.)

This configuration enables customization of the display mode for each user in the predetermined type of virtual space during the scheduled period, thus giving each user a special feeling.

(10) In any of the above (1) to (3), the event content during the first scheduled period and the second scheduled period includes specific content (e.g., a live event as in 35 FIGS. 35A and 35B) that is provided from a predetermined timing of the first scheduled period to the end of the first scheduled period, and the displaying step changes the display mode (e.g., the display mode of the flower stand FS that is used for stage effects of the live event shown in FIG. 35 FIGS. 35A and 35B) in the predetermined type of virtual space during provision of specific content that corresponds to the specific content during the second scheduled period, in accordance with an event that occurs from the start of the second scheduled period to the timing that corresponds to the predetermined timing of the second scheduled period (e.g., step S303 in FIG. 37A, step S313 and step S314 in FIG. 37B).

This configuration draws the user's attention to how the display mode changes in the predetermined type of virtual space during provision of the specific content, in accordance with an event that occurs up to the predetermined timing.

(11) In the above (10), the display mode (e.g., the display mode of a flower stand FS used for stage effects of the live event shown in FIGS. 34A, 34B, 34C, and 34D) in the predetermined type of virtual space that is changeable during provision of the specific content during the second scheduled period may be different from the display mode for another user in accordance with an event that occurs from the start of the second scheduled period to the timing that corresponds to the predetermined timing of the second scheduled period (e.g., flower stands FS to be used for stage effects can be default flower stands FS in FIG. 36A or they can be flower stands in FIG. 36B in accordance with the user related information in FIG. 27C).

This configuration enables customization of the display mode for each user in the predetermined type of virtual space during the provision of specific content, thus giving each user a special feeling.

(12) In any of the above (1) to (3), the display mode in the predetermined type of virtual space to be changed by the displaying step during the second scheduled period includes the display mode of a specific object placed in the predetermined type of virtual space (e.g., a flower stand FS placed in the exhibition area in spatial area ER5), and an event that changes the display mode in the predetermined type of virtual space includes an event that places the specific object in a designated area in the predetermined type of virtual space during the second scheduled period, the specific object being associated with the user (e.g., an event that places the flower stand FS purchased by the user in the predetermined exhibition area A as shown in FIG. 29B, where the information on the flower stand FS purchased by the user is associated with the user as user related information in FIG. 27C).

This configuration places a specific object associated with the user in the area designated by the user during the scheduled period, and thus changes the display mode in the predetermined type of virtual space, thereby increasing the user's interest.

(13) In the above (1), the event content during the first scheduled period includes specific content (e.g., a live event as in FIGS. 35A and 35B) that is provided from a predetermined timing of the first scheduled period to the end of the first scheduled period, the display mode in the predetermined type of virtual space that is changed by the displaying step includes the display mode of a specific object (e.g., flower stands FS held by performer avatars 1a to 1d in FIGS. 35A and 35B and a management avatar) that is displayed corresponding to a facilitator character (e.g., performer avatars 1a to 1d in FIGS. 35A and 35B), the facilitator character facilitating the specific content and being displayed and acting in the predetermined type of virtual space while the event content is being provided, and the display mode of the specific object in the specific content during the second scheduled period is changeable from the display mode of the specific object in the specific content during the first scheduled period in accordance with an event that occurs in the predetermined type of virtual space during the second scheduled period (e.g., the latest flower stand (the last purchased flower stand) for each user may be displayed in association with the performer avatar).

This configuration allows the display mode of a specific object, which can be displayed corresponding to the facilitator character, to change in accordance with the event that occurs during the second scheduled period, thus increasing the user's interest due to such an event.

(14) In the above (1), the event content during the first scheduled period includes specific content (e.g., a live event as in FIGS. 35A and 35B) that is provided from a predetermined timing of the first scheduled period to the end of the first scheduled period, the displaying step provides specific content, which is to be provided after the start of the second scheduled time, and from a timing corresponding to the predetermined timing of the second scheduled time to the end of the second scheduled time, to a user who meets a predetermined condition (e.g., purchasing a ticket to participate in the event content), the displaying step allows a user, regardless of whether the user meets the predetermined condition, to view a displayed image in the predetermined type of virtual space during the period up to the timing corresponding to the predetermined timing (e.g., a user is allowed to enter spatial area ER5, regardless of whether the user has purchased a ticket to participate in the event content. See (Right to enter spatial area ER5) in (Modified Examples)).

This configuration allows a user who does not meet the predetermined condition also to view a displayed image in the predetermined type of virtual space. This increases interest in the specific content when the user views images in the predetermined type of virtual space, thereby improving the user's motivation to meet the predetermined condition.

(15) A system (virtual space content distribution system) according to one aspect of the present invention includes a computer (e.g., distribution server computer 100 and viewer terminal 300) that is configured to perform a process of providing a virtual space to a user, the system including the computer including a processor and a memory, the processor being configured to perform process of displaying an image in a generated virtual space, the image being in accordance with an operation by the user (e.g., a virtual space update data distribution process, a viewer's viewpoint image output process);

generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and providing event content in a predetermined type of virtual space (e.g., in spatial area ER5) of the virtual space in a first scheduled period (e.g., virtual space update data distribution process using event data 111, viewer's viewpoint image output process), wherein during the first scheduled period, an event in the predetermined type of virtual space is generated, an image is displayed in the predetermined type of virtual space in response to an operation by the user (e.g., the user is allowed to enter the spatial area ER5 and view a displayed image in spatial area ER5), and a display mode is changed in the predetermined type of virtual space in accordance with an event generated in the predetermined type of virtual space (e.g., placing a flower stand FS purchased by the user in spatial area ER5 in steps S107 to S109 of FIG. 28, choosing a flower stand FS by lottery to be exhibited in spatial area ER5 in step S203 of FIG. 32, changing settings performed in response to an operation by the manager, such as the display mode of a flower stand FS used for stage effects of a live event shown in FIGS. 34A, 34B, 34C, and 34D, the display mode being changeable in response to user purchasing in FIGS. 37A and 37B), event content is re-provided in the predetermined type of virtual space also in a second scheduled period after the first scheduled period has elapsed (e.g., the virtual space update data distribution process using event data 111, viewer's viewpoint image output process, see FIGS. 40A and 40B), and the display mode in the predetermined type of virtual space at the start of the second scheduled period is a display mode in accordance with the event generated in the first scheduled period, and the display mode in the predetermined type of virtual space is changeable according to the event generated in the predetermined type of virtual space during the second scheduled period (e.g., see FIG. 40A).

This configuration allows users to share the display mode in the predetermined type of virtual space in which event content is to be provided, the display mode being changeable in accordance with an event generated in the predetermined type of virtual space in the first scheduled period, thereby increasing the interest in the event content. This also enables re-provision of event content also in the second scheduled period, where the display mode in the predetermined type of virtual space at the start of the second scheduled period may be set to a display mode in accordance with the event generated in the first scheduled period. This increases the interest of a user, who participated in the first scheduled period, to the event content in the second scheduled period. This also changes the display mode in the predetermined type of virtual space in accordance with the event generated in the predetermined type of virtual space in the second scheduled period, and allows users to share the display mode. This increases the users' interest in the event content in the second scheduled period, regardless of whether the user participated in the first scheduled period or not.

(16) A system (virtual space content distribution system) according to one aspect of the present invention includes a computer (e.g., distribution server computer

100 and viewer terminal 300) that is configured to perform a process of providing a virtual space to a user, the system including the computer including a processor and a memory, the processor being configured to perform process of displaying an image in a generated virtual space, the image being in accordance with an operation by the user (e.g., a virtual space update data distribution process, a viewer's viewpoint image output process);

generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and providing event content in a predetermined type of virtual space (e.g., in spatial area ER5) of the virtual space in a first scheduled period (e.g., virtual space update data distribution process using event data 111, viewer's viewpoint image output process), wherein during the first scheduled period, an event in the predetermined type of virtual space is generated, an image is displayed in the predetermined type of virtual space in response to an operation by the user (e.g., the user is allowed to enter the spatial area ER5 and view a displayed image in spatial area ER5), and a display mode is changed in the predetermined type of virtual space in accordance with an event generated in the predetermined type of virtual space (e.g., placing a flower stand FS purchased by the user in spatial area ER5 in steps S107 to S109 of FIG. 28, choosing a flower stand FS by lottery to be exhibited in spatial area ER5 in step S203 of FIG. 32, changing settings performed in response to an operation by the manager, such as the display mode of a flower stand FS used for stage effects of a live event shown in FIGS. 34A, 34B, 34C, and 34D, the display mode being changeable in response to user purchasing in FIGS. 37A and 37B), event content is re-provided in the predetermined type of virtual space also in a second scheduled period after the first scheduled period has elapsed (e.g., the virtual space update data distribution process using event data 111, viewer's viewpoint image output process, see FIGS. 40A and 40B), and the display mode in the predetermined type of virtual space at the start of the second scheduled period is a predetermined display mode regardless of an event generated in the first scheduled period, and the display mode in the predetermined type of virtual space is changeable according to the event generated in the predetermined type of virtual space during the second scheduled period (e.g., see FIG. 40B).

This configuration allows users to share the display mode in the predetermined type of virtual space in which event content is to be provided, the display mode being changeable in accordance with an event generated in the predetermined type of virtual space in the first scheduled period, thereby increasing the interest in the event content. This also enables re-provision of event content also in the second scheduled period, where the display mode in the predetermined type of virtual space at the start of the second scheduled period may be set to a predetermined display mode. This allows a user, who participated in the first scheduled period, to participate in the event content in the second scheduled period with a fresh feeling, thereby increasing their interest in the event content. This also changes the display mode in the predetermined type of virtual space in accordance with the event generated in the predetermined type of virtual space in the second scheduled period, and allows users to share the display mode. This increases the users' interest in the event content in the second scheduled period, regardless of whether the user participated in the first scheduled period or not.

(17) A system (virtual space content distribution system) according to one aspect of the present invention includes a computer (e.g., distribution server computer 100 and viewer terminal 300) that is configured to provide a virtual space to a user, the system including the computer including a processor and a memory, the processor being configured to perform process of displaying an image in a generated virtual space, the image being in accordance with an operation by the user (e.g., a virtual space update data distribution process, a viewer's viewpoint image output process);

generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and providing event content in a predetermined type of virtual space (e.g., in spatial area ER5) of the virtual space in a first scheduled period (e.g., virtual space update data distribution process using event data 111, viewer's viewpoint image output process), wherein during the first scheduled period, an event is generated in the predetermined type of virtual space, an image is displayed in the predetermined type of virtual space in response to an operation by the user (e.g., the user is allowed to enter the spatial area ER5 and view a displayed image in spatial area ER5), and a display mode is changeable in the predetermined type of virtual space in accordance with an event generated in the predetermined type of virtual space, event content is re-provided in the predetermined type of virtual space also in a second scheduled period after the first scheduled period has elapsed (e.g., the virtual space update data distribution process using event data 111, viewer's viewpoint image output process, see FIGS. 40A and 40B), and the displaying step sets so that the display mode in the predetermined type of virtual space at the start of the second scheduled period is a display mode that is different depending on whether or not the user participated in the event content during the first scheduled period, and may change the display mode in the predetermined type of virtual space according to the event generated in the predetermined type of virtual space during the second scheduled period (e.g., see (Period before scheduled date and re-provision of content on event) in Modified Examples).

This configuration allows users to share the display mode in the predetermined type of virtual space in which event content is to be provided, the display mode being changeable in accordance with an event generated in the predetermined type of virtual space in the first scheduled period, thereby increasing the interest in the event content. This also enables re-provision of event content also in the second scheduled period, where the display mode in the predetermined type of virtual space at the start of the second scheduled period may be made different depending on whether or not the user participated in the event content during the first scheduled period. This gives a user a special and different feeling depending on whether or not they participated in the first scheduled period, and thus increases the interest in the event content in the second scheduled period. This also changes the display mode in the predetermined type of virtual space in accordance with the event generated in the predetermined type of virtual space in the second scheduled period, and allows users to share the display mode. This increases the users' interest in the event content in the second scheduled period, regardless of whether the user participated in the first scheduled period or not.

[Addendum 3]

A system is known, which provides a virtual space to users via a network and enables them to interact with other users in the virtual space.

Some of such systems have an upper limit set on the number of users who are allowed to enter the virtual space due to the factors such as the processing power of the server that provides the virtual space. Other systems have an upper limit set on the number of users that are allowed to enter a room, regardless of the factors such as the processing power of the server (see, for example, JP 2017-055790 A).

Conventional systems, which consider the server's processing power, typically set the upper limit with a margin so that the server's processing power will not be affected even if the upper limit is reached. However, if the limit is reached, the system uniformly restricts the entry to the virtual space. Meanwhile, to liven up the atmosphere of a live event in a virtual space, a plurality of talents and celebrities may wish to enter the same room, or a user may wish to enter the same virtual space because another user in a friend relationship has already entered there. Conventional systems fail to deal with these situations if the upper limit number is reached.

In views of the above, the present invention provides a method and a system that make restrictions on the upper limit of the number of users of entry into a virtual space variable as the situation demands.

(1) A method according to one aspect of the present invention controls a computer (e.g., distribution server computer 100) that controls a plurality of virtual-space providing sections (e.g., rooms corresponding to spatial areas ER1*a* to ER1*d* in FIG. 12, a plurality of rooms each constituting a virtual space in FIG. 42A) that provides a virtual space to a user, and the method includes:

in response to a request (e.g., logging in, entering room by selecting content, or designating a room to enter) for entry into the virtual space from a user, an associating step of associating the user with one of the plurality of virtual-space providing sections (e.g., steps S423, S425, and S426 of the room entry special processing in FIG. 42B), the plurality of virtual-space providing sections each having a predetermined upper limit (e.g., 200 users) for the number of users to accommodate, the users including a non-specific user who does not meet specific conditions (e.g., general users, users who are not relevant to other users) and specific users who meet the specific conditions (e.g., talent accounts and manager accounts and users who are relevant to other users), the associating step, in response to an entry request from the non-specific user, does not allow the non-specific user to be associated with a virtual-space providing section whose number of associated users has reached the predetermine number (e.g., NO in step S421 or S424 of FIG. 42B), while, in response to an entry request from the specific user, allows the specific user to be associated with a predetermined virtual-space providing section, regardless of whether the number of associated users has reached the predetermined number (e.g., steps S421 to S423 and steps S424 to S425 of FIG. 42B).

With this configuration, if an entry request is from a specific user, the restriction on entry to the virtual space set by the upper limit number is exceptionally lifted, and the specific user is allowed to be associated with a predetermined virtual-space providing section, thereby improving convenience for the specific user.

(2) In the above (1), the predetermined virtual-space providing section (e.g., a room corresponding to spatial areas ER1a to ER1d in FIG. 12, and multiple rooms each constituting a virtual space in FIG. 42A) is one (e.g., a room with a predetermined room ID) of the plurality of virtual-space providing sections, and is designated by a manager who manages the provision of the virtual spaces so that the virtual-space providing section can be associated with the specific user upon receiving an entry request from the specific user, regardless of whether the predetermined number has been reached or not.

This configuration associates a specific user with a virtual-space providing section designated by the manager, thereby reducing the processing load.

(3) In the above (1), the entry request from the specific user includes designation information for designating the virtual-space providing section to enter (e.g., the designation of the room ID in step S422 of FIG. 42B), and the predetermined virtual-space providing section is among the plurality of virtual-space providing sections, and is designated on the basis of designation information included in an entry request from the specific user.

This configuration associates a specific user with a virtual-space providing section designated by the specific user, thereby reducing the processing load, and also further improving the convenience of the specific user.

(4) In the above (3), when accepting requests to enter a same virtual-space providing section from multiple specific users within a specified period of time, the associating step associates the multiple specific users with the same virtual-space providing section (e.g., allowing them to enter the same room where the specific user has already entered; see (Special processing for room entry) in Modified Examples).

With this configuration, these specific users may set the same entry time intentionally, which allows them to be associated with the same virtual-space providing section. As a result, this configuration allows these specific users, who set the same entry time intentionally, to act in the virtual space provided by the same virtual-space providing section, thereby further improving the convenience of multiple specific users.

(5) In the above (1), the predetermined virtual-space providing section is associated with another specific user who is relevant to the specific user requesting entry (e.g., users appearing in the same live content, users having a relationship where the degree of intimacy exceeds a predetermined value).

This configuration allows a specific user to be associated with a virtual-space providing section, taking into account the relationship between the specific users, making it easier for them to act and communicate within the same virtual space that is provided by the same virtual-space providing section, and making it easier to enhance the atmosphere in the virtual space.

(6) In the above (1), the specific user includes a performer who facilitates content in the virtual space (e.g., a performer appearing as a performer in a live event such as in FIGS. 35A and 35B).

This configuration improves the convenience for the performer.

(7) In the above (1), the specific user includes a user who has authority to output images taken in the virtual space to be displayable on other computers (e.g., a user authorized to operate a virtual camera).

This configuration improves the convenience for the user having the authority to output.

(8) In the above (1), the specific user includes a user who is relevant (e.g., a friendship relationship, or a relationship in which the degree of intimacy exceeds a predetermined value) to another user who has been already associated with one of the plurality of virtual-space providing sections, and a predetermined virtual-space providing section with which the specific user is associated is the virtual-space providing section with which the other user is associated.

This configuration allows users, not limited to specific users, to be associated with a virtual-space providing section, taking into account the relationship between the users, making it easier for them to act and communicate within the same virtual space that is provided by the same virtual-space providing section, and making it easier to enhance the atmosphere in the virtual space.

(9) A system (virtual space content distribution system) according to one aspect of the present invention includes a computer (e.g., distribution server computer 100) that controls a plurality of virtual-space providing sections (e.g., rooms corresponding to spatial areas ER1a to ER1d in FIG. 12, a plurality of rooms each constituting virtual space in FIG. 42A) that provides a virtual space to a user, the computer including a processor and a memory, the system including the processor being configured to perform process of, in response to a request (e.g., logging in, entering room by selecting content, or designating a room to enter) for entry into the virtual space from a user, associating the user with one of the plurality of virtual-space providing sections (e.g., steps S423, S425, and S426 of the room entry special processing in FIG. 42B), the plurality of virtual-space providing sections each having a predetermined upper limit (e.g., 200 users) for the number of users to accommodate, the users including a non-specific user who does not meet specific conditions (e.g., general users, users who are not relevant to other users) and specific users who meet the specific conditions (e.g., talent accounts and manager accounts and users who are relevant to other users), in response to an entry request from the non-specific user, not allowing the non-specific user to be associated with a virtual-space providing section whose number of associated users has reached the predetermine number (e.g., NO in step S421 or S424 of FIG. 42B), while, in response to an entry request from the specific user, allowing the specific user to be associated with a predetermined virtual-space providing section, regardless of whether the number of associated users has reached the predetermined number (e.g., steps S421 to S423 and steps S424 to S425 of FIG. 42B).

With this configuration, if an entry request is from a specific user, the restriction on entry to the virtual space set by the upper limit number is exceptionally lifted, and the specific user is allowed to be associated with a predetermined virtual-space providing section, thereby enhancing the convenience for the specific user.

[Examples of Software Implementation]

The various control blocks of the controller of a computer such as a server or terminal in the above-mentioned embodiments may be implemented by a logic circuit (hardware) formed in an integrated circuit (IC chip), or may be implemented by software using a central processing unit (CPU). When the control blocks are implemented by software using a CPU, the computer having the controller includes a CPU that executes the instructions of a program, which is software that implements various functions, a read only memory ROM) or storage device (these are referred to as "recording media") in which the program and various data are recorded so as to be readable by the computer (or CPU), and a random access memory (RAM) in which the program is expanded. Then, when the computer (or CPU) reads and executes the program from the above recording medium, the aim of the present invention is achieved. The recording medium may be a "non-transitory tangible medium" such as a tape, a disk, a card, a semiconductor memory, or a programmable logic circuit. The program may be supplied to the computer via any transmission medium (e.g., a communication network or broadcast waves) capable of transmitting the program. One aspect of the present invention can also be implemented in the form of a data signal embedded in a carrier wave, in which the above program is embodied by electronic transmission.

The embodiments disclosed in this description are to be considered in all respects as illustrative and not restrictive. The scope of the present invention is defined by the claims, rather than the above description, and is intended to include any modification within the meaning and scope equivalent to the terms of the claims.

REFERENCE SIGNS LIST

1 Performer avatar
100 Distribution server computer
150 Administrator terminal
200 Performer terminal
300 Viewer terminal

What is claimed is:

1. A method of controlling a computer to provide a virtual space to a user, the method comprising:

a step of performing a process to display an image in the virtual space, the virtual space including a predetermined space, in which a plurality of types of objects including a first type of object and a second type of object are displayable, the step of performing a process to display an image in the virtual space including:

when first object information for displaying the first type of object is identifiable, performing a process of displaying the predetermined space regardless of whether second object information for displaying the second type of object is identifiable, and displaying the predetermined space so that: when the second object information is identifiable, the second type of object is displayed in a display mode in accordance with the second object information; and when the second object information is not identifiable, an alternative object corresponding to the second type of object is displayed.

2. The method according to claim 1, wherein the computer is a user terminal that displays a virtual space provided, and the step of performing a process to display an image in the virtual space includes: displaying an alternative object when the first object information is identifiable and when the second type of object is not identifiable after a predetermined time has elapsed since the timing when the second object information is to be received after a request for object information.

3. The method according to claim 1, wherein the computer is a distribution device that distributes information for providing the virtual space to a user terminal, and when the distribution device receives a request for object information from the user terminal, and identifies object information including the second object information for distributing, the step of performing a process to display an image in the virtual space distributes alternative object information for displaying the alternative object when the second object information is not identifiable.

4. The method according to claim 1, wherein the predetermined space is a space for providing event content in the predetermined space on a scheduled date.

5. The method according to claim 1, wherein the second type of object is an object whose display mode is changeable, and the second object information being not identifiable includes display mode information corresponding to a current display mode of the second type of object being not identifiable, and the step of performing a process to display an image in the virtual space includes: displaying the predetermined space so that: when the display mode information is identifiable, the second type of object is displayed in a display mode in accordance with the display mode information; and when the display mode information is not identifiable, the second type of object that is the alternative object is displayed in a predetermined display mode.

6. The method according to claim 1, wherein the second type of object is an object whose display mode is changeable in accordance with a user's action in the virtual space.

7. The method according to claim 6, wherein the user's action includes user's operation of placing the second type of object in the predetermined space and the user's operation of generating a display mode of the second type of object when placing the object.

8. A system including a computer that is configured to provide a virtual space to a user, the system comprising:

the computer including a processor and a memory, the processor being configured to perform a process to display an image in the virtual space, the virtual space including a predetermined space, in which a plurality of types of objects including a first type of object and a second type of object are displayable, when first object information for displaying the first type of object is identifiable, the processor performs a process of displaying the predetermined space regardless of whether second object information for displaying the second type of object is identifiable, and the processor displays the predetermined space so that: when the second object information is identifiable, the second type of object is displayed in a display mode in accordance with the second object information; and when the second object information is not identifiable, an alternative object corresponding to the second type of object is displayed.

* * * * *